United States Patent
Brighton et al.

(10) Patent No.: US 12,541,840 B1
(45) Date of Patent: Feb. 3, 2026

(54) SYSTEMS AND TECHNIQUES FOR VEHICLE INSPECTION AND CONDITION ANALYSIS

(71) Applicant: ACV Auctions Inc., Buffalo, NY (US)

(72) Inventors: Mark Brighton, Buffalo, NY (US); Akhil Kanna Devarashetti, Amherst, NY (US); Margaret Donnelly, Buffalo, NY (US); Livio Forte, III, Lloyd Harbor, NY (US); William Giegerich, Buffalo, NY (US); Frank Pollina, Pendleton, NY (US); Philip Schneider, Amherst, NY (US)

(73) Assignee: ACV Auctions Inc., Buffalo, NY (US)

( * ) Notice: Subject to any disclaimer, the term of this patent is extended or adjusted under 35 U.S.C. 154(b) by 0 days.

(21) Appl. No.: 19/009,900

(22) Filed: Jan. 3, 2025

Related U.S. Application Data

(60) Provisional application No. 63/689,539, filed on Aug. 30, 2024.

(51) Int. Cl.
*G06T 7/00* (2017.01)
*G06T 3/4038* (2024.01)
(Continued)

(52) U.S. Cl.
CPC .......... *G06T 7/0008* (2013.01); *G06T 3/4038* (2013.01); *G06T 7/70* (2017.01);
(Continued)

(58) Field of Classification Search
CPC ....... G06V 10/751; G05T 7/0008; G05T 7/70; G06T 3/4038; G06T 2200/04;
(Continued)

(56) References Cited

U.S. PATENT DOCUMENTS

| 6,369,849 | B1 | 4/2002 | Rzyski |
| 6,661,516 | B1 | 12/2003 | Dietsch et al. |

(Continued)

FOREIGN PATENT DOCUMENTS

| JP | 2011-255033 A | 12/2011 |
| JP | 3196221 U | 2/2015 |

(Continued)

OTHER PUBLICATIONS

Kasch J, Ahmadian M. Design and Operational Assessment of a Railroad Track Robot for Railcar Undercarriage Condition Inspection. Designs. Jul. 10, 2024;8(4):70. (Year: 2024).*

(Continued)

*Primary Examiner* — Tracy Mangialaschi
(74) *Attorney, Agent, or Firm* — Wolf, Greenfield & Sacks, P.C.

(57) ABSTRACT

Systems and techniques for inspecting undercarriages of vehicles. Some embodiments provide a vehicle undercarriage inspection system. The vehicle undercarriage inspection system may include a base having a width and a depth respectively extending along first and second orthogonal directions, the width extending from a first end to a second end of the base. The vehicle undercarriage inspection system may include a sensor array coupled to the base, the sensor array including a set of cameras oriented in multiple directions. The set of cameras may include: a first camera oriented in part towards the first end of the base, a second camera oriented in part towards the second end of the base, and a third camera between the first and second. The vehicle undercarriage inspection system may include a processor configured to control the sensor array to capture images of an undercarriage of a vehicle with the set of cameras.

19 Claims, 75 Drawing Sheets

(51) Int. Cl.
*G06T 7/70* (2017.01)
*G06V 10/75* (2022.01)

(52) U.S. Cl.
CPC ........ *G06V 10/751* (2022.01); *G06T 2200/04* (2013.01); *G06T 2200/08* (2013.01); *G06T 2207/20081* (2013.01); *G06T 2207/30252* (2013.01)

(58) Field of Classification Search
CPC ....... G06T 2200/08; G06T 2207/20081; G06T 2207/30252
See application file for complete search history.

(56) References Cited

U.S. PATENT DOCUMENTS

| | | |
|---|---|---|
| 6,856,344 B2 | 2/2005 | Franz |
| 7,349,007 B2 | 3/2008 | Millar |
| 7,359,042 B2 | 4/2008 | Ovadia |
| 8,006,559 B2 | 8/2011 | Mian et al. |
| 8,155,384 B2 | 4/2012 | Chew |
| 8,230,362 B2 | 7/2012 | Couch |
| 8,305,442 B2 | 11/2012 | Millar |
| 8,358,343 B2 | 1/2013 | Millar |
| 8,594,979 B2 | 11/2013 | Icove et al. |
| 8,817,098 B2 | 8/2014 | Millar |
| 9,244,133 B2 | 1/2016 | Icove et al. |
| 9,599,537 B2 | 3/2017 | DeAscanis et al. |
| 9,648,256 B2 | 5/2017 | Ramsey et al. |
| 9,649,990 B2 | 5/2017 | Hoellmann et al. |
| 10,346,969 B1 | 7/2019 | Raghu et al. |
| 10,410,182 B1 | 9/2019 | Tang et al. |
| 10,497,108 B1 | 12/2019 | Knuffman et al. |
| 10,825,097 B1 | 11/2020 | Knuffman et al. |
| 10,893,213 B2 | 1/2021 | Magnuszewski et al. |
| 11,196,965 B2 | 12/2021 | Hansen |
| 11,770,493 B2 | 9/2023 | Carolus et al. |
| 12,140,501 B1 | 11/2024 | Hever et al. |
| 12,235,187 B2 | 2/2025 | Utting |
| 2003/0185340 A1 | 10/2003 | Frantz |
| 2004/0057042 A1 | 3/2004 | Ovadia |
| 2004/0165750 A1 | 8/2004 | Chew |
| 2004/0199785 A1 | 10/2004 | Pederson |
| 2006/0170768 A1 | 8/2006 | Riley |
| 2006/0262190 A1* | 11/2006 | Millar .................. G06V 10/751 348/148 |
| 2007/0030349 A1 | 2/2007 | Riley |
| 2007/0040911 A1 | 2/2007 | Riley |
| 2007/0273760 A1 | 11/2007 | Morrison et al. |
| 2008/0136625 A1 | 6/2008 | Chew |
| 2008/0292211 A1 | 11/2008 | Frantz |
| 2009/0033744 A1 | 2/2009 | Frantz |
| 2011/0098056 A1 | 4/2011 | Rhoads et al. |
| 2014/0036082 A1 | 2/2014 | Hoellmann et al. |
| 2014/0313334 A1 | 10/2014 | Slotky |
| 2015/0331113 A1 | 11/2015 | Stettner et al. |
| 2016/0090132 A1 | 3/2016 | Ramsey et al. |
| 2016/0195613 A1* | 7/2016 | Knox ..................... B61L 3/065 342/52 |
| 2017/0180611 A1 | 6/2017 | Arcaini et al. |
| 2018/0012350 A1 | 1/2018 | Gangitano et al. |
| 2018/0035606 A1 | 2/2018 | Burdoucci |
| 2019/0113464 A1 | 4/2019 | Tingle |
| 2019/0204184 A1 | 7/2019 | Neumann et al. |
| 2019/0304099 A1 | 10/2019 | Hever et al. |
| 2019/0304100 A1 | 10/2019 | Hever et al. |
| 2020/0175352 A1 | 6/2020 | Cha et al. |
| 2020/0322545 A1* | 10/2020 | Magnuszewski ...... H04N 23/55 |
| 2020/0322546 A1 | 10/2020 | Carolus et al. |
| 2021/0018426 A1 | 1/2021 | Amer et al. |
| 2021/0090242 A1 | 3/2021 | Hever et al. |
| 2021/0174117 A1 | 6/2021 | Hever et al. |
| 2021/0358115 A1 | 11/2021 | Hever et al. |
| 2021/0390720 A1 | 12/2021 | Dmitriev |
| 2022/0051391 A1 | 2/2022 | Bogomolny et al. |
| 2022/0097463 A1 | 3/2022 | Shklyar et al. |
| 2022/0101512 A1 | 3/2022 | Grossman et al. |
| 2023/0251398 A1 | 8/2023 | Morton |
| 2023/0342937 A1 | 10/2023 | Hever et al. |
| 2023/0388442 A1 | 11/2023 | Carolus et al. |
| 2024/0144358 A1 | 5/2024 | Hauk |
| 2024/0351705 A1 | 10/2024 | Ferry et al. |
| 2024/0404041 A1 | 12/2024 | Hever et al. |
| 2025/0063131 A1 | 2/2025 | Carolus et al. |

FOREIGN PATENT DOCUMENTS

| | | | | |
|---|---|---|---|---|
| KR | 101630596 B1 * | 6/2016 | ............... | G08G 1/04 |
| WO | WO 2004/061771 A1 | 7/2004 | | |
| WO | WO-2006059998 A1 * | 6/2006 | ........... | H04N 5/2627 |
| WO | WO 2006/091874 A2 | 8/2006 | | |
| WO | WO 2012/103999 A1 | 8/2012 | | |
| WO | WO 2013/178460 A1 | 12/2013 | | |
| WO | WO 2020/250220 A1 | 12/2020 | | |

OTHER PUBLICATIONS

Dickson, Paul, et al. "Mosaic generation for under vehicle inspection." Sixth IEEE Workshop on Applications of Computer Vision, 2002. (WACV 2002). Proceedings. IEEE, 2002. (Year: 2002).*

Ross, Robert, John Devlin, and Anthony de Souza-Daw. "VUIR: A Vehicle Undercarriage Inspection Robot." Recent Advances in Robotics and Automation. Berlin, Heidelberg: Springer Berlin Heidelberg, 2013. 183-192. (Year: 2013).*

Tevema Marketing, "Is Aluminum Better in Tension or Compression," May 6, 2024. (Year: 2024).*

International Search Report and Written Opinion for International Application No. PCT/US2020/026417 mailed Jul. 31, 2020.

Extended European Search Report for European Application No. 20784941.5 dated Nov. 22, 2022.

Ruiz et al., Use of an automatic under-vehicle inspection system as a tool to streamline vehicle screening at ports of entry and security checkpoints. 2012 European Intelligence and Security Informatics Conference. Aug. 22, 2012:329-33.

[No Author Listed], All-in-One Digital Marketing Software for Dealers. UnderCarriage Photography. Youtube. https://www.youtube.com/watch?v=dSej-eRA5e0 Jun. 7, 2023. 1 page.

Kiong, Vehicle Undercarriage Scanning System. University of Southern Queensland. Faculty of Engineering & Surveying. Submitted Oct. 27, 2005. 163 pages.

* cited by examiner

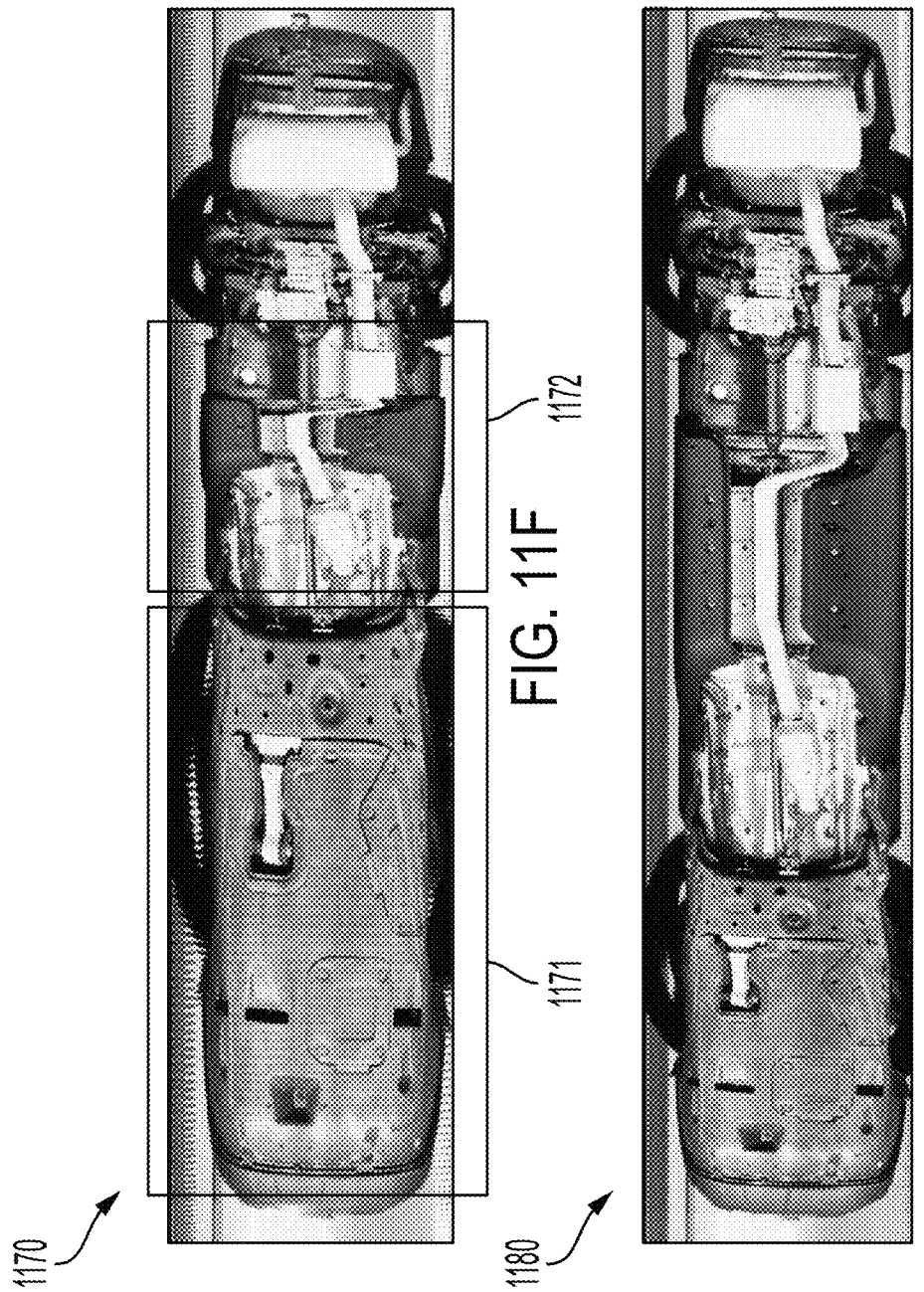

SYSTEMS AND TECHNIQUES FOR VEHICLE INSPECTION AND CONDITION ANALYSIS

RELATED APPLICATIONS

This application claims priority under 35 U.S.C. § 119(e) to U.S. Provisional Application No. 63/689,539, filed on Aug. 30, 2024, entitled "SYSTEMS AND TECHNIQUES FOR VEHICLE INSPECTION AND CONDITION ANALYSIS", which is herein incorporated by reference in its entirety.

FIELD

This disclosure relates to vehicle inspection systems.

BACKGROUND

Vehicles are often bought and sold multiple times throughout their lifetimes. Vehicles can be bought and sold in person, online in a virtual sales environment, and/or at auctions, which may take place in person or online over the Internet. Because of the large volume of vehicles sold at auctions, it is often not possible for buyers to inspect vehicles in person, let alone have the vehicles inspected by qualified mechanics. Buyers often rely on auction houses or third-party inspection services to provide information about the vehicle upon which purchasing decisions may be made. Such information about a vehicle may be provided, in electronic form, as a part of a vehicle condition report. The value of a vehicle condition report depends on the accuracy and completeness of the data it contains. Vehicle condition reports contain information about many different parts of vehicles, and it is difficult to obtain this information accurately and efficiently when inspecting a vehicle.

SUMMARY

Some embodiments provide for a vehicle inspection system for inspecting a vehicle, the system comprising: a vehicle exterior inspection system comprising: a first support member; a first sensor array coupled to the first support member and comprising a first set of cameras positioned to capture images of wheels of the vehicle being imaged; a second sensor array coupled to the first support member and comprising a second set of cameras positioned to capture images of a side of the vehicle being imaged; and a third sensor array coupled to the first support member and comprising a third set of cameras positioned to capture images of a roof of the vehicle being imaged; and a vehicle undercarriage inspection system comprising: a base having a width and a depth respectively extending along first and second directions orthogonal to one another, the width extending from a first end of the base to a second end of the base, the base supporting a fourth sensor array configured to capture images of an undercarriage of the vehicle, wherein the fourth sensor array comprises: a first camera positioned at a first side of the base, and oriented towards the first side of the base; a second camera positioned at a second side of the base, and oriented towards the second side of the base; and a third camera positioned between the first and second cameras, wherein the vehicle inspection system is configured to: capture a first plurality of images of the vehicle using the first, second and third sets of cameras of the vehicle exterior inspection system; and capture a second plurality of images of the undercarriage of the vehicle using the fourth sensor array of the vehicle undercarriage inspection system.

In some embodiments, the vehicle inspection system further comprises a computer hardware processor configured to: when the vehicle is moved relative to the vehicle exterior inspection system and the vehicle undercarriage inspection system: triggering the capture of the first plurality of images of the vehicle using the first, second and third sets of cameras of the vehicle exterior inspection system, receiving the first plurality of images, and/or processing the first plurality of images; and triggering the capture of a second plurality of images of the undercarriage of the vehicle using the fourth sensor array of the vehicle undercarriage inspection system, receiving the second plurality of images, and/or processing the second plurality of images.

In some embodiments, the vehicle inspection system is configured to trigger the capture the first and second plurality of images based on a position of the vehicle.

In some embodiments, the vehicle undercarriage inspection system further comprises: a sensor configured to output data indicative of the position and/or motion of the vehicle relative to the vehicle inspection system, wherein the capturing of the first plurality of images is performed in response to determining the vehicle is at a first position and/or first distance relative to the vehicle inspection system, based on the data indicative of the position and/or motion of the vehicle.

In some embodiments, the capturing of the second plurality of images is performed in response to determining the vehicle is at a second position and/or distance relative to the vehicle inspection system, different from the first position, based on the data indicative of the position and/or motion of the vehicle.

In some embodiments, the second position is closer to the vehicle inspection system than the first position, and/or the first distance is smaller than the second distance.

In some embodiments, the computer hardware processor is further configured to perform: stopping the capturing of the first plurality of images in response to determining the vehicle is at a third position and/or distance relative to the vehicle inspection system, different from the first and second positions and/or distances, based on the data indicative of the position and/or motion of the vehicle; and stopping the capturing of the second plurality of images in response to determining the vehicle is at a fourth position and/or distance relative to the vehicle inspection system, different from the first, second and third positions and/or distances, based on the data indicative of the position and/or motion of the vehicle.

In some embodiments, the vehicle exterior inspection system further comprises: a second support member; a fourth sensor array coupled to the second support member and comprising a fourth set of cameras positioned to capture images of wheels of the vehicle being imaged; a fifth sensor array coupled to the second support member and comprising a fifth set of cameras positioned to capture images of a side of the vehicle being imaged; and a sixth sensor array coupled to the second support member and comprising a sixth set of cameras positioned to capture images of a roof of the vehicle being imaged.

In some embodiments, the vehicle exterior inspection system is portable and is collapsible between a deployed and a stowed configuration, and is configured to image the vehicle when in the deployed configuration, and the vehicle undercarriage inspection system weighs less than 10 pounds, and further comprises a handle attached to the base for lifting the vehicle undercarriage inspection system.

In some embodiments, one or more of the first, second, third and fourth sensor arrays comprise one or more of: a microphone, an infrared camera, a thermal camera, a magnetometer, a time of flight sensor, a light source, and/or an air quality sensor.

In some embodiments, the first, second, and third sensor arrays are configured such that a combined FOV of the first, second and third sets of cameras spans at least 150 inches in height, 300 inches in length and 120 inches in width.

Some embodiments provide for a vehicle inspection system for analyzing condition of a vehicle, the system comprising: a vehicle exterior inspection system comprising: a first support member; a first sensor array coupled to the first support member and comprising a first set of cameras positioned to capture images of wheels of the vehicle being imaged; a second sensor array coupled to the first support member and comprising a second set of cameras positioned to capture images of a side of the vehicle being imaged; and a third sensor array coupled to the first support member and comprising a third set of cameras positioned to capture images of a roof of the vehicle being imaged; a vehicle undercarriage inspection system comprising: a base having a width and a depth respectively extending along first and second directions orthogonal to one another, the width extending from a first end of the base to a second end of the base, the base supporting a fourth sensor array configured to capture images of an undercarriage of the vehicle, wherein the fourth sensor array comprises: a first camera positioned at a first side of the base, and oriented towards the first side of the base; a second camera positioned at a second side of the base, and oriented towards the second side of the base; and a third camera positioned between the first and second cameras; and a computer hardware processor configured to perform: obtaining a first plurality of images of the vehicle captured using the first, second and third sets of cameras of the vehicle exterior inspection system; obtaining a second plurality of images of the undercarriage of the vehicle captured using the fourth sensor array of the vehicle undercarriage inspection system; processing images of the first and second pluralities of images, using at least one trained machine learning (ML) model, to determine whether the vehicle has one or more defects; and generating a vehicle condition report based on results of the processing of the images of the first plurality of images and the second plurality of images.

In some embodiments, the computer hardware processor is further configured to perform: generating a composite image of the undercarriage of the vehicle by combining images of the second plurality of images, wherein the composite image is processed using the at least one machine learning model to determine whether the vehicle has the one or more defects.

In some embodiments, the one or more defects include: scratches to an exterior of the vehicle; cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, a missing catalytic converter and/or suspension modifications.

In some embodiments, the computer hardware processer is further configured to perform: generating a 3D model of the of the vehicle based on the first and second pluralities of images; generating a visualization of the 3D model; and providing access to the visualization to one or more users.

In some embodiments, the computer hardware processor is further configured to perform: before processing the images of the first plurality of images, identifying a subset of the first plurality of images based on a pose of the vehicle in images of the plurality of images, wherein processing the images of the first plurality of images comprises processing the subset of images.

In some embodiments, the vehicle undercarriage imaging system further comprises a sensor configured to output data indicative of the position and/or motion of the vehicle relative to the vehicle undercarriage inspection system; and generating the composite image is performed based on the data indicative of the position and/or motion of the vehicle.

In some embodiments, one or more of the first, second, third and fourth sensor arrays comprise one or more of: a microphone, an infrared camera, a thermal camera, a magnetometer, a time of flight sensor, a light source, and/or an air quality sensor.

In some embodiments, obtaining the first plurality of images comprises capturing the first plurality of images of the vehicle using the first, second and third sets of cameras of the vehicle exterior inspection system; and obtaining the second plurality of images comprises capturing the second plurality of images of the undercarriage of the vehicle using the fourth sensor array of the vehicle undercarriage inspection system.

Some embodiments provide for a vehicle inspection system, for inspecting a vehicle, the vehicle inspection system comprising: a vehicle exterior inspection system comprising: a first support member comprising a first portion and a second portion angled relative to the first portion; and a first plurality of sensor arrays coupled to the first support member, the first plurality of sensor arrays comprising: a first sensor array comprising a first set of cameras oriented in multiple first directions, the first sensor array being coupled to the first support member at a position at which the first set of cameras has one or more wheels of a vehicle in its field of view (FOV) when the first sensor array is being used to image the vehicle; a second sensor array comprising a second set of cameras oriented in multiple second directions, the second sensor array being coupled to the first support member at a position at which the second set of cameras has a first side of the vehicle in its FOV when the second sensor array is being used to image the vehicle; and a third sensor array comprising a third set of cameras oriented in multiple third directions, the third sensor array being coupled to the first support member at a position at which the third set of cameras has a roof of the vehicle in its FOV when the third sensor array is being used to image the vehicle; and a vehicle undercarriage inspection system, comprising: a base having a width and a depth respectively extending along first and second directions orthogonal to one another, the width extending from a first end of the base to a second end of the base; and a fourth sensor array coupled to the base, the fourth sensor array comprising a set of cameras oriented in multiple directions, the set of cameras including: a first camera oriented in part towards the first end of the base; a second camera oriented in part towards the second end of the base; and a third camera positioned between the first and second cameras.

Some embodiments provide for a method for inspecting a vehicle using a vehicle inspection system, the vehicle inspection system comprising a vehicle exterior inspection system comprising a support member and a plurality of exterior sensor arrays coupled to the support member, the plurality of exterior sensor arrays comprising respective sets of sensors oriented in different directions, and a vehicle undercarriage inspection system comprising an undercarriage sensor array comprising first, second and third cameras configured to capture images at different angles relative to the vehicle undercarriage, and a sensor configured to output data indicative of position and/or motion of the vehicle relative to the vehicle inspection system, the method comprising: moving the vehicle and the vehicle inspection system relative to one another; triggering capture, by the plurality of exterior sensor arrays and undercarriage sensor array, of sensor data about the vehicle; capturing the sensor data about the vehicle using the plurality of exterior sensor arrays and undercarriage sensor array of the vehicle inspection system; stopping capture of the sensor data about the vehicle; stopping movement of the vehicle and the vehicle inspection system relative to one another; and generating a vehicle condition report based on the sensor data collected using the plurality of exterior sensor arrays and the undercarriage sensor array.

In some embodiments, the generating comprises generating the vehicle condition report using the vehicle inspection system.

In some embodiments, the generating comprises: providing to a computer hardware processor, separate from the vehicle inspection system, at least some of the sensor data collected using the plurality of exterior sensor arrays and the undercarriage sensor array.

In some embodiments, the triggering is performed by the vehicle inspection system based on the data indicative of the position and/or motion of the vehicle.

In some embodiments, the triggering comprises: triggering capture of the sensor data by the plurality of exterior sensor arrays when the vehicle is determined to be at a first position and/or distance relative to the vehicle inspection system based on the data indicative of the position and/or motion of the vehicle.

In some embodiments, the triggering comprises: triggering capture of the sensor data by the undercarriage sensor array when the vehicle is determined to be at a second position and/or a second distance relative to the vehicle inspection system, different from the first position, based on the data indicative of the position and/or motion of the vehicle.

In some embodiments, the second position is closer to the vehicle inspection system than the first position, and/or the second distance is smaller than the first distance.

In some embodiments, the stopping is performed by the vehicle inspection system based on the data indicative of the position and/or motion of the vehicle.

In some embodiments, the method further comprises: before the moving, placing a mobile vehicle diagnostic device (MVDD) of the vehicle inspection system at an engine of the vehicle, wherein the triggering comprises triggering a sensor array of the MVDD of the vehicle inspection system to capture the sensor data about the engine of the vehicle and the capturing comprises using the MVDD to capture the sensor data about the engine of the vehicle.

Some embodiments provide for a method for inspecting a vehicle using a vehicle inspection system, the vehicle inspection system comprising a vehicle exterior inspection system comprising a support member and a plurality of exterior sensor arrays coupled to the support member, the plurality of exterior sensor arrays comprising respective sets of sensors oriented in different directions, and a vehicle undercarriage inspection system comprising an undercarriage sensor array comprising first, second and third cameras configured to capture images at different angles relative to the vehicle undercarriage, and a sensor configured to output data indicative of position and/or motion of the vehicle relative to the vehicle undercarriage inspection system, the method comprising: moving the vehicle and the vehicle inspection system relative to one another; triggering capture, by the plurality of exterior sensor arrays and undercarriage sensor array, of sensor data about the vehicle; capturing the sensor data about the vehicle using the plurality of exterior sensor arrays and undercarriage sensor array of the vehicle inspection system; stopping capture of the sensor data about the vehicle; stopping movement of the vehicle and the vehicle inspection system relative to one another; and processing the sensor data, using a computer hardware processor, to identify one or more vehicle defects.

In some embodiments, the triggering comprises: triggering capture of the sensor data by the plurality of exterior sensor arrays is performed when the vehicle is determined to be at a first position and/or distance relative to the vehicle inspection system based on the data indicative of the position and/or motion of the vehicle.

In some embodiments, the triggering comprises: triggering capture of the sensor data by the undercarriage sensor array is performed when the vehicle is determined to be at a second position and/or distance relative to the vehicle inspection system, different from the first position, based on the data indicative of the position and/or motion of the vehicle.

In some embodiments, the stopping is performed by the vehicle inspection system based the data indicative of the position and/or motion of the vehicle.

In some embodiments, the method further comprises: before the moving, placing a mobile vehicle diagnostic device (MVDD) of the vehicle inspection system at an engine of the vehicle, wherein the triggering comprises triggering a sensor array of the MVDD of the vehicle inspection system to capture the sensor data about the engine of the vehicle and the capturing comprises using the MVDD to capture the sensor data about the engine of the vehicle.

Some embodiments provide for a method for inspecting a vehicle using a vehicle inspection system, the vehicle inspection system comprising a vehicle exterior inspection system comprising a support member and a plurality of exterior sensor arrays coupled to the support member, the plurality of exterior sensor arrays comprising respective sets of sensors oriented in different directions, and a vehicle undercarriage inspection system comprising an undercarriage sensor array comprising first, second and third cameras configured to capture images at different angles relative to the vehicle undercarriage, and a sensor configured to output data indicative of position and/or motion of the vehicle relative to the vehicle inspection system, the method comprising: positioning the vehicle, the vehicle exterior inspections system and the vehicle undercarriage inspection system relative to one another; triggering the vehicle inspection system to collect alignment data of the vehicle relative to the vehicle inspection system; obtaining an indication of an alignment of the vehicle relative to the vehicle inspection system based on the alignment data; based on the indication of the alignment of the vehicle, adjusting one or more of the exterior sensor arrays or the undercarriage sensor array; moving the vehicle and the vehicle inspection system relative to one another; capturing sensor data about the vehicle using the plurality of exterior sensor arrays and undercarriage sensor array of the vehicle inspection system; and processing the sensor data, using a computer hardware processor, to identify one or more vehicle defects.

In some embodiments, the alignment data is captured by the sensor of the vehicle undercarriage inspection system configured to output the data indicative of the position and/or motion of the vehicle.

In some embodiments, the moving comprises driving the vehicle past the vehicle undercarriage inspection system and vehicle exterior inspection system. In some embodiments, the moving comprises moving the vehicle exterior and vehicle undercarriage inspection systems about the vehicle.

In some embodiments, the method further comprises: before the moving, placing a mobile vehicle diagnostic device (MVDD) of the vehicle inspection system at an engine of the vehicle, wherein the triggering comprises triggering a sensor array of the MVDD of the vehicle inspection system to capture the sensor data about the engine of the vehicle and the capturing comprises using the MVDD to capture the sensor data about the engine of the vehicle.

In some embodiments, the method further comprises: receiving an indication the capturing was unsuccessful; and recapturing second sensor data about the vehicle using the plurality of exterior sensor arrays and undercarriage sensor array of the vehicle inspection system.

Some embodiments provide for a system for vehicle inspection, the system comprising: a first support member comprising a first portion and a second portion angled relative to the first portion; a first plurality of sensor arrays coupled to the first support member, the first plurality of sensor arrays comprising: a first sensor array comprising a first set of cameras oriented in multiple first directions, the first sensor array being coupled to the first support member at a position at which the first set of cameras has one or more wheels of a vehicle in its field of view (FOV) when the first sensor array is being used to image the vehicle; a second sensor array comprising a second set of cameras oriented in multiple second directions, the second sensor array being coupled to the first support member at a position at which the second set of cameras has a first side of the vehicle in its FOV when the second sensor array is being used to image the vehicle; and a third sensor array comprising a third set of cameras oriented in multiple third directions, the third sensor array being coupled to the first support member at a position at which the third set of cameras has a roof of the vehicle in its FOV when the third sensor array is being used to image the vehicle; and a processor configured to control the first plurality of sensor arrays to capture images of the vehicle.

In some embodiments, the first sensor array is positioned below the second and third sensor arrays on the first support member. In some embodiments, the second sensor array is positioned below the third sensor array on the first support member. In some embodiments, the first and second sensor arrays are positioned on the first portion of the first support member, and the third sensor array is positioned on the second portion of the first support member.

In some embodiments, the first sensor array further comprises: a microphone, an infrared camera, a thermal camera, a magnetometer, a light source and/or an air quality sensor.

In some embodiments, the system further comprises: a second support member comprising a third portion, and a fourth portion angled relative to the third portion; and a second plurality of sensor arrays coupled to the second support member, the second plurality of sensor arrays comprising: a fourth sensor array comprising a fourth set of cameras oriented in multiple fourth directions, the fourth sensor array being coupled to the second support member at a position at which the fourth set of cameras has one or more wheels of a vehicle in its FOV when the fourth sensor array is being used to image the vehicle; a fifth sensor array comprising a fifth set of cameras oriented in multiple fifth directions, the fifth sensor array being coupled to the second support member at a position at which the fifth set of cameras has a second side of the vehicle in its field of view when the fifth sensor array is being used to image the vehicle; and a sixth sensor array comprising a sixth set of cameras oriented in multiple sixth directions, the sixth sensor array being coupled to the second support member at a position at which the sixth set of cameras has the roof of the vehicle in its field of view when the sixth sensor array is being used to image the vehicle, wherein the processor is further configured to control the second plurality of sensor arrays capture images of the vehicle.

In some embodiments, the first plurality of sensor arrays is configured such that a combined FOV of the first, second and third sets of cameras spans at least 150 inches in height, 300 inches in length and 120 inches in width.

In some embodiments, during imaging the vehicle and the first support member move relative to one another along a first direction; the first set of cameras comprises: a first camera oriented in part towards the first direction; a second camera oriented in part opposite the first direction; and a third camera oriented substantially perpendicular to the first direction; the first camera has a rocker panel and wheels of the vehicle in its field of view when being used to image the vehicle; the second camera has the rocker panel and rear of the vehicle in its field of view when being used to image the vehicle; and the third camera has one or more wheels of the vehicle in its field of view when being used to image the vehicle.

In some embodiments, during imaging the vehicle and the first support member move relative to one another along a first direction; the second set of cameras comprises: a first camera oriented in part towards the first direction; a second camera oriented in part opposite the first direction; and a third camera oriented substantially perpendicular to the first direction; the first camera has the side and front of the vehicle in its field of view when being used to image the vehicle; the second camera has the side and rear of the vehicle in its field of view when being used to image the vehicle; and the third camera has the side of the vehicle in its field of view when being used to image the vehicle.

In some embodiments, during imaging the vehicle and the first support member move relative to one another along a first direction; the third set of cameras comprises: a first camera oriented in part towards the first direction; a second camera oriented in part opposite the first direction; and a third camera oriented substantially perpendicular to the first direction; the first camera has the roof, front, and hood of the vehicle in its field of view when being used to image the vehicle; the second camera has the roof and rear of the vehicle in its field of view when being used to image the vehicle; and the third camera has the hood and the roof of the vehicle in its field of view when being used to image the vehicle.

In some embodiments, the first support member is portable and is collapsible between a deployed and a stowed configuration, and the vehicle inspection system is configured to image the vehicle when the first support member is in the deployed configuration.

In some embodiments, the processor is configured to control the first plurality of sensor arrays to image the vehicle as the vehicle is driven past the first support member. In some embodiments, the processor is configured to control the first support member to move about the vehicle, and the processor is configured to control the first plurality of sensor arrays to image the vehicle as the first support member moves about the vehicle.

In some embodiments, the processor is further configured to process the images of the vehicle using at least one trained machine learning (ML) model, to determine whether the vehicle has one or more defects, wherein the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

In some embodiments, the system further comprises a vehicle undercarriage inspection system comprising a fourth sensor array configured to capture signals related to the undercarriage of the vehicle.

Some embodiments provide for a system for vehicle inspection, the system comprising: a support member; a first plurality of sensor arrays coupled to the first support member, the first plurality of sensor arrays comprising: a first sensor array comprising a first set of cameras oriented in multiple first directions and a first microphone; a second sensor array comprising a second set of cameras oriented in multiple second directions and a second microphone; and a third sensor array comprising a third set of cameras oriented in multiple third directions, and a third microphone; and a processor configured to control the first plurality of sensor arrays to capture images and audio recordings of the vehicle.

In some embodiments, during imaging the vehicle and support member move relative to one another along a first direction; and the first, second and third sets of cameras respectively comprise: a first camera oriented in part towards the first direction; a second camera oriented in part opposite the first direction; and a third camera oriented substantially perpendicular to the first direction.

In some embodiments, the processor is further configured to process the images and/or audio of the vehicle using at least one trained machine learning (ML) model, to determine whether the vehicle has one or more defects, wherein the one or more defects include: scratches to an exterior of the vehicle; cracked windows, mirrors, or windshields; chipped paint; dents to the exterior of the vehicle; misaligned body panels; missing vehicle parts, non-standard replacement parts, non-standard paint; aftermarket vehicle accessories; rust/corrosion on the vehicle; damaged wheels; damaged tires; bald tires; tire sidewall bubbles; broken tire valves; wheel misalignment; mismatched tires; brake rotor discoloration; brake rotor damage; brake rotor wear; suspension modifications; engine damage; an exhaust leak; and/or transmission whine.

Some embodiments provide for a system for vehicle inspection, the system comprising: a support member; a first plurality of sensor arrays coupled to the first support member, the first plurality of sensor arrays configured to capture signals about a vehicle as the vehicle and support member move relative to one another along a first direction, and comprising: a first sensor array comprising a first set of cameras, the first sensor array coupled to the first support member at a position at which the first set of cameras has a first side of the vehicle in its FOV when the first sensor array is being used to image the vehicle, the first set of cameras comprising: a first camera oriented in part towards the first direction; a second camera oriented in part opposite the first direction; and a third camera oriented substantially perpendicular to the first direction; and a second sensor array comprising a second set of cameras, the first sensor array coupled to the first support member at a position at which the second set of cameras has a roof of the vehicle in its FOV when the second sensor array is being used to image the vehicle, the second set of cameras comprising: a fourth camera oriented in part towards the first direction; a fifth camera oriented in part opposite the first direction; and a sixth camera oriented substantially perpendicular to the first direction; and a processor configured to control the first plurality of sensor arrays to capture images of the vehicle.

In some embodiments, the first camera has the side and front of the vehicle in its FOV when being used to image the vehicle; the second camera has the side and rear of the vehicle in its FOV when being used to image the vehicle; the third camera has the side of the vehicle in its FOV when being used to image the vehicle; the fourth camera has the roof, front, and hood of the vehicle in its FOV when being used to image the vehicle; the fifth camera has the roof and rear of the vehicle in its FOV when being used to image the vehicle; and the sixth camera has the hood and the roof of the vehicle in its FOV when being used to image the vehicle.

Some embodiments provide for a method for analyzing condition of a vehicle from images of the vehicle collected by a vehicle inspection system, the vehicle inspection system comprising a plurality of sensor arrays comprising first, second and third sensor arrays comprising respective first, second, and third sets of cameras, the method comprising: using at least one computer hardware processor to perform: obtaining a plurality of images using the vehicle inspection system, the plurality of images including first, second, and third sets of images captured, respectively, by the first, second, and third sets of cameras; identifying a subset of the plurality of images for subsequent processing to identify whether the vehicle has one or more defects, wherein the identifying is performed based on a pose of the vehicle in images of the plurality of images; processing the subset of the plurality of images, using at least one trained machine learning (ML) model, to determine whether the vehicle has the one or more defects; and generating a vehicle condition report based on results of the processing, the vehicle condition report including an indication of the one or more defects in the plurality of images.

In some embodiments, the obtaining comprises controlling the plurality of sensor arrays of the vehicle inspection system to capture the plurality of images of the vehicle.

In some embodiments, the controlling comprises: controlling the first set of cameras to capture images of one or more wheels of the vehicle; controlling the second set of cameras to capture images of a first side of the vehicle; and controlling the third set of cameras to capture images of a roof of the vehicle.

In some embodiments, the method further comprises: generating a 3D model of the vehicle using at least some of the plurality of images; generating a visualization of the 3D model; and providing access to the visualization to one or more users.

In some embodiments, the 3D model is generated using photogrammetry, neural radiance fields, or Gaussian splatting.

In some embodiments, the method further comprises: identifying, from among the plurality of images, an image containing personally identifiable information (PII); identifying a region of the image containing the PII; and distorting the region of the image containing the PII, wherein the vehicle condition report includes the image.

In some embodiments, the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

In some embodiments, the vehicle inspection system further comprises a vehicle undercarriage inspection system; and the plurality of images includes a fourth set of images of an undercarriage of the vehicle captured by the vehicle undercarriage inspection system.

In some embodiments, identifying the subset of the plurality of images for subsequent processing comprises: determining a degree of matching between the pose of the vehicle in images of the plurality of images and vehicle poses of a reference set of vehicle poses; and for each vehicle pose of the reference set of vehicle poses, identifying an image in the plurality of images having at least a threshold degree of matching and including the identified image in the subset of the plurality of images.

In some embodiments, determining the degree of matching between the pose of the vehicle in the images of the plurality of images and vehicle poses of the reference set of vehicle poses comprises: determining a distance between a center of a bounding box of the vehicle in an image and the center of the image.

In some embodiments, the set of vehicle poses includes poses associated with the cameras of the first, second and third sets of cameras.

Some embodiments provide for a vehicle inspection system comprising: a plurality of sensor arrays comprising first, second and third sensor arrays comprising respective first, second, and third sets of cameras; and a computer hardware processor configured to perform: obtaining a plurality of images, the plurality of images including first, second, and third sets of images captured, respectively, by the first, second, and third sets of cameras; identifying a subset of the plurality of images for subsequent processing to identify whether the vehicle has one or more defects, wherein the identifying is performed based on a pose of the vehicle in images of the plurality of images; processing the subset of the plurality of images, using at least one trained machine learning (ML) model, to determine whether the vehicle has the one or more defects; and generating a vehicle condition report based on results of the processing, the vehicle condition report including an indication of the one or more defects in the plurality of images.

In some embodiments, the obtaining comprises controlling the plurality of sensor arrays of the vehicle inspection system to capture the plurality of images of the vehicle.

In some embodiments, the controlling comprises: controlling the first set of cameras to capture images of one or more wheels of the vehicle; controlling the second set of cameras to capture images of a first side of the vehicle; and controlling the third set of cameras to capture images of a roof of the vehicle.

In some embodiments, the vehicle inspection system further comprises: generating, using photogrammetry, neural radiance fields or Gaussian splatting, a 3D model of the vehicle using at least some of the plurality of images; generating a visualization of the 3D model; and providing access to the visualization to one or more users.

In some embodiments, the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint; aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

Some embodiments provide for at least one non-transitory computer-readable storage medium storing processor-executable instructions that, when executed by at least one computer hardware processor, causes the at least one computer hardware processor to perform a method for analyzing conditions of a vehicle from images of the vehicle collected by a vehicle inspection system, the vehicle inspection system comprising a plurality of sensor arrays comprising first, second and third sensor arrays comprising respective first, second, and third sets of cameras, the method comprising: obtaining a plurality of images, the plurality of images including first, second, and third sets of images captured, respectively, by the first, second, and third sets of cameras; identifying a subset of the plurality of images for subsequent processing to identify whether the vehicle has one or more defects, wherein the identifying is performed based on a pose of the vehicle in images of the plurality of images; processing the subset of the plurality of images, using at least one trained machine learning (ML) model, to determine whether the vehicle has the one or more defects; and generating a vehicle condition report based on results of the processing, the vehicle condition report including an indication of the one or more defects in the plurality of images.

In some embodiments, the obtaining comprises controlling the plurality of sensor arrays of the vehicle inspection system to capture the plurality of images of the vehicle.

In some embodiments, the controlling comprises: controlling the first set of cameras to capture images of one or more wheels of the vehicle; controlling the second set of cameras to capture images of a first side of the vehicle; and controlling the third set of cameras to capture images of a roof of the vehicle.

In some embodiments, the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

Some embodiments provide a method for a vehicle using a vehicle inspection system, the vehicle inspection system comprising a support member and a plurality of sensor arrays coupled to the support member, the plurality of sensor arrays comprising respective sets of sensors oriented in different directions, the method comprising: moving the vehicle and the support member of the vehicle inspection system relative to one another; triggering capture of sensor data about the vehicle by the plurality of sensor arrays of the vehicle inspection system; capturing the sensor data about the vehicle using the plurality of sensor arrays of the vehicle inspection system; stopping capture of the sensor data about the vehicle; stopping movement of the vehicle and the support member relative to one another; providing, to a computer hardware processor, the sensor data collected using the plurality of sensor arrays; and receiving, from the computer hardware processor, a vehicle condition report generated using the sensor data.

In some embodiments, the plurality of sensor arrays comprise first, second and third sensor arrays, the first sensor array comprising a first set of cameras oriented in multiple first directions, the second sensor array comprising a second set of cameras oriented in multiple second directions, the third sensor array comprising a third set of cameras oriented in multiple third directions, and wherein capturing the data related to the vehicle using the plurality of sensor arrays comprises, capturing images of the vehicle using the first, second and third sets of cameras.

In some embodiments, obtaining an image of a front of the vehicle using a camera of the vehicle inspection system.

In some embodiments, the method further comprises, obtaining a plurality of images of an interior of the vehicle using a camera of the vehicle inspection system; and providing the plurality of images to the computer hardware processor.

In some embodiments, the method further comprises: before the moving, placing a mobile vehicle diagnostic device (MVDD) of the vehicle inspection system at an engine of the vehicle, wherein the triggering comprises triggering a sensor array of the MVDD of the vehicle inspection system to capture sensor data about the engine of the vehicle.

In some embodiments, the method further comprises: before the moving, positioning a vehicle undercarriage imaging system of the vehicle inspection system relative to the vehicle and the support member of the vehicle inspection system, wherein the triggering comprises triggering a sensor array of the vehicle undercarriage imaging system to capture sensor data about an undercarriage of the vehicle.

In some embodiments, the method further comprises: obtaining a plurality of images of an interior of the vehicle using a camera of the vehicle inspection system, wherein the providing further comprises providing the plurality of images of the interior of the vehicle to the computer hardware processor.

In some embodiments, the triggering is performed by the vehicle inspection system when the vehicle is detected at a first position by one or more sensors of the plurality of sensor arrays.

In some embodiments, the stopping capture is performed by the vehicle inspection system when the vehicle is detected at a second position, different from the first position, by the one or more sensors of the plurality of sensor arrays.

In some embodiments, the method further comprises: before receiving the vehicle condition report, receiving from the computer hardware processor an indication the capturing was unsuccessful; recapturing second sensor data about the vehicle using the plurality of sensor arrays of the vehicle inspection system; and providing, to the computer hardware processor, the second sensor data collected using the plurality of sensor arrays.

In some embodiments, the method further comprises: before the moving, positioning the support member relative to the vehicle.

In some embodiments, the moving comprises driving the vehicle past the support member. In some embodiments, the moving comprises moving the support member about the vehicle.

Some embodiments provide for a method for inspecting a vehicle using a vehicle inspection system, the vehicle inspection system comprising a support member, and a plurality of sensor arrays coupled to the support member, the plurality of sensor arrays comprising respective sets of sensors oriented in different directions, the method comprising: positioning the vehicle and the support member of the vehicle inspection system relative to one another; triggering the vehicle inspection system to collect alignment data of the vehicle relative to the vehicle inspection system; providing, to a computer hardware processor, the alignment data; receiving, from the computer hardware processor, an indication of an alignment of the vehicle relative to the vehicle inspection system; repositioning the support member relative to the vehicle based on the indication of the alignment; moving the vehicle and the support member of the vehicle inspection system relative to one another; capturing sensor data about the vehicle using the plurality of sensor arrays of the vehicle inspection system; providing, to a computer hardware processor, the sensor data collected using the plurality of sensor arrays; and receiving, from the computer hardware processor, a vehicle condition report.

In some embodiments, the method further comprises: before the moving, positioning a vehicle undercarriage imaging system of the vehicle inspection system relative to the vehicle and the support member of the vehicle inspection system; and performing a registration process between the support member and the vehicle undercarriage imaging system, wherein the triggering comprises triggering the vehicle inspection system to collect alignment data of the support member and the vehicle undercarriage inspection system relative to the vehicle.

In some embodiments, the method further comprises: before the moving, placing a mobile vehicle diagnostic device (MVDD) of the vehicle inspection system at an engine of the vehicle, the MVDD comprising a sensor array.

In some embodiments, the moving comprises driving the vehicle past the support member.

Some embodiments provide for a method for inspecting a vehicle using a vehicle inspection system, the vehicle inspection system comprising a support member, and a plurality of sensor arrays coupled to the support member, the plurality of sensor arrays comprising respective sets of sensors oriented in different directions, the method comprising: moving the vehicle and the support member of the vehicle inspection system relative to one another; capturing sensor data about the vehicle using the plurality of sensor arrays of the vehicle inspection system; stopping movement of the vehicle and the support member relative to one another; providing, to a computer hardware processor, the sensor data collected using the plurality of sensor arrays; receiving, from the computer hardware processor, a vehicle condition report indicating one or more defects present on the vehicle; providing, to the computer hardware processor, a request for sensor data related to the one or more defects present on the vehicle; and receiving, from the computer hardware processor, a plurality of sensor data related to the one or more defects present on the vehicle.

In some embodiments, the sets of sensors oriented in different directions of the plurality of sensor arrays are respective sets of cameras; and the plurality of sensor data related to the one or more defects comprises a plurality of images of the one or more defects taken from different angles by cameras of the respective sets of cameras of the plurality of sensor arrays.

In some embodiments, the method further comprises: analyzing the vehicle to confirm a presence of the one or more defects; providing, to the computer hardware processor, an indication of the presence of the one or more defects; and receiving, from the computer hardware processor, an updated vehicle condition report.

Some embodiments provide for a vehicle undercarriage inspection system, comprising: a base having a width and a depth respectively extending along first and second directions orthogonal to one another, the width extending from a first end of the base to a second end of the base; a sensor array coupled to the base, the sensor array comprising a set of cameras oriented in multiple directions, the set of cameras including: a first camera oriented in part towards the first end of the base; a second camera oriented in part towards the second end of the base; and a third camera positioned between the first and second cameras; and a processor configured to control the sensor array to capture a plurality of images of an undercarriage of a vehicle with the set of cameras.

In some embodiments, the sensor array further comprises: a microphone, an infrared camera, a thermal camera, a magnetometer, a time of flight sensor, a light source, and/or an air quality sensor.

In some embodiments, the processor is further configured to: generate a composite image of the vehicle undercarriage from images of the plurality of images of the vehicle undercarriage captured using the set of cameras.

In some embodiments, the processor is further configured to: process the composite image, using at least one trained machine learning (ML) model, to determine whether the vehicle has one or more defects, or provide the composite image to another computing device for processing with the at least one trained ML model to determine whether the vehicle has one or more defects.

In some embodiments, the one or more defects include: damage to one or more vehicle parts, presence of rust, presence of one or more aftermarket vehicle modifications, altered vehicle suspension, and/or a missing catalytic converter.

In some embodiments, the sensor array further comprises: a first time of flight (TOF) sensor oriented in part toward the first end of the base; and a second TOF sensor oriented in part the second end of the base, wherein the processor is configured to: determine a position and/or motion of the vehicle relative to the vehicle undercarriage inspection system based on signals collected by the first and second TOF sensors; and generate a composite image of the vehicle undercarriage from images of the plurality of images of the vehicle undercarriage captured using the set of cameras and based on the position and/or motion of the vehicle relative to the vehicle undercarriage inspection system.

In some embodiments, the vehicle undercarriage inspection system further comprises a cover coupled to the base, wherein the cover is configured to withstand 16,000 pounds of force. In some embodiments, the cover comprises internal ribbing configured to reinforce the cover to withstand the 16,000 pounds of force.

In some embodiments, the first, second and third cameras are configured such that their combined field of view (FOV) is 200 cm in width with a minimum pixel density of 15 pixels/cm.

In some embodiments, the vehicle undercarriage inspection system weighs less than 10 pounds; and the vehicle undercarriage inspection system further comprises a handle attached to the base for lifting the vehicle undercarriage inspection system.

In some embodiments, the processor is configured to: generate a 3D reconstruction of the vehicle undercarriage using the images of the vehicle undercarriage captured using the set of cameras.

In some embodiments, the vehicle undercarriage inspection further comprises: a substrate supporting a plurality of electronic components, the plurality of electronic components comprising: the processor; respective camera controllers for the first, second and third cameras; and a power supply.

Some embodiments provide for a vehicle undercarriage inspection system, comprising: a base having a width and a depth respectively extending along first and second directions orthogonal to one another, the width extending from a first end of the base to a second end of the base; a sensor array coupled to the base, the sensor array comprising: a set of cameras oriented in multiple directions; and a first time of flight (TOF) sensor configured to detect a position and/or motion of the vehicle; and a processor configured to: control the sensor array to capture a plurality of images of an undercarriage of a vehicle with the set of cameras; and control the TOF sensor to capture one or more signals indicative of the position and/or motion of the vehicle.

In some embodiments, the vehicle undercarriage inspection system further comprises: a second time of flight sensor configured to detect a position and/or motion of the vehicle, wherein: the first time of flight sensor is oriented in part towards the first end of the base; the second time of flight sensor is oriented in part towards the second end of the base; and the first and second time of flight sensors are configured to collect signals indicative of a distance to one or more wheels of the vehicle.

In some embodiments, the first TOF sensor is oriented to collect signals indicative of a distance between the undercarriage of the vehicle and the vehicle undercarriage inspection system.

In some embodiments, wherein the processor is configured to generate a composite image of the undercarriage of the vehicle by combining images of the plurality of images based on the signals indicative of the position and/or motion of the vehicle.

Some embodiments provide for a method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a time of flight (TOF) sensor configured to output signals indicative of distance of one or more parts of the vehicle relative to the vehicle undercarriage inspection system, the method comprising using a computer hardware processor to perform: obtaining, using the TOF sensor, at least one first signal indicative of a distance between the vehicle and the TOF sensor; in response to determining, using the at least one signal, that the vehicle is within a threshold distance of the TOF sensor, triggering the sensor array to capture one or more images of the vehicle undercarriage; capturing the one or more images of the vehicle undercarriage using the sensor array; and processing images of the one or more images using a trained machine learning model to determine whether the vehicle has one or more defects.

In some embodiments, the method further comprises: obtaining, using the TOF sensor, at least one second signal indicative of the distance between the vehicle and the TOF sensor; and in response to determining the vehicle is in a second position relative to the vehicle undercarriage inspection system based on the at least one second signal, triggering the sensor array to stop capture of the images of the vehicle undercarriage.

In some embodiments, the method further comprises: determining, using the at least one signal, that the vehicle is within the threshold distance of the TOF sensor.

In some embodiments, the one or more images of the vehicle undercarriage comprise a plurality of images, and wherein the processing comprises: generating a composite image of the undercarriage of the vehicle by combining the images of the plurality of images based on the signals related to position of the vehicle obtained from the TOF sensor.

Some embodiments provide for a method for analyzing condition of an undercarriage of a vehicle using a vehicle undercarriage inspection system, the vehicle undercarriage inspection system comprising a sensor array, the sensor array comprising first, second, and third cameras, the method comprising using a computer hardware processor to perform: obtaining, using the sensor array of the vehicle undercarriage inspection system, sensor data about the undercarriage of the vehicle captured as the vehicle and vehicle undercarriage inspection system move relative to each other, the sensor data including: first, second and third sets of images captured by the first, second and third cameras, respectively; and data indicative of a position and/or motion of the vehicle relative to the vehicle undercarriage inspection system; generating a composite image of the undercarriage of the vehicle by combining images of the first, second and third sets of images based on the data indicative of a position and/or motion of the vehicle relative to the vehicle undercarriage inspection system; determining whether the vehicle has one or more defects by processing the composite image, using a first trained machine learning (ML) model; and generating a vehicle condition report based on results of the processing.

In some embodiments, the first, second and third sets of images respectively comprise consecutive images of the undercarriage of the vehicle taken by the first, second and third cameras.

In some embodiments, the method further comprises: determining pixel shift distances between adjacent images of the consecutive images of the first, second and third sets of images, wherein generating the composite image is performed based on the pixel shift distances and the data indicative of position and/or motion of the vehicle.

In some embodiments, the vehicle undercarriage imaging system further comprises a sensor configured to output data indicative of a position and/or motion of the vehicle relative to the vehicle undercarriage inspection system.

In some embodiments, the method further comprises: determining pixel shift distances between adjacent images of the consecutive images of the first, second and third sets of images; and aligning the first, second and third sets of images using the respective pixel shift distances for the first, second and third sets of images, wherein the generating comprises combining temporally aligned images of the first, second and third sets of images.

In some embodiments, aligning the first, second and third sets of images comprises: determining a difference between the pixel shift distances of the second and third sets of images and the pixel shift distances of the first set of images; and determining an alignment of the first, second and third sets of images which minimizes the difference between the pixel shift distances of the second and third sets of images and the pixel shift distances of the first set of images.

In some embodiments, the method further comprises: determining pixel shift distances between adjacent images of the consecutive images of the first, second and third sets of images; and determining, based on the pixel shift distances, respective first, second and third subsets of images from the first, second and third sets of images, the first, second and third subsets of images comprising images in which the vehicle is moving relative to the vehicle undercarriage inspection system, wherein generating the composite image of the undercarriage of the vehicle by combining images of the first, second and third subsets of images.

In some embodiments, the one or more defects include: damage to one or more vehicle parts, presence of rust, presence of one or more aftermarket vehicle modifications, altered vehicle suspension, and/or a missing catalytic converter.

In some embodiments, the method further comprises: generating a 3D model of the undercarriage of the vehicle based on the first, second and third sets of images and the data indicative of the position and/or motion of the vehicle relative to the vehicle undercarriage inspection system; generating a visualization of the 3D model; and providing access to the visualization to one or more users.

In some embodiments, the method further comprises: obtaining air quality data from an air quality sensor of the vehicle undercarriage inspection system; obtaining magnetic field data from a magnetometer of the vehicle undercarriage inspection system; and/or obtaining audio data from a microphone of the vehicle undercarriage inspection system, wherein determining whether the vehicle has the one or more defects comprises processing the air quality data, magnetic field data and/or the audio data using a second trained machine learning model.

Some embodiments provide for a vehicle undercarriage inspection system for analyzing a condition of an undercarriage of a vehicle, the system comprising: a sensor array comprising: a first, second and third camera; and a time-of-flight sensor configured to output data indicative of a position and/or motion of the vehicle relative to the vehicle undercarriage inspection system; and a computer hardware processor configured to perform: obtaining, from the sensor array, sensor data about the undercarriage of the vehicle captured as the vehicle and vehicle undercarriage inspection system move relative to each other, the sensor data including: first, second and third sets of images taken respectively by the first, second and third cameras; and data, captured by the time-of-flight sensor indicative of a position and/or motion of the vehicle relative to the vehicle undercarriage inspection system; generating a composite image of the undercarriage of the vehicle by combining images of the first, second and third sets of images based on the data indicative of position and/or motion of the vehicle relative to the vehicle undercarriage inspection system; determining whether the vehicle has one or more defects by processing the composite image, using a first trained machine learning (ML) model; and generating a vehicle condition report based on results of the processing.

In some embodiments, the first, second and third sets of images respectively comprise consecutive images of the undercarriage of the vehicle taken by the first, second and third cameras.

In some embodiments, the computer hardware processor is further configured to perform: determining pixel shift distances between adjacent images of the consecutive images of the first, second and third sets of images, wherein generating the composite image is performed based on the pixel shift distances and the data indicative of position and/or motion of the vehicle.

In some embodiments, the computer hardware processor is further configured to perform: determining pixel shift distances between adjacent images of the consecutive images of the first, second and third sets of images; and aligning the first, second and third sets of images using the respective pixel shift distances for the first, second and third sets of images, wherein the generating the composite image comprises combining aligned images of the first, second and third sets of images.

In some embodiments, wherein the one or more defects include: damage to one or more vehicle parts, presence of rust, presence of one or more aftermarket vehicle modifications, altered vehicle suspension, and/or a missing catalytic converter.

Some embodiments provide for at least one non-transitory computer-readable storage medium storing processor executable instructions that, when executed by at least one computer hardware processor, cause the at least one computer hardware processor to perform a method for analyzing conditions of an undercarriage of a vehicle using a vehicle undercarriage inspection system, the vehicle undercarriage inspection system comprising a sensor array, the sensor array comprising first, second and third cameras, the method comprising: obtaining, using the sensor array of the vehicle undercarriage inspection system, sensor data about the undercarriage of the vehicle captured as the vehicle and vehicle undercarriage inspection system move relative to each other, the sensor data including: first, second and third sets of images captured by the first, second and third cameras, respectively; and data indicative of a position and/or motion of the vehicle relative to the vehicle undercarriage inspection system; generating a composite image of the undercarriage of the vehicle by combining images of the first, second and third sets of images based on the data indicative of a position and/or motion of the vehicle relative to the vehicle undercarriage inspection system; determining whether the vehicle has one or more defects by processing the composite image, using a first trained machine learning (ML) model; and generating a vehicle condition report based on results of the processing.

In some embodiments, wherein the first, second and third sets of images respectively comprise consecutive images of the undercarriage of the vehicle taken by the first, second and third cameras.

In some embodiments, the method further comprises: determining pixel shift distances between adjacent images of the consecutive images of the first, second and third sets of images, the generating the composite image is performed based on the pixel shift distances.

In some embodiments, the method further comprises: determining pixel shift distances between adjacent images of the consecutive images of the first, second and third sets of images; and aligning the first, second and third sets of images using the respective pixel shift distances for the first, second and third sets of images, wherein the generating the composite image comprises combining aligned images of the first, second and third sets of images.

In some embodiments, the one or more defects include: damage to one or more vehicle parts, presence of rust, presence of one or more aftermarket vehicle modifications, altered vehicle suspension, and/or a missing catalytic converter.

Some embodiments provide for a method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a sensor configured to output data indicative of position and/or motion of the vehicle relative to the vehicle undercarriage inspection system, the method comprising: positioning the vehicle undercarriage inspection system relative to the vehicle; moving the vehicle and the vehicle undercarriage inspection system relative to one another; triggering capture of data about the vehicle undercarriage by the sensor array of the vehicle undercarriage inspection system; capturing the data about the vehicle undercarriage using the sensor array of the vehicle undercarriage inspection system, the data about the vehicle including a plurality of images of the undercarriage of the vehicle captured by the first, second, and third cameras at the different angles relative to the vehicle undercarriage; stopping capture of the data about the vehicle undercarriage; and generating, based on at least some of the plurality of images, a composite image of the vehicle undercarriage.

In some embodiments, the generating is performed using the vehicle inspection system.

In some embodiments, the generating comprises: providing, from the vehicle undercarriage inspection system to a computer hardware processor, separate from the vehicle undercarriage inspection system the at least some of the plurality of images for use in generating the composite image of the vehicle undercarriage.

In some embodiments, the capturing comprises capturing respective first, second and third set of images using the first, second and third cameras of the sensor array.

In some embodiments, the triggering comprises triggering the capture based on the data indicative of the position and/or motion of the vehicle.

In some embodiments, the stopping capture is performed based on the data indicative of the position and/or motion of the vehicle.

In some embodiments, the moving comprises driving the vehicle over the vehicle undercarriage inspection system.

In some embodiments, the method further comprises: before the moving, positioning a vehicle exterior inspection system relative to the vehicle, the vehicle exterior inspection system comprising a support member and a plurality of sensor arrays coupled to the support member, the plurality of sensor arrays comprising respective sets of sensors oriented in different directions, wherein: the triggering comprises triggering the plurality of sensor arrays to capture sensor data about an exterior of the vehicle; and the capturing further comprises capturing the sensor data about an exterior of the vehicle using the plurality of sensor arrays.

Some embodiments provide for a method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a sensor configured to output data indicative of position and/or motion of the vehicle relative to the vehicle undercarriage inspection system, the method comprising: positioning the vehicle undercarriage inspection system relative to the vehicle; triggering the vehicle undercarriage inspection system to collect alignment data of the vehicle relative to the vehicle undercarriage inspection system; generating, based on the alignment data, an indication of an alignment of the vehicle relative to the vehicle inspection system; repositioning the vehicle relative to the vehicle undercarriage inspection system based on the indication of the alignment of the vehicle relative to the vehicle inspection system; moving the vehicle and the vehicle undercarriage inspection system relative to one another; capturing sensor data about the vehicle undercarriage using the sensor array of the vehicle undercarriage inspection system, the data about the vehicle including a plurality of images of the undercarriage of the vehicle; and generating, based on at least some of the plurality of images, a composite image of the vehicle undercarriage.

In some embodiments, the alignment data is captured by the sensor configured to output data indicative of the position and/or motion of the vehicle.

In some embodiments, the capturing is triggered based on the data indicative of the position and/or motion of the vehicle. In some embodiments, the capturing is stopped based on the data indicative of the position and/or motion of the vehicle.

In some embodiments, the moving comprises driving the vehicle over the vehicle undercarriage inspection system. In some embodiments, the moving comprises moving the vehicle undercarriage inspection system beneath the vehicle.

In some embodiments, the generating is performed by the vehicle undercarriage inspection system.

Some embodiments provide for a method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a sensor configured to output data indicative of position and/or motion of the vehicle relative to the vehicle undercarriage inspection system, the method comprising: moving the vehicle and the vehicle undercarriage inspection system relative to one another; capturing sensor data about the vehicle undercarriage using the sensor array of the vehicle undercarriage inspection system; providing, to a computer hardware processor, the data about the vehicle undercarriage; receiving, from the computer hardware processor, a vehicle condition report indicating one or more defects present on the vehicle; providing, to the computer hardware processor, a request for sensor data related to the one or more defects present on the vehicle; and receiving, from the computer hardware processor, a plurality of sensor data related to the one or more defects present on the vehicle.

In some embodiments, the plurality of sensor data related to the one or more defects comprises a plurality of images of the one or more defects taken from different angles by the first, second and third cameras of the sensor array.

In some embodiments, the method further comprises: analyzing the vehicle to confirm a presence of the one or more defects; providing, to the computer hardware processor, an indication of the presence of the one or more defects; and receiving, from the computer hardware processor, an updated vehicle condition report.

In some embodiments, the capturing is triggered by the vehicle undercarriage inspection based on the data indicative of the position and/or motion. In some embodiments, the capturing is stopped by the vehicle inspection system based on the data indicative of the position and/or motion.

BRIEF DESCRIPTION OF THE DRAWINGS

FIG. 11F is an example composite image of a vehicle generated based on vehicle speed estimated from pixel shift distances without TOF sensor data, according to some embodiments of the technology described herein.

FIG. 11G is an example composite image of a vehicle generated based on vehicle speed estimated from pixel shift distances and TOF sensor data, according to some embodiments of the technology described herein.

DETAILED DESCRIPTION

Figure 1A:
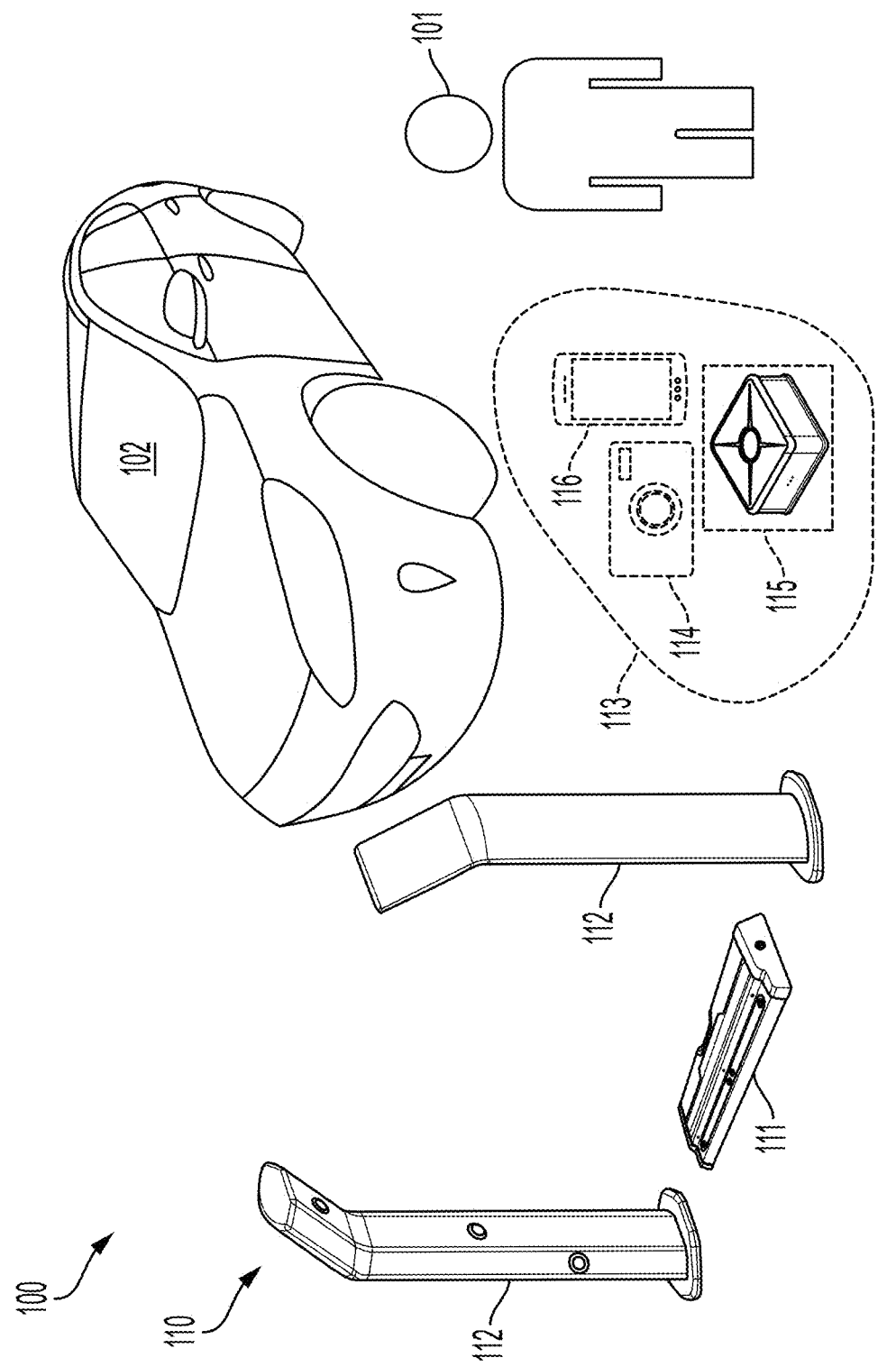
FIG. 1A depicts an example environment in which a vehicle inspection system may be deployed, according to some embodiments of the technology described herein.

Every year, a large number of vehicles (e.g., cars, trucks, boats, etc.) is bought and sold across numerous locations such as dealerships and auction houses. In addition to the millions of new vehicles sold each year, annual sales of used cars and trucks are in the tens of millions in the U.S. alone. Used vehicle transactions involve cars of many different brands and trims, manufactured across a wide range of years (i.e., decades), in a variety of conditions ranging from almost new to having numerous defects, and possibly with post-sale modifications. Given the range of vehicle types and conditions transacted, vehicle inspections are especially important to collect accurate and complete data to inform the transactions taking place, but the sheer number of vehicles to be inspected poses a challenge not only in getting such inspections completed in a timely fashion, but also having them be sufficiently thorough and accurate so that their results are reliable.

Indeed, vehicle inspectors have to collect a vast amount and variety of data about vehicles including data about a vehicle's exterior, interior, undercarriage, drivetrain, exhaust system, engine, transmission, electrical systems, and other components, to generate a complete vehicle condition report. Collecting all this information for one vehicle is time consuming not only because there is a lot of data that must be collected, but also because a vehicle inspector cannot collect different types of data simultaneously. This limits the inspector's abilities and would require additional inspectors or extended inspection times for meeting the needs of auction houses, which have many (e.g., hundreds, thousands, or tens of thousands) of vehicles to analyze.

An additional challenge is that vehicle inspections be performed in a consistent and principled manner across the many types of vehicles being inspected and that the inspection results be provided in a consistent way. Differences in inspectors and how they approach inspectors as well as the different types and conditions of vehicles being inspected, leads to variations in the data collected about the vehicles, which in turn analyzing such data a complex task that cannot be performed in a uniform or standardized manner across all inspected vehicles. For example, if different inspectors take different types of images of vehicle exteriors (e.g., different resolution, different angles, different lighting conditions), analyzing images taken in different conditions in the same automated way can lead to errors (e.g., missed defects or incorrectly identified defects). What is desirable, but has not yet been achieved by conventional vehicle inspection methods, is the ability to generate vehicle condition reports that contain similar types of information about vehicles (in terms of the type, the quality, and the accuracy of the data being collected), regardless of the inspector performing the inspection or the vehicle that is being inspected.

Of course, the state of the art is not entirely manual inspections because inspectors do have access to a variety of different vehicle inspection tools that can help them to perform the inspections. For example, an inspector may use their mobile phone to take pictures or videos of a car and upload the captured images for inclusion in the vehicle condition report or for further analysis (e.g., to identify dents, chipped paint, rust, etc.). As another example, an inspector may use a device equipped with a microphone to record the sounds generated by a vehicle (e.g., its engine, transmission, exhaust system, etc.) during operation for inclusion in the vehicle condition reports or for further analysis (e.g., to identify engine defects, transmission defects, exhaust system defects, etc.). As yet another example, an inspector may use on OBD/OBDII scanner to access on board diagnostic (OBD) codes that provide information about the vehicle's condition.

However, although such tools can be very helpful, they don't fully address a number of the above described challenges and therefore conventional inspection techniques relying on such tools can be improved upon. First, even if an inspector has access to a variety of technologies (e.g., cameras, microphones, OBD scanners, etc.), an inspector cannot use all these tools at once and instead will use them serially, one after the other, which can take time and does not address the need to perform inspections efficiently given the number of vehicles to be inspected. Relatedly, because the tools are not used simultaneously, not only do inspections take longer but there is not a way to take advantage of multi-sensor fusion techniques by jointly analyzing data collected by different sensors (e.g., audio and image sensors, different audio sensors, different cameras, regular, infrared, and multi-spectral camera, etc.). Second, different inspectors may deploy such technological tools differently (e.g., inspectors may take images at different angles and/or lighting conditions, inspectors may record audio by placing the microphones in different positions relative to the car, etc.), which leads to variations in the quality and accuracy of data collected.

To address the above-described problems with conventional inspection techniques, including conventional inspection techniques that rely on various technologies, the inventors have developed a new vehicle inspection system. The new vehicle inspection system increases the speed of inspection (e.g., from an average of 30 minutes of which about 10-15 minutes is devoted to imaging down to an average of less than 3 minutes, with about 20-40 seconds for imaging), allowing for a greater number of vehicles to be inspected more quickly. The new vehicle inspection system captures sensor data in a standardized way by providing consistent sensor positions and orientations relative to the vehicle in a consistent environment (e.g., consistent lighting conditions). To this end, the new vehicle inspection system includes numerous sensors of different types positioned over a wide range of angles and perspectives relative to the vehicle being inspected. Moreover, the new vehicle inspection system is able to capture data simultaneously using multiple sensors including multiple sensors of the same type (e.g., multiple cameras, multiple audio sensors, etc.) and sensors of different types (e.g., optical cameras, infrared cameras, multispectral cameras, audio sensors, vibration sensors, magnetometers, time-of-flight sensors, etc., which enables data collected by multiple sensors concurrently (e.g., simultaneously) to be analyzed jointly for assessing the condition of the vehicle being inspected (e.g., by identifying one or more defects using data collected by multiple different sensors). All this provides for a vehicle inspection system that improves over conventional vehicle inspection technology by providing for more time-efficient, accurate and high quality inspections and subsequent analysis.

The new vehicle inspection system developed by the inventors may be deployed in a variety of locations such as a vehicle auction location, a dealership, an inspection site, a rental car locations, a parking lot, and/or any other suitable location. The vehicle inspection system developed by the inventors may be portable such that its components may be moved to different positions at a location (e.g., moved to different parking lots at a dealership having multiple parking lots) or between locations (e.g., moved from one dealership to another or from one auction site to another).

In some embodiments, the vehicle inspection system may include one or multiple components. For example, the vehicle inspection system may include a vehicle exterior inspection system, a vehicle undercarriage inspection system, or both the vehicle exterior inspection system and the vehicle undercarriage inspection system. One or both of the vehicle undercarriage inspection system and the vehicle exterior inspection systems may be portable. Each of the vehicle inspection system components may include one or more sensors. For example, in some embodiments, the vehicle undercarriage inspection system may have a sensor array having one or more of: a camera, a microphone, an infrared camera, a thermal camera, a magnetometer, a time of flight sensor, a light source, and/or an air quality sensor. As another example, the vehicle exterior inspection system may have multiple sensor arrays each having multiple cameras (of the same or different types) thereon. The sensor arrays may also include acoustic sensors, light sources, and/or any other suitable sensors).

In some embodiments, the vehicle inspection system may further include one or more processors which may be part of one or more computing devices. The processor(s) may be configured to control operation of the sensors part of the vehicle inspection system. For example, the processor(s) may be configured to trigger collection of data by one or more of the sensors and may control the sensors to collect data in a synchronized manner, for example, concurrently (so there is overlap in the time periods the sensors are operating) or even simultaneously (so that two or more sensors are controlled to gather sensor data at the same time). The processor(s) may further offload the captured data from the sensor(s), pre-process and/or analyze the data, and/or forward the data to one or more other computing devices (e.g., computing devices external to the vehicle inspection system, for example, one or more computing devices on the cloud) for pre-processing and/or analysis. The processor(s) may be part of a computing device or devices co-located or integrated with the vehicle inspection system (e.g., a laptop, a desktop, a smartphone, a tablet, a raspberry pi, a controller, etc.).

In some embodiments, a vehicle may be moved relative to the vehicle inspection system and the vehicle inspection system may capture data about the vehicle using its sensor suite. The sensors may be automatically triggered to capture data about the vehicle based on the relative position of the vehicle and the sensors. For example, a car may be driven through (or automatically moved through on a moving belt relative to) the vehicle inspection system and sensors in the vehicle exterior inspection system and the vehicle undercarriage inspection system may be triggered to start and stop capturing data about the vehicle based on the position of the vehicle relative to the sensors. In some embodiments, the vehicle inspection system may include one or more sensors (e.g., a ranging sensor such as a radar, a time of flight sensor, a lidar, etc.) configured to measure the distance (e.g., range) to and/or the position of the vehicle relative to the system or a component thereof (e.g., one or more sensors) and use the data collected by such as a sensor or sensors to trigger the starting and stopping of capture of sensor data by other sensors (e.g., cameras).

As can be appreciated from the foregoing, in some embodiments, the vehicle inspection system may operate to inspect the vehicle autonomously. For example, the vehicle inspection system may control movement of the vehicle (e.g., by moving a belt or other movable platform, like a turntable), so that the vehicle moves relative to the vehicle inspection system. As the car is then moved to certain positions relative to the sensors, the vehicle inspection system may trigger those sensors (e.g., cameras, acoustic sensors, magnetometers, etc.) to start capturing data about the vehicle and, later, stop capture when the car is moved out of position. Of course, fully automated inspection is not required and, in some embodiments, an inspector may co-operate with the system to perform the inspection. For example, the inspector may drive a car through the inspection system and/or reposition the car relative to the inspection system when the alignment is not suitable for one or more sensors. As another example, the inspector may reposition a component of the inspection system (e.g., the vehicle undercarriage inspection system) so that it is better aligned with the vehicle.

As described above, in some embodiments, a vehicle inspection system includes a vehicle undercarriage inspection system. In some embodiments, a vehicle undercarriage inspection system includes a sensor array, configured to capture sensor data about an undercarriage of a vehicle. In some embodiments, a sensor array of a vehicle undercarriage inspection system includes one or more of each of: a camera, a microphone, an infrared camera, a thermal camera, a magnetometer, a time of flight sensor, a light source, and/or an air quality sensor. In some embodiments, sensors of a vehicle undercarriage inspection system may be angled in different directions to capture data from different parts of the vehicle undercarriage. In some embodiments, a vehicle undercarriage inspection system may record data using a sensor array as a vehicle is driven over and/or around the vehicle undercarriage inspection system. In some embodiments, a vehicle undercarriage inspection system records data using a sensor array as the vehicle undercarriage inspection system moves beneath and/or around a vehicle. In some embodiments, a vehicle undercarriage inspection system may automatically record data from the undercarriage of the vehicle based on the position and/or motion of the vehicle. In some embodiments, a vehicle undercarriage inspection system may be controlled by a user to record data from the undercarriage of the vehicle.

In some embodiments, a composite image of a vehicle may be generated based on data captured by a vehicle undercarriage inspection system. In some embodiments, a composite image may be generated by combining images captured by one or more cameras of a vehicle undercarriage inspection system as the vehicle moves relative to the vehicle undercarriage inspection system. In some embodiments, a composite image may be generated by combining images captured by one or more cameras of a vehicle undercarriage inspection system based on a speed of the vehicle in the images. In some embodiments, the speed of the vehicle in the images may be determined based on a pixel shift distance between consecutive images. In some embodiments, the speed of the vehicle in the images may be determined based on data received from a sensor configured to output data related to the position and/or motion of the vehicle relative to the vehicle undercarriage inspection system, for example a time of flight (TOF) sensor.

In some embodiments, data recorded by a sensor array of a vehicle undercarriage inspection system may be processed using one or more machine learning models. In some examples, a composite image of a vehicle undercarriage may be analyzed using the one or more machine leaning models. In some embodiments, the data may be analyzed using the one or more machine learning models to determine the presence of one or more defects in a vehicle. In some embodiments, the one or more defects include one or more of: damage to one or more vehicle parts, presence of rust, presence of one or more aftermarket vehicle modifications, altered vehicle suspension, and/or a missing catalytic converter, among other defects. In some embodiments, the data may be analyzed using the one or more machine learning models to determine one or more characteristics of a vehicle. In some examples, the vehicle characteristics include a vehicle drivetrain type, a vehicle battery type, a vehicle make, a vehicle model, a vehicle trim level, and vehicle component types, among other vehicle characteristics.

Accordingly, some embodiments provide for a vehicle undercarriage inspection system, comprising: (A) a base having a width and a depth respectively extending along first and second directions orthogonal to one another, the width extending from a first end of the base to a second end of the base; (B) a sensor array coupled to the base, the sensor array comprising a set of cameras oriented in multiple directions, the set of cameras including: a first camera oriented in part towards the first end of the base; a second camera oriented in part towards the second end of the base; and a third camera positioned between the first and second cameras; and (C) a processor configured to control the sensor array to capture a plurality of images of an undercarriage of a vehicle with the set of cameras.

In some embodiments, the sensor array may further comprise: a microphone, an infrared camera, a thermal camera, a magnetometer, a time of flight sensor, a light source, and/or an air quality sensor.

In some embodiments, the processor is further configured to generate a composite image of the vehicle undercarriage from images of the plurality of images of the vehicle undercarriage captured using the set of cameras. Additionally, the processor may be further configured to: process the composite image, using at least one trained machine learning (ML) model, to determine whether the vehicle has one or more defects (e.g., damage to one or more vehicle parts, presence of rust, presence of one or more aftermarket vehicle modifications, altered vehicle suspension, and/or a missing catalytic converter), or provide the composite image to another computing device for processing with the at least one trained ML model to determine whether the vehicle has one or more defects, or generate a 3D reconstruction of the vehicle undercarriage using the images of the vehicle undercarriage captured using the set of cameras.

In some embodiments, the sensor array further comprises: a first time of flight (TOF) sensor oriented in part toward the first end of the base; and a second TOF sensor oriented in part the second end of the base, wherein the processor is configured to: determine a position and/or motion of the vehicle relative to the vehicle undercarriage inspection system based on signals collected by the first and second TOF sensors; and generate a composite image of the vehicle undercarriage from images of the plurality of images of the vehicle undercarriage captured using the set of cameras and based on the position and/or motion of the vehicle relative to the vehicle undercarriage inspection system.

In some embodiments, the first, second and third cameras are configured such that their combined field of view (FOV) is 200 cm in width with a minimum pixel density of 15 pixels/cm.

In some embodiments, the vehicle undercarriage inspection system may weigh less than 10 pounds (e.g., between 3 and 10 lbs.) and include a handle attached to the base for lifting the vehicle undercarriage inspection system.

In some embodiments, the vehicle undercarriage inspection system further comprises: a substrate supporting a plurality of electronic components, the plurality of electronic components comprising: the processor; respective camera controllers for the first, second and third cameras; and a power supply.

In some embodiments, the vehicle undercarriage inspection system further comprises a cover coupled to the base, wherein the cover is configured to withstand up to 16,000 pounds of force. The cover may include internal ribbing configured to reinforce the cover to withstand the 16,000 pounds of force.

In some embodiments, a vehicle undercarriage inspection system may comprise: (A) a base having a width and a depth respectively extending along first and second directions orthogonal to one another, the width extending from a first end of the base to a second end of the base; (B) a sensor array coupled to the base, the sensor array comprising: a set of cameras oriented in multiple directions; and a first time of flight (TOF) sensor configured to detect a position and/or motion of the vehicle; and (C) a processor configured to: control the sensor array to capture a plurality of images of an undercarriage of a vehicle with the set of cameras; and control the TOF sensor to capture one or more signals indicative of the position and/or motion of the vehicle.

Examples of analyses of vehicle data, and machine learning models for processing vehicle data are discussed in U.S. Pat. No. 11,631,289, entitled "Vehicle Audio Capture and Diagnostics," filed Jan. 22, 2020, U.S. Pat. No. 10,893,213, entitled "Vehicle Undercarriage Imaging System," filed Apr. 2, 2019, U.S. patent application Ser. No. 18/778,247, entitled "Methods and Systems for Identifying Potential Vehicle Defects," filed Jul. 19, 2024, and U.S. patent application Ser. No. 18/483,935, entitled: "Machine Learning and Magnetic Field Sensing Techniques for Vehicle Inspection and Condition Analysis," filed Oct. 10, 2023, each of which is incorporated by reference herein in its entirety.

As described above, in some embodiments, a vehicle inspection system includes a vehicle exterior inspection system. In some embodiments, a vehicle exterior inspection system may include a support member which supports components for vehicle inspection. In some embodiments, a vehicle exterior inspection system may include one or more sensor arrays, coupled to the support member, for capturing data related to a vehicle. In some examples, a sensor array of a vehicle exterior inspection system may include one or more of: a camera, a microphone, an infrared camera, a thermal camera, a magnetometer, a time of flight sensor, a light source, and/or an air quality sensor. In some embodiments, sensors of a vehicle exterior inspection system may be positioned to capture data related to specific portions of a vehicle. For example, sensors and/or sensor arrays may be positioned to capture data from the front, rear, roof, hood, sides, and wheels of a vehicle, among other vehicle portions. In some embodiments, a support member of a vehicle exterior inspection system may support multiple sensor arrays to capture data from different vehicle portions. In some embodiments, a support member of a vehicle inspection system may include one or more angled portions to support a sensor and/or sensor array to capture data of a particular portion of a vehicle, for example the top of a support member may be angled such that a sensor array positioned at the top of the support member may capture data from the roof of the vehicle. In some embodiments, a vehicle exterior inspection system may automatically record data from the undercarriage of the vehicle based on the position and/or motion of the vehicle. In some embodiments, a vehicle exterior inspection system may be controlled by a user to record data from the undercarriage of the vehicle.

In some embodiments, data subsets may be determined from the data collected by a vehicle exterior inspection system. For example, a subset of images may be determined from images captured by one or more cameras of the vehicle exterior inspection system. In some embodiments, the subset of images may be determined based on the pose of the vehicle within the images. For example, an image is selected for the subset of images when the vehicle is in a desired position within the image. In some embodiments, a desired position of the vehicle may be when the vehicle is centered within the image. In some embodiments a desired position of the vehicle is when a specific component of the vehicle is centered within the image, for example a wheel of the vehicle. In some embodiments, a desired position of the vehicle is when the vehicle and/or a component of the vehicle is in a desired location within the image, for example, the hood is at a side of the image. In some embodiments, a subset of images may be determined by comparing images to a set of desired vehicle poses. In some embodiments a subset of data is processed.

In some embodiments, data recorded by sensor array(s) of a vehicle exterior inspection system may be processed using one or more machine learning models. In some embodiments, the data may be analyzed using the one or more machine learning models to determine the presence of one or more defects in a vehicle. In some embodiments, the one or more defects include one or more of: scratches to an exterior of the vehicle; cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, a missing catalytic converter and/or suspension modifications. In some embodiments, the data may be analyzed using the one or more machine learning models to determine one or more characteristics of a vehicle. In some examples, the vehicle characteristics include a vehicle drivetrain type, a vehicle battery type, a vehicle make, a vehicle model, a vehicle trim level, and vehicle component types, among other vehicle characteristics.

In some embodiments, an air quality sensor may be configured to detect levels of one or more of: $CO_2$, CO, $NO_x$, and/or $SO_2$. $CO_2$ may be indicative of combustion efficiency wherein higher $CO_2$ concentration equals greater vehicle efficiency. Low concentrations are linked to problems within the engine (e.g., air/fuel imbalance or misfires). CO may be indicative of improper combustion, catalytic converter issues, and exhaust leaks (in the early stages of the exhaust). Ideally, all CO should be converted to $CO_2$ upon exiting through the exhaust tailpipe. $NO_x$ may be indicative of catalytic converter problems accompanied by possible exhaust leaks, fuel system issues, and exhaust gas recirculation (EGR) obstruction/malfunction. Ideally, $NO_x$ should be converted to $N_2$ upon exhaust. High levels of $SO_2$ may be indicative of poor fuel quality.

Examples of analyses of vehicle data and machine learning models for processing vehicle data are discussed in U.S. Pat. No. 11,631,289, entitled "Vehicle Audio Capture and Diagnostics," filed Jan. 22, 2020, U.S. Pat. No. 10,893,213, entitled "Vehicle Undercarriage Imaging System," filed Apr. 2, 2019, U.S. Patent Application No. 18,778,247, entitled "Methods and Systems for Identifying Potential Vehicle Defects," filed Jul. 19, 2024, and U.S. patent application Ser. No. 18/483,935, entitled: "Machine Learning and Magnetic Field Sensing Techniques for Vehicle Inspection and Condition Analysis," filed Oct. 10, 2023, each of which is incorporated by reference herein in its entirety.

In some embodiments, a vehicle inspection system may include a mobile vehicle diagnostic device (MVDD), containing one or more types of sensors, for gathering vehicle data during a vehicle inspection. An example of an MVDD is described in US Patent Publication number US 2023/0204461A1, entitled "Multi-Sensor Devices and Systems for Evaluating Vehicle Conditions," filed Dec. 22, 2022, the entire contents of which are incorporated by reference herein in its entirety. In some embodiments, a MVDD may be positioned, by an inspector in accordance with a vehicle inspection, near or inside a vehicle to collect data about the vehicle. In some embodiments a MVDD may record audio signals, vibration signals, and/or metadata containing one or more properties of the particular vehicle. In some embodiments, data recorded by a MVDD may be analyzed to detect presence or absence of one or more defects in the particular vehicle (e.g., by detecting the presence or absence of engine noise, transmission noise, start-up engine rattle, and/or any other type of defect the presence of which may be reflected in the gathered data). In some embodiments, data recorded by a MVDD may be processed using one or more machine learning models to determine the presence of defects in the vehicle. For example, a ML model may analyze data from a MVDD to determine one or more of presence or absence of abnormal internal engine noise (e.g., ticking, knocking, hesitation), rough running engine, abnormal timing chain noise (e.g., rattling of a stretched chain), abnormal engine accessory noise (e.g., power steering pump whines, serpentine belt squeals, bearing damage, turbocharger or supercharger noise, and noise emanating from any other anomalous components that are not internal to the engine block), and/or abnormal exhaust noise (e.g., noise generated due to a cracked or damaged exhaust system near the engine), among other defects.

In some embodiments, a vehicle inspection system may include a device which records on-board diagnostic (OBD) codes from a vehicle. In some embodiments, a vehicle inspection system may include a device which records OBDII codes from a vehicle. In some embodiments, the data obtained from a device which records OBD and/or OBDII codes may be analyzed by one or more machine learning models, to determine defects and/or characteristics of a vehicle. In some embodiments, the data obtained from a device which records OBD and/or OBDII codes may be analyzed by one or more machine learning models together with data from one or more other sensors of a vehicle inspection system, to determine defects and/or characteristics of a vehicle.

In some embodiments, a vehicle inspection system may include a camera for obtaining images of a vehicle. In some embodiments, the camera may be a camera of a mobile device such as a smartphone or a tablet. In some embodiments, the camera may be a digital camera. In some embodiments the camera may be a 360° camera. In some embodiments, a camera may be used to obtain images of the front, rear, VIN plate, and/or engine bay of a vehicle. In some embodiments, the camera may be used to capture images of the interior of a vehicle. In some embodiments, the data obtained from a camera may be analyzed by one or more machine learning models, to determine defects and/or characteristics of a vehicle. In some embodiments, the data obtained from camera may be analyzed by one or more machine learning models together with data from one or more other sensors of a vehicle inspection system, to determine defects and/or characteristics of a vehicle.

In some embodiments, a vehicle inspection system may include a paint meter for measuring the thickness at one or more portions of the vehicle. In some embodiments, the data obtained from paint meter may be analyzed by one or more machine learning models, to determine defects and/or characteristics of a vehicle. In some embodiments, the data obtained from a paint meter may be analyzed by one or more machine learning models together with data from one or more other sensors of a vehicle inspection system, to determine defects and/or characteristics of a vehicle.

In some embodiments, a vehicle inspection system may include any combination of a vehicle undercarriage inspection system, a vehicle exterior inspection system, a MVDD, a device for recording OBD codes, a paint meter, and a camera. For example, a vehicle inspection system may include all six components, any five of the components, any four of the components, any three of the components, any two of the components, or any one of the components.

In some embodiments a vehicle inspection system may include one or more computer hardware processors for performing vehicle inspections and/or processing vehicle inspection data. In some embodiments, the one or more processors may control the components of a vehicle inspection system to collect data. For example, by triggering the sensors to begin and/or stop collection of data. In some embodiments, the one or more processors may control the vehicle inspection system based on data received from one or more sensors, for example, by triggering recording of data when a vehicle is determined to be at a specific position based on data from a TOF sensor. In some embodiments, the one or more processors may perform analyses of vehicle inspection data, for example, generating composite images, data subsets, processing with ML models, determining the presence of one or more vehicle defects, and/or generating vehicle condition reports. In some examples, the one or more processors of a vehicle inspection system may be included in one or more components of the vehicle inspection system, for example in a vehicle undercarriage inspection system, a vehicle exterior inspection system, a mobile device, or a computer used with the vehicle inspection system. In some embodiments, the components of a vehicle connection system may be connected to enable transmission and reception of data between each other, for example using a wired or wireless connection. In some embodiments, components of vehicle inspection system such as mobile devices and/or processors may be connected via Bluetooth and/or Wi-Fi connections. In some embodiments, a vehicle inspection process requires connecting components via Bluetooth and/or Wi-Fi. In some embodiments, the one or more processors of a vehicle inspection system may be remote from the vehicle inspection system and may transmit and/or receive data to/from the components of the vehicle inspection system. In such embodiments, the components of the vehicle inspection system may be connected to the one or more processors via a communication network (e.g., Internet, local area network (LAN), wide area network (WAN), wireless network, wired network, and/or any suitable combination thereof). In some embodiments, the one or more processors of the vehicle inspection system may be distributed between the components of the vehicle inspection system and a remote location.

In some embodiments, the one or more processors of a vehicle inspection system may use one or more ML models to analyze data recorded by the sensors of the vehicle inspection system. In some examples, the data may be processed to determined one or more characteristics and/or defects of the vehicle, as described herein. In some embodiments, machine learning models may analyze data recorded by a single sensor, type of sensor, and/or sensor array of the vehicle inspection system. For example, a ML model configured to determine the presence of damage to the exterior of the vehicle may only process images captured by cameras of the vehicle exterior inspection system. In some embodiments, a ML model may analyze data recorded by multiple sensors, or types of sensors. For example, a ML model configured to determine the presence of a catalytic converter may analyze a composite image of a vehicle undercarriage and magnetometer data from the vehicle.

In some embodiments, a vehicle inspection system is configured to generate a vehicle condition report. In some embodiments, the vehicle condition report is generated based on data collected from sensors of the vehicle inspection system. in some embodiment, the vehicle condition report is generated based on processing of data (e.g., using one or more machine learning models) collected by the sensors of the vehicle inspection system. In some embodiments, the vehicle condition report includes information related to vehicle characteristics, for example, a make, model, year, milage, trim level, Vehicle Identification Number (VIN), color, vehicle options, vehicle packages, and vehicle maintenance history, among other characteristics. In some embodiments, the vehicle condition report may include one or more defects and/or characteristics determined based on data collected by the vehicle inspection system. In some embodiments, the vehicle condition report may include data collected by the vehicle inspection system, for example, a composite image of the vehicle undercarriage, images of the exterior of the vehicle, and audio recordings of the, among other data. In some embodiments, the vehicle condition report may be in an electronic format. In some embodiments, the vehicle condition report may be presented on a user interface of the vehicle inspection system, such as a on a display of a mobile device and/or computer associated with the vehicle inspection system. In some embodiments the vehicle condition report may be generated using one or more ML models.

In some embodiments, the electronic vehicle condition report may be provided via at least one communication network, to a remote device of an inspector of the vehicle. The inspector may review the determined characteristics and or for correctness and may, for example, confirm its correctness (e.g., via a GUI) or change its value. In some embodiments, the electronic vehicle condition report may be provided, via at least one communication network, to one or more reviewers. The reviewer(s) may review accuracy of the vehicle condition report to determine the likelihood of a claim dispute. In some embodiments, upon reviewing and approving the electronic vehicle condition report, an online vehicle auction to auction the vehicle may be initiated, manually or automatically.

Accordingly, in some embodiments, an exterior vehicle inspection system comprises: (A) a first support member comprising a first portion and a second portion angled relative to the first portion; (B) a first plurality of sensor arrays coupled to the first support member, the first plurality of sensor arrays comprising: a first sensor array comprising a first set of cameras oriented in multiple first directions, the first sensor array being coupled to the first support member at a position at which the first set of cameras has one or more wheels of a vehicle in its field of view (FOV) when the first sensor array is being used to image the vehicle; a second sensor array comprising a second set of cameras oriented in multiple second directions, the second sensor array being coupled to the first support member at a position at which the second set of cameras has a first side of the vehicle in its FOV when the second sensor array is being used to image the vehicle; and a third sensor array comprising a third set of cameras oriented in multiple third directions, the third sensor array being coupled to the first support member at a position at which the third set of cameras has a roof of the vehicle in its FOV when the third sensor array is being used to image the vehicle; and (C) a processor configured to control the first plurality of sensor arrays to capture images of the vehicle.

In some embodiments, the first sensor array is positioned below the second and third sensor arrays on the first support member. The second sensor array may be positioned below the third sensor array on the first support member. The first and second sensor arrays may be positioned on the first portion of the first support member, and the third sensor array may be positioned on the second portion of the first support member.

In some embodiments, the first sensor array further comprises: a microphone, an infrared camera, a thermal camera, a magnetometer, a light source and/or an air quality sensor.

In some embodiments, the exterior vehicle inspection system comprises: a second support member comprising a third portion, and a fourth portion angled relative to the third portion; a second plurality of sensor arrays coupled to the second support member, the second plurality of sensor arrays comprising: a fourth sensor array comprising a fourth set of cameras oriented in multiple fourth directions, the fourth sensor array being coupled to the second support member at a position at which the fourth set of cameras has one or more wheels of a vehicle in its FOV when the fourth sensor array is being used to image the vehicle; a fifth sensor array comprising a fifth set of cameras oriented in multiple fifth directions, the fifth sensor array being coupled to the second support member at a position at which the fifth set of cameras has a second side of the vehicle in its field of view when the fifth sensor array is being used to image the vehicle; and a sixth sensor array comprising a sixth set of cameras oriented in multiple sixth directions, the sixth sensor array being coupled to the second support member at a position at which the sixth set of cameras has the roof of the vehicle in its field of view when the sixth sensor array is being used to image the vehicle, wherein the processor is further configured to control the second plurality of sensor arrays capture images of the vehicle.

In some embodiments, the first plurality of sensor arrays is configured such that the combined FOV of the first, second and third sets of cameras spans at least 150 inches in height, 300 inches in length and 120 inches in width.

In some embodiments, during imaging the vehicle and support structure move relative to one another along a first direction; the first set of cameras comprises: a first camera oriented in part towards the first direction; a second camera oriented in part opposite the first direction; and a third camera oriented substantially perpendicular to the first direction; the first camera has a rocker panel and wheels of the vehicle in its field of view when being used to image the vehicle; the second camera has the rocker panel and rear of the vehicle in its field of view when being used to image the vehicle; and the third camera has one or more wheels of the vehicle in its field of view when being used to image the vehicle.

In some embodiments, during imaging the vehicle and support structure move relative to one another along a first direction, and the second set of cameras comprises: a first camera oriented in part towards the first direction; a second camera oriented in part opposite the first direction; and a third camera oriented substantially perpendicular to the first direction; the first camera has the side and front of the vehicle in its field of view when being used to image the vehicle; the second camera has the side and rear of the vehicle in its field of view when being used to image the vehicle; and the third camera has the side of the vehicle in its field of view when being used to image the vehicle.

In some embodiments, during imaging the vehicle and support structure move relative to one another along a first direction, the third set of cameras comprises: a first camera oriented in part towards the first direction; a second camera oriented in part opposite the first direction; and a third camera oriented substantially perpendicular to the first direction; the first camera has the roof, front, and hood of the vehicle in its field of view when being used to image the vehicle; the second camera has the roof and rear of the vehicle in its field of view when being used to image the vehicle; and the third camera has the hood and the roof of the vehicle in its field of view when being used to image the vehicle.

In some embodiments, the first support member is portable and is collapsible between a deployed and a stowed configuration, and the vehicle inspection system is configured to image the vehicle when the first support member is in the deployed configuration.

In some embodiments, the processor is configured to control the first plurality of sensor arrays to image the vehicle as the vehicle is driven past the first support member.

In some embodiments, the processor is configured to control the first support member to move about the vehicle, and the processor is configured to control the first plurality of sensor arrays to image the vehicle as the first support member moves about the vehicle.

In some embodiments, the processor is further configured to process the images of the vehicle using at least one trained machine learning (ML) model, to determine whether the vehicle has the one or more defects, wherein the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

Some embodiments are directed to a system for vehicle inspection, the system comprising: a support member; a first plurality of sensor arrays coupled to the first support member, the first plurality of sensor arrays comprising: a first sensor array comprising a first set of cameras oriented in multiple first directions and a first microphone; a second sensor array comprising a second set of cameras oriented in multiple second directions and a second microphone; and a third sensor array comprising a third set of cameras oriented in multiple third directions, and a third microphone; and a processor configured to control the first plurality of sensor arrays to capture images and audio recordings of the vehicle.

In some embodiments, during imaging the vehicle and support member move relative to one another along a first direction, and the first, second and third sets of cameras respectively comprise: a first camera oriented in part towards the first direction; a second camera oriented in part opposite the first direction; and a third camera oriented substantially perpendicular to the first direction.

In some embodiments, the processor is further configured to process the images and/or audio of the vehicle using at least one trained machine learning (ML) model, to determine whether the vehicle has the one or more defects, wherein the one or more defects include: scratches to an exterior of the vehicle; cracked windows, mirrors, or windshields; chipped paint; dents to the exterior of the vehicle; misaligned body panels; missing vehicle parts, non-standard replacement parts, non-standard paint; aftermarket vehicle accessories; rust/corrosion on the vehicle; damaged wheels; damaged tires; bald tires; tire sidewall bubbles; broken tire valves; wheel misalignment; mismatched tires; brake rotor discoloration; brake rotor damage; brake rotor wear; suspension modifications; engine damage; an exhaust leak; and/or transmission whine.

Some embodiments provide for a system for vehicle inspection, the system comprising: a support member; a first plurality of sensor arrays coupled to the first support member, the first plurality of sensor arrays configured to capture signals about a vehicle as the vehicle and support member move relative to one another along a first direction, and comprising: a first sensor array comprising a first set of cameras, the first sensor array coupled to the first support member at a position at which the first set of cameras has a first side of the vehicle in its FOV when the first sensor array is being used to image the vehicle, the first set of cameras comprising: a first camera oriented in part towards the first direction; a second camera oriented in part opposite the first direction; and a third camera oriented substantially perpendicular to the first direction; and a second sensor array comprising a second set of cameras, the first sensor array coupled to the first support member at a position at which the second set of cameras has a roof of the vehicle in its FOV when the second sensor array is being used to image the vehicle, the second set of cameras comprising: a fourth camera oriented in part towards the first direction; a fifth camera oriented in part opposite the first direction; and a sixth camera oriented substantially perpendicular to the first direction; and a processor configured to control the first plurality of sensor arrays to capture images of the vehicle.

In some embodiments, the first camera has the side and front of the vehicle in its FOV when being used to image the vehicle; the second camera has the side and rear of the vehicle in its FOV when being used to image the vehicle; the third camera has the side of the vehicle in its FOV when being used to image the vehicle; the fourth camera has the roof, front, and hood of the vehicle in its FOV when being used to image the vehicle; the fifth camera has the roof and rear of the vehicle in its FOV when being used to image the vehicle; and the sixth camera has the hood and the roof of the vehicle in its FOV when being used to image the vehicle.

As described above, in some embodiments, a vehicle inspection system may include both an exterior vehicle inspection system and a vehicle undercarriage inspection system. Accordingly, some embodiments provide for a vehicle inspection system for inspecting a vehicle, the system comprising: (A) a vehicle exterior inspection system comprising: a first support member; a first sensor array coupled to the first support member and comprising a first set of cameras positioned to capture images of wheels of the vehicle being imaged; a second sensor array coupled to the first support member and comprising a second set of cameras positioned to capture images of a side of the vehicle being imaged; and a third sensor array coupled to the first support member and comprising a third set of cameras positioned to capture images of a roof of the vehicle being imaged; (B) a vehicle undercarriage inspection system comprising: a base having a width and a depth respectively extending along first and second directions orthogonal to one another, the width extending from a first end of the base to a second end of the base, the base supporting a fourth sensor array configured to capture images of an undercarriage of the vehicle, wherein the fourth sensor array comprises: a first camera positioned at a first side of the base, and oriented towards the first side of the base; a second camera positioned at a second side of the base, and oriented towards the second side of the base; and a third camera positioned between the first and second cameras, wherein the vehicle inspection system is configured to: capture a first plurality of images of the vehicle using the first, second and third sets of cameras of the vehicle exterior inspection system; and capture a second plurality of images of the undercarriage of the vehicle using the fourth sensor array of the vehicle undercarriage inspection system.

In some embodiments, the vehicle inspection system further comprises a computer hardware processor configured to: when the vehicle is moved relative to the vehicle exterior inspection system and the vehicle undercarriage inspection system, triggering the capture of the first plurality of images of the vehicle using the first, second and third sets of cameras of the vehicle exterior inspection system, receiving the first plurality of images, and/or processing the first plurality of images; and triggering the capture of a second plurality of images of the undercarriage of the vehicle using the fourth sensor array of the vehicle undercarriage inspection system, receiving the second plurality of images, and/or processing the second plurality of images.

In some embodiments, the vehicle inspection system is configured to trigger the capture the first and second plurality of images based on a position of the vehicle.

In some embodiments, the vehicle undercarriage inspection system further comprises: a sensor configured to output data indicative of the position and/or motion of the vehicle relative to the vehicle inspection system, wherein the capturing of the first plurality of images is performed in response to determining the vehicle is at a first position and/or first distance relative to the vehicle inspection system, based on the data indicative of the position and/or motion of the vehicle.

In some embodiments, capturing of the second plurality of images is performed in response to determining the vehicle is at a second position and/or distance relative to the vehicle inspection system, different from the first position, based on the data indicative of the position and/or motion of the vehicle. The second position of the vehicle may be closer to the vehicle inspection system than the first position, and/or the first distance is smaller than the second distance.

In some embodiments, the computer hardware processor is further configured to perform: stopping the capturing of the first plurality of images in response to determining the vehicle is at a third position and/or distance relative to the vehicle inspection system, different from the first and second positions and/or distances, based on the data indicative of the position and/or motion of the vehicle; and stopping the capturing of the second plurality of images in response to determining the vehicle is at a fourth position and/or distance relative to the vehicle inspection system, different from the first, second and third positions and/or distances, based on the data indicative of the position and/or motion of the vehicle.

In some embodiments, the vehicle exterior inspection system further comprises: a second support member; a fourth sensor array coupled to the second support member and comprising a fourth set of cameras positioned to capture images of wheels of the vehicle being imaged; a fifth sensor array coupled to the second support member and comprising a fifth set of cameras positioned to capture images of a side of the vehicle being imaged; and a sixth sensor array coupled to the second support member and comprising a sixth set of cameras positioned to capture images of a roof of the vehicle being imaged.

In some embodiments, the vehicle exterior inspection system is portable and is collapsible between a deployed and a stowed configuration, and is configured to image the vehicle when in the deployed configuration; and the vehicle undercarriage inspection system weighs less than 10 pounds, and further comprises a handle attached to the base for lifting the vehicle undercarriage inspection system.

In some embodiments, one or more of the first, second, third and fourth sensor arrays comprise one or more of: a microphone, an infrared camera, a thermal camera, a magnetometer, a time of flight sensor, a light source, and/or an air quality sensor.

In some embodiments, the first, second, and third sensor arrays are configured such that the combined FOV of the first, second and third sets of cameras spans at least 150 inches in height, 300 inches in length and 120 inches in width.

Some embodiments provide for a vehicle inspection system for analyzing the condition of a vehicle, the system comprising: (A) a vehicle exterior inspection system comprising: a first support member; a first sensor array coupled to the first support member and comprising a first set of cameras positioned to capture images of wheels of the vehicle being imaged; a second sensor array coupled to the first support member and comprising a second set of cameras positioned to capture images of a side of the vehicle being imaged; and a third sensor array coupled to the first support member and comprising a third set of cameras positioned to capture images of a roof of the vehicle being imaged; and (B) a vehicle undercarriage inspection system comprising: a base having a width and a depth respectively extending along first and second directions orthogonal to one another, the width extending from a first end of the base to a second end of the base, the base supporting a fourth sensor array configured to capture images of an undercarriage of the vehicle, wherein the fourth sensor array comprises: a first camera positioned at a first side of the base, and oriented towards the first side of the base; a second camera positioned at a second side of the base, and oriented towards the second side of the base; and a third camera positioned between the first and second cameras; and (C) a computer hardware processor configured to perform: obtaining a first plurality of images of the vehicle captured using the first, second and third sets of cameras of the vehicle exterior inspection system; and obtaining a second plurality of images of the undercarriage of the vehicle captured using the fourth sensor array of the vehicle undercarriage inspection system; processing images of the first and second pluralities of images, using at least one trained machine learning (ML) model, to determine whether the vehicle has one or more defects; and generating a vehicle condition report based on results of the processing of the images and the composite image.

In some embodiments, the computer hardware processor is further configured to perform: generating a composite image of the undercarriage of the vehicle by combining images of the second plurality of images, wherein the composite image is processed using the at least one machine learning model to determine whether the vehicle has the one or more defects. The one or more defects include: scratches to an exterior of the vehicle; cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, a missing catalytic converter and/or suspension modifications.

In some embodiments, the computer hardware processer is further configured to perform: generating a 3D model of the of the vehicle based on the first and second pluralities of images; generating a visualization of the 3D model; and providing access to the visualization to one or more users.

In some embodiments, the computer hardware processor is further configured to perform: before processing the images of the first plurality of images, identifying a subset of the first plurality of images based on a pose of the vehicle in images of the plurality of images, wherein processing the images of the first plurality of images comprises processing the subset of images.

In some embodiments, the vehicle undercarriage imaging system further comprises a sensor configured to output data indicative of the position and/or motion of the vehicle relative to the vehicle undercarriage inspection system; and the computer hardware processor is further configured to perform: determining, based on the data indicative of the position and/or motion of the vehicle, a speed of the vehicle relative to the vehicle undercarriage inspection system, wherein the composite image is generated based on the vehicle speed.

In some embodiments, one or more of the first, second, third and fourth sensor arrays comprise one or more of: a microphone, an infrared camera, a thermal camera, a magnetometer, a time of flight sensor, a light source, and/or an air quality sensor.

In some embodiments, obtaining the first plurality of images comprises capturing the first plurality of images of the vehicle using the first, second and third sets of cameras of the vehicle exterior inspection system; and obtaining the second plurality of images comprises capturing the second plurality of images of the undercarriage of the vehicle using the fourth sensor array of the vehicle undercarriage inspection system.

Some embodiments provide for a vehicle inspection system, for inspecting a vehicle, the vehicle inspection system comprising: (A) a vehicle exterior inspection system comprising: a first support member comprising a first portion and a second portion angled relative to the first portion; a first plurality of sensor arrays coupled to the first support member, the first plurality of sensor arrays comprising: a first sensor array comprising a first set of cameras oriented in multiple first directions, the first sensor array being coupled to the first support member at a position at which the first set of cameras has one or more wheels of a vehicle in its field of view (FOV) when the first sensor array is being used to image the vehicle; a second sensor array comprising a second set of cameras oriented in multiple second directions, the second sensor array being coupled to the first support member at a position at which the second set of cameras has a first side of the vehicle in its FOV when the second sensor array is being used to image the vehicle; and a third sensor array comprising a third set of cameras oriented in multiple third directions, the third sensor array being coupled to the first support member at a position at which the third set of cameras has a roof of the vehicle in its FOV when the third sensor array is being used to image the vehicle; and (B) a vehicle undercarriage inspection system, comprising: a base having a width and a depth respectively extending along first and second directions orthogonal to one another, the width extending from a first end of the base to a second end of the base; a fourth sensor array coupled to the base, the fourth sensor array comprising a set of cameras oriented in multiple directions, the set of cameras including: a first camera oriented in part towards the first end of the base; a second camera oriented in part towards the second end of the base; and a third camera positioned between the first and second cameras.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A depicts an example environment to which a vehicle inspection system is deployed, according to some embodiments. The environment 100 includes vehicle inspection system 110, vehicle 102 and vehicle inspector 101.

The vehicle inspection system 110 includes vehicle undercarriage inspection system 111, vehicle exterior inspection system 112, and other sensors 113. The other sensors 113 include a camera 114, a MVDD 115, and mobile device 116. In some embodiments, the other sensors may include further sensors such as a device to record OBD codes from vehicle 102. As described herein, the vehicle inspection system 110 may include any number and/or combination of sensors 111-116.

The vehicle undercarriage inspection system 111 is positioned between the two support members of the vehicle exterior inspection system 112. In some embodiments, the vehicle undercarriage inspection system is configured to obtain data from the undercarriage of the vehicle as the vehicle drives over the vehicle undercarriage inspection system 111. In some embodiments, the vehicle undercarriage inspection system 111 includes a sensor array, which includes one or more sensors for recording data from the undercarriage of the vehicle. In some embodiments, data collected by the vehicle undercarriage inspection system 111 may be used to generate a composite image of the undercarriage of the vehicle, and/or in determining one or more characteristics and/or defects of the vehicle. Example vehicle undercarriage inspection systems are further described herein with reference to FIGS. 7-16C.

The vehicle exterior inspection system 112 includes two support members which collect data about the exterior of the vehicle, as the vehicle 102 drives past the support members of the vehicle exterior inspection system. In some embodiments, the vehicle exterior inspection system 112. In some embodiments, the support members of the vehicle exterior inspection system 112 include one or more sensor arrays which record data about the exterior of the vehicle as the vehicle drives past the support members of the vehicle exterior inspection system 112. In some embodiments, the sensors and/or sensor arrays of the vehicle exterior inspection system 112 may be positioned to record different portions of the vehicle 102. In some embodiments, the sensors and/or sensor arrays of the vehicle exterior inspection system 112 may be angled at different directions to capture data from different portions of the exterior of the vehicle. In some embodiments, data collected by the vehicle exterior inspection system 112 may be used in determining one or more characteristics and/or defects of the vehicle 102. Example vehicle exterior inspection systems are further described herein with reference to FIGS. 17A-29C.

In some embodiments, vehicle inspector 101 may use camera 114 to capture images of the vehicle 102. In some embodiments, the camera 114 may be used to capture images of the front of the vehicle, and/or the rear of the vehicle. In some embodiments, the camera 114 may be used to capture images of the interior of the vehicle 102. In some embodiments, images captured by the camera 114 may be used in determining one or more characteristics and/or defects of the vehicle 102.

In some embodiments, vehicle inspector 101 may place MVDD at the engine of the vehicle, to capture data related to the engine of the vehicle 102. In some embodiments, the MVDD may capture data related to the engine of the vehicle 102 when the vehicle 102 is being driven. In some embodiments, the MVDD may capture data related to the engine of the vehicle 102 when the vehicle 102 is driven over the vehicle undercarriage inspection system 111 and/or past the support members of the vehicle exterior inspection system. In some embodiments, the data related to the engine of the vehicle 102 may be used in determining one or more defects and/or characteristics of the vehicle 102.

In some embodiments, vehicle inspector 101 may use mobile device 116 to capture images of the vehicle 102. In some embodiments, the mobile device 116 may be used to capture images of the front of the vehicle, and/or the rear of the vehicle. In some embodiments, the mobile device 116 may be used to capture images of the interior of the vehicle 102. In some embodiments, the mobile device 116 may be used to capture other data related to the vehicle 102, for example audio data and/or magnetic field data. In some embodiments, data captured by the mobile device 116 may be used in determining one or more characteristics and/or defects of the vehicle 102.

In some embodiments, vehicle inspector 101 may control the capturing of data by the vehicle inspection system using mobile device 116. In some embodiments, the mobile device 116 may be connected to one or more components of the vehicle inspection system 110. In some embodiments, the mobile device 116 may provide an application which allows for the controlling of components of the vehicle inspection system 110.

In some embodiments, one or more components of the vehicle inspection system 110 may include a processor. In some embodiments the processor(s) of the vehicle inspection system 110 may be used in controlling the capturing of data related to the vehicle 102. In some embodiments, the processor(s) may control automatic capturing of data related to the vehicle 102. In some embodiments, the processor(s) of the vehicle inspection system 110 may allow the vehicle inspector 101 to control the capturing of data related to the vehicle 102. In some embodiments, the processor(s) of the vehicle inspection system 110 may allow for capturing of data related to the vehicle 102 which is automatic in part, and in part controlled by the vehicle inspector 101.

In some embodiments, the processor(s) of the vehicle inspection system 110 may process and/or analyze data captured using the vehicle inspection system. In some embodiments, the processor(s) of the vehicle inspection system 110 may determine one or more characteristics and/or defects of the vehicle 102, based on the captured data. In some embodiments, the processor(s) of the vehicle inspection system may generate a vehicle condition report for vehicle 102. In some embodiments, the processor(s) of the vehicle inspection system may display a vehicle condition report for review by vehicle inspector 101. In some embodiments, a vehicle condition report may be displayed on mobile device 116. In some embodiments, the processor(s) of the vehicle inspection system 110 may provide a user interface for displaying of vehicle data and/or controlling of components of the vehicle inspection system.

Figure 1B:
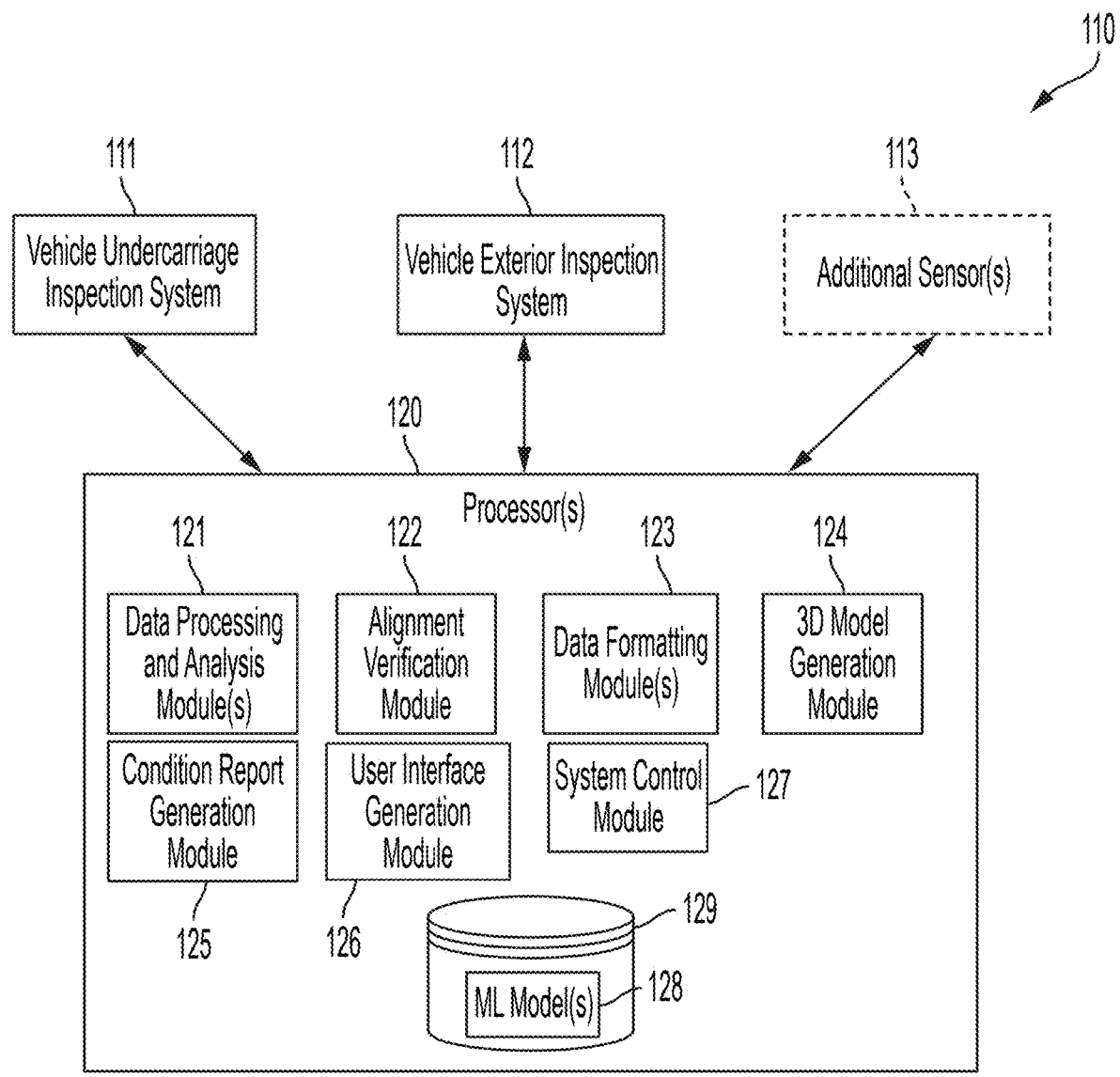
FIG. 1B is a diagram illustrating components of a vehicle inspection system, according to some embodiments of the technology described herein.

FIG. 1B is a diagram illustrating the processor(s) of a vehicle inspection system, according to some embodiments. In FIG. 1B, vehicle inspection system 110 includes vehicle undercarriage inspection system 111, vehicle exterior inspection system 112, additional sensors 113, and processor (s) 120. Processor(s) 120 may be part of one or more computing device(s) (laptops, desktops, single-board computing devices such as a Raspberry Pi, a tablet, a smartphone, a rackmount computer, etc.). The processor(s) 120 may be programmed to perform one or more tasks by executing processor-executable instructions. Processor-executable instructions may be organized into one or more software modules as shown in FIG. 1B. These are shown inside the processor-executable instructions box to indicate that they can be used to program the processor(s) 120.

As described herein, in some embodiments, the processor (s) 120 may be implemented as a part of the components of the vehicle inspection system 110, for example as a part of the vehicle undercarriage inspection system 111, the vehicle exterior inspection system 112, and/or the additional sensors 113. In some embodiments, the processor(s) 120 may be implemented separately from the vehicle undercarriage inspection system 111, vehicle exterior inspection system 112, and additional sensors 113, for example as part of a computer connected to the vehicle inspection system 110. In some examples, the processor(s) 120 may be implemented remotely from the vehicle inspection system 110, and may be connected to the vehicle undercarriage inspection system 111, vehicle exterior inspection system 112, and/or additional sensors 113 via a communication network. Thus, the processors 120 may include one or more processors and each such processor may be part of vehicle inspection system 110 or remote from vehicle inspection system 110. In some embodiments, when processor(s) 120 include multiple processors, one or more processors may be co-located with vehicle inspection system 110 (e.g., integrated with or proximate to vehicle undercarriage inspection system and/or vehicle exterior inspection system) and one or more other processors may be located remotely from vehicle inspection system 110 (e.g., as part of a cloud computing infrastructure).

The processor(s) 120 may transmit data to and/or receive data from the vehicle undercarriage inspection system 111, vehicle exterior inspection system 112, and additional sensors 113. In some embodiments, the processor(s) 120 may transmit control signals to the vehicle undercarriage inspection system 111, vehicle exterior inspection system 112, and additional sensors 113. In some embodiments, the control signals may trigger the vehicle undercarriage inspection system 111, vehicle exterior inspection system 112, and additional sensors 113 to begin and/or stop capturing of data related to a vehicle. In some embodiments, the processor(s) 120 may generate control signals based on sensor data received from the vehicle undercarriage inspection system 111, vehicle exterior inspection system 112, and additional sensors 113, for example data related to the position and/or motion of the vehicle. In some embodiments, the processors may generate control signals automatically when the vehicle is determined to be in one or more specific locations. In some embodiments, the processor(s) may transmit control signals to sensors of the vehicle undercarriage inspection system 111, vehicle exterior inspection system 112, and additional sensors 113, individually based on the position and/or motion of the vehicle. In some embodiments, the processor(s) may transmit control signals to the vehicle undercarriage inspection system 111, vehicle exterior inspection system 112, and additional sensors 113 based on input of a user.

The processor(s) 120 may be programmed to perform one or more tasks by computer executable instructions in one or more software modules. Such software modules may include, as shown in FIG. 1B, data processing and analysis module(s) 121, alignment verification module(s) 122, data formatting module(s) 123, 3D model generation module 124, condition report generation module 125, user interface generation module 126, system control module 127, and one or more database(s) 129 storing machine learning models 128.

The data processing and analysis and modules 121 may perform one or more operations on data received from the vehicle undercarriage inspection system 111, vehicle exterior inspection system 112, and/or additional sensors 113. In some embodiments, the processing and analysis modules 121 may filter data, structure data and/or preprocess data for additional processing and analysis. In some embodiments, the data processing and analysis modules 121 may determine one or more vehicle characteristics from the data received from the vehicle undercarriage inspection system 111, vehicle exterior inspection system 112, and/or additional sensors 113. In some embodiments, the data processing and analysis modules 121 may use one or more machine learning models, such as ML models 128 to determine the one or more vehicle characteristics. In some embodiments, the data processing and analysis modules 121 may determine one or more vehicle defects from the data received from the vehicle undercarriage inspection system 111, vehicle exterior inspection system 112, and/or additional sensors 113. In some embodiments, the data processing and analysis modules may determine the one or more defects using one or more ML models, such as ML models 128.

The alignment verification module 122 may determine whether the vehicle is properly aligned with the vehicle inspection system 110 for inspection. In some embodiments, the alignment verification module may analyze data received from one or more sensors of the vehicle inspection system, for example cameras and/or TOF sensors. In some embodiments, the alignment verification module 122 determines an alignment of the vehicle relative to one or more components of the vehicle inspection system, for example the vehicle undercarriage inspection system 111 and/or the vehicle exterior inspection system 112. In some embodiments, the alignment verification module 122 may determine an alignment of the vehicle and provide an indication of the alignment of the vehicle to one or more components of the vehicle inspection system, such as a mobile device or other component with a display. In some embodiments, the alignment of the vehicle may be a binary value, for example, aligned or not aligned. In some embodiments, when the alignment verification module 122 determines the vehicle is not aligned with the vehicle inspection system, the alignment verification module may provide an indication of an adjustment to be made to the vehicle, for example move vehicle left.

The data formatting module(s) 123 may perform one or more operations on the data received from the vehicle undercarriage inspection system 111, vehicle exterior inspection system 112, and/or additional sensors 113. In some embodiments, the data formatting modules 123 may format data such that it may be further used by other modules of the processor(s) 120. in some embodiments, the data formatting module may generate a composite image of a vehicle undercarriage based on data received from the vehicle undercarriage inspection system 111, for example by combining images captured by cameras of the vehicle undercarriage inspection system 111. In some embodiments the composite image may be generated based on additional data received from the vehicle undercarriage inspection system 111, for example data indicative of the position and/or motion of the vehicle such as data captured by a TOF sensor. In some embodiments, the data formatting modules 123 may determine subsets of data for analysis. In some embodiments, the data formatting modules 123 may determine subsets of data for analysis by determining whether the data matches one or more criteria and in response to determining the data matches one or more criteria, including the data in a subset of data for analysis. In some embodiments, the data may be selected based on a level of noise in the data, the signal strength in the data, and/or a position of the vehicle within the data. In some embodiments, the data formatting modules may remove personally identifiable information from data, for example images received from the vehicle undercarriage inspection system 111, vehicle exterior inspection system 112, and/or additional sensors 113. In some embodiments, the data formatting modules 123 may provide data to other modules for analysis, for example data processing and analysis modules 121, alignment verification modules 122, 3D model generation modules 124, condition report generation module 125, user interface generation module 126, and/or system control module.

In some embodiments, the 3D model generation module 124 may generate a 3D model of a vehicle based on data received from the vehicle undercarriage inspection system 111, vehicle exterior inspection system 112, and/or additional sensors 113. In some embodiments, the 3D model generation module 124 may generate a 3D model of the exterior of the vehicle based on data received from the vehicle exterior inspection system 112. In some embodiments, the 3D model generation module may generate a 3D model of the undercarriage of the vehicle based on data received from the vehicle undercarriage inspection system 111. In some embodiments, the 3D model may be generated using one or more ML models, such as ML models 128. In some embodiments, the 3D model is generated using photogrammetry. In some embodiments, the 3D model is generated using neural radiance fields. In some embodiments, the 3D model is generated using Gaussian splatting.

The vehicle condition report generation module 125 may generate a vehicle condition report based on data received from the vehicle undercarriage inspection system 111, vehicle exterior inspection system 112, and/or additional sensors 113. In some embodiments, the vehicle condition report generation module 125 may generate a vehicle condition report based on one or more characteristics and/or defects of the vehicle determined using the data processing and analysis modules 121. In some embodiments, the condition report generation module 125 may generate a vehicle condition report that includes data related to a vehicle, for example images of the vehicle, and/or audio recordings of the vehicle. IN some embodiments, the vehicle condition report generation module 125 may generate a vehicle condition report suing data received from the data formatting modules 123, for example, images with PII removed, a subset of images and/or other data, and/or a composite image of the vehicle undercarriage. In some embodiments, the condition report generation module may include a 3D model of the vehicle generated using the 3D model generation model 124. In some embodiments, the condition report generation module may generate a vehicle condition report using data obtained from a user interface of the vehicle inspection system.

User interface generation module 126 may provide a user interface of the vehicle inspection system on one or more displays connected to the vehicle inspection system. In some embodiments the user interface generation module 126 may provide a user interface on a mobile device of the vehicle inspection system, a computer connected to one or more components of the vehicle inspection system, and/or a device remote from the vehicle inspection system. In some embodiments, the user interface generation module 126 may generate a user interface which displays information related to a vehicle, for example, alignment data, a 3D model of a vehicle, and/or a vehicle condition report. In some embodiments, the user interface generation module 126 may provide vehicle data to a user responsive to a request for additional data, for example, the module 126 may provide additional images of a region of the vehicle responsive to a request for images of the region.

The system control module 127 may generate and provide control signals to the vehicle undercarriage inspection system 111, vehicle exterior inspection system 112, and/or additional sensors 113. In some embodiments, the control signals may include signals to trigger the starting and/or stopping of recording data by sensors of the vehicle inspection system. In some embodiment, the control signals may be generated based on data obtained from the vehicle undercarriage inspection system 111, vehicle exterior inspection system 112, and/or additional sensors 113, for example data indicative of the position and/or motion of the vehicle. In some embodiments, the system control module 127 may generate control signals based on inputs received from a user of the vehicle inspection system 110.

Databases 129 store ML models 128. In some embodiments, the databases 129 are implemented as a part of one or more components of the vehicle inspection system 110, for example as physical storage. In some embodiments, the databases 129 are accessible by components of the vehicle inspection system, for example as cloud storage.

ML models 128 may be used by modules of the vehicle inspection system to analyze data and/or process obtained from the vehicle undercarriage inspection system 111, vehicle exterior inspection system 112, and/or additional sensors 113. In some embodiments, the ML models 128 may be used in determining one or more vehicle defects and/or characteristics. Machine learning models for determining vehicle characteristics and/or defects are described in U.S. Pat. No. 11,631,289, entitled "Vehicle Audio Capture and Diagnostics," filed Jan. 22, 2020, U.S. Pat. No. 10,893,213, entitled "Vehicle Undercarriage Imaging System," filed Apr. 2, 2019, U.S. patent application Ser. No. 18/778,247, entitled "Methods and Systems for Identifying Potential Vehicle Defects," filed Jul. 19, 2024, and U.S. patent application Ser. No. 18/483,935, entitled: "Machine Learning and Magnetic Field Sensing Techniques for Vehicle Inspection and Condition Analysis," filed Oct. 10, 2023, each of which is incorporated by reference herein in its entirety. In some embodiments, the ML models may be used by the alignment verification modules 122, data formatting modules 123, 3D model generation modules 124, and/or condition report generation modules 125.

Figure 1C:
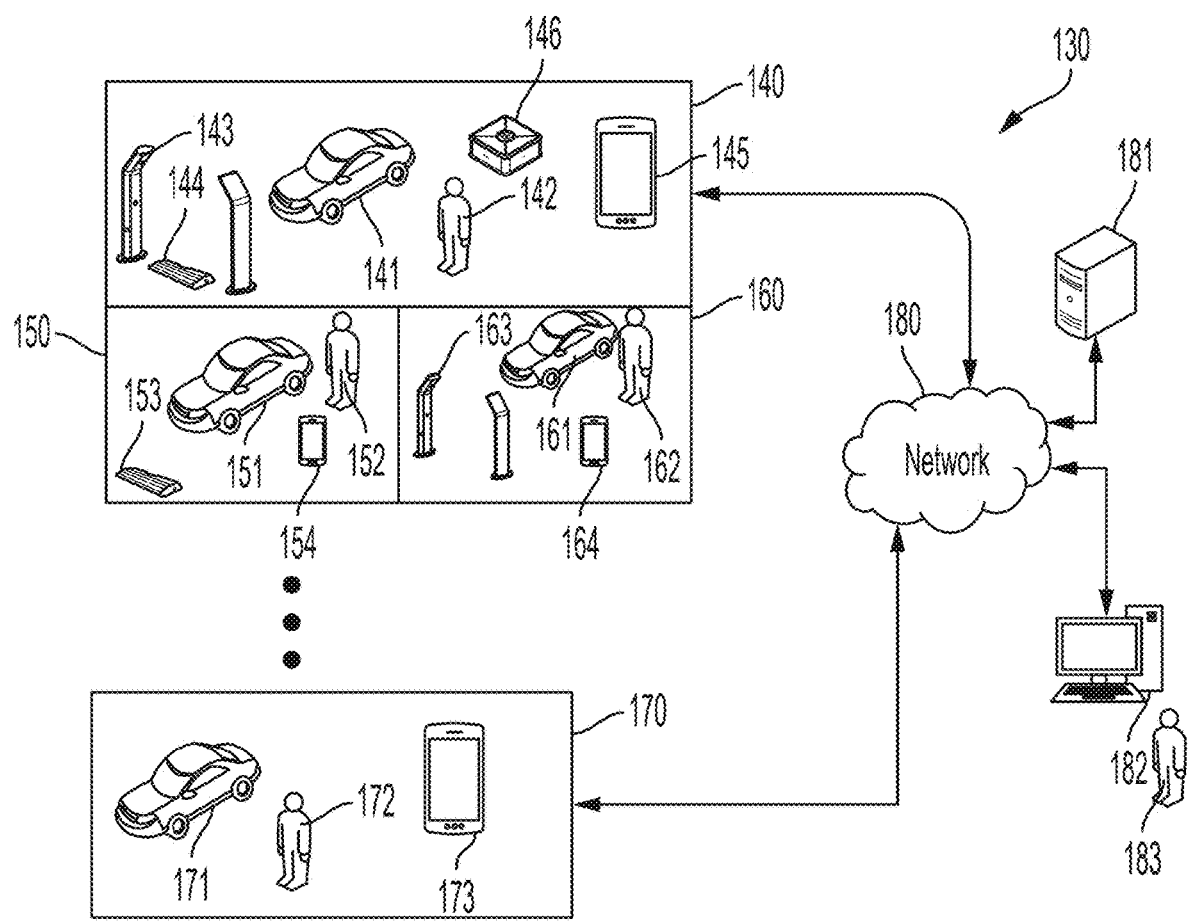
FIG. 1C illustrates an example of an environment 130 in which multiple vehicle inspection systems may be deployed, according to some embodiments of the technology described herein.

FIG. 1C illustrates an example of an environment 130 to which multiple vehicle inspection systems are deployed, according to some embodiments. The inspections may be used to collect information about one or more vehicles and analyze the collected information to determine whether any one of the vehicles has or is likely to have one or more potential defects. The collected information may be collected by inspectors in connection with one or vehicle inspections, such as vehicle inspections 140, 150, 160 and 170.

In the illustrated example of FIG. 1C, the environment may include any suitable number of mobile devices for collecting data about any suitable number of vehicles as aspects of the technology described herein are not limited by the number of devices that are part of the vehicle inspection system or the number of vehicles that such devices may be used to examine. As shown in the example of FIG. 1C, four vehicle inspections are being performed, 140, 150, 160 and 170, however greater or fewer inspections may be performed in such environments.

As shown in FIG. 1C, each inspection is performed using different devices. Inspection 140 is performed on vehicle 141 by inspector 142, using vehicle exterior inspection system 143, vehicle undercarriage inspection system 144, mobile device 145 and MVDD 146. Vehicle inspection 150 is performed on vehicle 151 by inspector 152 using vehicle undercarriage inspection system 153 and mobile device 154. Vehicle inspection 160 is performed on vehicle 161 by inspector 162 using vehicle exterior inspection system 163 and mobile device 164. Vehicle inspection 170 is performed on vehicle 171 by inspector 172 using mobile device 173.

During vehicle inspections 140, 150, 160, and 170 the data collected may be provided through network 180 to a remote computer 182 and/or server(s) 181 where the data may be stored and/or processed by trained machine learning models. In some embodiments, the vehicle information includes data gathered at least in part during inspection of the vehicle using a vehicle inspection system, as described herein. For example, the vehicle information may include audio recordings acquired by recording sounds of various vehicle components while the vehicle is in operation. As another example, the vehicle information may include a photo and/or video acquired during the vehicle inspection of the interior and/or exterior of the vehicle. As yet another example, the vehicle information may include on-board diagnostic codes data, such as on-board diagnostics II (OB-DII) codes and/or a live data stream from the vehicles on-board diagnostic system. In some embodiments, the data may be used to generate a vehicle condition report, as described herein.

In some embodiments, the data collected during vehicle inspections, and/or results of analysis by ML models (e.g., identified defects and/or characteristics, and/or likelihoods of defects and/or characteristics) may be provided to reviewer 183 on remote computer 182. The reviewer 183 may review the data to determine the accuracy of the results of the analysis by the ML models and whether one or more defects and/or characteristics are present on the vehicle. In some embodiments, reviewer 183 may update the data associated with a vehicle inspection, and/or may make changes to a vehicle condition report based on their review.

Figure 1D:
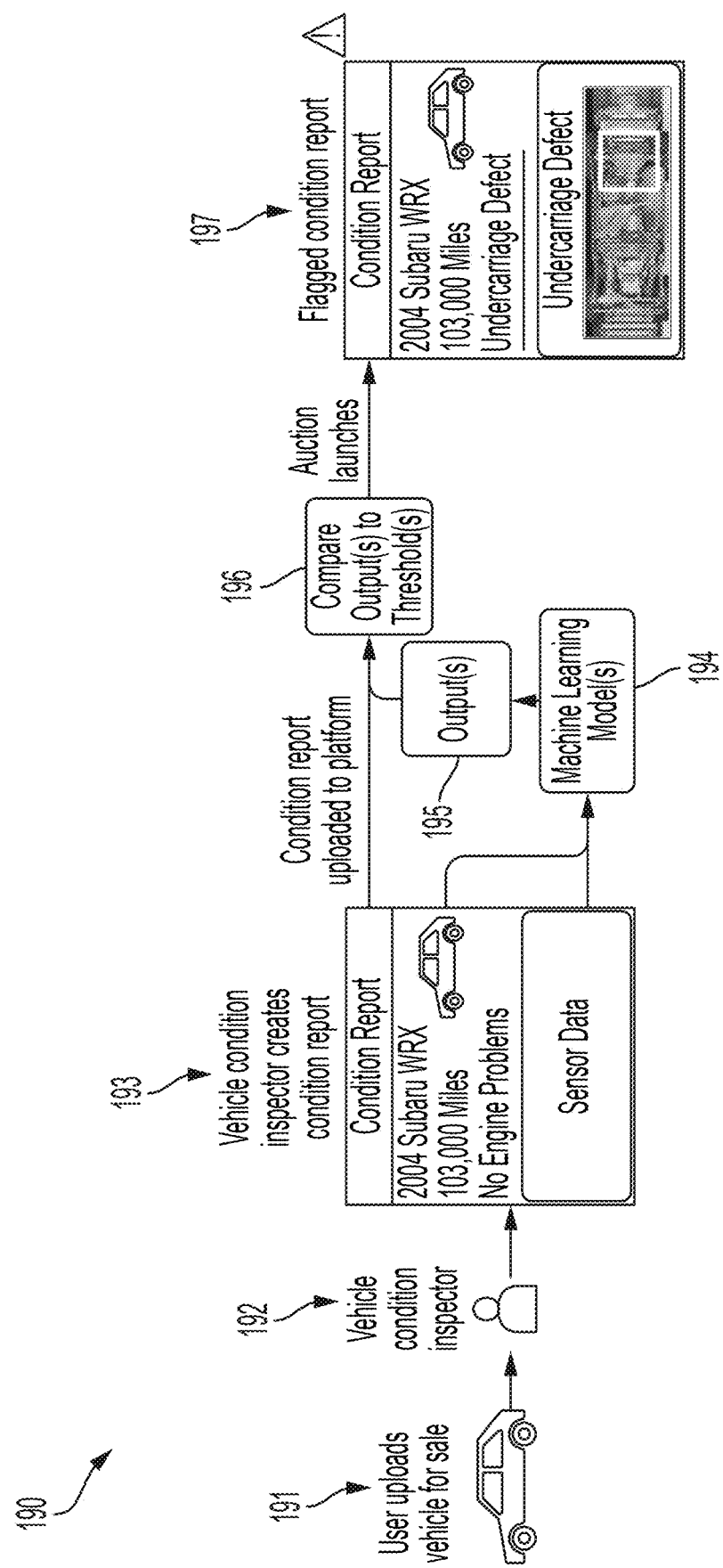
FIG. 1D illustrates an example vehicle examination process 190 for use with a digital vehicle auction platform, according to some embodiments of the technology described herein.

FIG. 1D illustrates an example vehicle examination process 190 for use with a digital vehicle auction platform, according to some embodiments. As shown in FIG. 1D, vehicle examination 190 may involve a user uploading a vehicle listing for sale 191. In some embodiments, a vehicle sale profile may be uploaded to a server, on which the platform is hosted, for display as an available vehicle for sale. The user may perform said uploading via a software application installed on a user's device. That software application may be an application for connecting with a digital vehicle auction platform and/or an Internet browser providing web-based access to the digital vehicle auction platform.

Once uploaded, a vehicle condition inspector 192 may conduct an examination of the vehicle. That examination may involve the inspector to physically inspect the vehicle. The examination process may involve having the inspector use a vehicle inspection system to collect data about the vehicle, as described herein. The inspector may have a mobile device as part of the vehicle inspection system and may use that device to interact with the vehicle inspection system. The mobile device may have a software application executing thereon that may instruct the inspector to take the vehicle through a series of stages (e.g., starting the engine, revving the engine, idling the engine, moving the vehicle, turning off the engine, a series of any of the preceding stages sequenced in any suitable way and repeating any one stage any suitable number of times) while the vehicle inspection gathers sensor data during at least some of those stages. As described herein, the collected data may be analyzed (e.g., using one or more trained ML models described herein) and the results of the analysis may be included in a vehicle condition report that serves aggregation of data regarding the vehicle's current condition. When the vehicle is presented to potential buyers on the digital platform, the vehicle condition report may be presented to parties potentially interested in bidding on the vehicle.

In some embodiments, the vehicle's condition report may include a review of the vehicle's characteristics, defects, damage, and/or faults. The vehicle condition report may include multiple (e.g., at least 10, 20, 30, etc.) photos of the exterior, interior, undercarriage, engine bay, and/or any other suitable component. Additionally or alternatively, the vehicle condition report may include the VIN number, odometer reading, engine fuel type, cosmetic issues observed by a user, mechanical issues observed by a user, and any of the other types of information about a vehicle described herein. In some embodiments, the vehicle condition report may include signals acquired of the vehicle during the vehicle examination, as described herein including with reference to FIG. 2.

As described herein, in some embodiments, the vehicle examination includes acquiring sensor signals using vehicle inspection system. Following the vehicle examination, the vehicle condition inspector generates a vehicle condition report associated with the vehicle for which a vehicle sale profile has been created. The vehicle condition report may include the signals and/or metadata acquired during the vehicle examination.

In some embodiments, the vehicle examination may occur prior to the uploading of a vehicle sale profile 191. Accordingly, in some embodiments, the vehicle condition report 193 may be generated along with the vehicle sale profile. In some embodiments, the vehicle condition report may be generated prior to the vehicle sale profile. However, once the vehicle sale profile is created it may be matched with the vehicle condition report based on the VIN or other available identification information.

However, in generating the vehicle condition report, user observations as to potential vehicle conditions may not be reliable. For example, engine defects may be very subtle issues which may only be discernible by automobile experts, if observable by physical observation at all. Accordingly, a vehicle defect may go unnoticed or even misclassified resulting in inaccurate vehicle condition report. In such an instance, an unknowing buyer may purchase the anomalous vehicle and upon finding such an undisclosed issue, may be eligible to file for an arbitration. More accurate vehicle condition reports may reduce the occurrence of undisclosed vehicle defects and by extension arbitrations.

Accordingly, to decrease the risk of undisclosed vehicle defects, the signals acquired during the vehicle examination by a plurality of sensors of the vehicle inspection device may be processed by one or trained machine learning models to detect the presence or absence of potential vehicle defects. After the generated of the vehicle condition report, the acquired signals may be processed by trained machine learning model(s) 194 to produce one or more outputs 195, which may be indicative of one or more defects present in the vehicle (as determined based on the sensor data and/or metadata processed). In some embodiments, the output(s) 195 may be compared to threshold(s) 196 to determine if the output(s) 195 are indicative of the presence or absence of a one or more potential vehicle defects.

In some embodiments, comparing output(s) 195 to threshold(s) 196 may be implemented using class-wise thresholds such that if a predicted vehicle defect exceeds its class threshold the vehicle is subsequently flagged with the corresponding defect. In some embodiments, the thresholds may be tuned to favor very precise predictions at the expense of recall to decrease the likelihood of falsely labeling a vehicle as having a vehicle defect when it is in fact clean. For example, different classes of defects (e.g., internal engine noise, after market vehicle parts, rough running engine, timing chain noise, etc.) may be associated with different threshold confidences such that different degrees of confidence may be required for different types of defects in order to flag them as potential defects in the report.

After determining whether the output(s) 195 are indicative of the presence or absence of a potential vehicle defect, the vehicle condition report may be flagged for the presence of the potential vehicle defect. In some embodiments, if the processing by the trained machine learning model(s) identifies potential defects which were not listed in the vehicle condition report 193, then the vehicle condition report may be flagged for additional review by the vehicle condition inspector 192, including conducting a second vehicle examination. Such a second vehicle examination may include collecting additional data about the vehicle using vehicle inspection system, for example, by collecting additional sensor data and subsequently analyzing it using one or multiple trained ML models.

In some embodiments, where a potential defect was listed in the vehicle condition effect, but the analysis by the trained machine learning models identified that the listed vehicle condition was absent from the data, the vehicle condition report may also be flagged for an additional review by the vehicle condition inspector 192, including conducting a second vehicle examination. In some embodiments, the output of the trained machine learning model(s) may be used to update the vehicle condition report to indicate either the presence and/or the absence of a vehicle defect without requiring an additional review by the vehicle condition inspector.

Figure 2:
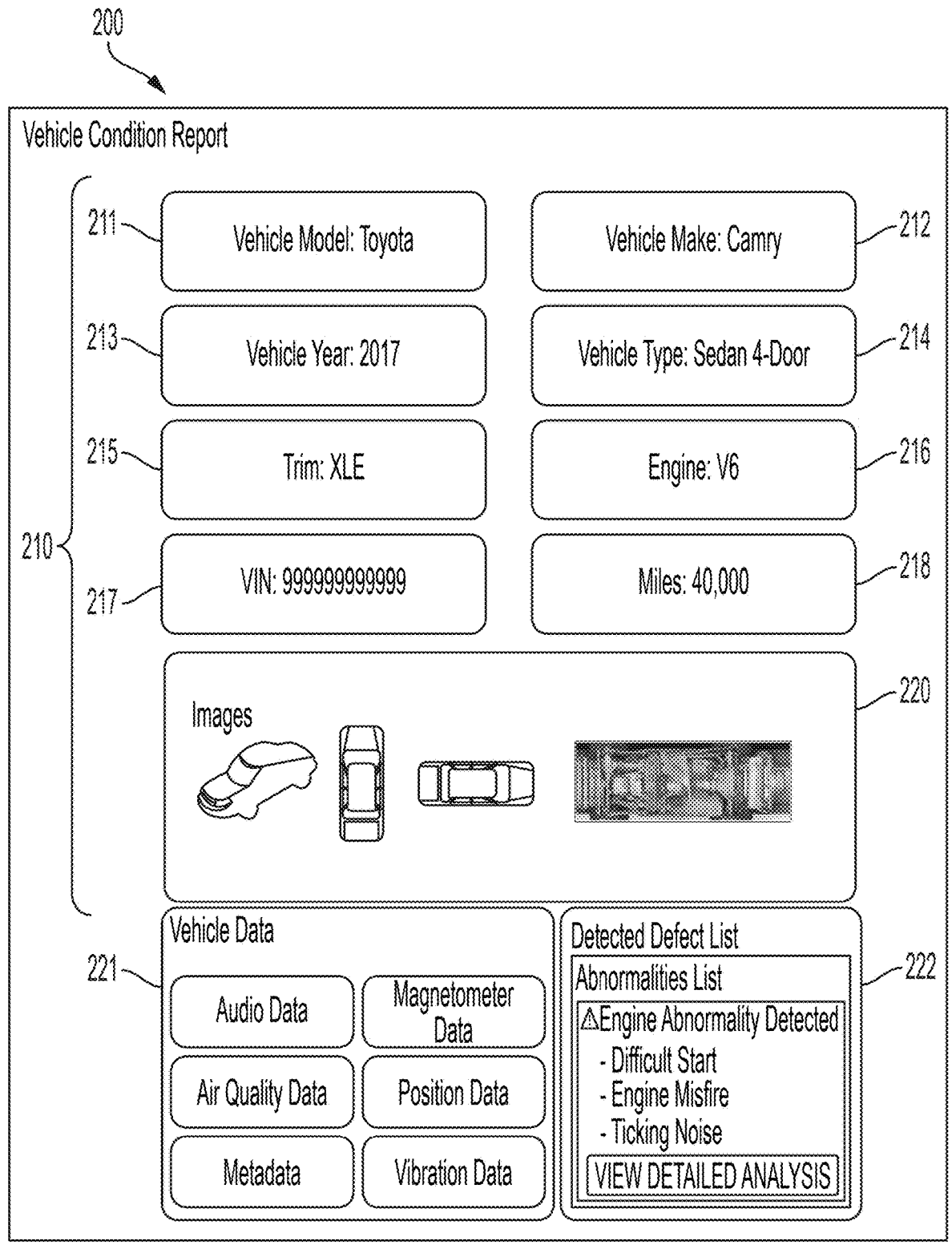
FIG. 2 illustrates an example vehicle condition report, according to some embodiments of the technology described herein.

FIG. 2 illustrates an example vehicle condition report, according to some embodiments. In some embodiments, vehicle report 200 may include basic vehicle data 210, vehicle data 221, and detected defect list 222. Vehicle data 221 may include data recorded during a vehicle inspection, for example audio data, magnetometer data, air quality data, position data, metadata, and/or vibration data. In some embodiments, vehicle data may include additional data recorded by a vehicle inspection system, as described herein. In some embodiments, the vehicle data is selectable to be viewed in detail by a user of a vehicle inspection system.

As shown in the example of FIG. 2, basic vehicle data 210 may include vehicle model 211, vehicle make 212, vehicle year 213, vehicle type 214, trim type 215, engine type 216, VIN 217, an odometer reading 218, and one or more images 220 of the vehicle and/or any of its components (e.g., undercarriage, panels, doors, hood, engine block, rear, etc.) may be included in vehicle condition report 200.

The vehicle report of FIG. 2 is illustrative and that, in other examples, one or more other types of information may be included in the vehicle report in addition to or instead of the information shown in FIG. 2, as aspects of the technology described herein are not limited in this respect. For example, a vehicle condition report may include vehicle RPM data from the OBDII port and/or data from one or more other sensors (e.g., thermal, humidity, VOC, etc.). As another example, any list part of list 222 may be displayed with a corresponding numeric value (e.g., a probability, a confidence value, a likelihood) indicating a degree of confidence in the vehicle actually having that defect. Such numeric values may be generated by the trained ML models described herein, for example.

FIGS. 3A-3F illustrate steps in an example vehicle inspection process, according to some embodiments.

Figure 3A:
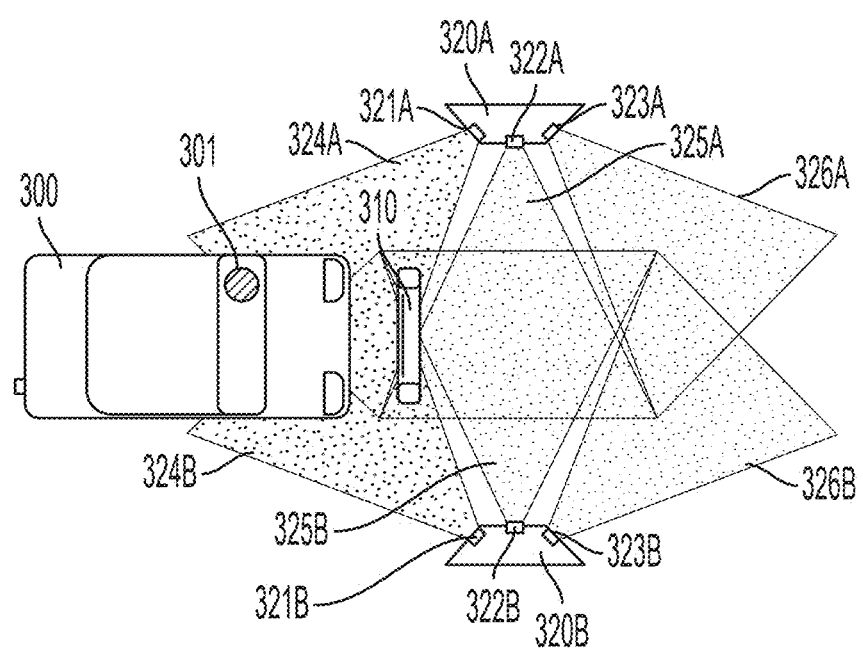
FIGS. 3A-3F illustrate steps in an example vehicle inspection process, according to some embodiments of the technology described herein.

In FIG. 3A, components of a vehicle inspection system are shown. The vehicle inspection system includes vehicle undercarriage inspection system 310 and support members 320A and 320B of a vehicle exterior inspection system. The vehicle inspection may be performed by inspector 301 on vehicle 300.

Support members 320A and B contain sensor arrays including cameras 321-323A and 321-323B, respectively. As shown the sensor arrays include three cameras, each angled in different directions. In FIG. 3A, cameras 321A and 321B have fields of view (FOV)s 324A and 324B, respectively, facing vehicle 300. Cameras 322A and B have FOVs 325A and 325B, respectively, which face the opposite support member. Cameras 323A and 323B have FOVs 326A and 326B, respectively, which face away from vehicle 300.

As shown, the support members of the vehicle exterior inspection system have sensor arrays including three cameras, however, the vehicle exterior inspection system may include a greater number of sensor arrays and/or cameras, as described herein.

In some embodiments, a registration process may be performed between the components of a vehicle inspection system, before performing an inspection. In some embodiments, the registration process incudes communicatively connecting the components, for example through wired and/or wireless connections. In some embodiments the registration process requires registering the positions of the components, for example using sensors of the system. In some embodiments the registration process involves capturing images and/or data from the components including the position of one or more markers and/or fiducials on the components.

In some embodiments, the alignment of the components of the vehicle inspection system may be verified and/or adjusted before performing an inspection.

Figure 3B:
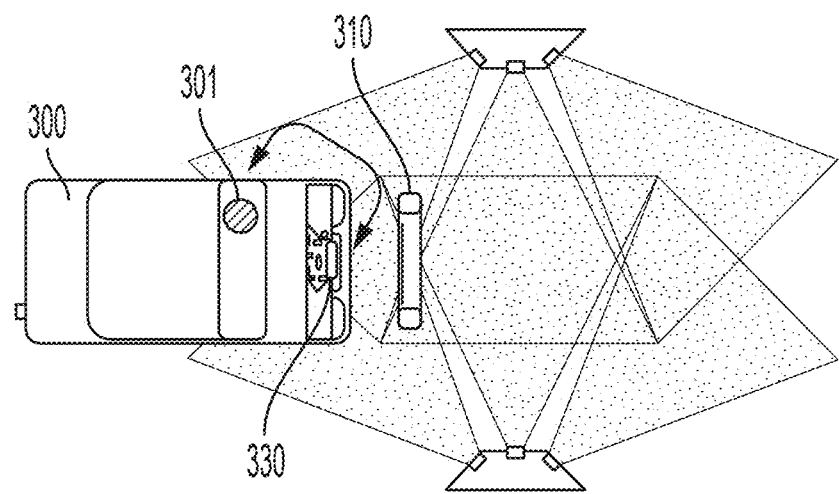
Figure 3C:
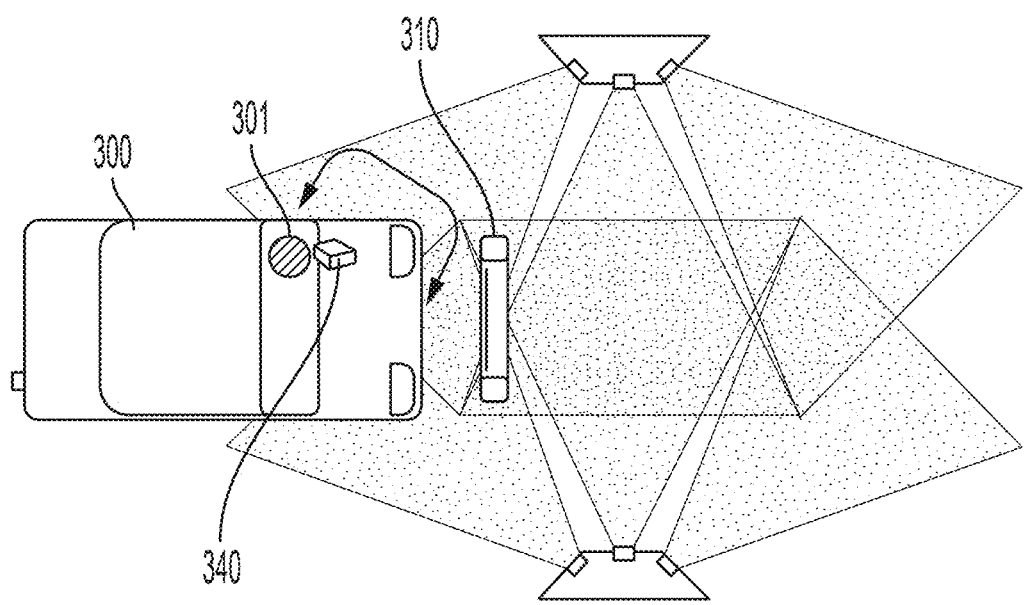

In FIG. 3B, the inspector 301 places a MVDD 330 at the engine of the vehicle 300. The MVDD may collect audio and vibration signals of the engine of the vehicle, as described herein. In FIG. 3C, the inspector 301 connects a vehicle diagnostic device 340 to the vehicle 300. In some embodiments the vehicle diagnostic device 340 is configured to record metadata from the vehicle 300. In some embodiments, the vehicle diagnostic device 340 is configured to record OBD and/or OBDII signals from the vehicle 300.

Figure 3D:
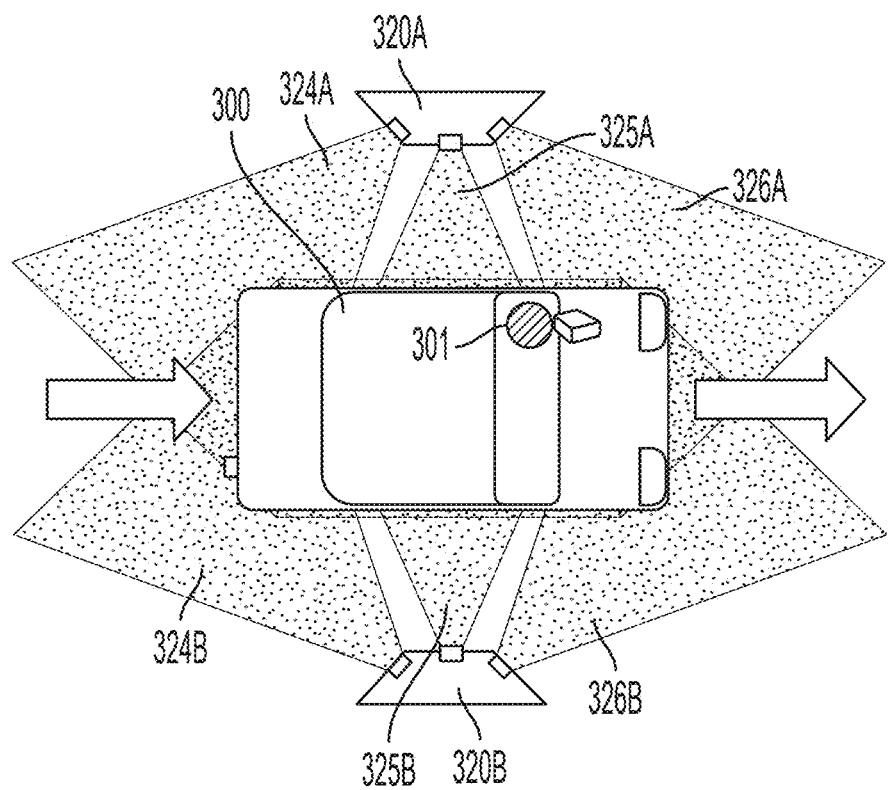

In FIG. 3D, the inspector 301 drives the vehicle 300. The inspector drives the vehicle over vehicle undercarriage inspection system 310. In some embodiments, the vehicle undercarriage inspection device may be configured to automatically start and stop recording of data related to the undercarriage of the vehicle as the vehicle passes over.

In FIG. 3D, The inspector 301 drives the vehicle through the fields of view of the cameras of the vehicle exterior inspection system. The vehicle begins in fields of view 324A and 324B in which cameras 321A and 321B capture images of the vehicle 300. The vehicle then passes into fields of view 325A and 325B in which cameras 322A and 322B capture images of the vehicle. Finally the vehicle passes into fields of view 326A and 326B in which cameras 323A and 323B capture images of the vehicle.

In sum embodiments, the cameras of the vehicle exterior inspection device are configured to automatically start and stop capturing of images of the vehicle as the vehicle passes into and out of their respective fields of view.

Figure 3E:
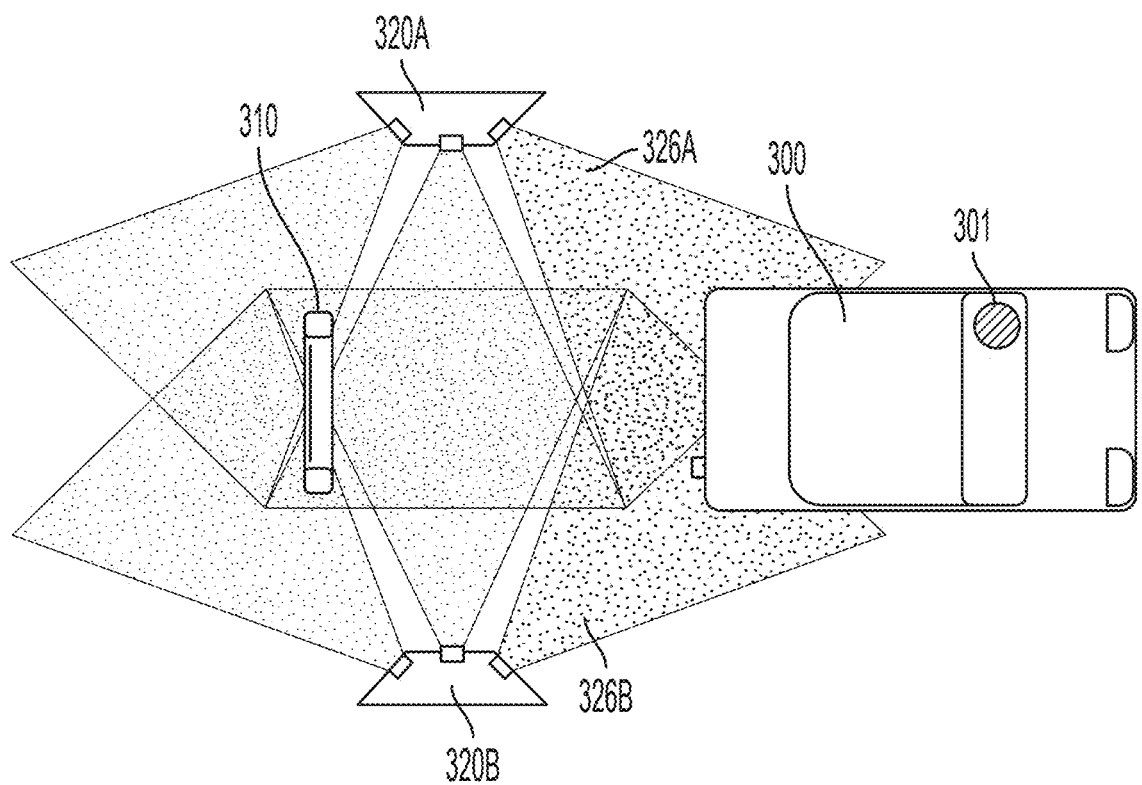

In FIG. 3E, the vehicle 300 has passed through all fields of view of the cameras of the vehicle exterior inspection system, and has passed over the vehicle undercarriage inspection system 310, And both systems have completed capturing data of the vehicle.

Figure 3F:
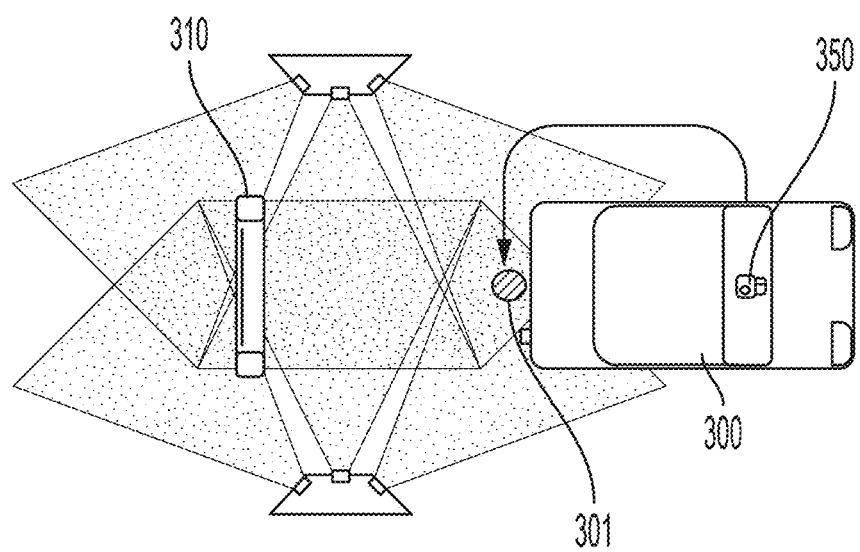

In FIG. 3F, The inspector 301 moves around vehicle 300 to capture additional images of the vehicle using camera 350. In some embodiments, the inspector 301 uses camera 350 to capture images of the front, rear, VIN plate, and/or engine bay of a vehicle. In some embodiments, the inspector 301 captures images of the interior of the vehicle using camera 350.

After completion of the vehicle inspection process as detailed in FIGS. 3A through 3F, the data collected using the sensors of the vehicle inspection system may be analyzed using one or more processors to determine characteristics and/or defects of the vehicle as described herein.

In some embodiments, the data may be analyzed, for example by one or more ML models to determine if it is of sufficient quality for analysis. In some examples, it may be determined the inspection process was unsuccessful and needs to be reperformed. In some embodiments, the user is notified the inspection process was unsuccessful via a user interface of the vehicle inspection system.

The vehicle inspection process of FIGS. 3A-3F allows for data to be collected from a vehicle efficiently, from multiple sources, during a single pass of the vehicle through the vehicle inspection system. This vehicle inspection process is more efficient than conventional inspection processes and allows for faster vehicle inspections to be performed.

Figure 4A:
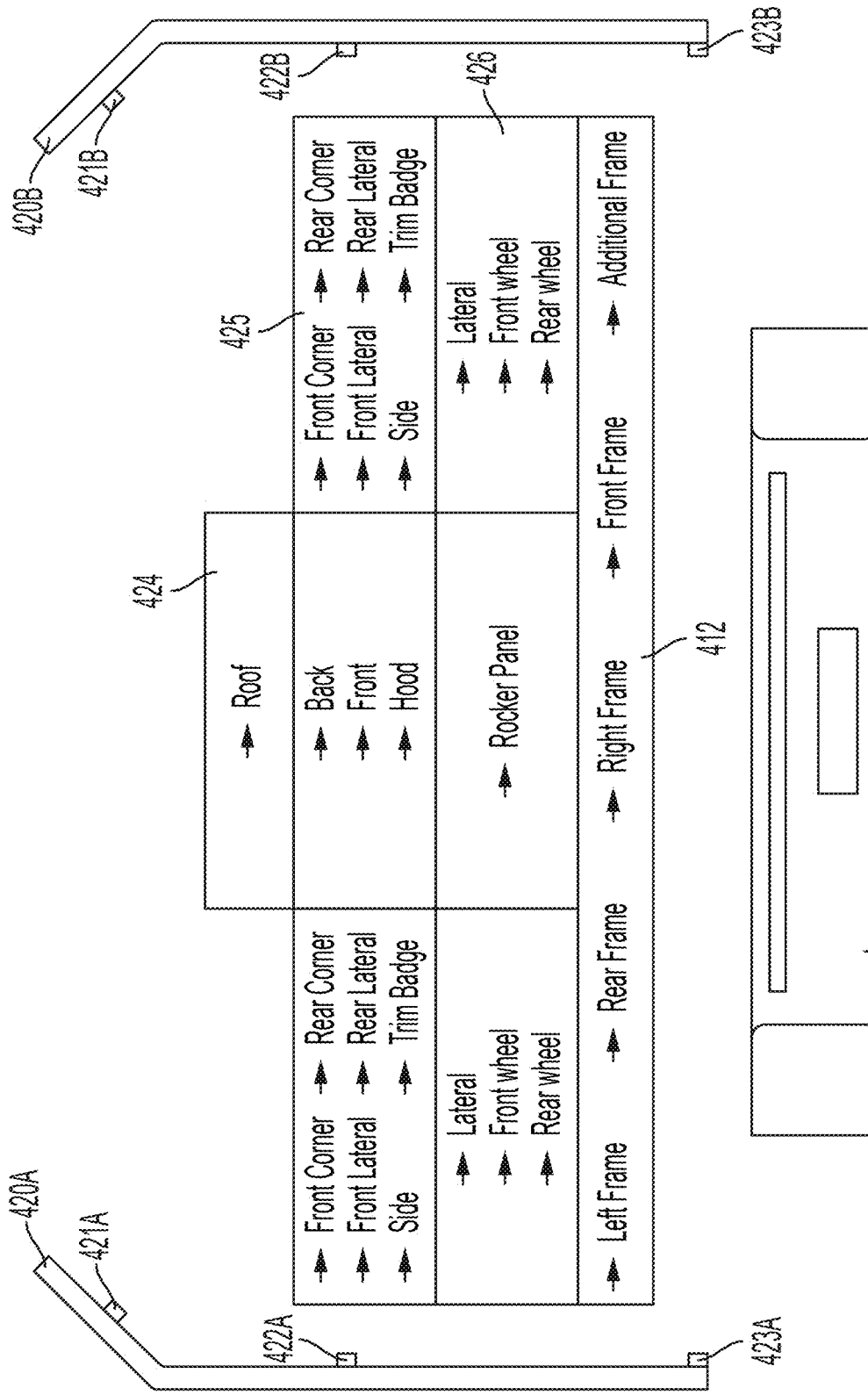
FIG. 4A illustrates example image data which may be captured by a vehicle inspection system, according to some embodiments of the technology described herein.

FIG. 4A illustrates example image data which may be captured by a vehicle inspection system, according to some embodiments. In the example of FIG. 4A, the vehicle inspection system includes a vehicle exterior inspection system and a vehicle undercarriage inspection system. The vehicle exterior inspection system includes 2 support members 420A and 420B. Each support member 420A and 420B includes three camera sets, 421A-423A and 421B-423B, respectively. Each camera set may include multiple cameras oriented in different directions as described herein. Each camera set may be configured to capture images of different portions of the vehicle during a vehicle inspection process.

The top camera sets 421-A and 421B are configured to capture images of the roof of the vehicle 424. The middle two camera sets, 422A and 422B, are configured to capture images of multiple components of the vehicle 425. The middle two camera sets 422A and 422B are configured to capture images of the front corners, rear corners, front laterals, rear laterals, sides, and trim badges of both sides of the vehicle. In addition, the middle two camera sets 422A and 422B are configured to capture images of the back front and hood of the vehicle. Finally, the bottom two camera sets 423A and 423B are configured to capture images of the laterals, front wheels, rear wheels and rocker panels of the vehicle on both sides of the vehicle, as shown by reference 426.

The vehicle undercarriage inspection system 410 is additionally configured to capture images of the undercarriage of the vehicle, as represented by reference 412. The vehicle undercarriage inspection system 410 may include a set of cameras configured to capture different frames of the vehicle undercarriage, including the left, rearm right and front of the undercarriage, as represented by reference 412. The vehicle undercarriage inspection system may capture additional frames of the vehicle undercarriage for use in analyses.

Figure 4B:
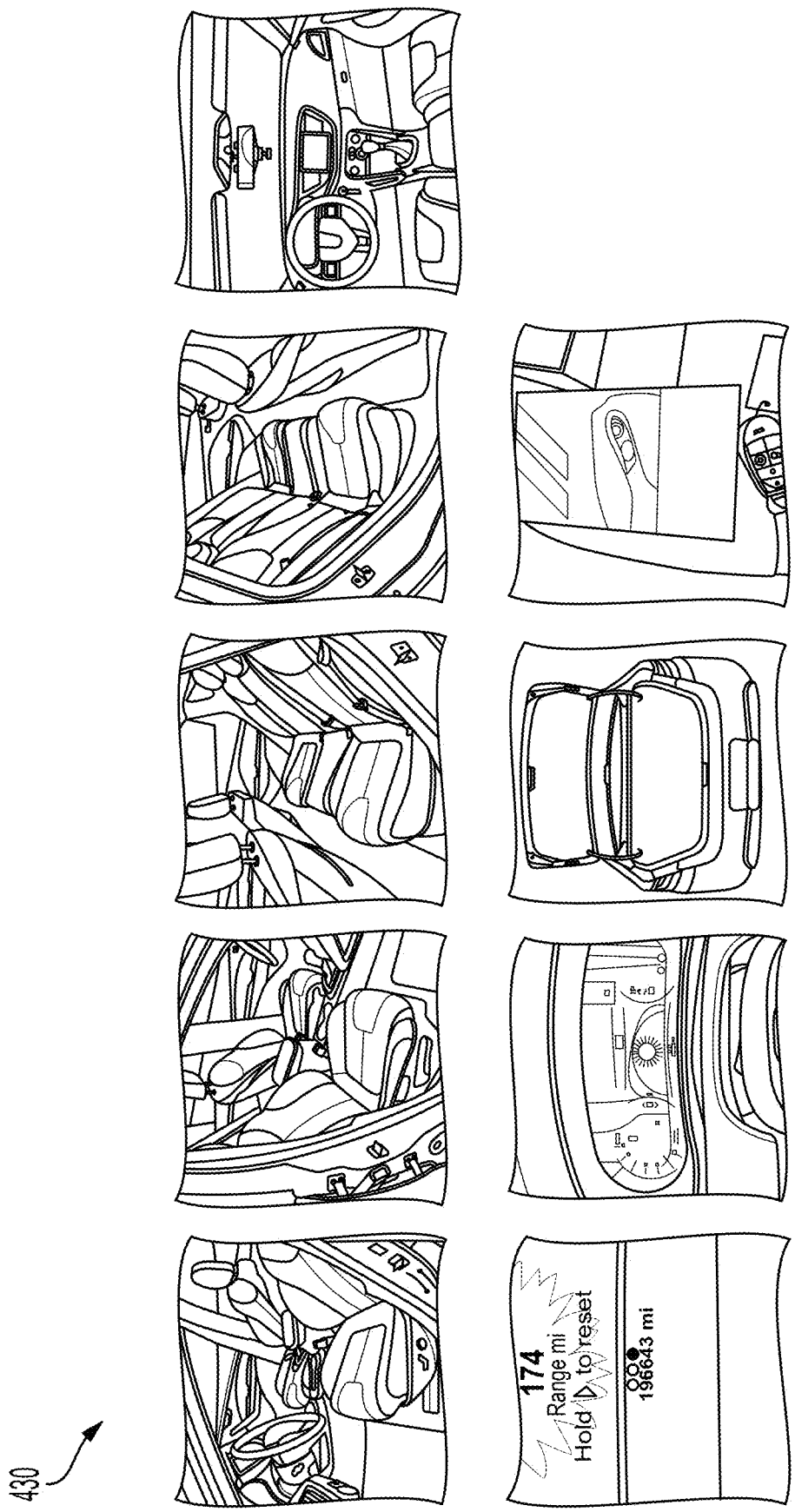
FIG. 4B is an example of images of a vehicle interior which may be captured during a vehicle inspection process, according to some embodiments of the technology described herein.

FIG. 4B is an example of images of a vehicle interior which may be captured during a vehicle inspection process, according to some embodiments. The images 430 of FIG. 4B may be captured, for example, as described with reference to FIG. 3F. The images of the vehicle interior may include images of the driver side front seat, passenger side front seat, driver side rear seat, passenger side rear seat, center console, odometer, gauge cluster, trunk, and/or the user manual and keys of the vehicle. The vehicle interior images may be analyzed as described herein. In some embodiments, the images 430 may be analyzed to determine one or more defects and/or characteristics of the interior of the vehicle such as damaged seats, damaged floor, damaged headliner, damaged panels interior color, odometer reading, and/or warning lights, among other defects and/or characteristics.

Figure 5A:
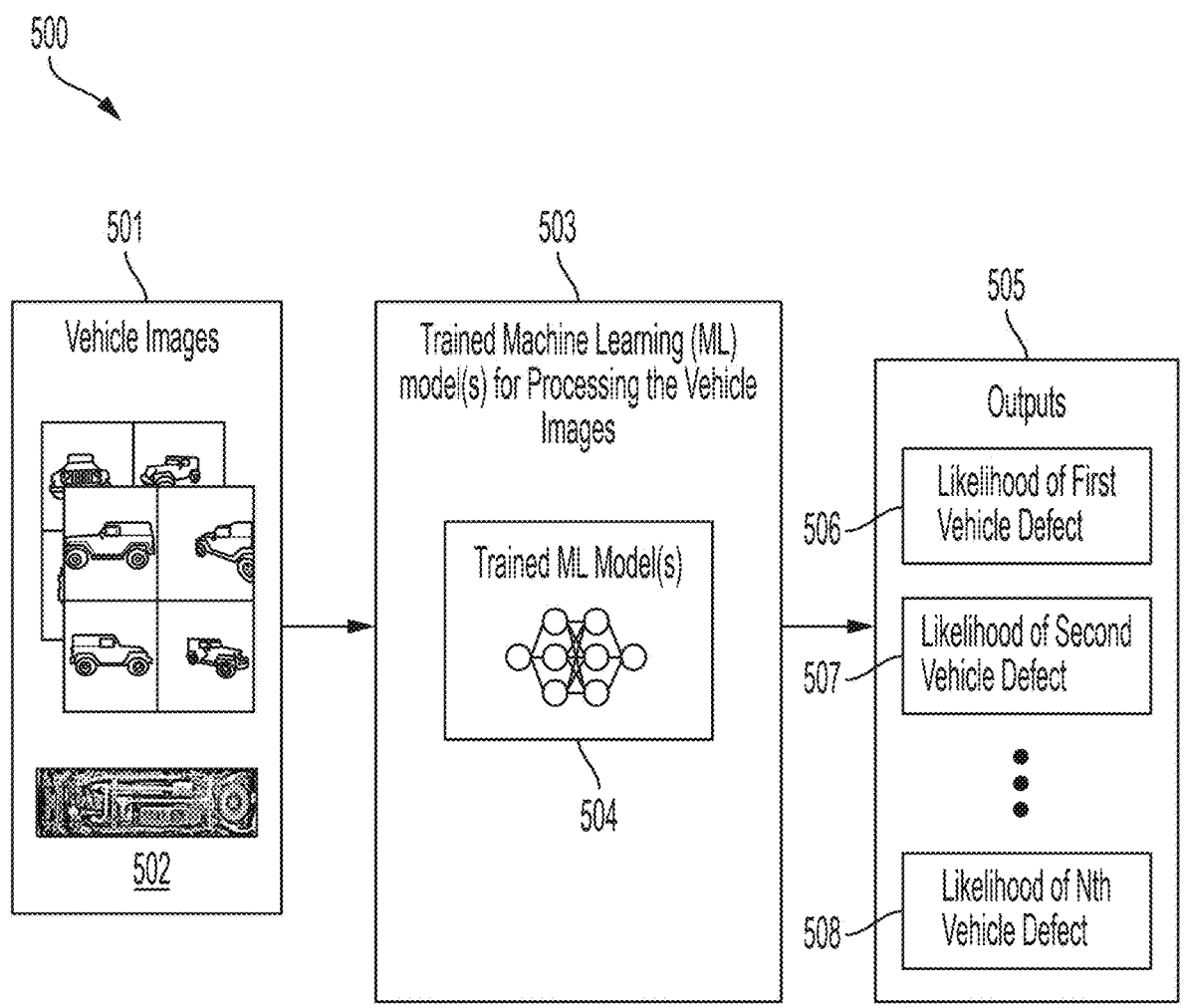
FIG. 5A illustrates one or more trained machine learning models 500 for processing images of a vehicle to evaluate the vehicle's condition, according to some embodiments of the technology described herein.

FIG. 5A illustrates one or more trained machine learning models 500 for processing images of a vehicle to evaluate the vehicle's condition, according to some embodiments. As shown in FIG. 5A, trained machine learning model 500 includes trained machine learning model 503 for processing the vehicle images 501 to obtain outputs 505.

In some embodiments, the images 501 may be captured as a part of a vehicle inspection, performed using a vehicle inspection system. For example, as described with reference to FIGS. 3A-F. In some embodiments, the images 501 may include the views of the vehicle described with reference to FIGS. 4A-4B.

In some embodiments, the images 502 of the vehicle may be a series of images acquired of different views of the vehicle or may be a single image constructed from processing a series of images as described herein. In some embodiments, the vehicle images 502 include images and/or a composite image of the undercarriage of the vehicle. In some embodiments, the vehicle images 502 include an image and/or images of the exterior of the vehicle. In some embodiments, the images 502 may be collected from a vehicle inspection system, as described herein. The images 502 may include multiple color channels and may be formatted in any suitable image format. For example, the image may be a Joint Photographic Expert Group (JPEG) image or a Portable Network Graphics (PNG) image, where each pixel has a corresponding value indicating the red, blue, and green color components.

In some embodiments, trained machine learning model 503 for processing the images of the vehicle may include preprocessing to generate input images for trained machine learning model 504. Preprocessing to generate input images may modify at least one characteristic of the images of the vehicle, prior to the image being processed by the trained machine learning model 504.

Trained machine learning model 504 may be any suitable machine learning model for image analysis. In some embodiments, trained machine learning model 504 is a 2D convolutional neural network. In some embodiments, ML model 504 is structured as a deep convolutional neural network (DCNN). In some embodiments, ML model 504 is structured as a YOLO architecture neural network. In some embodiments, ML model 504 is a transformer-based model. In some embodiments, ML model 504 is a diffusion model. In some embodiments the machine learning model 504 is configured as an EfficientNet convolutional neural network.

Outputs 505 may include a list of vehicle defects and the respective likelihood of the defect being present in the vehicle. As shown in FIG. 5A outputs 505 include the likelihood of a first vehicle defect 506, the likelihood of a vehicle image defect 507, and a likelihood of an nth vehicle defect 508. For example, when n=8 there may be 8 output classes (e.g., types of vehicle defects) including 7 defect classes and one affirmative quality class. In some embodiments, the outputs 505 include likelihood of particular vehicle characteristics being present. Examples of vehicle characteristics and defects are described herein. In some embodiments, the outputs include likelihoods of image defects, for example incorrect cropping, insufficient detail, dirty lens, haze or glare, incorrect trim, and/or poor lighting, among other image defects.

Figure 5B:
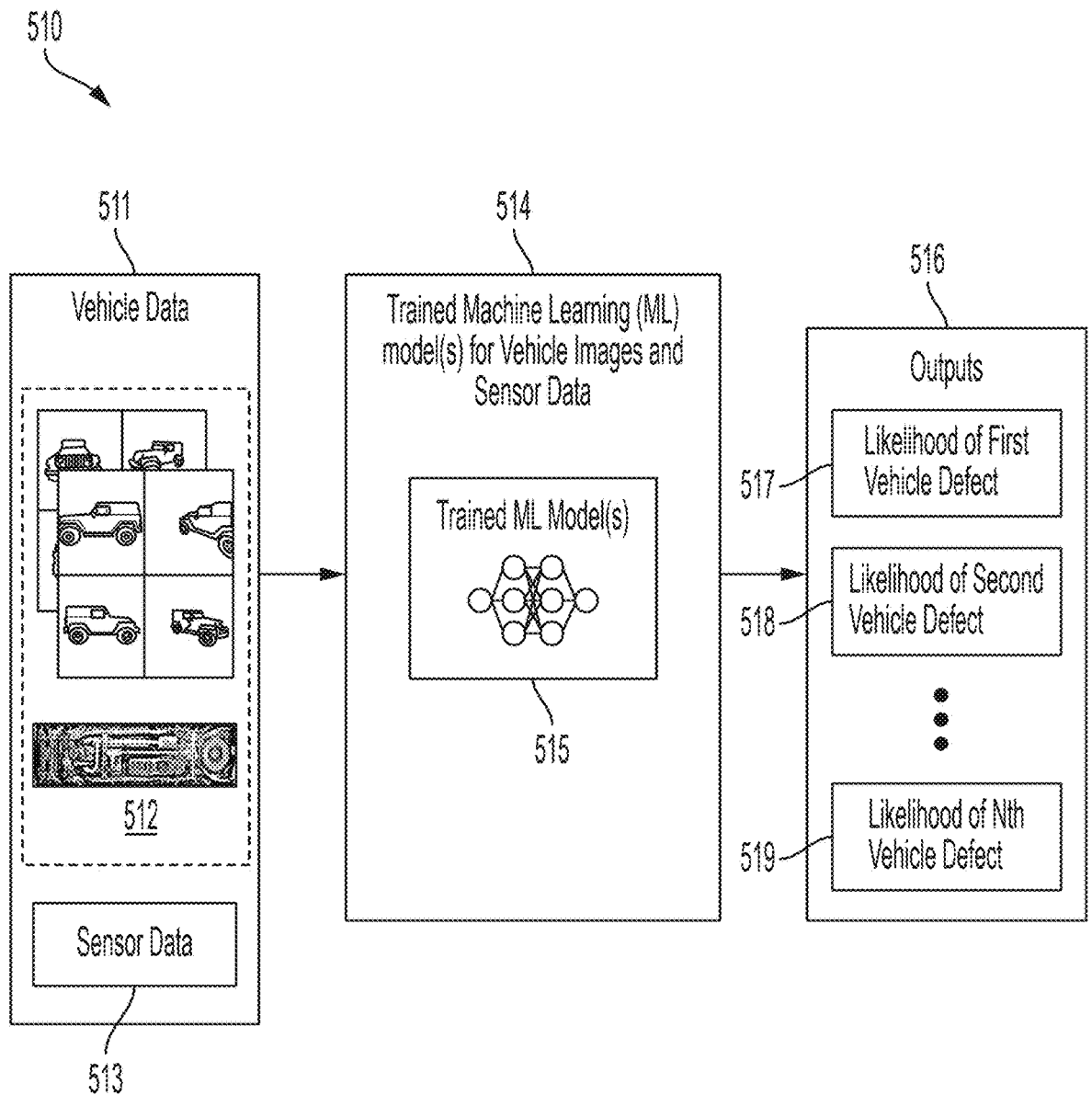
FIG. 5B illustrates one or more trained machine learning models 510 for processing images and data of a vehicle to evaluate the vehicle's condition, according to some embodiments of the technology described herein.

FIG. 5B illustrates one or more trained machine learning models 510 for processing images and data of a vehicle to evaluate the vehicle's condition, according to some embodiments. As shown in FIG. 5B, trained machine learning model 510 includes trained machine learning model 514 for processing the vehicle data 511 to obtain outputs 516.

In some embodiments, the data 511 may be captured as a part of a vehicle inspection, performed using a vehicle inspection system. For example, as described with reference to FIGS. 3A-F. In some embodiments, the images 512 of the data 511 may include the views of the vehicle described with reference to FIGS. 4A-4B.

In some embodiments, the vehicle data may include images 512 of and sensor data 513 about a vehicle. In some embodiments, the images 512 of the vehicle may be a series of images acquired of different views of the vehicle or may be a single image constructed from processing a series of images as described herein. In some embodiments, the images 512 may be formatted as described with reference to images 502 of FIG. 5A.

In some embodiments, the sensor data 513 may include data collected by one or more sensors of a vehicle inspection system, as described herein. For example, the sensor data 513 may include data collected by a microphone, an infrared camera, a thermal camera, a magnetometer, a time of flight sensor, a MVDD, a device configured to collect vehicle metadata, and/or an air quality sensor.

In some embodiments, trained machine learning model 514 for processing the vehicle data may include preprocessing to generate input data for trained machine learning model 515. Preprocessing to generate input data may modify at least one characteristic of the vehicle data, prior to the data being processed by the trained machine learning model 515.

In some embodiments, the trained machine learning models 514 may process vehicle images 512 and sensor data 513 separately. In some embodiments, the trained machine learning models 514 may process vehicle images 512 and sensor data 513 together. In some embodiments, the trained machine learning models 514 may process vehicle images 512 and sensor data 513 together in part and separately in part.

Trained machine learning model 515 may be any suitable machine learning model for image and/or sensor data analysis. In some embodiments, trained machine learning model 515 is a 2D convolutional neural network. In some embodiments, ML model 515 is structured as a deep convolutional neural network (DCNN). In some embodiments, ML model 515 is structured as a YOLO architecture neural network. In some embodiments, ML model 515 is a transformer-based model. In some embodiments, ML model 515 is a diffusion model. In some embodiments the machine learning model 515 is configured as an EfficientNet convolutional neural network.

Outputs 516 may include a list of vehicle defects and the respective likelihood of the defect being present in the vehicle. As shown in FIG. 5B outputs 516 include the likelihood of a first vehicle defect 517, the likelihood of a vehicle image defect 518, and a likelihood of an nth vehicle defect 519. For example, when n=8 there may be 8 output classes (e.g., types of vehicle defects) including 7 defect classes and one affirmative quality class. In some embodiments, the outputs 516 include likelihood of particular vehicle characteristics being present. Examples of vehicle characteristics and defects are described herein. In some embodiments, the outputs include likelihoods of image and/or data defects, for example incorrect cropping, insufficient detail, dirty lens, haze or glare, incorrect trim, insufficient magnitude, too noisy, and/or poor lighting, among other defects.

Figure 5C:
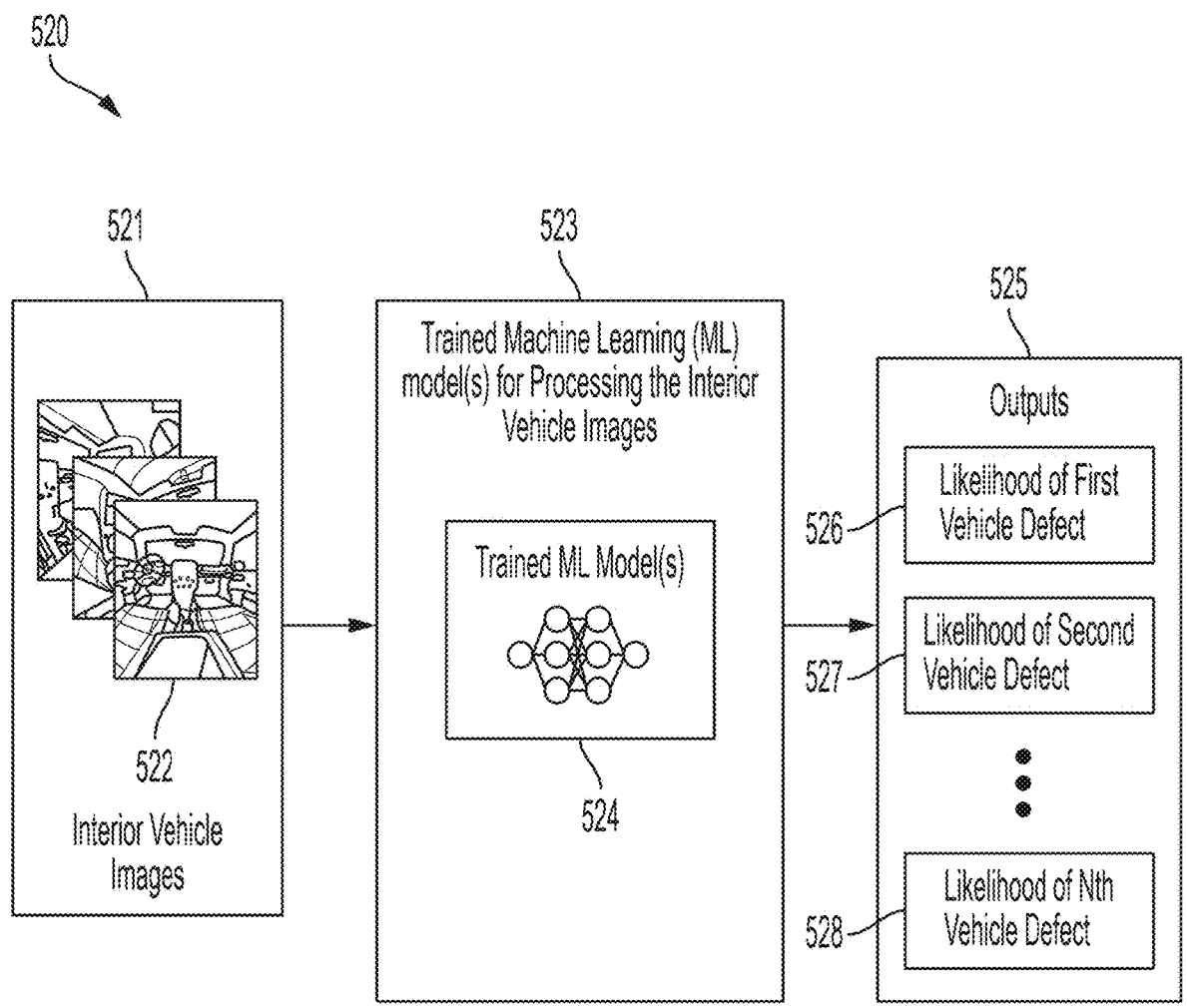
FIG. 5C illustrates one or more trained machine learning models 523 for processing images of the interior of a vehicle to evaluate the vehicle's condition, according to some embodiments of the technology described herein.

FIG. 5C illustrates one or more trained machine learning models 523 for processing images of the interior of a vehicle to evaluate the vehicle's condition, according to some embodiments. As shown in FIG. 5C, trained machine learning model 520 includes trained machine learning model 523 for processing the vehicle interior images 522 to obtain outputs 525.

In some embodiments, the vehicle interior images 522 may be captured as a part of a vehicle inspection, performed using a vehicle inspection system. For example, as described with reference to FIGS. 3A-F. In some embodiments, the vehicle interior images 522 may include the views of the interior of the vehicle described with reference to FIG. 4B.

In some embodiments, trained machine learning model 523 for processing the vehicle interior images may include preprocessing to generate input data for trained machine learning model 524. Preprocessing to generate input data may modify at least one characteristic of the vehicle interior images, prior to the data being processed by the trained machine learning model 524.

Trained machine learning model 523 may be any suitable machine learning model for image analysis. In some embodiments, trained machine learning model 523 is a 2D convolutional neural network. In some embodiments, ML model 523 is structured as a deep convolutional neural network (DCNN). In some embodiments, ML model 523 is structured as a YOLO architecture neural network. In some embodiments, ML model 523 is a transformer-based model. In some embodiments, ML model 523 is a diffusion model. In some embodiments the machine learning model 523 is configured as an EfficientNet convolutional neural network, which takes interior images as inputs and is configured to output prediction labels for identified damage and/or defects.

Outputs 525 may include a list of vehicle defects and the respective likelihood of the defect being present in the vehicle. As shown in FIG. 5C outputs 525 include the likelihood of a first vehicle defect 526, the likelihood of a vehicle image defect 527, and a likelihood of an nth vehicle defect 528. For example, when n=8 there may be 8 output classes (e.g., types of vehicle defects) including 7 defect classes and one affirmative quality class. In some embodiments, the outputs 525 include likelihood of particular vehicle characteristics being present. Examples of vehicle characteristics and defects are described herein. In some embodiments, the outputs include likelihoods of image defects, as described herein.

Figure 5D:
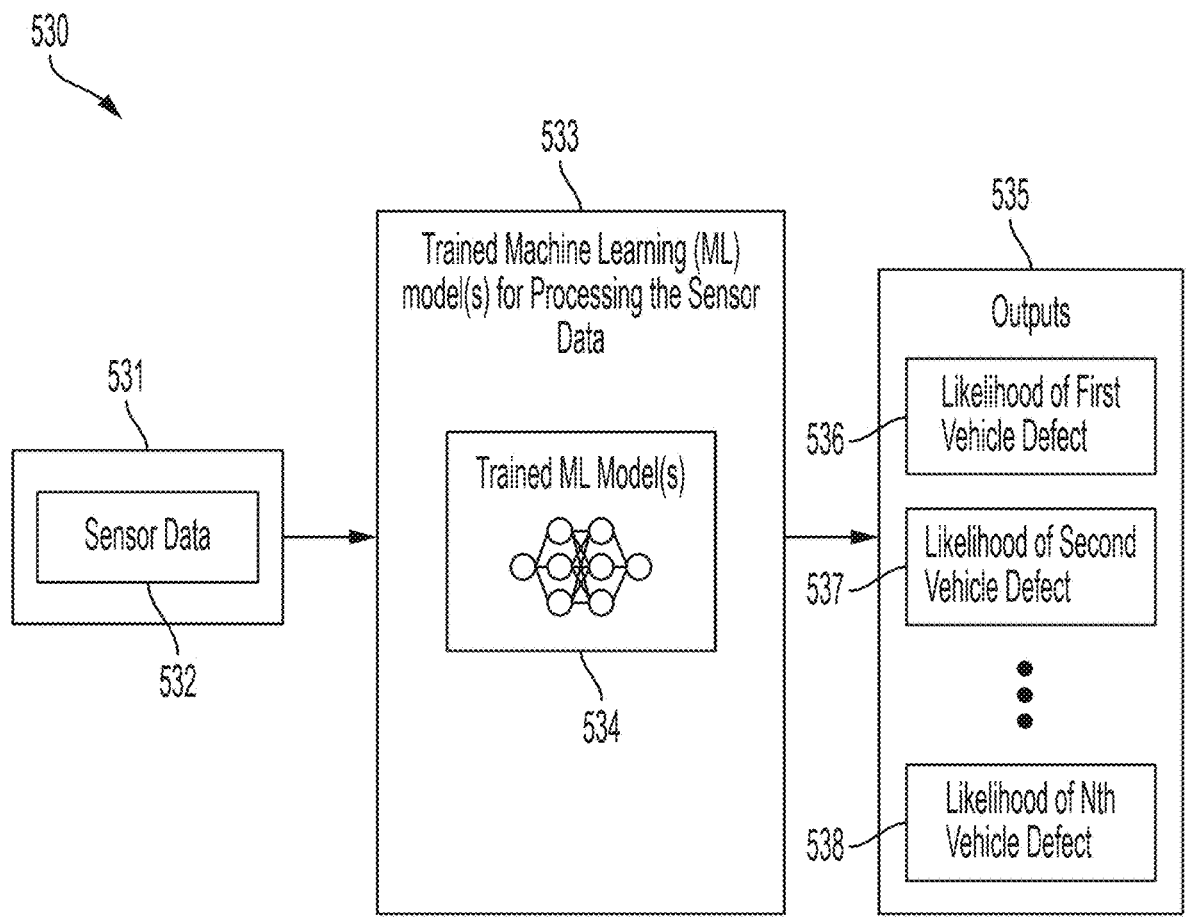
FIG. 5D illustrates one or more trained machine learning models 530 for processing data of a vehicle to evaluate the vehicle's condition, according to some embodiments of the technology described herein.

FIG. 5D illustrates one or more trained machine learning models 530 for processing data of a vehicle to evaluate the vehicle's condition, according to some embodiments. As shown in FIG. 5D, trained machine learning model 530 includes trained machine learning model 533 for processing the vehicle data 531 to obtain outputs 535.

In some embodiments, the data 531 may be captured as a part of a vehicle inspection, performed using a vehicle inspection system. For example, as described with reference to FIGS. 3A-F.

In some embodiments, the vehicle data may sensor data 532 about a vehicle. In some embodiments, the sensor data 532 may include data collected by one or more sensors of a vehicle inspection system, as described herein. For example, the sensor data 532 may include data collected by a microphone, an infrared camera, a thermal camera, a magnetometer, a time of flight sensor, a MVDD, a device configured to collect vehicle metadata, and/or an air quality sensor.

In some embodiments, trained machine learning model 533 for processing the vehicle data may include preprocessing to generate input data for trained machine learning model 534. Preprocessing to generate input data may modify at least one characteristic of the vehicle data, prior to the data being processed by the trained machine learning model 534.

In some embodiments, the trained machine learning models 533 may process vehicle sensor data from different vehicle sensors separately. In some embodiments, the trained machine learning models 533 may process the sensor data from different vehicle sensors together. In some embodiments, the trained machine learning models 533 may process sensor data from different sensors together in part and separately in part.

Trained machine learning model 534 may be any suitable machine learning model for sensor data analysis. In some embodiments, trained machine learning model 534 is a 2D convolutional neural network. In some embodiments, ML model 534 is structured as a deep convolutional neural network (DCNN). In some embodiments, ML model 534 is a transformer-based model.

Outputs 535 may include a list of vehicle defects and the respective likelihood of the defect being present in the vehicle. As shown in FIG. 5D outputs 535 include the likelihood of a first vehicle defect 536, the likelihood of a vehicle image defect 537, and a likelihood of an nth vehicle defect 538. For example, when n=8 there may be 8 output classes (e.g., types of vehicle defects) including 7 defect classes and one affirmative quality class. In some embodiments, the outputs 535 include likelihood of particular vehicle characteristics being present. Examples of vehicle characteristics and defects are described herein. In some embodiments, the outputs include likelihoods data defects, for example incorrect cropping, insufficient detail, incorrect trim, insufficient magnitude, and/or too noisy, among other defects.

Figure 6A:
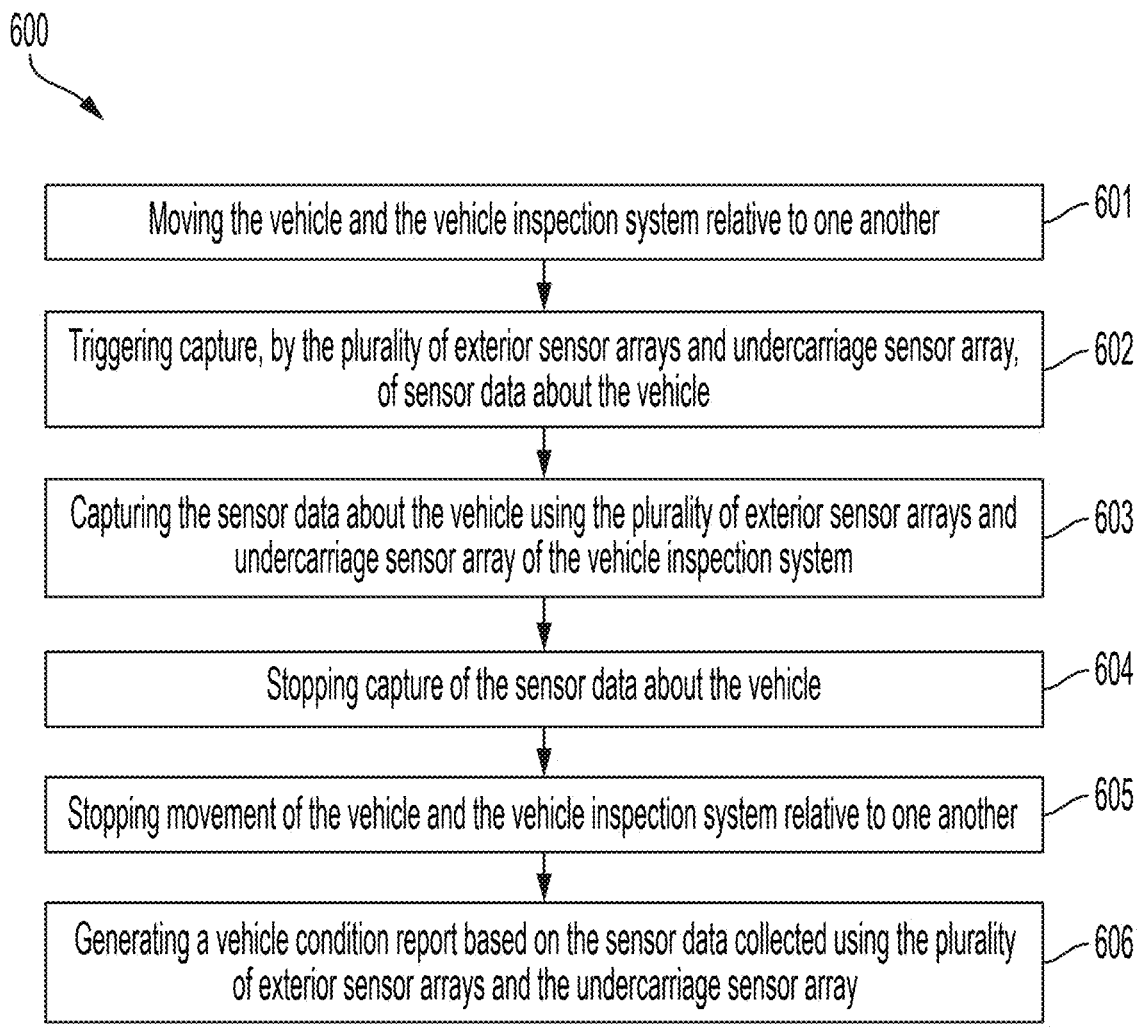
FIG. 6A is a flowchart of an illustrative process 600 for inspecting a vehicle using a vehicle inspection system, according to some embodiments of the technology described herein.

FIG. 6A is a flowchart of an illustrative process 600 for inspecting a vehicle using a vehicle inspection system, according to some embodiments. In some embodiments, the vehicle inspection system is configured such as those described herein with reference to FIGS. 1A-4B. In some embodiments, the vehicle inspection system used in performing process 600 includes a vehicle exterior inspection system with a support member and exterior sensor arrays coupled to the support member. The exterior sensor arrays having respective sets of sensors oriented in different directions. The vehicle inspection system may also include a vehicle undercarriage inspection system with an undercarriage sensor array including first, second and third cameras which capture images at different angles relative to the vehicle undercarriage, and a sensor configured to output data indicative of the position and/or motion of the vehicle relative to the vehicle inspection system. Some steps of process 600 may be performed by a vehicle inspector. Some steps of process 600 may be performed by one or more components of the vehicle inspection system.

Process 600 starts at step 601 by moving the vehicle and the vehicle inspection system relative to one another. In some embodiments, the vehicle may be driven past components of a vehicle inspection system, such as described with reference to FIGS. 3A-F. The vehicle may be driven by an inspector or by another individual. In some embodiments, one or more components of a vehicle inspection system may move relative to the vehicle. For example, a vehicle undercarriage inspection system may move beneath and/or around a vehicle, and/or a vehicle exterior inspection system may move relative to the vehicle such as described with reference to FIGS. 17C-H.

Next, step 602 is performed by triggering capture, by the plurality of exterior sensor arrays and undercarriage sensor array, of sensor data about the vehicle. In some embodiments, the triggering is performed automatically by the vehicle inspection system. In some embodiments the triggering is performed automatically based on signals obtained from one or more sensors of a vehicle inspection system, such as TOF sensors, and/or cameras. In some embodiments, the triggering is performed when the vehicle is determined to be at one or more positions relative to the vehicle inspection system based on sensor data. In some embodiments, different components may be triggered at different times, for example a vehicle exterior inspection system may be triggered to capture data when the vehicle is determined to be at a first position and the vehicle undercarriage inspection system is triggered to capture data when the vehicle is determined to be at a second position. In some embodiments individual sensors may be triggered at different times, for example sensors having different orientations may be triggered based on the position of the vehicle.

In some embodiments, the triggering is performed manually by an inspector by providing one or more inputs to a vehicle inspection system, such as through a user interface or other inputs as described herein.

Next, step 603 is performed by capturing the sensor data about the vehicle using the plurality of exterior sensor arrays and undercarriage sensor array of the vehicle inspection system.

Next, step 604 is performed by stopping capture of the sensor data about the vehicle. In some embodiments, the stopping is performed automatically by the vehicle inspection system. In some embodiments the stopping is performed automatically based on signals obtained from one or more sensors of a vehicle inspection system, such as TOF sensors, and/or cameras. In some embodiments, the stopping is performed when the vehicle is determined to be at one or more positions relative to the vehicle inspection system based on sensor data. In some embodiments, different components may be stopped at different times, for example a vehicle exterior inspection system may be stopped from capturing data when the vehicle is determined to be at a first position and the vehicle undercarriage inspection system may be stopped from capturing data when the vehicle is determined to be at a second position. In some embodiments individual sensors may be stopped at different times, for example sensors having different orientations may be stopped based on the position of the vehicle.

In some embodiments, the stopping is performed manually by an inspector by providing one or more inputs to a vehicle inspection system, such as through a user interface or other inputs as described herein.

Next, step 605 is performed by stopping movement of the vehicle and the vehicle inspection system relative to one another. In some embodiments, step 605 is performed by an inspector or other individual by stopping the vehicle. In some embodiments, step 605 is performed by an inspector by providing an input to the vehicle inspection system to stop moving. In some embodiments, step 605 is performed automatically by a vehicle inspection system.

Next, step 606 is performed by generating a vehicle condition report based on the sensor data collected using the plurality of exterior sensor arrays and the undercarriage sensor array. In some embodiments, step 606 is performed by an inspector who reviews the collected data. In some embodiments, step 606 is performed by one or more components of the vehicle inspection system, such as processors. In some embodiments, the condition report includes data related to the vehicle, for example as described with reference to FIG. 2. In some embodiments, data of a vehicle condition report may be determined using one or more machine learning models, such as those described herein with reference to FIGS. 5A-D, 13A-C, and/or 23A-E. In some embodiments, the vehicle condition report may be displayed and/or otherwise provided for a vehicle inspector for review.

Following the conclusion of process 600, the inspector may proceed to conduct a further vehicle inspection. Accordingly, in some embodiments, the inspector may use the vehicle condition report and/or targeted professional inspection instructions to determine particular techniques to use during the further vehicle inspection (e.g., to check for the potential vehicle defects).

Additionally, or alternatively, the inspector may be a potential buyer who may use the vehicle condition report to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 6B:
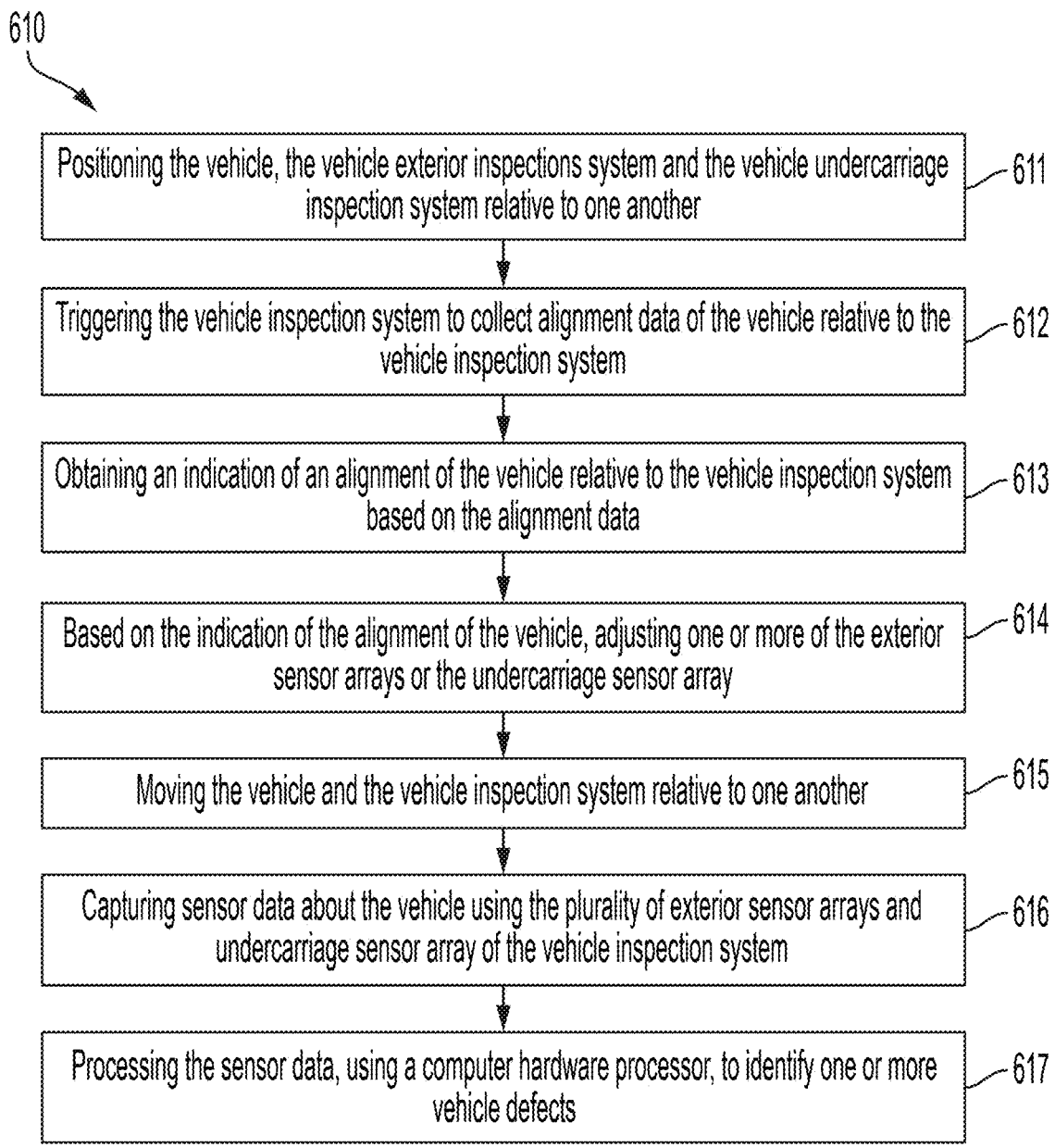
FIG. 6B is a flowchart of an illustrative process 610 for preparing and using a vehicle inspection system to perform a vehicle inspection, according to some embodiments of the technology described herein.

FIG. 6B is a flowchart of an illustrative process 610 for preparing and using a vehicle inspection system to perform a vehicle inspection, according to some embodiments. In some embodiments, the vehicle inspection system is configured such as those described herein with reference to FIGS. 1A-4B. In some embodiments, the vehicle inspection system used in performing process 610 includes a vehicle exterior inspection system with a support member and exterior sensor arrays coupled to the support member. The exterior sensor arrays having respective sets of sensors oriented in different directions. The vehicle inspection system may also include a vehicle undercarriage inspection system with an undercarriage sensor array including first, second and third cameras which capture images at different angles relative to the vehicle undercarriage, and a sensor configured to output data indicative of the position and/or motion of the vehicle relative to the vehicle inspection system. Some steps of process 610 may be performed by a vehicle inspector. Some steps of process 610 may be performed by one or more components of the vehicle inspection system.

Process 610 begins at step 611, by positioning the vehicle, the vehicle exterior inspection system and the vehicle undercarriage inspection system relative to one another. In some embodiments, the system components may be positioned as described with reference to FIGS. 3A-F, with a vehicle undercarriage inspection system positioned between support members of a vehicle exterior inspection system, in front of a vehicle. In some embodiments, vehicle exterior inspection systems may be configured as described with reference to FIGS. 17A-H, in combination with vehicle undercarriage inspection systems as described herein. In some embodiments, an inspector may perform step 611. In some embodiments step 611 may be performed automatically by components of the vehicle inspection system. In some embodiments step 611 may be performed in part by an inspector and in part by components of the vehicle inspection system.

Next, step 612 is performed by triggering the vehicle inspection system to collect alignment data of the vehicle relative to the vehicle inspection system. In some embodiments, the triggering is performed automatically by the vehicle inspection system. In some embodiments the triggering is performed automatically based on signals obtained from one or more sensors of a vehicle inspection system, such as TOF sensors, and/or cameras. In some embodiments, the triggering is performed when the vehicle is determined to be at one or more positions relative to the vehicle inspection system based on sensor data.

In some embodiments, the triggering is performed manually by an inspector by providing one or more inputs to a vehicle inspection system, such as through a user interface or other inputs as described herein.

In some embodiments, the alignment data includes data from one or more TOF sensors of the vehicle inspection system, as described herein. For example, the alignment data may include data collected by TOF sensors of a vehicle undercarriage imaging system as described with reference to FIGS. 7-9B. In some embodiments, the alignment data includes data from one or more cameras of the vehicle inspection system.

Next, step 613 is performed by obtaining an indication of an alignment of the vehicle relative to the vehicle inspection system based on the alignment data. In some embodiments, the indication of alignment may be determined by the vehicle inspection system. In some embodiments, the indication of alignment may be determined by an alignment verification module, such as modules 122, 932 and/or 2132. In some embodiments, the indication of alignment may be provided on a display of a vehicle inspection system, as described in herein.

Next, step 614 is performed by adjusting one or more of the exterior sensor arrays or the undercarriage sensor array, based on the indication of the alignment of the vehicle. In some embodiments, step 614 may be performed by an inspector or another individual. In some embodiments step 614 may be performed automatically by one or more components of a vehicle inspection system. In some embodiments step 614 may be performed in part by an inspector or other individual and in part automatically by one or more components of a vehicle inspection system. In some embodiments, the indication of alignment includes a direction for readjustment, and step 614 may be performed based on the direction for readjustment.

In some embodiments, steps 611-614 may be iterated until the vehicle is determined to be properly aligned.

Next, step 615 is performed by moving the vehicle and the vehicle inspection system relative to one another. In some embodiments, the vehicle may be driven past components of a vehicle inspection system, such as described with reference to FIGS. 3A-F. The vehicle may be driven by an inspector or by another individual. In some embodiments, one or more components of a vehicle inspection system may move relative to the vehicle. For example, a vehicle undercarriage inspection system may move beneath and/or around a vehicle, and/or a vehicle exterior inspection system may move relative to the vehicle such as described with reference to FIGS. 17C-H.

Next, step 616 is performed by capturing sensor data about the vehicle using the plurality of exterior sensor arrays and undercarriage sensor array of the vehicle inspection system.

Next step 617 is performed by processing the sensor data, using a computer hardware processor, to identify one or more vehicle defects. In some embodiments, the one or more defects include vehicle defects, as described herein. In some embodiments, step 617 may be performed by one or more components of a vehicle inspection system, for example data processing and analysis modules, such as 121, 931, and/or 2131, as described herein. In some embodiments, the sensor data may undergo formatting for processing, as described herein. For example, subsets of data may be selected for processing, such as described with reference to FIGS. 22A-E. Additionally, or alternatively, for example, a composite image may be generated for processing, using images and/or sensor data obtained from the undercarriage inspection system, such as described with reference to FIGS. 10-11G. In some embodiments, the processing may be performed using one or more trained machine learning models to identify vehicle defects, for example ML models such as those described herein with reference to FIGS. 5A-D, 13A-C, and/or 23A-E.

In some embodiments, the vehicle defects may be displayed and/or otherwise provided for a vehicle inspector for review. In some embodiments, the vehicle defects may be provided as a part of a vehicle condition report. In some embodiments, the vehicle defects may be formatted as likelihoods of the vehicle having the defects. In some embodiments, the vehicle defects may be formatted as probabilities of the vehicle having the defects. In some embodiments the vehicle defects may be confidence scores of the vehicle having the defects.

Following the conclusion of process 610, the inspector may proceed to conduct a further vehicle inspection. Accordingly, in some embodiments, the inspector may use the identified defects and/or targeted professional inspection instructions to determine particular techniques to use during the further vehicle inspection to check for the potential vehicle defects. Additionally, or alternatively, the targeted professional inspection instructions may alert the inspector of features indicative of the potential vehicle defects.

Additionally, or alternatively, the inspector may be a potential buyer who may use the defects to make more informed pricing offers or to check for themselves the presence of the potential vehicle defects. Additionally, or alternatively, the inspector may be a potential seller who may use the output to anticipate potential customer complaints. Additionally, or alternatively, the inspector may be the vehicle owner who may use the output to anticipate component failures and repairs.

Figure 6C:
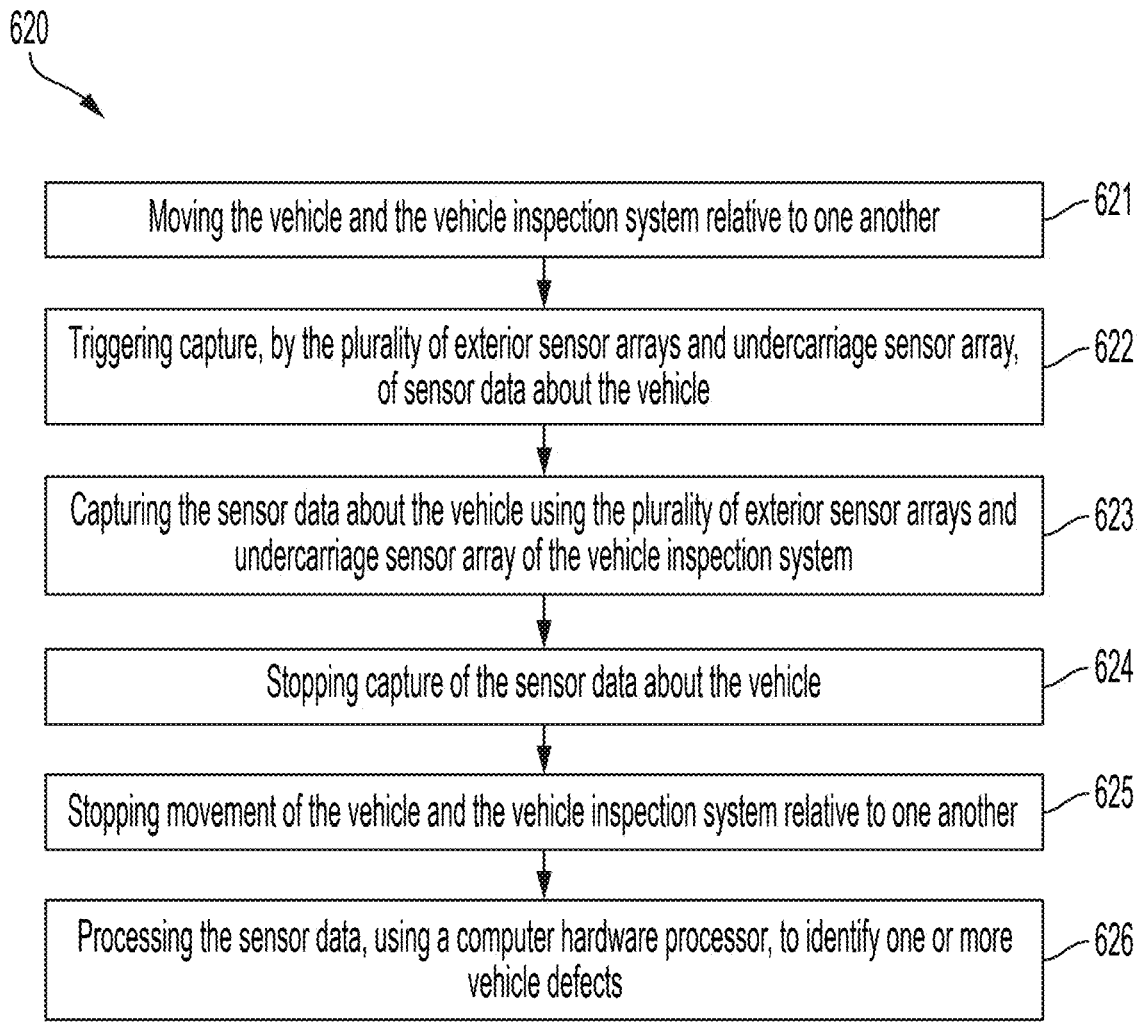
FIG. 6C is a flowchart of an illustrative process 620 for using a vehicle inspection system to determine one or more vehicle defects, according to some embodiments of the technology described herein.

FIG. 6C is a flowchart of an illustrative process 620 for using a vehicle inspection system to determine one or more vehicle defects, according to some embodiments. In some embodiments, the vehicle inspection system is configured such as those described herein with reference to FIGS. 1A-4B. In some embodiments, the vehicle inspection system used in performing process 610 includes a vehicle exterior inspection system with a support member and exterior sensor arrays coupled to the support member. The exterior sensor arrays having respective sets of sensors oriented in different directions. The vehicle inspection system may also include a vehicle undercarriage inspection system with an undercarriage sensor array including first, second and third cameras which capture images at different angles relative to the vehicle undercarriage, and a sensor configured to output data indicative of the position and/or motion of the vehicle relative to the vehicle inspection system. Some steps of process 620 may be performed by a vehicle inspector. Some steps of process 620 may be performed by one or more components of the vehicle inspection system.

Process 620 begins at step 621 by moving the vehicle and the vehicle inspection system relative to one another. In some embodiments, the vehicle may be driven past components of a vehicle inspection system, such as described with reference to FIGS. 3A-F. The vehicle may be driven by an inspector or by another individual. In some embodiments, one or more components of a vehicle inspection system may move relative to the vehicle. For example, a vehicle undercarriage inspection system may move beneath and/or around a vehicle, and/or a vehicle exterior inspection system may move relative to the vehicle such as described with reference to FIGS. 17C-H.

Next, step 621 is performed by triggering capture, by the plurality of exterior sensor arrays and undercarriage sensor array, of sensor data about the vehicle. In some embodiments, the triggering is performed automatically by the vehicle inspection system. In some embodiments the triggering is performed automatically based on signals obtained from one or more sensors of a vehicle inspection system, such as TOF sensors, and/or cameras. In some embodiments, the triggering is performed when the vehicle is determined to be at one or more positions relative to the vehicle inspection system based on sensor data. In some embodiments, different components may be triggered at different times, for example a vehicle exterior inspection system may be triggered to capture data when the vehicle is determined to be at a first position and the vehicle undercarriage inspection system is triggered to capture data when the vehicle is determined to be at a second position. In some embodiments individual sensors may be triggered at different times, for example sensors having different orientations may be triggered based on the position of the vehicle.

In some embodiments, the triggering is performed manually by an inspector by providing one or more inputs to a vehicle inspection system, such as through a user interface or other inputs as described herein.

Next, step 623 is performed by capturing the sensor data about the vehicle using the plurality of exterior sensor arrays and undercarriage sensor array of the vehicle inspection system.

Next, step 624 is performed by stopping capture of the sensor data about the vehicle. In some embodiments, the stopping is performed automatically by the vehicle inspection system. In some embodiments the stopping is performed automatically based on signals obtained from one or more sensors of a vehicle inspection system, such as TOF sensors, and/or cameras. In some embodiments, the stopping is performed when the vehicle is determined to be at one or more positions relative to the vehicle inspection system based on sensor data. In some embodiments, different components may be stopped at different times, for example a vehicle exterior inspection system may be stopped from capturing data when the vehicle is determined to be at a first position and the vehicle undercarriage inspection system may be stopped from capturing data when the vehicle is determined to be at a second position. In some embodiments individual sensors may be stopped at different times, for example sensors having different orientations may be stopped based on the position of the vehicle.

In some embodiments, the stopping is performed manually by an inspector by providing one or more inputs to a vehicle inspection system, such as through a user interface or other inputs as described herein.

Next, step 625 is performed by stopping movement of the vehicle and the vehicle inspection system relative to one another. In some embodiments, step 605 is performed by an inspector or other individual by stopping the vehicle. In some embodiments, step 605 is performed by an inspector by providing an input to the vehicle inspection system to stop moving. In some embodiments, step 605 is performed automatically by a vehicle inspection system.

Next, step 626 is performed by processing the sensor data, using a computer hardware processor, to identify one or more vehicle defects. In some embodiments, step 626 may be performed by one or more components of a vehicle inspection system, for example data processing and analysis modules, such as 121, 931, and/or 2131, as described herein. In some embodiments, the sensor data may undergo formatting for processing, as described herein. For example, subsets of data may be selected for processing, such as described with reference to FIGS. 22A-E. Additionally, or alternatively, for example, a composite image may be generated for processing, using images and/or sensor data obtained from the undercarriage inspection system, such as described with reference to FIGS. 10-11G. In some embodiments, the processing may be performed using one or more trained machine learning models to identify vehicle defects, for example ML models such as those described herein with reference to FIGS. 5A-D, 13A-C, and/or 23A-E.

In some embodiments, the vehicle defects may be displayed and/or otherwise provided for a vehicle inspector for review. In some embodiments, the vehicle defects may be provided as a part of a vehicle condition report. In some embodiments, the vehicle defects may be formatted as likelihoods of the vehicle having the defects. In some embodiments, the vehicle defects may be formatted as probabilities of the vehicle having the defects. In some embodiments the vehicle defects may be confidence scores of the vehicle having the defects.

Following the conclusion of process 620, the inspector may proceed to conduct a further vehicle inspection. Accordingly, in some embodiments, the inspector may use the identified defects and/or targeted professional inspection instructions to determine particular techniques to use during the further vehicle inspection to check for the potential vehicle defects. Additionally, or alternatively, the targeted professional inspection instructions may alert the inspector of features indicative of the potential vehicle defects.

Additionally, or alternatively, the inspector may be a potential buyer who may use the defects to make more informed pricing offers or to check for themselves the presence of the potential vehicle defects. Additionally, or alternatively, the inspector may be a potential seller who may use the output to anticipate potential customer complaints. Additionally, or alternatively, the inspector may be the vehicle owner who may use the output to anticipate component failures and repairs.

Figure 7:
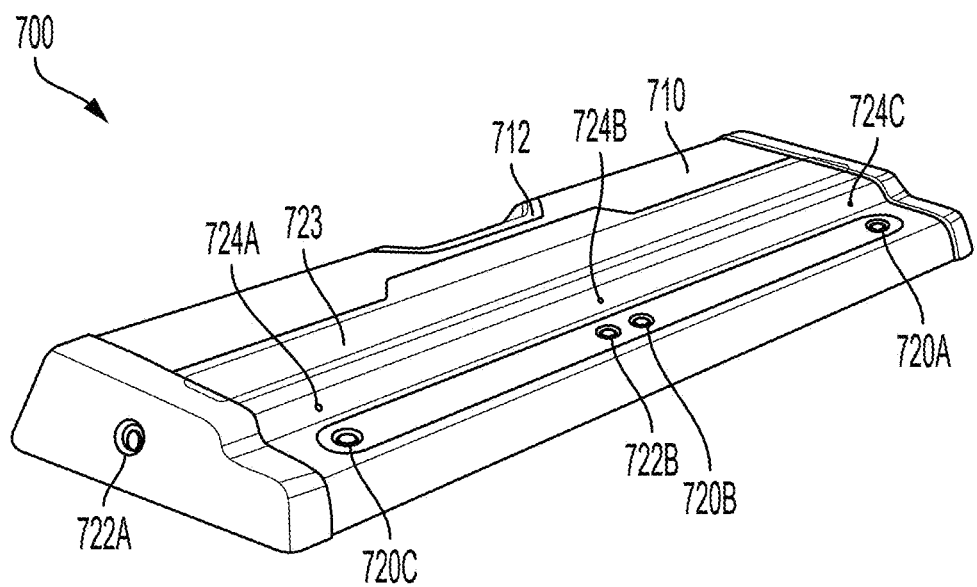
FIG. 7 is a view of an example vehicle undercarriage inspection system, according to some embodiments of the technology described herein.

FIG. 7 is a view of a vehicle undercarriage inspection system, according to some embodiments. The vehicle undercarriage inspection system 700 includes a base and multiple sensors for capturing data related to a vehicle undercarriage. In some embodiments, vehicle undercarriage inspection system 700 may be used as a part of a vehicle inspection system for example vehicle inspection system 110 as described with reference to FIG. 1A. In some embodiments, vehicle undercarriage inspection system 700 maybe used alone to capture data from the undercarriage of a vehicle.

Vehicle under system 700 includes cover 710. Cover 710 may be configured to allow the vehicle undercarriage inspection system 700 to be accidentally ran over by a car. For example, the materials, shape, and/or structure of the cover 710 may allow for the cover to withstand being run over by a car. In some embodiments, the cover 710 may be made from one or more materials, including PEEK, ABS, PC, PTFE, HDPE, and/or Nylon. In some embodiments, the cover 710 includes internal structures such as support members, trusses and/or ribs, which allow the cover to withstand forces from vehicles. In some embodiments, the cover 710 is shaped di dissipate forces from vehicles. In some embodiments, the cover 710 may withstand up to 5,000 lbs. of force, up to 10,000 lbs. of force, up to 15,000 lbs. of force, up to 16,000 lbs. of force, up to 20,000 lbs. of force, and/or up to 50,000 lbs. of force.

The cover includes handle 712. Handle 712 may be used for positioning and/or transporting vehicle undercarriage inspection system 700. In some embodiments, the vehicle undercarriage inspection system 700 may be transported between inspection locations, and/or repositioned during vehicle inspections. In some embodiments, the vehicle undercarriage inspection system 700 is light weight, allowing for easy transportation and/or positioning of the system. In some embodiments, the vehicle undercarriage inspection system may weigh less than 50 lbs., less than 40 lbs., less than 30 lbs., less than 20 lbs., less than 10 lbs., and/or less than 5 lbs.

The vehicle undercarriage inspection system 700 includes various sensors and features for collecting data related to a vehicle undercarriage. In some embodiments, the sensors and features of the vehicle undercarriage inspection system 700 may be configured as a sensor array, as described herein. The vehicle undercarriage inspection system 700 includes cameras 720A-C, TOF sensors 722A-B, microphones 724A-C, and light source 723. In some embodiments, the vehicle undercarriage inspection system 700 may contain additional sensors, for example additional cameras, TOF sensors, microphones. In some embodiments, the vehicle undercarriage inspection system may include an infrared camera, a thermal camera, a magnetometer, and/or an air quality sensor. In some embodiments, data collected by the sensors of the vehicle undercarriage inspection system 700 may be analyzed and/or used in generating a vehicle condition report, as described herein.

In some embodiments the sensors of the vehicle undercarriage inspection system 700 may be controlled to capture data from the undercarriage of a vehicle as the vehicle and undercarriage inspection system move relative to each other. In some embodiments, the vehicle may move relative to the vehicle undercarriage inspection system 700 (e.g., by driving over the vehicle undercarriage inspection system). In some embodiments, the vehicle undercarriage inspection system may move relative to the vehicle (e.g., moving underneath and/or around the vehicle on tracks or wheels).

The vehicle undercarriage inspection system 700 includes cameras 720A, 720B and 720C. The cameras may capture images of the vehicle undercarriage as the vehicle and vehicle undercarriage inspection system 700 move relative to each other. In some embodiments, the cameras may be oriented at different angles. In some embodiments, camera 720A may be oriented in part towards the right side of the vehicle undercarriage inspection system 700 in FIG. 7. In some embodiments, camera 720B may be oriented substantially vertically in FIG. 7. In some embodiments, camera 720C may be oriented in part towards the left side of the vehicle undercarriage inspection system 700. In some embodiments, the images captured by cameras 720A-C may be used in generating a composite image of the undercarriage of the vehicle, as described herein.

Cameras of vehicle undercarriage imaging systems, as described herein, may be configured with specific attributes. For example, cameras may have a horizontal FOV (along the width of the vehicle) of 150-250 cm at 20 cm of clearance, a resolution of 8-12 pixels/cm at 20 cm of clearance, a sampling rate of 50-75 Hz, and/or a shutter speed of 200-500 us. In some embodiments, camera parameters are selected to minimize motion blur, for example to have a maximum blur at specified vehicle speeds, such as a maximum blur of 4 pixels at 6 miles per hour.

The vehicle undercarriage inspection system 700 includes time of flight sensors 722A and 722B. In some embodiments, the vehicle undercarriage inspection system 700 may additionally include a third time of flight sensor opposite time of flight sensor 722A, on the right side of the vehicle undercarriage inspection system 700 in FIG. 7. In some embodiments, the time of flight sensors may be configured to detect signals related to the position, and/or motion of the vehicle. For example, the time of flight sensors may detect signals indicative of the distance between the time of flight centers and one or more parts of the vehicle. Time of flight sensor 722A may be configured to determine the distance between the vehicle inspection system 701 or more wheels of the vehicle. In some embodiments, time of flight sensor 722 a may be used to determine the alignment of the vehicle relative to the vehicle undercarriage inspection system 700. Time of flight sensor 722 B may be configured to determine the distance between the undercarriage of the vehicle and the vehicle undercarriage inspection system 700. In some embodiments, data from time of flight sensor 722B may be used in generating a composite image of the vehicle undercarriage, as described herein.

In embodiments, data from time of flight sensors of the vehicle undercarriage inspection system may be used to trigger one or more sensors of the vehicle undercarriage inspection system to start and/or stop capturing of data. In some embodiments, data from time of flight sensors may be used to start and or stop capturing of data by one or more sensors of a vehicle inspection system. In some embodiments, data from time of flight sensors may be used to determine when the vehicle is at one or more positions relative to the vehicle undercarriage inspection system and/or a vehicle inspection system, and in response to determining the vehicle is at the one or more positions, trigger one or more sensors to start and/or stop capturing data.

Vehicle undercarriage inspection system 700 additionally includes microphones 724A, 724B and 724C. The microphones may be configured to record audio from the undercarriage of the vehicle. As shown in FIG. 7, the microphones are distributed along a width of the vehicle undercarriage inspection system 700. Accordingly, the microphones may capture audio from different portions of the undercarriage of the vehicle. For example microphone 724A may capture audio from parts of the vehicle passing over the left portion of the vehicle undercarriage inspection system 700 in FIG. 7, microphone 724 B may capture audio from parts of the vehicle passing over the center of the vehicle undercarriage inspection system 700 in FIG. 7, and microphone 724 C may capture audio from parts of the vehicle passing over the right portion of the vehicle undercarriage inspection system 700 in FIG. 7.

The vehicle undercarriage inspection system 700 additionally includes light source 723. Light source 723 may be configured to illuminate the undercarriage of the vehicle during a vehicle inspection, such that the cameras 720A, 720B and 720 C may capture images of the undercarriage of the vehicle. In some embodiments, the light source 723 include multiple individual light sources. For example, light source 723 may include multiple LED's. In some embodiments, individual light sources of light source 723 may be angled in different directions to illuminate different portions of the undercarriage of the vehicle. For example, one or more individual light sources of light source 723 may be angled towards the right side of vehicle undercarriage inspection system 700, one or more individual light sources of light source 723 may be angled towards the left side of the vehicle undercarriage inspection system 700, one or more individual light sources of light source 723 maybe angled towards the front of vehicle undercarriage inspection system 700, and one or more individual light sources of light source 723 may be angled towards the rear of the vehicle undercarriage inspection system 700. In some embodiments, light source 723 may be controlled based on the position of the vehicle relative to the vehicle undercarriage inspection system 700, as described herein.

In some embodiments, the parameters of light sources of vehicle undercarriage imaging systems may be selected to improve imaging quality. For example, constant current LEDs may be used to eliminate flicker.

In some embodiments, vehicle undercarriage inspection system 700 may comprise one or more processors for controlling sensors, and/or analyzing data recorded by sensors, as described herein. In some embodiments, vehicle undercarriage inspection system 700 may provide data recorded by sensors to a processor separate from vehicle undercarriage inspection system 700 to analyze the data, as described herein. In some embodiments, vehicle undercarriage inspection system 700 may receive data, such as control data, from a processor separate from vehicle undercarriage inspection system 700, as described herein.

In some embodiments, vehicle undercarriage inspection system 700 may include one or more features for facilitating movement and/or placement. For example vehicle undercarriage inspection system may include one or more of wheels, adjustable feet, and/or pads.

Figure 8A:
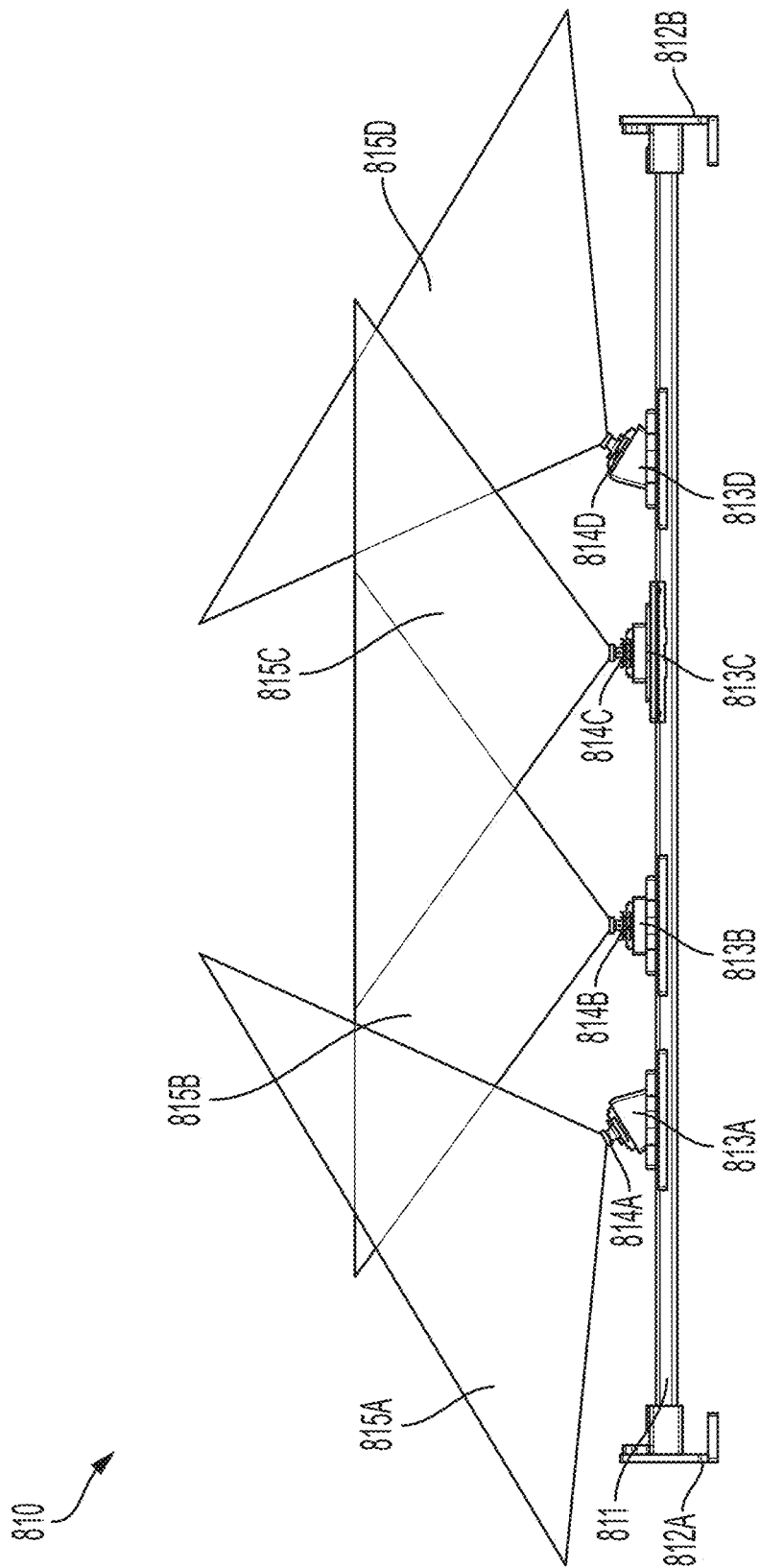
FIG. 8A illustrates an example set of cameras part of a vehicle undercarriage inspection system, according to some embodiments of the technology described herein.

FIG. 8A illustrates an example camera set of a vehicle undercarriage inspection system, according to some embodiments. In some embodiments, the camera set may be included in a vehicle undercarriage inspection system such as 700 of FIG. 7. In some embodiments, the camera set may be a part of a vehicle inspection system, as described herein. The camera set 810 includes four cameras 814A-D and associated components for positioning the cameras within a vehicle undercarriage inspection system.

The cameras 814A-D may be positioned within a vehicle undercarriage inspection system using components shown in FIG. 8A. These components include support member 811, camera mounting brackets 813A-D, and mounting brackets 812A-B. In some embodiments, cameras of a vehicle undercarriage inspection system may be positioned within the vehicle undercarriage inspection system using different components than those shown in FIG. 8A.

The support member 811 allows for mounting of cameras 814A-C with respective camera mounting brackets 813A-C. In some embodiments, the camera mounting brackets may be secured to the support member using fasteners, a friction fit, and/or alignment of features between the mounting brackets and the support member. In some embodiments, the support member 811 may comprise one or more features which facilitate the mounting of the camera mounting brackets, such as holes and/or rails.

The support member 811 may be secured within a vehicle undercarriage inspection system using mounting brackets 812A and 812B. The mounting brackets 812A and 812B may support the support member 811 at the ends of the support member. In some embodiments, the mounting brackets secure the support member to the base of a vehicle undercarriage inspection system.

The cameras 814A-D are mounted to the support member by respective camera mounting brackets 813A-D. In some embodiments, the cameras may be secured to the camera mounting brackets via fasteners, adhesives, and/or other suitable mounting techniques. Some of the camera mounting brackets may be angled such that the cameras mounted to them are oriented at an angle. For example, camera mounting bracket 813A is angled such that camera 814A is angled to the left side of FIG. 8A, and camera mounting bracket 813D is angled such that camera 814D is angled towards the right side of FIG. 8A. Camera mounting brackets 813B and 813C are not angled and the respective cameras 814B and 814C are therefore oriented towards the top of FIG. 8A. In some embodiments, additional cameras may be oriented at different angles, for example three of the cameras may be oriented at different angles, or all of the cameras may be oriented at different angles. In some embodiments, fewer cameras may be oriented at different angles, on camera or none of the cameras may be oriented at different angles.

The different orientations of the cameras allow for the camera set 810 to capture images of the undercarriage of a vehicle at different angles. This may allow for capturing of images of a greater amount of a vehicle undercarriage than in vehicle undercarriage inspection systems with cameras which are not angled. The different angles of the cameras, and/or number of cameras in the set may allow for cameras to "look around" components of the vehicle undercarriage. For example, if a camera of the camera set is obscured by a low hanging part of the vehicle undercarriage, images of the undercarriage may be captured by the other cameras of the camera set.

The different orientations of the cameras 814A-D are represented by the respective camera fields of view (FOVs) 815A-D. The FOVs represent the area in which cameras may capture images of the vehicle undercarriage. As shown, the FOVs 815A and 815D, respectively, of cameras 814A and 814D are angled towards the left side of FIG. 8A and the right side of FIG. 8A, respectively. This is due to the orienting of cameras 814A and 814D by the respective camera mounting brackets 813A and D, as described herein. As shown, the FOVs of the cameras overlap in some areas, and therefore images components of the vehicle undercarriage may be captured by multiple cameras.

Figure 8B:
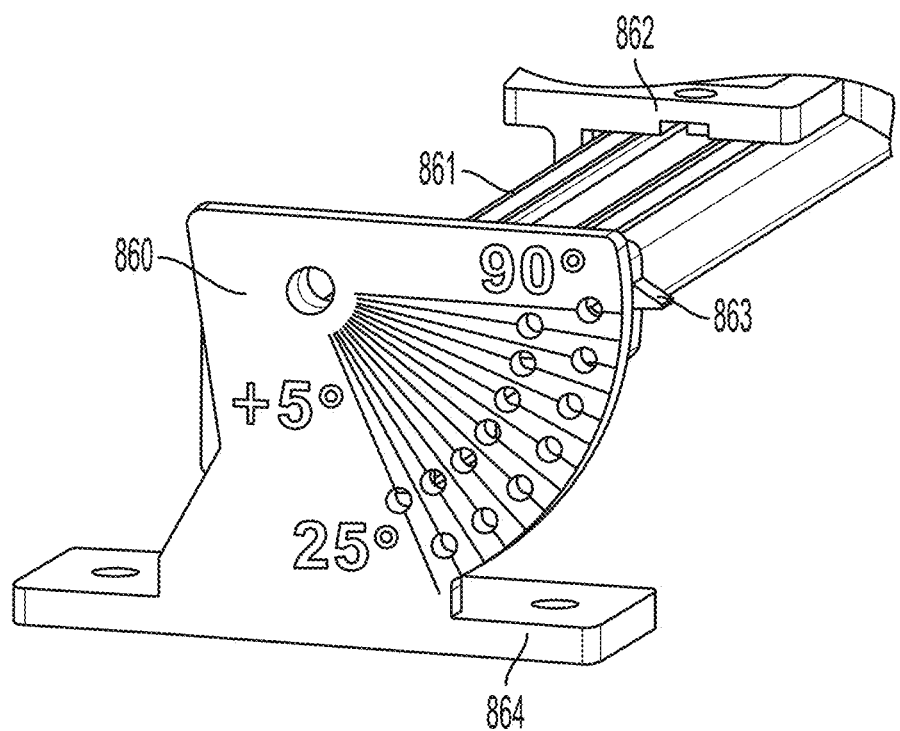
FIG. 8B is a view of an example mounting bracket of a vehicle undercarriage inspection system, according to some embodiments of the technology described herein.

FIG. 8B is a view of an example mounting bracket of a vehicle undercarriage inspection system, according to some embodiments. The mounting bracket 860 of FIG. 8B may be used in a vehicle undercarriage inspection system as described herein, for example as described with reference to FIG. 8A. The mounting bracket 860, supports support member 861. Support member 861 may support one or more cameras, as described herein. Cameras may be mounted to support member 861 using camera mounting brackets, as described herein, such as camera mounting bracket 865.

Mounting bracket 860 may allow for the support member 861 to be positioned at different angles. As shown in FIG. 8B, the angle of the support member 861 can be adjusted between an angle of 250 and 900 relative to a vertical direction in FIG. 8B. The angle may be adjusted using angle adjustment mechanism 863, which may interact with holes in a side of the mounting bracket. The mounting bracket 860 additionally includes bottom portion for securing to a base or other component of a vehicle undercarriage inspection system.

Figure 8C:
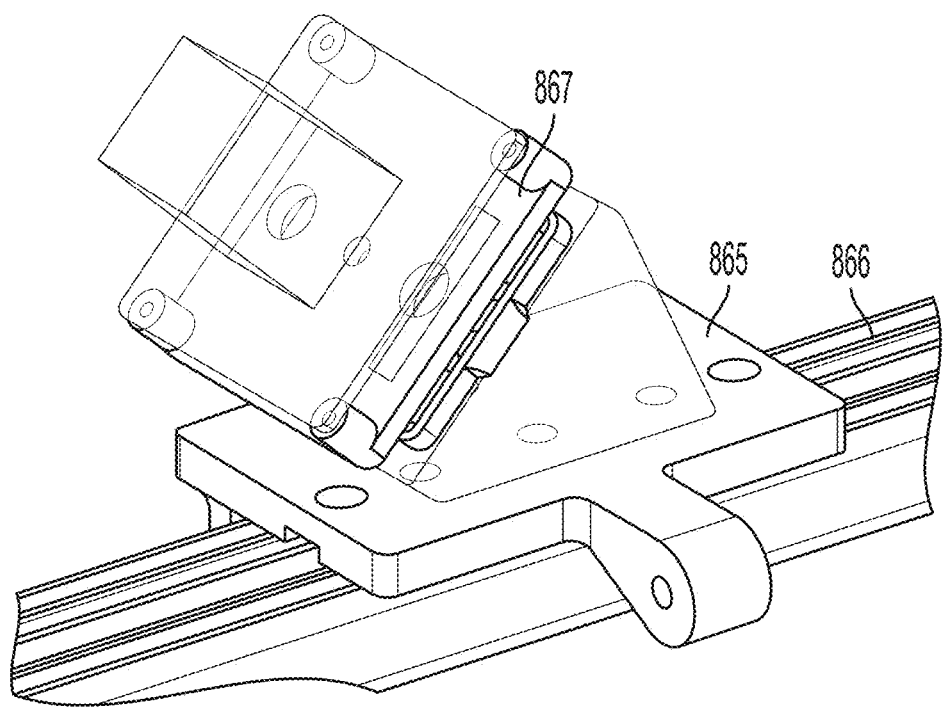
FIG. 8C illustrates an example camera mounting bracket, according to some embodiments of the technology described herein.

FIG. 8C illustrates an example camera mounting bracket, according to some embodiments. The camera mounting bracket 865 is coupled to a support member 866. The camera mounting bracket 865 maybe coupled to the support member via the holes in the camera mounting bracket 865 and the rail of the support member 866. A camera maybe mounted to camera mounting bracket 865 directly or indirectly. As shown, a camera is indirectly mounted to mounting bracket 865 via camera mounting plate 867. In some embodiments, a camera may be mounted to a camera mounting plate using fasteners and/or adhesives as described herein. In some embodiments, a camera mounting plate may be mounted to a camera mounting bracket through fasteners and/or adhesives.

Figure 8D:
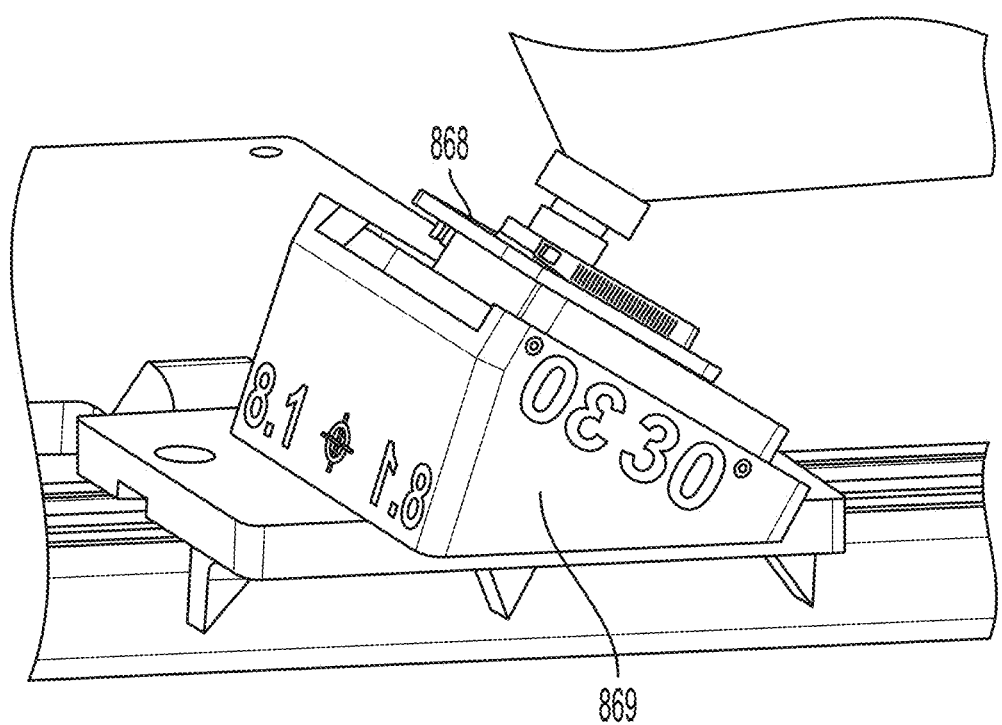
FIG. 8D illustrates a camera indirectly mounted to a camera mounting bracket via an angled wedge, according to some embodiments of the technology described herein.

FIG. 8D illustrates a camera indirectly mounted to a camera mounting bracket via an angled wedge, according to some embodiments. As shown, camera 868 is mounted to a camera mounting plate which in turn is mounted via angled wedge 869 to a camera mounting bracket. The angled wedge may allow for the camera to be oriented in different angles, as described herein. As shown, the angled wedge orients the camera at a 30° angle relative to the support member in FIG. 8D, an angled wedge may have any suitable angle for orienting cameras for capturing images of vehicle undercarriages. For example, an angled wedge may have any angle between 5° and 90°.

Figure 8E:
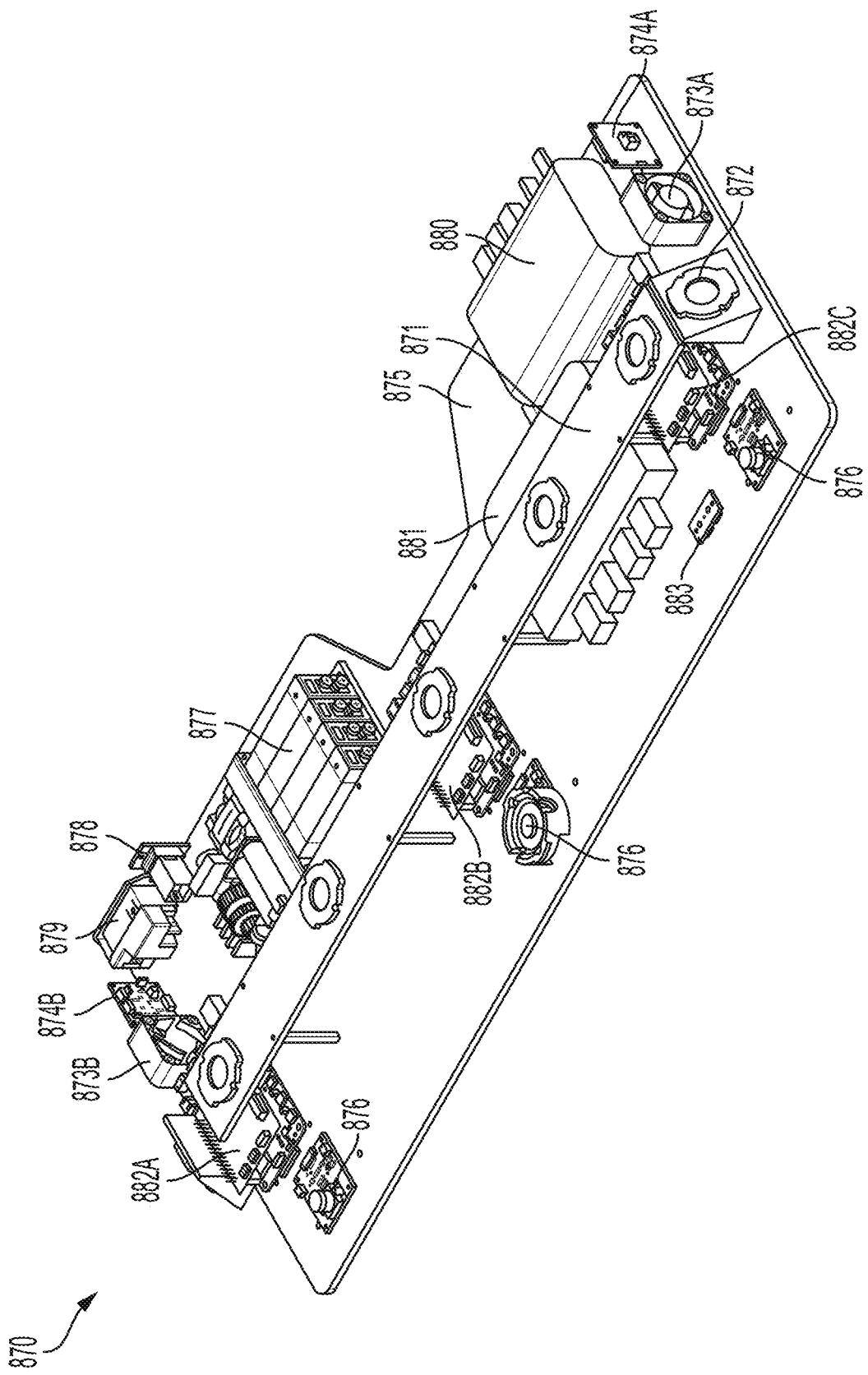
FIG. 8E illustrates example internal components of a vehicle undercarriage inspection system, according to some embodiments of the technology described herein.

FIG. 8E illustrates example internal components of a vehicle undercarriage inspection system, according to some embodiments. The vehicle undercarriage inspection system 870 of FIG. 8E is an example vehicle undercarriage inspection system and other systems may have the same, similar, or different components and/or arrangements.

Vehicle undercarriage inspection system 870 includes base 875 which components may be mounted to. The components may be mounted to base 875 via any suitable method, for example adhesives and/or fasteners.

Vehicle undercarriage inspection system 870 includes light support member, which provides support for light sources 872. As shown there are 7 light sources, however the vehicle undercarriage inspection system may include greater or fewer light sources. As shown, two of the light sources are angled towards the sides of the base 875. These light sources may allow different portions of the vehicle undercarriage to be illuminated, which cannot be without such angling. As shown, the light support member 871 is mounted to the base with standoffs, however other mounting techniques may be used.

The vehicle undercarriage inspection system 870 additionally includes fans 873A and 873B which may be used to manage the temperature of the components of the vehicle undercarriage inspection system.

The vehicle undercarriage inspection system 870 additionally includes TOF sensors 874A and 874B, which are oriented towards the ends of the vehicle undercarriage inspection system. TOF sensors may capture data related to the position and/or motion of the vehicle. In some embodiments, TOF sensors 874A and B may capture data related to the wheels of the vehicle. In some embodiments, data captured by the TOF sensors 874A-B may be used to determine an alignment of the vehicle relative to the vehicle undercarriage inspection system and/or a vehicle inspection system, as described herein. In some embodiments, data from the TOF sensors 874A-B may be used to trigger starting and/or stopping of data collection by sensors of the vehicle undercarriage inspection system and/or a vehicle inspection system.

Vehicle undercarriage inspection system 870 additionally includes cameras 876, which may capture images of the vehicle undercarriage, as described herein. In some embodiments, the cameras 876 may include greater or fewer cameras, as described herein. In some embodiments, the cameras 876 may be oriented at different angles, as described herein. In some embodiments, the cameras may include a lens cover and/or filter, as shown on the central camera in FIG. 8E. In some embodiments, the cameras may include microphones.

The vehicle inspection system additionally includes air quality sensor 883, which may capture data related to the air quality at the undercarriage of the vehicle. This data may be used to determine vehicle defects such as exhaust and/or fluid leaks. In some embodiments, air quality sensor 883 is configured as a Volatile Organic Compound (VOC) sensor. In some embodiments, air quality sensor 883 may be configured to detect levels of $CO_2$, CO, nitrogen oxides $NO_x$, and/or $SO_2$.

The vehicle undercarriage inspection system additionally includes power supply 877. Power supply 877 may be a battery or other suitable power supply. In some embodiments the power supply may be charged via a power source plugged into power assembly 879. Power assembly additional includes a power switch for powering on and off the vehicle undercarriage inspection system 870.

The vehicle undercarriage inspection system 870 additionally includes signal port 878 which may connect (e.g., via a cable) to a computer and/or a communication network. The signal port may connect to network switch 881. In some embodiments the network switch 881 is configured as an Ethernet switch. In some embodiments, vehicle undercarriage inspection system 870 may connect to a computer and/or network through a wireless connection. In some embodiments, the vehicle undercarriage inspection system 870 may connect via wireless connections using router 880.

The components of the vehicle undercarriage inspection system 870 may be controlled (e.g., turned on, turned off, triggered to begin and/or stop recording of data, etc.) by the processors 882A-C. In some embodiments, the vehicle undercarriage inspection system may perform analyses of data captured by the sensors of the vehicle undercarriage inspection system and/or a vehicle inspection system, using processors 882A-C. In some embodiments, the vehicle undercarriage inspection system may include a greater or lesser number of processors. Example functions of processors of a vehicle undercarriage inspection system are discussed with regard to FIGS. 9A-B.

Figure 9A:
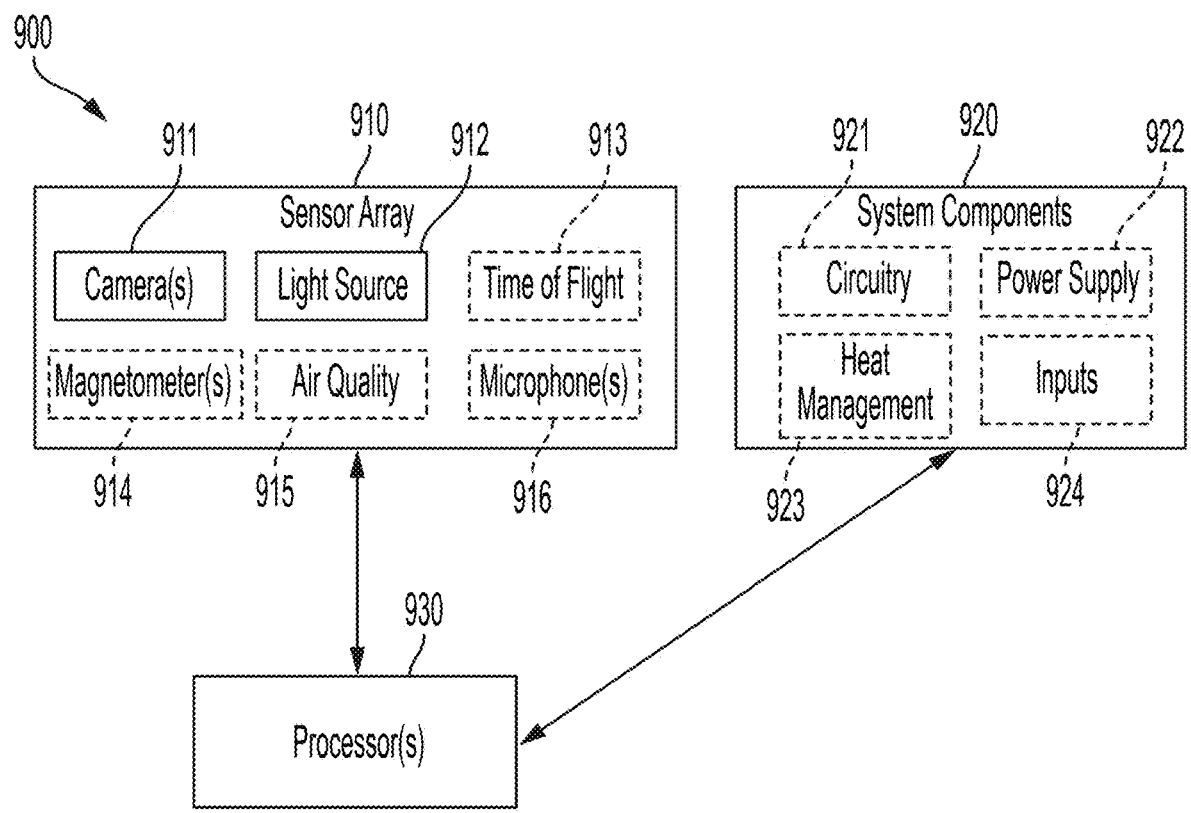
FIG. 9A is a diagram illustrating the components of a vehicle undercarriage inspection system, according to some embodiments of the technology described herein.

FIG. 9A is a diagram illustrating the components of a vehicle undercarriage inspection system, according to some embodiments. Vehicle undercarriage inspection system 900 includes a sensor array 910, system components 920, and processor(s) 930. The vehicle undercarriage system 900 is an example vehicle undercarriage inspection system and may be configured as described herein, for example, as described with reference to FIGS. 7-8E. In some embodiments, the sensor array 910, system components 920 and processors 930 may be implemented in a single device and/or location. In some embodiments, the sensor array 910, system components 920 and processors 930 may be implemented in separate devices and/or locations. In some embodiments, the sensor array 910, system components 920, and processors 930 may be implemented in part in a single device and/or location and in part in separate and/or remote devices and/or locations.

Sensor array 910 includes multiple sensors which may be included in vehicle undercarriage inspection system 900. These sensors include cameras 911, TOF sensors 913, magnetometers 914, air quality sensors 915 and microphones 916. In some embodiments, sensor array 910 may include additional sensors, as described herein. In some examples, a sensor array may include fewer sensors than those shown in sensor array 910. The sensor array additionally includes components which may facilitate the recording of data from the undercarriage of the vehicle, for example, light source 912.

Cameras 911 may capture images of the undercarriage of a vehicle. The images may be captured as the vehicle and vehicle undercarriage inspection system move relative to one another. In some embodiments, the cameras 911 may be configured as a camera set, as described herein. In some embodiments the cameras 911 may include different types of cameras, for example, optical cameras, thermal cameras, and/or IR cameras. In some embodiments, the cameras may be oriented at different angles, as described herein. In some embodiments, the images captured by cameras 911 may be used to generate a composite image of the vehicle undercarriage, as described herein. In some embodiments, the images captured by the cameras 911 may be analyzed to determine one or vehicle characteristics and/or defects, as described herein.

Light source 912 may be used to illuminate the vehicle undercarriage to facilitate capturing of images of the undercarriage. In some embodiments, the light source 912 may include one or more individual light sources which supply light to the vehicle undercarriage, as described herein. In some embodiments, the individual light sources of light source 912 may be oriented at different angles, as described herein.

TOF sensors 913 may capture data indicative of the position and/or motion of the vehicle relative to the vehicle undercarriage inspection system 900. In some embodiments, the TOF sensors 913 may capture data indicative of the position and/or motion of the vehicle relative to a vehicle inspection system, as described herein. In some examples, the TOF sensors 913 may include multiple TOF sensors. In some embodiments, the TOF sensors 913 may be oriented in different directions. In some embodiments the TOF sensors 913 may be oriented in different directions, for example towards different ends of a vehicle undercarriage inspection system, and/or substantially vertically towards a vehicle undercarriage, as described herein. In some embodiments, data collected by TOF sensors 913 may be used in determining vehicle alignment with the vehicle undercarriage inspection system. For example, a vehicle undercarriage inspection system may use TOF sensors oriented towards ends of the vehicle undercarriage inspection system to determine alignment. In some embodiments, the data collected by TOF sensors 913 may be used in controlling one or more components of the vehicle undercarriage inspection system 900 and/or a vehicle inspection system.

Magnetometers 914 may capture magnetic field signals from a vehicle undercarriage. In some embodiments, the magnetic field signals are used to determine characteristics and/or defects of a vehicle, for example, a vehicle trim, drivetrain, make, model, presence of a catalytic converter, alternator performance, battery type, battery performance, and/or drivetrain performance, among other defects and/or characteristics as described herein. Techniques for analyzing vehicles using magnetometers are discussed in U.S. patent application Ser. No. 18/483,935, entitled: "Machine Learning and Magnetic Field Sensing Techniques for Vehicle Inspection and Condition Analysis," filed Oct. 10, 2023, which is incorporated by reference herein in its entirety.

Air quality sensors 915 may record air quality data of the vehicle undercarriage. In some embodiments, the air quality sensors are VOC sensors. In some examples, data recorded by the air quality sensors 915 may be used to determine one or more defects such as fluid leaks, exhaust performance, and/or exhaust leaks.

Microphones 916 may be used to record audio data from the undercarriage of a vehicle. The audio data may be used in determining one or more defects and/or characteristics of a vehicle, for example exhaust leaks, engine knocking, engine defects, and/or transmission whine, among other defects and/or characteristics, as described herein.

Vehicle undercarriage inspection system additionally includes system components 920. In some embodiments, the vehicle undercarriage inspection system may include greater or fewer components than those included in system components 920.

System components 920 include circuitry 921, power supply 922, heat management 923 and inputs 924. In some embodiments, the system components may include greater or fewer components than those shown.

Circuitry 921 may include circuit boards, wiring, and/or other electrical components for interconnecting components of the vehicle undercarriage inspection system, including components of the sensor array 910 and system components 920.

Power supply 922 may provide power to components of the vehicle undercarriage inspection system, including components of the sensor array 910 and system components 920. Power supply 922 may be configured as a battery and/or any suitable power supply.

Heat management components 923 may function to reduce the temperature of the vehicle undercarriage inspection system. In some embodiments, the heat management components 923 may be active and/or passive components. In some embodiments, the heat management components may include fans and/or heat sinks.

Inputs 924 may allow for signals and/or other inputs to be provided to the vehicle undercarriage inspection system. In some embodiments, the inputs 924 may include on or more electrical ports and/or connectors, buttons, switches, antennas, routers, and/or other components, as described herein.

Sensor array 910 and system components may send data to and/or receive data from processors 930. For example data from sensors of the sensor array and components of system components 920 may be provided to processors 930, and processors 930 may provide control signals to the sensor arrays and/or system components 920.

Figure 9B:
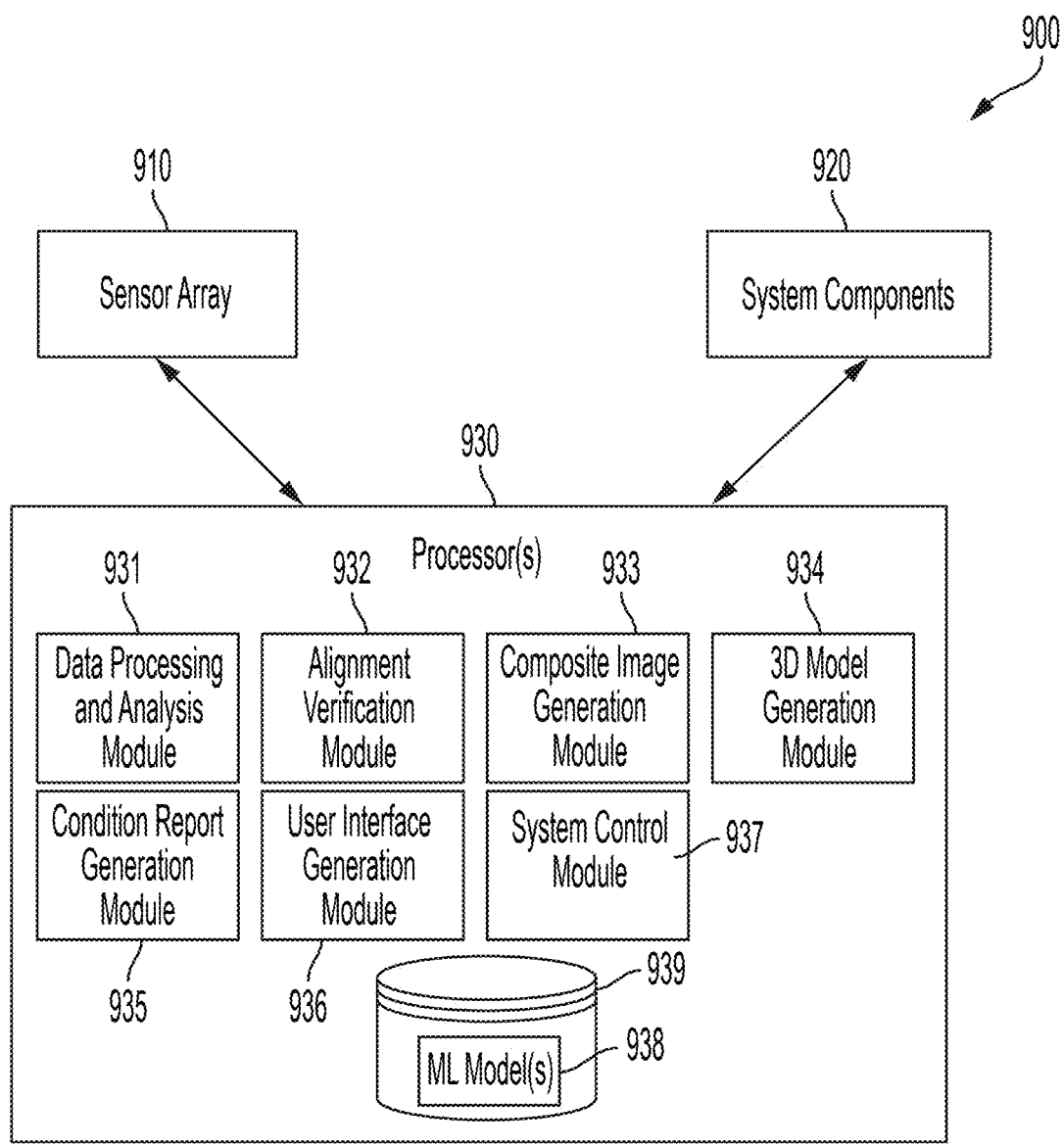
FIG. 9B is a diagram illustrating components of a vehicle undercarriage inspection system, according to some embodiments of the technology described herein.

FIG. 9B is a diagram illustrating the components of processor(s) of a vehicle undercarriage inspection system, according to some embodiments. In FIG. 9B, vehicle undercarriage inspection system 900 includes sensor array 910, system components 920, and processor(s) 930. As described herein, in some embodiments, the processors 930 may be implemented as a part of the components of the vehicle undercarriage inspection system 900. In some embodiments, the processor(s) 930 may be implemented separate from the vehicle undercarriage inspection system 900, for example as a device connected to the vehicle undercarriage inspection system 900 at the location of the vehicle inspection system and/or in a remote location. In some embodiments, the processors 930 may be implemented in part separately from and in part as a portion of the vehicle undercarriage inspection system 900.

The processor(s) 930 include data processing and analysis modules 931, alignment verification modules 932, composite image generation module 933, 3D model generation module 934, condition report generation module 935, user interface generation module 936, system control module 937, and database 939 storing machine learning models 938.

The data processing and analysis and modules 931 may perform one or more operations on data received from the sensor array 910. In some embodiments, the processing and analysis modules 931 may filter data, structure data and/or preprocess data for additional processing and analysis. In some embodiments, the data processing and analysis modules 931 may determine one or more vehicle characteristics from the data received from the sensor array 910. In some embodiments, the data processing and analysis modules 931 may use one or more machine learning models, such as ML models 938 to determine the one or more vehicle characteristics. In some embodiments, the data processing and analysis modules 931 may determine one or more vehicle defects from the data received from sensor array 910. In some embodiments, the data processing and analysis modules may determine the one or more defects using one or more ML models, such as ML models 938.

The alignment verification module 932 may determine whether the vehicle is properly aligned with the vehicle undercarriage inspection system for an inspection. In some embodiments, the alignment verification module may determine whether the vehicle is aligned with a vehicle inspection system. In some embodiments, the alignment verification module may analyze data received from one or more sensors of the vehicle inspection system, for example cameras and/or TOF sensors. In some embodiments, the alignment verification module determines the alignment of the vehicle using TOF sensors. In some embodiments, the alignment may be determined based on one or more TOF sensors facing a vehicle, and comparing a detected position of the vehicle to a desired position. In some embodiments, the alignment may be determined based on data from TOF sensors facing different ends of the vehicle undercarriage inspection system. In some embodiments, the alignment verification may determine a difference between the position of the vehicle at the different ends of the vehicle undercarriage inspection system, and determine whether the difference is greater than a threshold alignment difference. In some embodiments, the alignment verification module 932 may determine an alignment of the vehicle and provide an indication of the alignment of the vehicle to one or more components of the vehicle inspection system, such as a mobile device or other component with a display. In some embodiments, the alignment of the vehicle may be a binary value, for example, aligned or not aligned. In some embodiments, when the alignment verification module 932 determines the vehicle is not aligned with the vehicle inspection system, the alignment verification module may provide an indication of an adjustment to be made to the vehicle, for example move vehicle left.

The composite image generation module 933 may generate a composite image of the undercarriage of the vehicle based on data obtained from the sensor array. In some embodiments, the composite image may be generated using images obtained from the cameras of the sensor array. In some embodiments, the composite image may be generated based on data obtained from a TOF sensor. Examples of composite image generation are described with reference to FIGS. 10-11G.

In some embodiments, the 3D model generation module 934 may generate a 3D model of a vehicle based on data received from the sensor array. In some embodiments, the 3D model may be generated using one or more ML models, such as ML models 938. In some embodiments, the 3D model is generated using photogrammetry. In some embodiments, the 3D model is generated using neural radiance fields. In some embodiments, the 3D model is generated using Gaussian splatting.

The vehicle condition report generation module 935 may generate a vehicle condition report based on data received the sensor array. In some embodiments, the vehicle condition report generation module 935 may generate a vehicle condition report based on one or more characteristics and/or defects of the vehicle determined using the data processing and analysis modules 931. In some embodiments, the condition report generation module 935 may generate a vehicle condition report that includes data related to a vehicle, for example images of the vehicle, and/or audio recordings of the vehicle. In some embodiments, a vehicle condition report may include a composite image of the vehicle undercarriage. In some embodiments, the condition report generation module may include a 3D model of the vehicle in a vehicle condition report. In some embodiments, the condition report generation module may generate a vehicle condition report using data obtained from a user interface of the vehicle undercarriage inspection system.

User interface generation module 936 may provide a user interface of the vehicle undercarriage inspection system on one or more displays connected to the vehicle undercarriage inspection system. In some embodiments the user interface generation module 936 may provide a user interface on a mobile device connected to the vehicle undercarriage inspection system, a computer connected to one or more components of the vehicle undercarriage inspection system, and/or a device remote from the vehicle undercarriage inspection system. In some embodiments, the user interface generation module 936 may generate a user interface which displays information related to a vehicle, for example, alignment data, a 3D model of a vehicle, and/or a vehicle condition report. In some embodiments, the user interface generation module 936 may provide vehicle data to a user responsive to a request for additional data, for example, the module 936 may provide additional images of a region of the vehicle responsive to a request for images of the region.

The system control module 927 may generate and provide control signals to the components of vehicle undercarriage inspection system 900. In some embodiments, the control signals may include signals to trigger the starting and/or stopping of recording data by sensors of the sensor array 910. In some embodiment, the control signals may be generated based on data obtained from the sensor array, for example data indicative of the position and/or motion of the vehicle. In some embodiments, the system control module 937 may generate control signals based on inputs received from a user of the vehicle undercarriage inspection system 900.

Databases 939 store ML models 938. In some embodiments, the databases 939 are implemented as a part of one or more components of the vehicle undercarriage inspection system 900, for example as physical storage. In some embodiments, the databases 939 are accessible by components of the vehicle inspection system, for example as cloud storage.

ML models 938 may be used by modules of the vehicle undercarriage inspection system to analyze data and/or process obtained from the sensor array 910. In some embodiments, the ML models 938 may be used in determining one or more vehicle defects and/or characteristics. Machine learning models for determining vehicle characteristics and/or defects are describe in U.S. Pat. No. 11,631,289, entitled "Vehicle Audio Capture and Diagnostics," filed Jan. 22, 2020, U.S. Pat. No. 10,893,213, entitled "Vehicle Undercarriage Imaging System," filed Apr. 2, 2019, U.S. patent application Ser. No. 18/778,247, entitled "Methods and Systems for Identifying Potential Vehicle Defects," filed Jul. 19, 2024, and U.S. patent application Ser. No. 18/483,935, entitled: "Machine Learning and Magnetic Field Sensing Techniques for Vehicle Inspection and Condition Analysis," filed Oct. 10, 2023, each of which is incorporated by reference herein in its entirety. In some embodiments, the ML models may be used by the alignment verification modules 932, composite image generation module 933, 3D model generation modules 934, and/or condition report generation modules 935.

Figure 10:
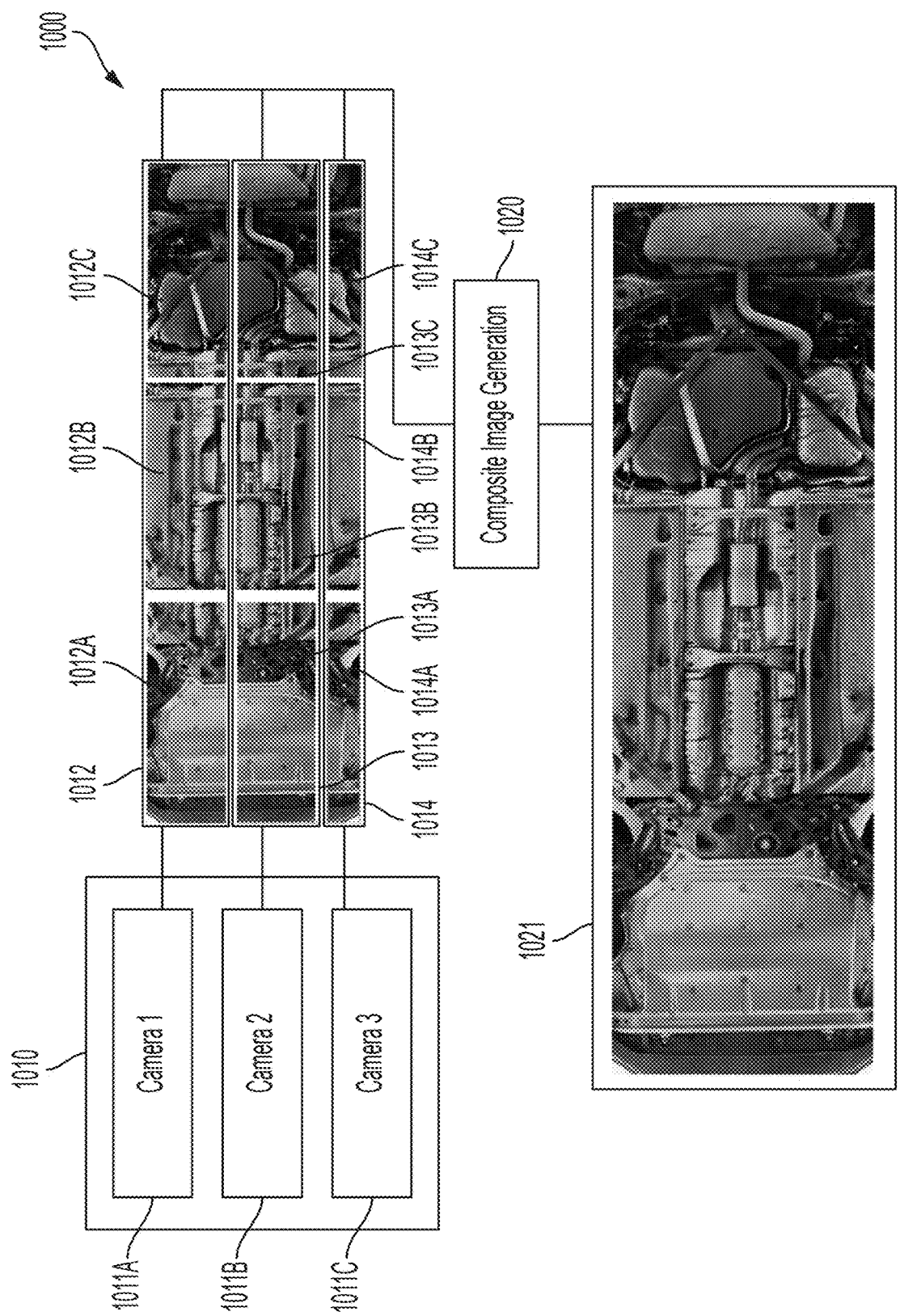
FIG. 10 illustrates an example process 1000 for generating a composite image of a vehicle undercarriage, according to some embodiments of the technology described herein.

FIG. 10 illustrates an example process 1000 for generating a composite image of a vehicle undercarriage, according to some embodiments. In the example of FIG. 10, a composite image is generated from images received from cameras 1011A, 1011B and 1011C of a sensor array 1010 of an example vehicle undercarriage inspection system. The process of FIG. 10 may be used to generate a composite image from images captured from cameras of vehicle undercarriage inspection systems, as described herein.

Each camera captures multiple images of the vehicle undercarriage. Camera 1011A captures image set 1012, including images 1012A-C. Camera 1011B captures image set 1013, including images 1013A-C. Camera 1011C captures image set 1014, including images 1014A-C. The image sets 1012, 1013 and 1014 may include consecutive images captured as the vehicle and vehicle undercarriage inspection system move relative to one another.

The images captured by the cameras 1011A-C may be sent to composite image generation module 1020, where composite image 1021 is produced from the images. As shown, composite image 1021 includes a complete view of the undercarriage of the vehicle. The composite image generation module may generate the composite image 1021 by determining pixel shifts between adjacent photos within an image set. Image sets may then be aligned and cropped. The vehicle speed in images may be determined based on pixel shift distances. Finally the composite image may be generated based on the aligned image sets and vehicle speed. In some embodiments, the composite image may be generated based on data related to the position and/or motion of the vehicle, such as from a TOF sensor. Composite image generation is described in more detail in FIGS. 11A-E.

Figure 11A:
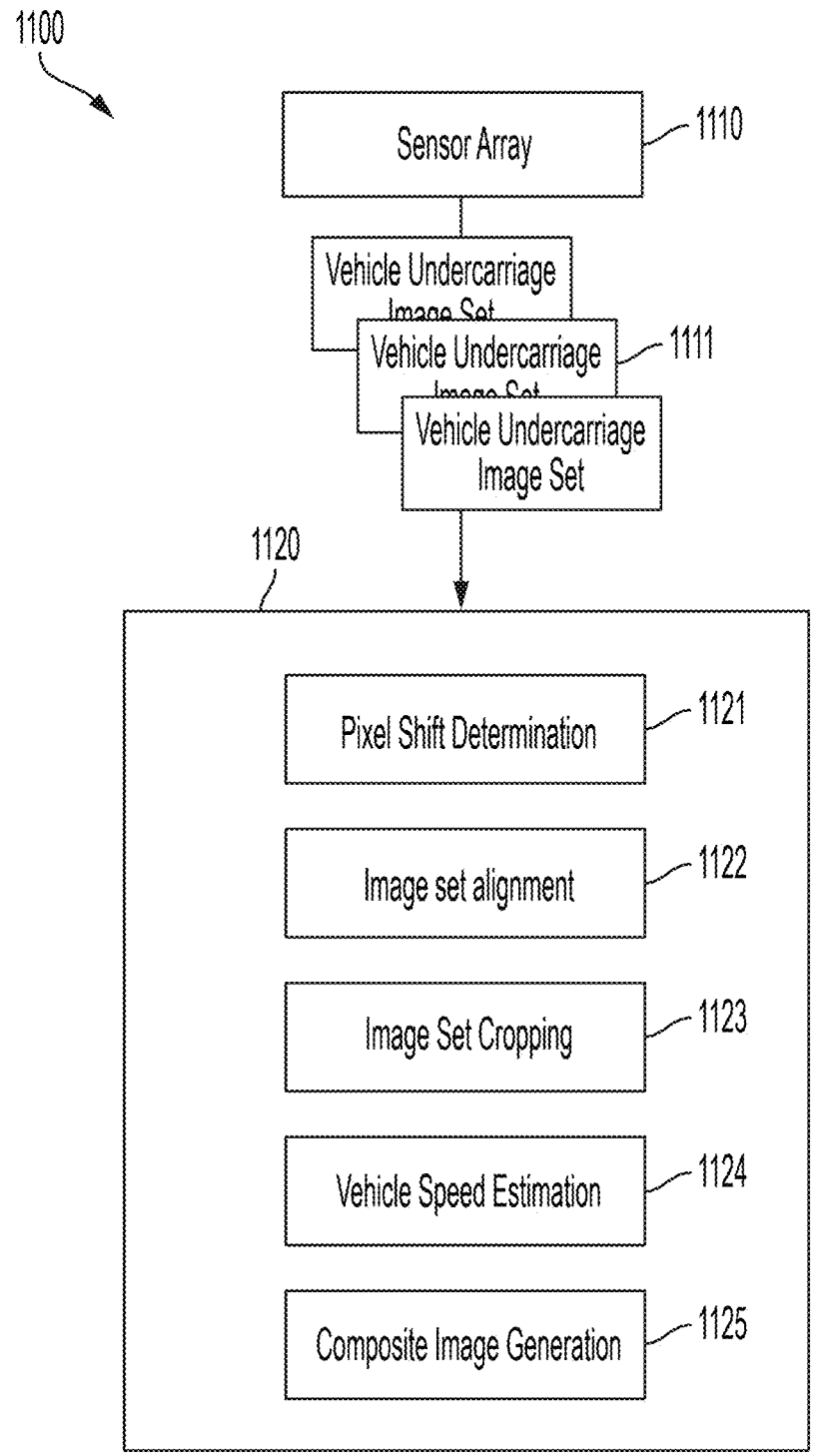
FIG. 11A is an example data flow for generating a composite image of a vehicle undercarriage, according to some embodiments of the technology described herein.

FIG. 11A is an example data flow for generating a composite image of a vehicle undercarriage, according to some embodiments. The process flow 1100 may be performed by one or more processors of a vehicle undercarriage inspection system and/or a vehicle inspection system, as described herein.

Sensor array 1110 may be a sensor array of a vehicle undercarriage inspection system, and provides vehicle undercarriage image sets 1111 to composite image generation module 1120. In some embodiments, the vehicle undercarriage image sets 1111 may be captured by cameras of a vehicle undercarriage inspection system. In some embodiments, each set of the vehicle undercarriage image sets 1111 may be captured by a respective camera of a vehicle undercarriage imaging system, as described herein. In some embodiments, the vehicle undercarriage image sets may include consecutive images of the undercarriage of the vehicle. In some embodiments, the image sets may be reversed in order, such that the images of the image set are ordered from the front to the rear of the vehicle.

The composite image generation module 1120 includes sub modules for generating the composite image of the undercarriage of the vehicle. These sub modules include pixel shift determination module 1121, image set alignment module 1122, image set cropping module 1123, vehicle speed estimation module 1124, and composite image generation module 1125.

Pixel shift determination module 1121 may determine pixel shift distances between adjacent images of the image sets 1111. The pixel shifts may be caused by the movement of the vehicle and vehicle undercarriage inspection system relative to each other. In some embodiments, pixel shift distance may be determined based on a comparison of adjacent images, for example, by determining a location of an image feature in adjacent images and determining the difference in position. In some embodiments, one or more ML models may be used in determining pixel shift distances. In some embodiments, pixel shift distances may be determined based on the process shown in FIG. 11B.

Figure 11B:
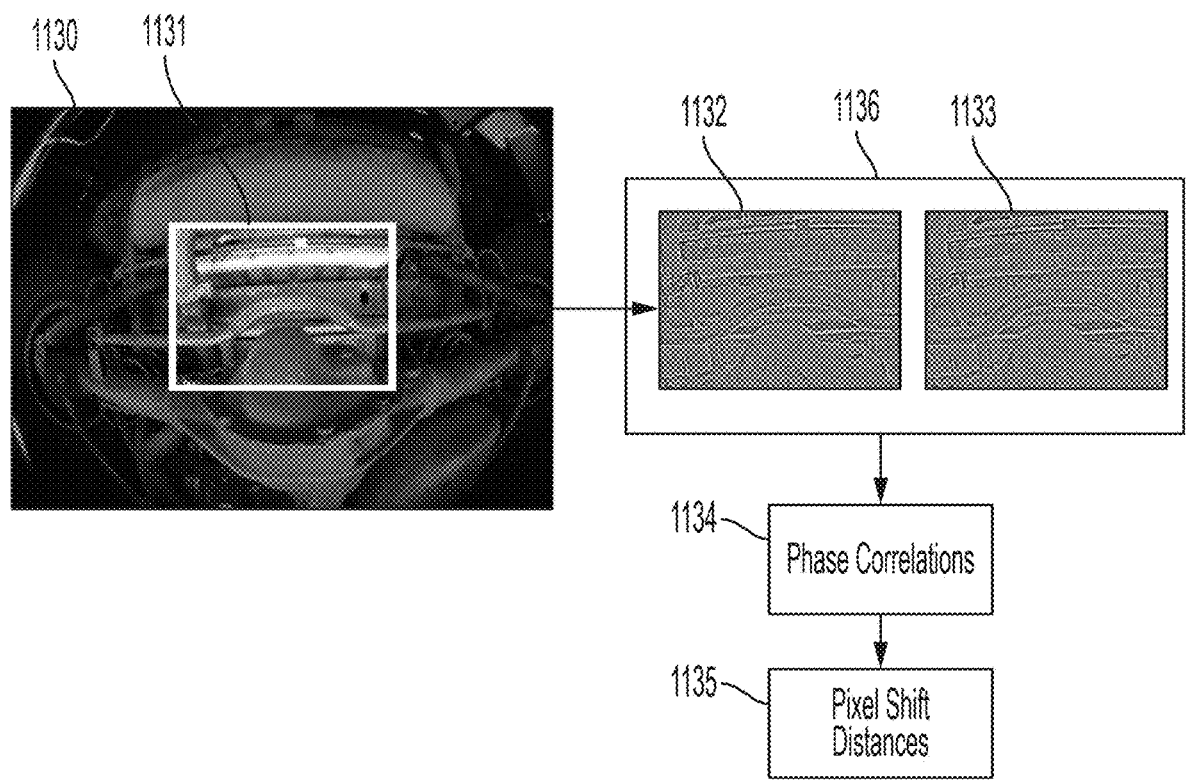
FIG. 11B illustrates an example process for determining pixel shift distances between adjacent images of an images set, according to some embodiments of the technology described herein.

FIG. 11B illustrates an example process for determining pixel shift distances between adjacent images of an images set, according to some embodiments. In some embodiments, the process of FIG. 11B may be performed on all adjacent images of image sets. In the process of FIG. 11B, if an image set has n frames, n–1 pixel shift values will be determined.

Image 1130 is an example image from a vehicle undercarriage image set. The image 1130 may be cropped to minimize distortion caused by the lens of the camera used to capture the image. In some embodiments, the image may be center cropped. In some embodiments the center $\frac{1}{3}^{rd}$ of the image may be cropped. As shown, image 1130 is center cropped, and cropped image 1131 is used in further processing.

Cropped images may be provided to preprocessing module 1136, where one or more transformations may be applied. As shown, two adjacent cropped images from a vehicle undercarriage image set have been preprocessed. The preprocessed images 1132 and 1133 may have had one or more transformations applied. In some embodiments, the preprocessed images may have had one or more of a Contrast Limited Adaptive Histogram Equalization transformation, and/or a Laplacian transformation applied. All images of an image set may be preprocessed using preprocessing module 1136.

After preprocessing, the phase correlation 1134 may be determined between the adjacent preprocessed images 1132 and 1133. The phase correlation may be indicative of the offset between the adjacent preprocessed images. The phase correlation may be determined for all adjacent preprocessed images from an image set.

Pixel shift distances 1135 may then be determined from the phase correlations 1134. The pixel shift distances 1135 may represent the amount the vehicle and vehicle undercarriage inspection system moved relative to each other (in pixels) between adjacent images of an image set. Pixel shift distances may be determined for all adjacent images of received image sets. In some embodiments, pixel shift distances for an image set may be stored in an array.

Returning to FIG. 11A, the determined pixel shift distances may be passed to image set alignment module 1122. Although the image sets 1111 may be recorded at the same time programmatically, the images of the image sets may still be out of sync. Image set alignment module 1122 may align the images of the image sets 1111 based on the pixel shift distances. Image sets 1111 may be aligned by matching the pixel shift distance of the image sets. The image sets may be aligned such that the difference between pixel shift distances of the image sets is minimized. In some embodiments, the image sets may be aligned by "locking" the position of an image set and moving the other image sets relative to the locked image set. At each index the other image sets are moved to, the difference between the pixel shift distances may be determined. In some embodiments, the average pixel shift difference may be determined for each index the image sets are moved to. In some embodiments, the image sets may be shifted by a certain amount in one or more directions. In some embodiments, the image sets may be shifted forward in time based on the time of capture and/or backwards in time based on the time of capture. In some embodiments the image sets may be shifted by up to 25% of their length forwards and/or backwards. The image sets may be aligned at the index with the lowest difference in pixel shift distances.

Figure 11C:
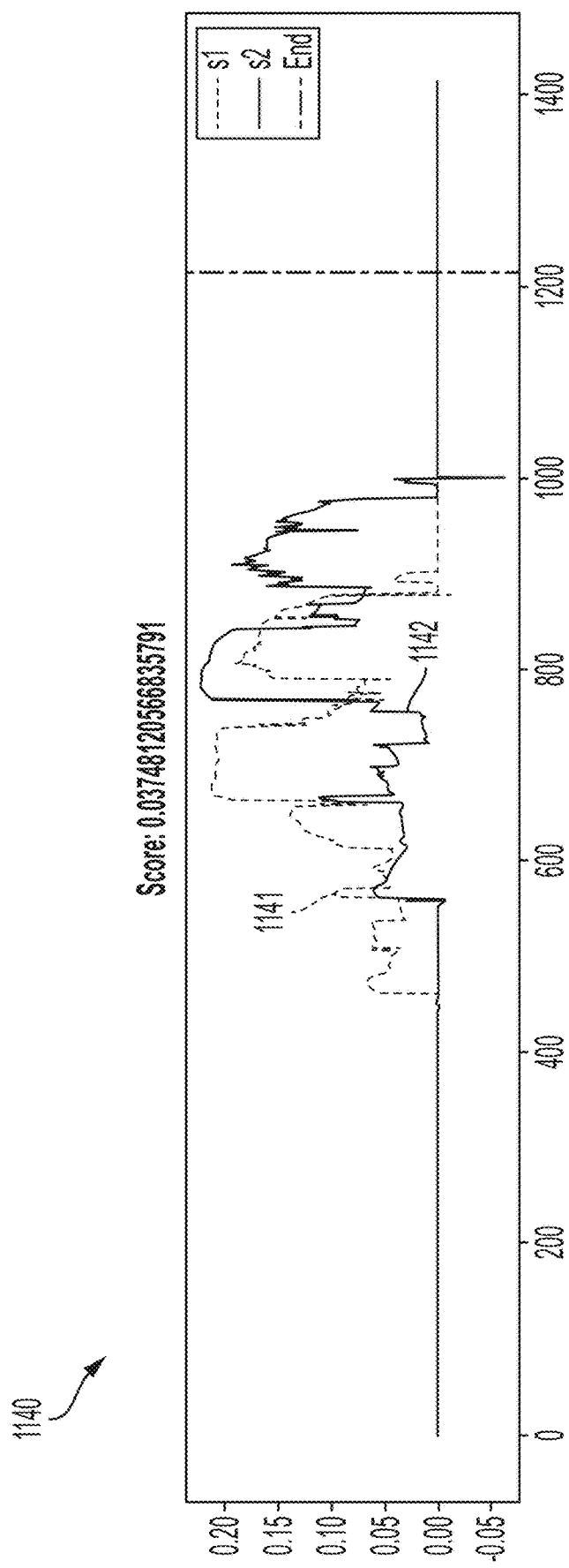
FIGS. 11C-D illustrate an example of aligning image sets, according to some embodiments of the technology described herein.
Figure 11D:
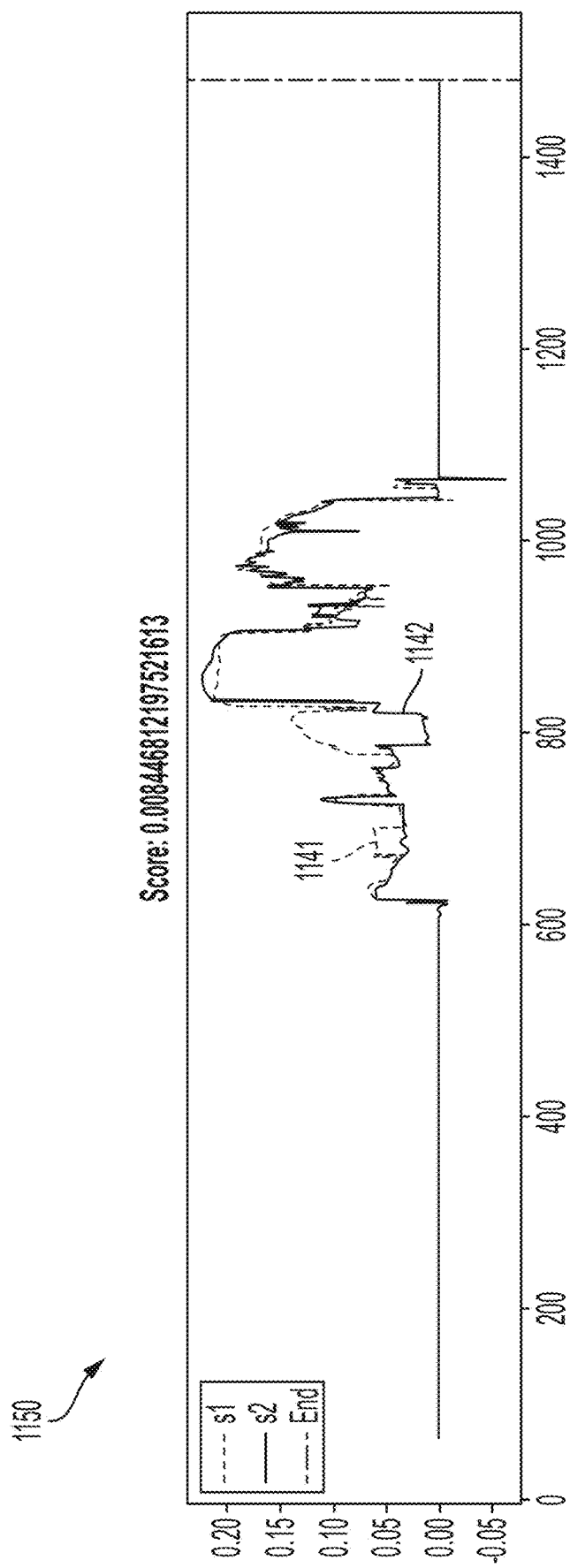

FIGS. 11C-D illustrate an example of aligning image sets, according to some embodiments. In FIG. 11C, plot 1140 illustrates the pixel shift distances for two sets of images. The indexes of the images of the image sets are shown on the X-axis. The pixel shift distances for adjacent images are shown on the Y-axis. Line 1141 corresponds to pixel shift distances for a first image set, and line 1142 corresponds to pixel shift distances for a second image set. As shown lines 1141 and 1142 have similar shapes, but line 1142 is shifted to the right of 1141.

FIG. 11D shows a plot 1150 of aligned image sets. The indexes of the images of the image sets are shown on the X-axis. The pixel shift distances for adjacent images are shown on the Y-axis. As shown, the lines 1141 and 1142 are aligned, compared to plot 1140 of FIG. 11C. The lines 1141 and 1142 are aligned such that the pixel shift distance differences between them are minimized. As shown, line 1142 is no longer shifted to the right of line 1141 and the shapes of the lines 1141 and 1142 generally follow each other.

Returning to FIG. 11A, the aligned image sets may be passed to image set cropping module 1123. Image set cropping module 1123 may crop image sets such that the image sets include images where the vehicle undercarriage is present. In some embodiments, the image sets may be cropped based on the pixel shift distances of the image sets.

In some embodiments, the pixel shifts for the aligned image sets are iterated over, and the average values are found for indexes at the left and right of the image set. The left and right of the image set may represent the beginning and end indexes of the image set. The differences between the average pixel shift distance values for the left and right indexes, and the maximum difference gives the starting index for where the vehicle undercarriage becomes visible and the minimum difference represents the ending index for when the vehicle undercarriage is visible.

Figure 11E:
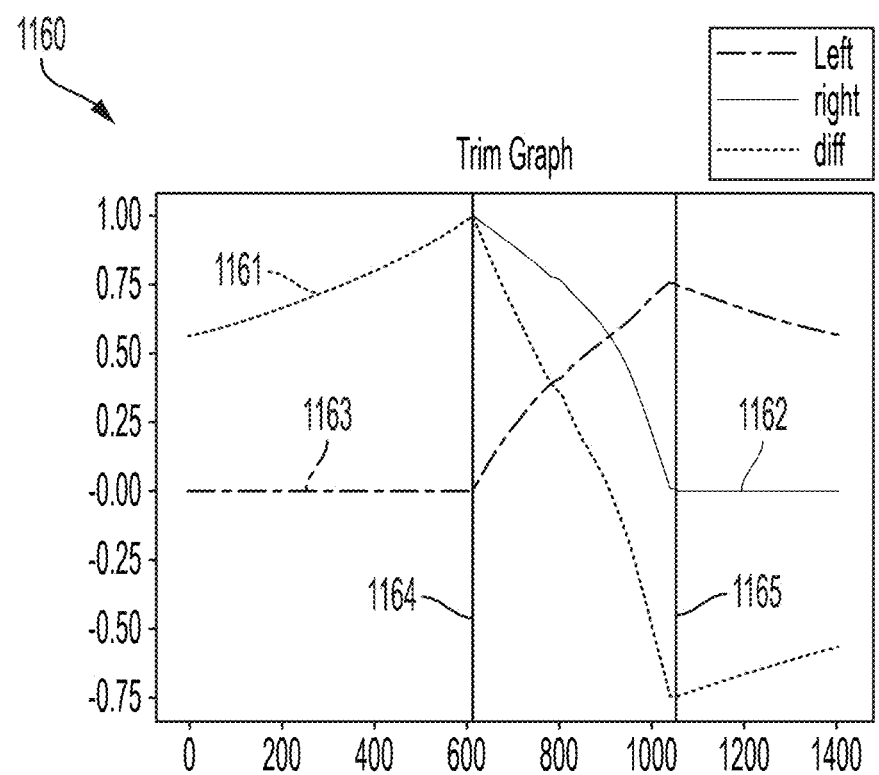
FIG. 11E is an example of a plot of pixel shift distance values which may be used in cropping images sets, according to some embodiments of the technology described herein.

This process is shown in FIG. 11E. In FIG. 11E includes plot 1160, which displays the right index average values, 1162, left index average values 1163, difference between the left and right index average values 1161, start point 1164 and end point 1165. The start point 1164 corresponds to the maximum difference between the left and right index average values and where the vehicle undercarriage becomes visible. The end point 1165 corresponds to the minimum difference between the left and right index average values and where the vehicle undercarriage is no longer visible.

The image sets may be trimmed such that only images where the vehicle undercarriage is visible are included.

Returning to FIG. 11A, the cropped image sets may then be provided to vehicle speed estimation module. In some embodiments, the vehicle speed represents the speed of the vehicle relative to the vehicle undercarriage inspection system, when the vehicle is moving. In some embodiments the vehicle speed represents the speed of the vehicle undercarriage inspection system relative to the vehicle when the vehicle undercarriage inspection system is moving. The vehicle speed may be estimated based on the pixel shift values of the cropped image sets. In some embodiments, the vehicle speed may be estimated based on the pixel shift values by estimating the speed based on an estimated distance to the vehicle undercarriage. This estimated distance may be used to correlate the pixel shift values to distances and/or to vehicle speeds. In some embodiments, the vehicle speed may be estimated based on pixel shift values and data from one or more TOF sensors facing the undercarriage of the vehicle. The TOF sensor data may represent the distance between the vehicle and the vehicle undercarriage inspection system. The TOF sensor data may be used to more accurately convert the pixel shift values to distances and/or speed, and to reduce errors caused by varying depths of undercarriage components. For example, low hanging undercarriage components may appear to be moving faster than the remainder of the undercarriage dur to their close proximity to cameras of the vehicle undercarriage imaging system and high differences in position in adjacent frames.

A TOF sensor may give the distance between the vehicle undercarriage and the vehicle undercarriage inspection system. This distance may be used in determining the speed of the vehicle based on pixel shift distances, for use in stitching images as detailed below:

For smooth image stitching, the number of pixels shifted c' should be determined for a fixed distance from camera d' of the undercarriage instead of varying heights.

$$c'_i = s_i * p / (l(d') * f)$$

Where $s_i$ is the speed in meters per second at image index i, p is the height of the center crop window used in phase correlation, f is the frames per second of the video.

For a given distance from the camera d in meters, l(d) is the length of the cropped window in meters.

$$l(d) = 2 * d * \tan(v/2)$$

where v is the field of view of the camera for the cropped window measured using a flat charuco board at a fixed distance from the camera.

Vehicle speed $s_i$ is given by the following formula $$s_i = f * l(d_i) * c_i / p$$

Where $d_i$ is the distance from the camera in meters given by a TOF sensor, interpolated to match the camera's framerate, $c_i$ is the number of pixels shifted given by phase correlation.

The vehicle speed may be determined for each image of the cropped image sets. These images may then be used to generate a composite image. The composite image generation module may generate a composite image by creating slices of the images of the image sets and combining the slices together to form a composite image. In some embodiments, the size of the slices may be determined based on the vehicle speed. In some embodiments the slices are taken along a width of the vehicle undercarriage. In some embodiments, the slices are blended together. In some embodiments the slices are blended using a soft feathering technique. The composite image may be displayed, and/or processed as described herein.

FIGS. 11F and 11G illustrate the improved composite image quality from using the vehicle speed as recorded by a TOF sensor in combining images.

FIG. 11F is an example composite image of a vehicle generated based on vehicle speed estimated from pixel shift distances, according to some embodiments. As described herein, the depth of undercarriage parts can impact the speed estimated based on pixel shifts alone, with lower parts being estimated as moving faster and higher parts being estimated as moving slower, due to different proximities to the cameras of the vehicle undercarriage imaging system. As shown in image 1170, in region 1171, the image is visibly stretched which is likely due to this portion of the undercarriage being closer to the cameras than other portions. In section 1172, the image is visibly compressed, which is likely due to this portion of the vehicle undercarriage being further from the camera than other portions.

FIG. 11G is an example composite image of a vehicle generated based on vehicle speed estimated from pixel shift distances and TOF sensor data, according to some embodiments. The composite image 1180 is of the same vehicle as composite image 1170 of FIG. 11F. As can be seen, there is no compression or extension of portions of image 1180, as there is in image 1170. This is due to the more accurate vehicle speed which may be determined by using TOF sensor data, as described herein.

Figure 12:
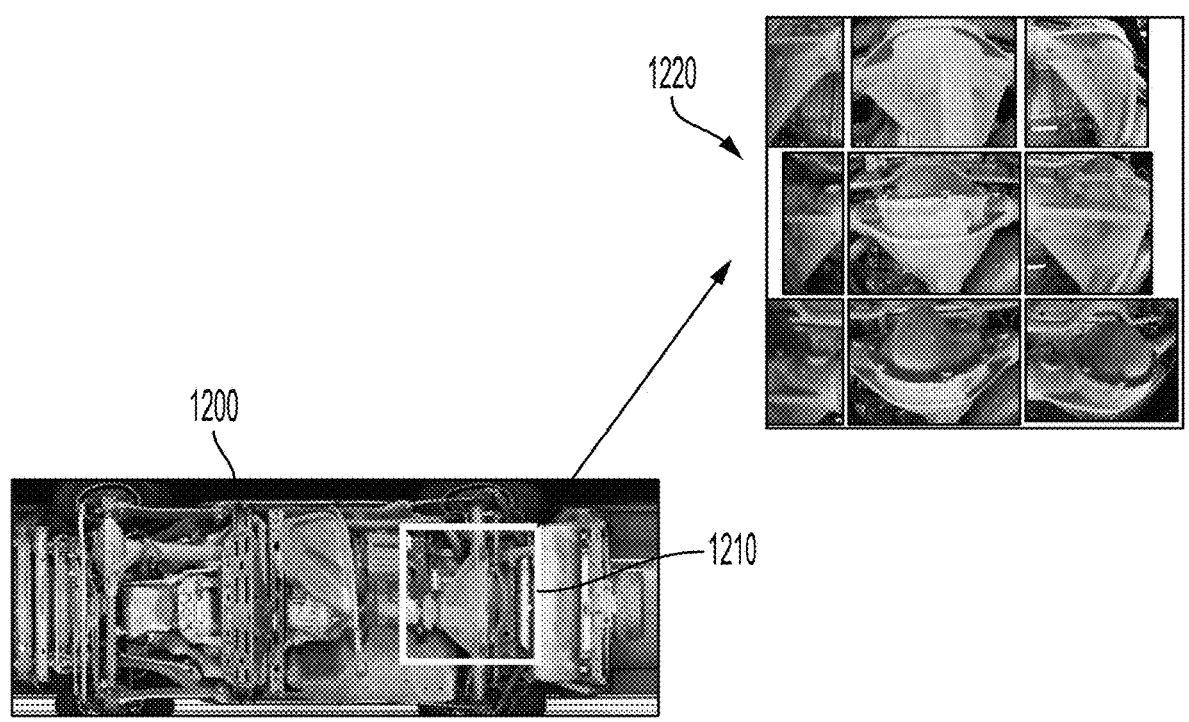
FIG. 12 is an example of displaying images of a vehicle undercarriage, according to some embodiments of the technology described herein.

FIG. 12 is an example of displaying images of a vehicle undercarriage, according to some embodiments. In some embodiments, the images of FIG. 12 may be displayed on a display of and/or connected to a vehicle undercarriage inspection system and/or a vehicle inspection system, as described herein.

Shown in FIG. 12 is a vehicle undercarriage composite image 1200, which may be generated as described herein. Composite image 1200 includes box 1210 around the bell housing of the vehicle. In some embodiments, the box may be applied to the image during processing to identify a defect in the undercarriage, for example a cracked bell housing. In some embodiments, the box may be generated by a user of the display. The box 1210 may be selectable to obtain additional views of the components of the undercarriage within the box. In some embodiments, a user may select any portion of the composite image to obtain additional views of the portion. In some embodiments, portions of the composite image identified as having defects may be selected to obtain additional views. In some embodiments, the user may review the additional views and provide inputs related to the views, for example confirming whether a defect is present.

Additional views 1220 show the components within box 1210. The views 1220 may be captured by one or more cameras of a vehicle undercarriage imaging system. In some embodiments, the additional views 1220 may be captured from different angles, providing views of the components within the box 1210 from different angles. These views allow for a more thorough analysis of the vehicle undercarriage components than is possible based on a composite image alone.

Figure 13A:
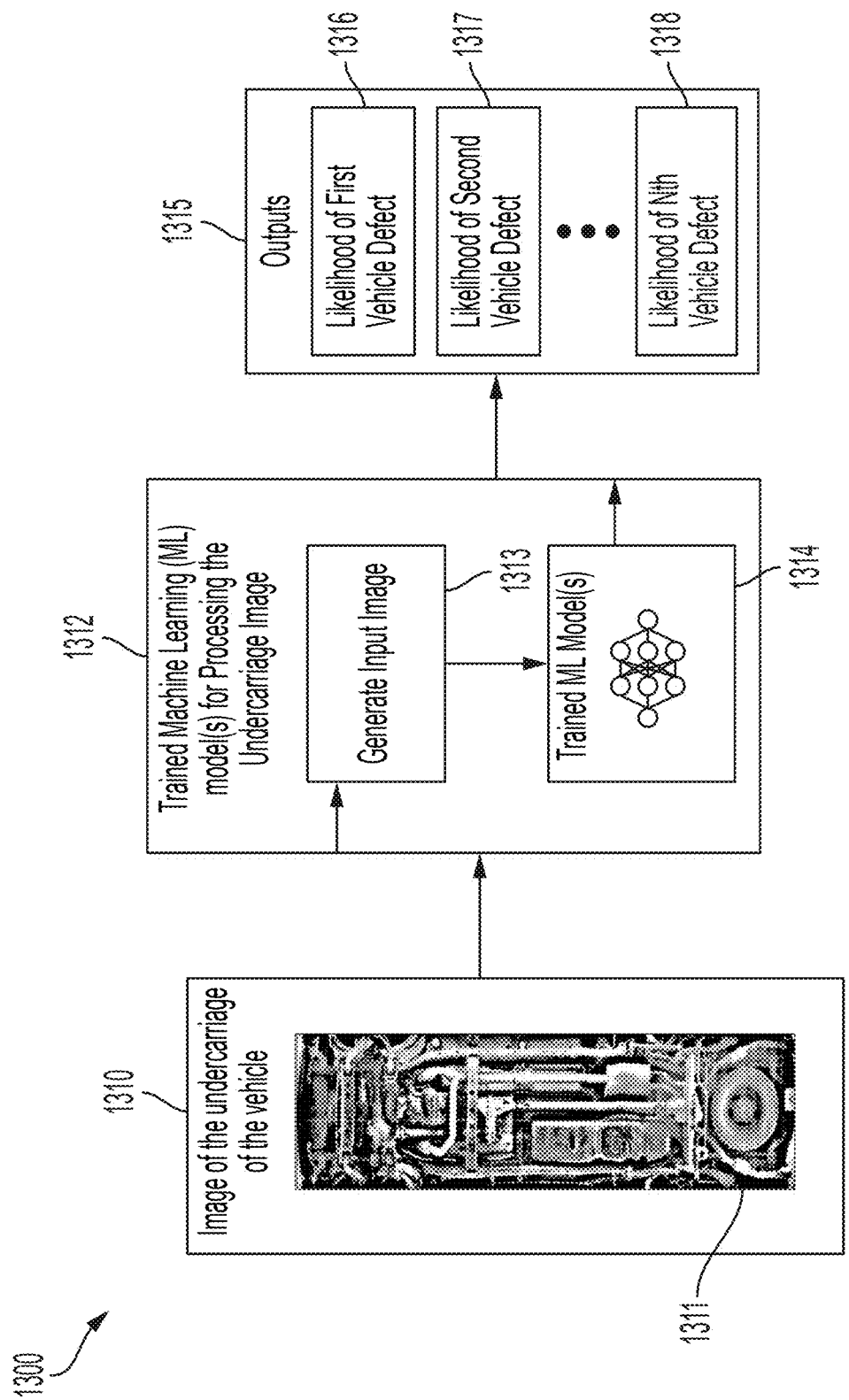
FIG. 13A illustrates one or more trained machine learning models 1300 for processing images of an undercarriage of a vehicle to evaluate the vehicle condition, according to some embodiments of the technology described herein.

FIG. 13A illustrates one or more trained machine learning models 1300 for processing images of an undercarriage of a vehicle to evaluate the vehicle condition, according to some embodiments. As shown in FIG. 13A, trained machine learning model 1300 includes trained machine learning model 1310 for processing the vehicle undercarriage images 1311 to obtain outputs 1315.

In some embodiments, the images 1311 may be captured as a part of a vehicle inspection, performed using a vehicle undercarriage inspection system. For example, as described with reference to FIGS. 3A-F, and 7-9B. In some embodiments, the images may be a composite image of the vehicle undercarriage, which may be generated as described herein, for example as described with reference to FIGS. 10-11G.

In some embodiments, trained machine learning model 1312 for processing the images of the vehicle may include preprocessing to generate input images for trained machine learning model 1314. Preprocessing to generate input images may modify at least one characteristic of the images of the vehicle, prior to the image being processed by the trained machine learning model 1314. Preprocessing may be performed by preprocessing module 1313. In some embodiments, the undercarriage image processed by the model may have a resolution of 650×224. The resolution of the undercarriage image may be upsampled (e.g., the number of pixels may be increased) or downsampled (e.g., the number of pixels may be reduced) such that the smaller dimension of the image is a same dimension as an input to the convolutional neural network architecture. For example, if the convolutional neural network is engineered for 224×224 inputs, the undercarriage image may be input as an image having 224 pixels for the width, and 650 pixels for the height to match the average aspect ratio of the images. In some embodiments, the images are resized using bilinear interpolation.

Trained machine learning model 1314 may be any suitable machine learning model for image analysis. In some embodiments, trained machine learning model 1314 is a 2D convolutional neural network. In some embodiments, ML model 1314 is structured as a deep convolutional neural network (DCNN). In some embodiments, ML model 1314 is structured as a YOLO architecture neural network. In some embodiments, ML model 1314 is a transformer-based model. In some embodiments, ML model 1314 is a diffusion model. In some embodiments the machine learning model 1314 is configured as an EfficientNet convolutional neural network.

Outputs 1315 may include a list of vehicle defects and the respective likelihood of the defect being present in the vehicle. As shown in FIG. 13A outputs 1315 include the likelihood of a first vehicle defect 1316, the likelihood of a vehicle image defect 1317, and a likelihood of an nth vehicle defect 1318. For example, when n=8 there may be 8 output classes (e.g., types of vehicle defects) including 7 defect classes and one affirmative quality class. In some embodiments, the outputs 1315 include likelihood of particular vehicle characteristics being present. Examples of vehicle characteristics and defects are described herein. In some embodiments, the outputs include likelihoods of image defects, for example incorrect cropping, insufficient detail, dirty lens, haze or glare, incorrect trim, and/or poor lighting, among other image defects.

Figure 13B:
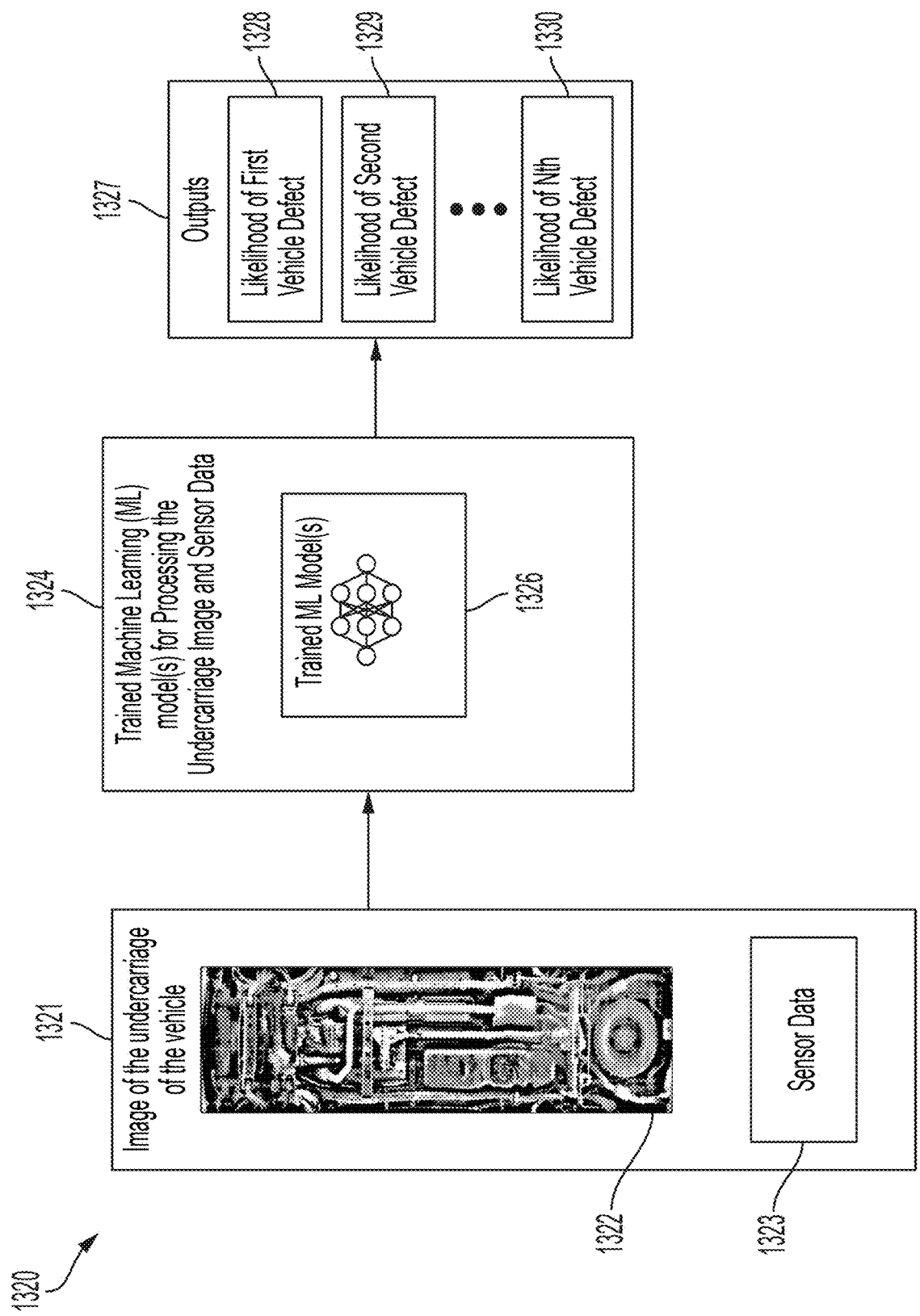
FIG. 13B illustrates one or more trained machine learning models 1320 for processing images and data of a vehicle undercarriage to evaluate the vehicle condition, according to some embodiments of the technology described herein.

FIG. 13B illustrates one or more trained machine learning models 1320 for processing images and data of a vehicle undercarriage to evaluate the vehicle condition, according to some embodiments. As shown in FIG. 13B, trained machine learning model 1320 includes trained machine learning model 1324 for processing the vehicle data 1321 to obtain outputs 1327.

In some embodiments, the data 1321 may be captured as a part of a vehicle inspection, performed using a vehicle undercarriage inspection system. For example, as described with reference to FIGS. 3A-F, and 7-9B. In some embodiments, the images 1322 of the data 1321 may include a composite image of the vehicle undercarriage, which may be generated as described herein, for example as described with reference to FIGS. 10-11G.

In some embodiments, the sensor data 1323 may include data collected by one or more sensors of a vehicle undercarriage inspection system, as described herein. For example, as described with respect to FIGS. 7-9B.

In some embodiments, trained machine learning model 1324 for processing the vehicle data may include preprocessing to generate input data for trained machine learning model 1326. Preprocessing to generate input data may modify at least one characteristic of the vehicle data, prior to the data being processed by the trained machine learning model 1326.

In some embodiments, the trained machine learning models 1324 may process vehicle images 1322 and sensor data 1323 separately. In some embodiments, the trained machine learning models 1324 may process vehicle images 1322 and sensor data 1323 together. In some embodiments, the trained machine learning models 1324 may process vehicle images 1322 and sensor data 1323 together in part and separately in part.

Trained machine learning model 1326 may be any suitable machine learning model for image and/or sensor data analysis. In some embodiments, trained machine learning model 1326 is a 2D convolutional neural network. In some embodiments, ML model 1326 is structured as a deep convolutional neural network (DCNN). In some embodiments, ML model 1326 is structured as a YOLO architecture neural network. In some embodiments, ML model 1326 is a transformer-based model. In some embodiments, ML model 1326 is a diffusion model. In some embodiments the machine learning model 1326 is configured as an EfficientNet convolutional neural network.

Outputs 1327 may include a list of vehicle defects and the respective likelihood of the defect being present in the vehicle. As shown in FIG. 13B outputs 1327 include the likelihood of a first vehicle defect 1328, the likelihood of a vehicle image defect 1329, and a likelihood of an nth vehicle defect 1330. For example, when n=8 there may be 8 output classes (e.g., types of vehicle defects) including 7 defect classes and one affirmative quality class. In some embodiments, the outputs 1327 include likelihood of particular vehicle characteristics being present. Examples of vehicle characteristics and defects are described herein. In some embodiments, the outputs include likelihoods of image and/or data defects, for example incorrect cropping, insufficient detail, dirty lens, haze or glare, incorrect trim, insufficient magnitude, too noisy, and/or poor lighting, among other defects.

Figure 13C:
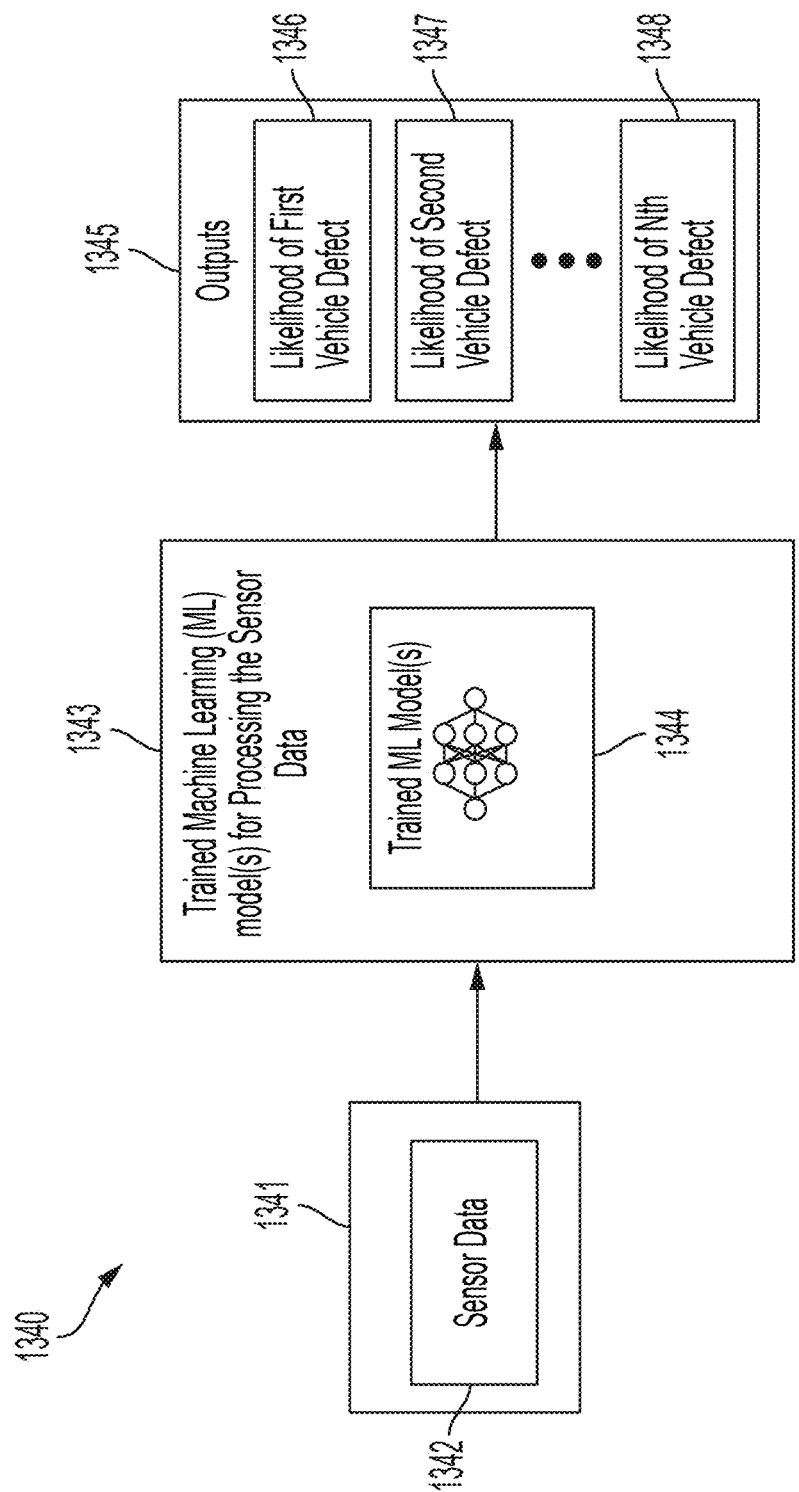
FIG. 13C illustrates one or more trained machine learning models 1340 for processing data of a vehicle undercarriage to evaluate the vehicle condition, according to some embodiments of the technology described herein.

FIG. 13C illustrates one or more trained machine learning models 1340 for processing data of a vehicle undercarriage to evaluate the vehicle condition, according to some embodiments. As shown in FIG. 13C, trained machine learning model 1343 includes trained machine learning model 1344 for processing the vehicle data 1342 to obtain outputs 1345.

In some embodiments, the data 1342 may be captured as a part of a vehicle undercarriage inspection, performed using a vehicle undercarriage inspection system. For example, as described with reference to FIGS. 7-9B.

In some embodiments, the vehicle data may sensor data 1342 about the undercarriage of a vehicle. In some embodiments, the sensor data 1342 may include data collected by one or more sensors of a vehicle undercarriage inspection system, as described herein.

In some embodiments, trained machine learning model 1343 for processing the vehicle data may include preprocessing to generate input data for trained machine learning model 1344. Preprocessing to generate input data may modify at least one characteristic of the vehicle undercarriage data, prior to the data being processed by the trained machine learning model 1344.

In some embodiments, the trained machine learning models 1343 may process vehicle undercarriage sensor data from different vehicle undercarriage sensors separately. In some embodiments, the trained machine learning models 1343 may process the sensor data from different vehicle sensors together. In some embodiments, the trained machine learning models 1343 may process sensor data from different sensors together in part and separately in part.

Trained machine learning model 1344 may be any suitable machine learning model for sensor data analysis. In some embodiments, trained machine learning model 1344 is a 2D convolutional neural network. In some embodiments, ML model 1344 is structured as a deep convolutional neural network (DCNN). In some embodiments, ML model 1344 is a transformer-based model.

Outputs 1345 may include a list of vehicle defects and the respective likelihood of the defect being present in the vehicle. As shown in FIG. 13C outputs 1345 include the likelihood of a first vehicle defect 1346, the likelihood of a vehicle image defect 1347, and a likelihood of an nth vehicle defect 1348. For example, when n=8 there may be 8 output classes (e.g., types of vehicle defects) including 7 defect classes and one affirmative quality class. In some embodiments, the outputs 1345 include likelihood of particular vehicle characteristics being present. Examples of vehicle characteristics and defects are described herein. In some embodiments, the outputs include likelihoods data defects, for example incorrect cropping, insufficient detail, incorrect trim, insufficient magnitude, and/or too noisy, among other defects.

Figure 14:
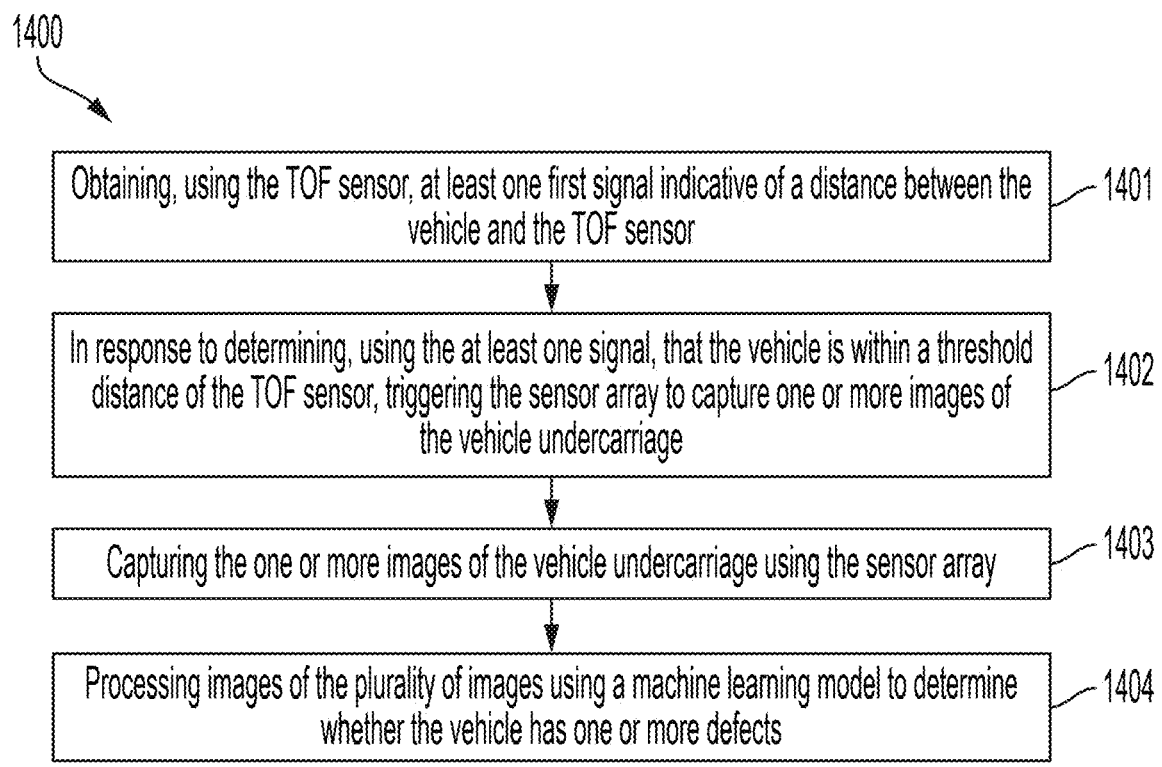
FIG. 14 is a flowchart of an illustrative process 1400 for performing a vehicle inspection using a vehicle undercarriage inspection system to identify vehicle defects, according to some embodiments of the technology described herein.

FIG. 14 is a flowchart of an illustrative process 1400 for performing a vehicle inspection using a vehicle undercarriage inspection system to determine vehicle defects, according to some embodiments. In some embodiments the vehicle undercarriage inspection system used in performing the process 1400 includes a sensor array with first, second and third cameras configured to capture images at different angles relative to the vehicle undercarriage, and a time of flight (TOF) sensor configured to output signals indicative of the distance of one or more parts of the vehicle relative to the vehicle undercarriage inspection system. In some embodiments, the vehicle undercarriage inspection system may be configured as described herein, for example as described with reference to FIGS. 7-9B. In some embodiments, the process 1400 may be performed be one or more processors of a vehicle undercarriage inspection system, as described herein, for example processors 930 as described with reference to FIGS. 9A-9B.

Process 1400 begins at step 1401 by obtaining, using the TOF sensor, at least one first signal indicative of a distance between the vehicle and the TOF sensor. In some embodiments, signals may be obtained from multiple TOF sensors, for example 2 TOF sensors, 3 TOF sensors, 4 TOF sensors or greater than 4 TOF sensors. In some embodiments, the TOF sensor may be oriented facing the vehicle. In some embodiments, the TOF sensor may be oriented towards an end of a vehicle undercarriage inspection system and configured to capture signals indicative of the position and/or movement of one or more wheels of the vehicle, such as TOF sensor 722A of FIG. 7. In some embodiments, the TOF sensor may be oriented facing the undercarriage of the vehicle, such as sensor 722B of FIG. 7.

Next, step 1402 is performed by in response to determining, using the at least one signal, that the vehicle is within a threshold distance of the TOF sensor, triggering the sensor array to capture one or more images of the vehicle undercarriage. In some embodiments, all sensors of the sensor array may be triggered to capture data from the vehicle undercarriage based on the at least one signal. In some embodiments, different sensors of the sensor arrays may be triggered at different times based on the at least one signal, for example cameras of the sensor array may be triggered first, followed by microphones of the sensor array. In some embodiments, step 1402 is performed by a system control module of a processor, for example module 937.

Next, step 1403 is performed by capturing the one or more images of the vehicle undercarriage using the sensor array. The one or more images may be captured using cameras of the sensor array.

Next, step 1404 is performed by processing images of the plurality of images using a machine learning model to determine whether the vehicle has one or more defects. In some embodiments, the one or more defects include vehicle defects, as described herein. In some embodiments, step 1404 may be performed by a data processing and analysis module, such 931, as described herein. In some embodiments, the sensor data may undergo formatting for processing, as described herein. For example, a composite image may be generated for processing, using images and/or sensor data obtained from the undercarriage inspection system, such as described with reference to FIGS. 10-11G. In some embodiments, the processing may be performed using one or more trained machine learning models to identify vehicle defects, for example ML models such as those described herein with reference to FIGS. 13A-C.

In some embodiments, the vehicle defects may be displayed and/or otherwise provided for a vehicle inspector for review. In some embodiments, the vehicle defects may be provided as a part of a vehicle condition report. In some embodiments, the vehicle defects may be formatted as likelihoods of the vehicle having the defects. In some embodiments, the vehicle defects may be formatted as probabilities of the vehicle having the defects. In some embodiments the vehicle defects may be confidence scores of the vehicle having the defects.

Following the conclusion of process 1400, the inspector may proceed to conduct a further vehicle inspection. Accordingly, in some embodiments, the inspector may use the identified defects and/or targeted professional inspection instructions to determine particular techniques to use during the further vehicle inspection to check for the potential vehicle defects. Additionally, or alternatively, the targeted professional inspection instructions may alert the inspector of features indicative of the potential vehicle defects.

Additionally, or alternatively, the inspector may be a potential buyer who may use the defects to make more informed pricing offers or to check for themselves the presence of the potential vehicle defects. Additionally, or alternatively, the inspector may be a potential seller who may use the output to anticipate potential customer complaints. Additionally, or alternatively, the inspector may be the vehicle owner who may use the output to anticipate component failures and repairs.

Figure 15:
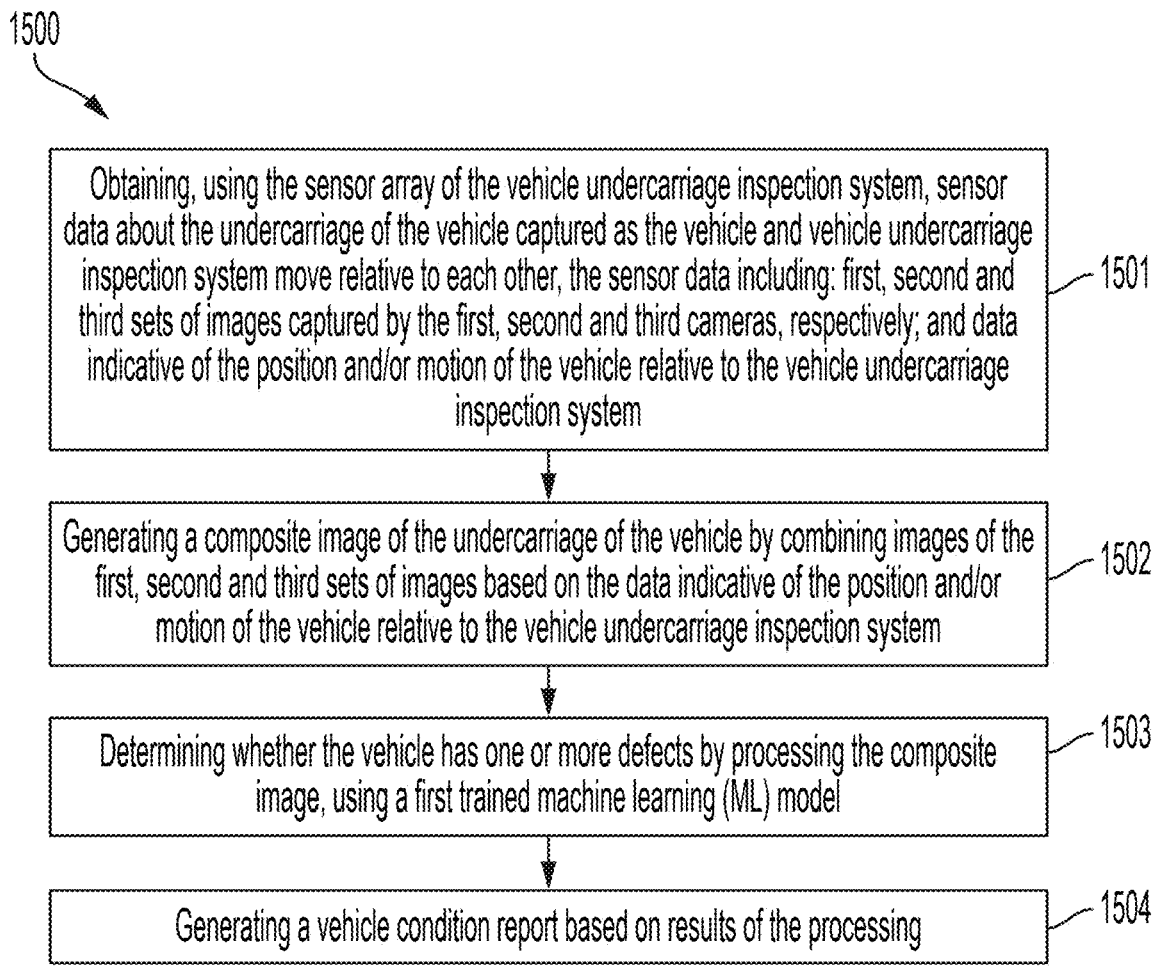
FIG. 15 is a flowchart of an illustrative process 1500 for analyzing vehicle condition using a vehicle undercarriage inspection system, according to some embodiments of the technology described herein.

FIG. 15 is a flowchart of an illustrative process 1500 for analyzing vehicle condition using a vehicle undercarriage inspection system, according to some embodiments. In some embodiments, the vehicle undercarriage inspection system used in performing process 1500 includes a sensor array with first, second, and third cameras. In some embodiments, the vehicle undercarriage inspection system used in performing process 1500 may be configured as described herein, for example as described with reference to FIGS. 7-9B. In some embodiments, process 1500 may be performed by one or more processors of a vehicle undercarriage inspection system, for example processors 930 as described with reference to FIGS. 9A-B.

Process 1500 begins at step 1501 by obtaining, using the sensor array of the vehicle undercarriage inspection system, sensor data about the undercarriage of the vehicle captured as the vehicle and vehicle undercarriage inspection system move relative to each other, the sensor data including: first, second and third sets of images captured by the first, second and third cameras, respectively, and data indicative of a position and/or motion of the vehicle relative to the vehicle undercarriage inspection system.

In some embodiments, the vehicle may be driven over and/or around a vehicle undercarriage inspection system. In some embodiments a vehicle undercarriage inspection system may move beneath and/or around the vehicle.

In some embodiments, the data indicative of the position and/or motion of the vehicle may be determined from the sets of images captured by the first, second and third cameras. In some embodiments, the data indicative of the position and/or motion of the vehicle may be captured from a TOF sensor.

Next, step 1502 is performed by generating a composite image of the undercarriage of the vehicle by combining images of the first, second and third sets of images based on the data indicative of a position and/or motion of the vehicle relative to the vehicle undercarriage inspection system. In some embodiments, the composite image is generated in part by determining pixel shift distances between images in each of the sets of images, aligning the sets of images, cropping the aligned sets of images, estimating the speed of the vehicle in images of the sets of images, and combining the images of the sets of images based on the vehicle speed, as described with reference to FIGS. 10-11G. In some embodiments, the vehicle speed may be determined based on pixel shift distances. In some embodiments, the vehicle may be determined based on pixel shift distances and data obtained from a TOF sensor.

Next, step 1503 is performed by determining whether the vehicle has one or more defects by processing the composite image, using a first trained machine learning (ML) model. In some embodiments, the one or more defects include vehicle defects, as described herein. In some embodiments, step 1503 may be performed by a data processing and analysis module, such 931, as described herein. In some embodiments, the processing may be performed using one or more trained machine learning models to identify vehicle defects, for example ML models such as those described herein with reference to FIGS. 13A-C.

Next, step 1504 is performed by generating a vehicle condition report based on results of the processing. In some embodiments, step 1504 is performed by a vehicle report generation module, such as 935 as described with reference to FIG. 9B. In some embodiments, the condition report includes data related to the vehicle such as vehicle characteristics and/or defects, for example as described with reference to FIG. 2. In some embodiments, data of a vehicle condition report may be determined using one or more machine learning models, such as those described herein with reference to FIGS. 13A-C. In some embodiments, the vehicle condition report may be displayed and/or otherwise provided for a vehicle inspector for review.

Following the conclusion of process 1500, the inspector may proceed to conduct a further vehicle inspection. Accordingly, in some embodiments, the inspector may use the vehicle condition report and/or targeted professional inspection instructions to determine particular techniques to use during the further vehicle inspection (e.g., to check for the potential vehicle defects).

Additionally, or alternatively, the inspector may be a potential buyer who may use the vehicle condition report to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 16A:
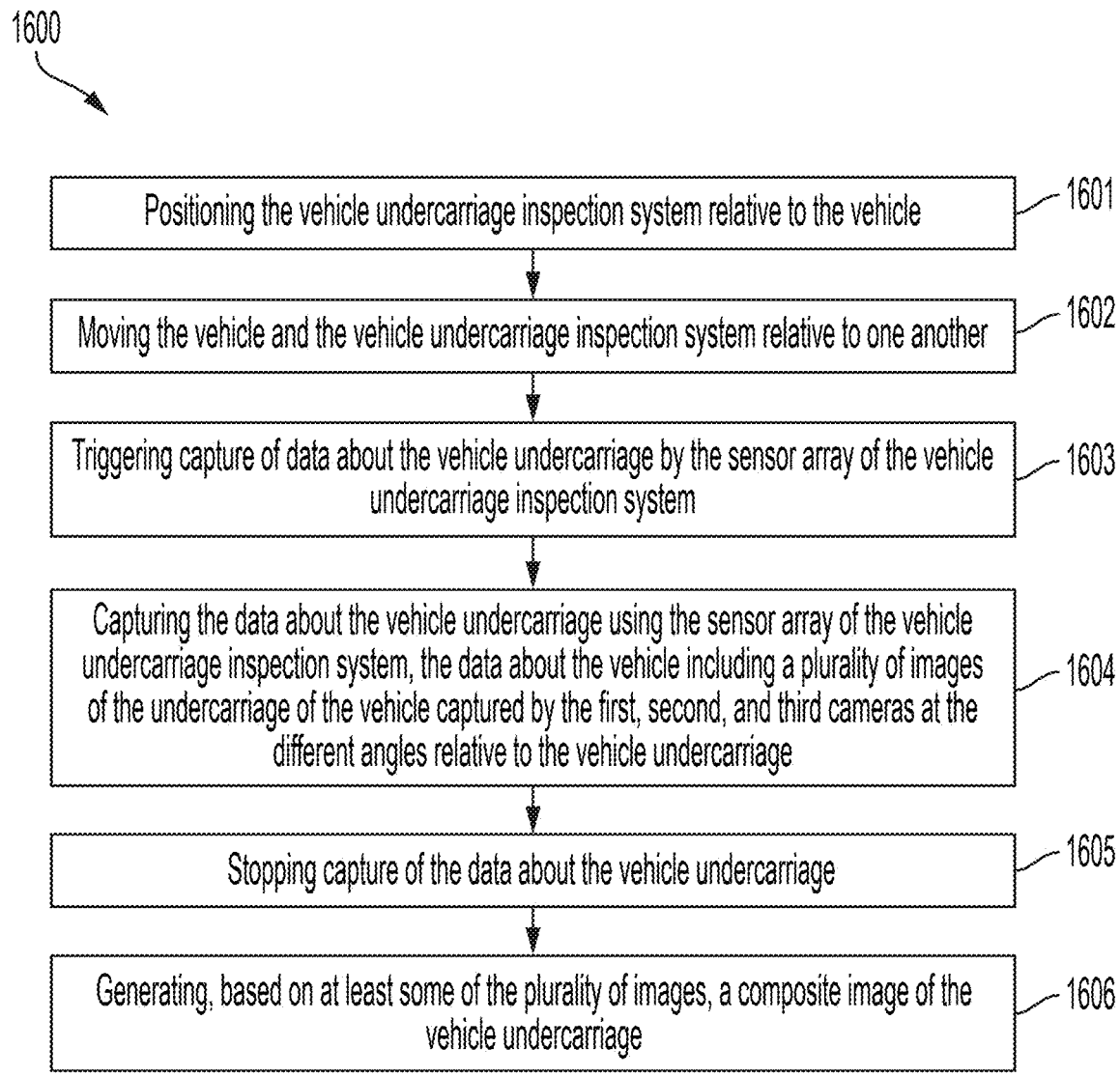
FIG. 16A is a flowchart of an illustrative process 1600 for inspecting an undercarriage of a vehicle using a vehicle undercarriage inspection system, according to some embodiments of the technology described herein.

FIG. 16A is a flowchart of an illustrative process 1600 for inspecting an undercarriage of a vehicle using a vehicle undercarriage inspection system, according to some embodiments. In some embodiments, the vehicle undercarriage inspection system used in performing process 1600 includes a sensor array with first, second and third cameras configured to capture images at different angles relative to the vehicle undercarriage, and a sensor configured to output data indicative of the position and/or motion of the vehicle relative to the vehicle undercarriage inspection system. In some embodiments, the vehicle undercarriage inspection system is configured as described with reference to FIGS. 7-9B. Some steps of process 1600 may be performed by an inspector and some steps may be performed by one or more components of the vehicle undercarriage inspection system.

Process 1600 begins with step 1601 by positioning the vehicle undercarriage inspection system relative to the vehicle. In some embodiments, vehicle undercarriage inspection system may be positioned as described with reference to FIGS. 3A-F, with the vehicle undercarriage inspection system positioned in front of a vehicle. In some embodiments, an inspector may perform step 1601. In some embodiments step 1601 may be performed automatically by the vehicle undercarriage inspection system. In some embodiments step 1601 may be performed in part by an inspector and in part by the vehicle undercarriage inspection system.

Next, step 1602 is performed by moving the vehicle and the vehicle undercarriage inspection system relative to one another. In some embodiments, the vehicle may be driven over the vehicle undercarriage inspection system, such as described with reference to FIGS. 3A-F. The vehicle may be driven by an inspector or by another individual. In some embodiments, the vehicle undercarriage inspection system may move relative to the vehicle. For example, the vehicle undercarriage inspection system may move beneath and/or around the vehicle.

Next, step 1603 is performed by triggering capture of data about the vehicle undercarriage by the sensor array of the vehicle undercarriage inspection system. In some embodiments, the triggering is performed automatically by the vehicle undercarriage inspection system. In some embodiments the triggering is performed automatically based on signals obtained from one or more sensors of the vehicle undercarriage inspection system, such as TOF sensors, and/or cameras. In some embodiments, the triggering is performed when the vehicle is determined to be at one or more positions relative to the vehicle inspection undercarriage system based on sensor data. In some embodiments different sensors of the vehicle undercarriage inspection system may be triggered at different times, for example sensors having different orientations may be triggered based on the position of the vehicle. In some embodiments, the triggering is performed in response to one or more inputs received from an inspector, such as through a user interface or other inputs as described herein.

Next, step 1604 is performed by capturing the data about the vehicle undercarriage using the sensor array of the vehicle undercarriage inspection system, the data about the vehicle including a plurality of images of the undercarriage of the vehicle captured by the first, second, and third cameras at the different angles relative to the vehicle undercarriage.

Next, step 1605 is performed by stopping capture of the data about the vehicle undercarriage. In some embodiments, the stopping is performed automatically by the vehicle undercarriage inspection system. In some embodiments the stopping is performed automatically based on signals obtained from one or more sensors of a vehicle undercarriage inspection system, such as TOF sensors, and/or cameras. In some embodiments, the stopping is performed when the vehicle is determined to be at one or more positions relative to the vehicle undercarriage inspection system based on sensor data. In some embodiments individual sensors may be stopped at different times, for example sensors having different orientations may be stopped based on the position of the vehicle. In some embodiments, the stopping is performed in response to inputs received from an inspector, such as through a user interface or other inputs as described herein.

Next, step 1606 is performed by generating, based on at least some of the plurality of images, a composite image of the vehicle undercarriage. In some embodiments, the composite image is generated in part by determining pixel shift distances between images of the plurality of images, aligning images of the plurality of images, cropping the aligned images, estimating the speed of the vehicle in the images, and combining the images based on the vehicle speed, as described with reference to FIGS. 10-11G. In some embodiments, the vehicle speed may be determined based on pixel shift distances. In some embodiments, the vehicle may be determined based on pixel shift distances and data obtained from a TOF sensor. In some embodiments, the composite image may be displayed and/or otherwise provided for a vehicle inspector for review.

Following the conclusion of process 1600, the inspector may proceed to conduct a further vehicle inspection. Accordingly, in some embodiments, the inspector may use the composite image and/or targeted professional inspection instructions to determine particular techniques to use during the further vehicle inspection (e.g., to check for the potential vehicle defects).

Additionally, or alternatively, the inspector may be a potential buyer who may use the composite image to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 16B:
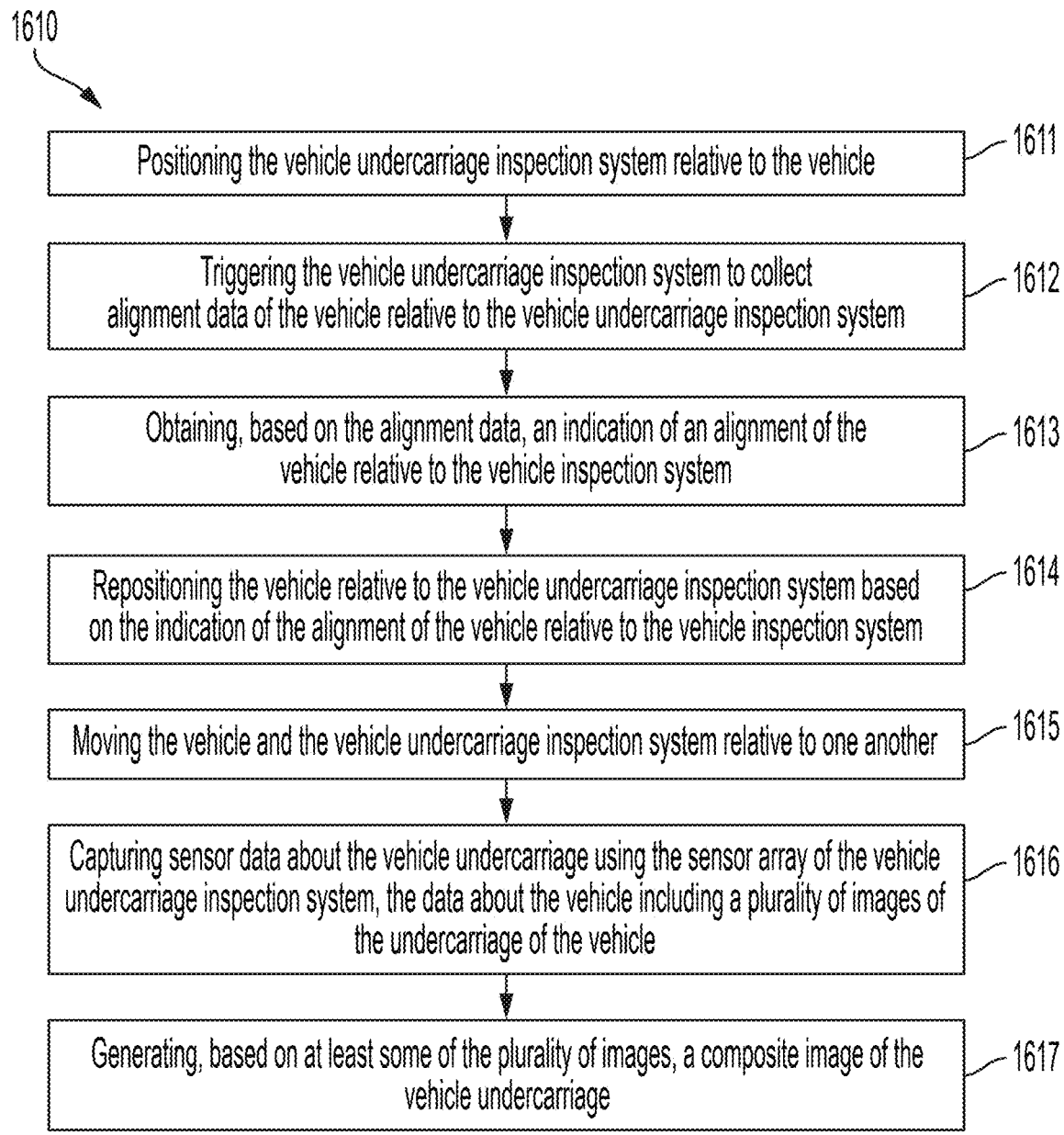
FIG. 16B is a flowchart of an illustrative process 1610 for preparing and using a vehicle undercarriage inspection system to perform a vehicle inspection, according to some embodiments of the technology described herein.

FIG. 16B is a flowchart of an illustrative process 1610 for preparing and using a vehicle undercarriage inspection system to perform a vehicle inspection, according to some embodiments. In some embodiments, the vehicle undercarriage inspection system used in performing process 1610 includes a sensor array with first, second and third cameras configured to capture images at different angles relative to the vehicle undercarriage, and a sensor configured to output data indicative of the position and/or motion of the vehicle relative to the vehicle undercarriage inspection system. In some embodiments, the vehicle undercarriage inspection system is configured as described with reference to FIGS. 7-9B. Some steps of process 1610 may be performed by an inspector and some steps may be performed by one or more components of the vehicle undercarriage inspection system.

Process 1610 begins with step 1611 by positioning the vehicle undercarriage inspection system relative to the vehicle. In some embodiments, vehicle undercarriage inspection system may be positioned as described with reference to FIGS. 3A-F, with the vehicle undercarriage inspection system positioned in front of a vehicle. In some embodiments, an inspector may perform step 1611. In some embodiments step 1611 may be performed automatically by the vehicle undercarriage inspection system. In some embodiments step 1611 may be performed in part by an inspector and in part by the vehicle undercarriage inspection system.

Next, step 1612 is performed by triggering the vehicle undercarriage inspection system to collect alignment data of the vehicle relative to the vehicle undercarriage inspection system. In some embodiments, the triggering is performed automatically by the vehicle undercarriage inspection system. In some embodiments the triggering is performed automatically based on signals obtained from one or more sensors of the undercarriage inspection system, such as TOF sensors, and/or cameras. In some embodiments, the triggering is performed when the vehicle is determined to be at one or more positions relative to the vehicle undercarriage inspection system based on sensor data.

In some embodiments, the triggering is performed manually by an inspector by providing one or more inputs to a vehicle undercarriage inspection system, such as through a user interface or other inputs as described herein.

In some embodiments, the alignment data includes data from one or more TOF sensors of the vehicle undercarriage inspection system, as described herein. For example, the alignment data may include data collected by TOF sensors of the vehicle undercarriage imaging system as described with reference to FIGS. 7-9B. In some embodiments, the alignment data includes data from one or more cameras of the vehicle undercarriage inspection system.

Next, step 1613 is performed by obtaining, based on the alignment data, an indication of an alignment of the vehicle relative to the vehicle inspection system. In some embodiments, the indication of alignment may be determined by the vehicle undercarriage inspection system. In some embodiments, the indication of alignment may be determined by an alignment verification module, such as module 932 as described with reference to FIG. 9B. In some embodiments, the indication of alignment may be provided on a display of the vehicle undercarriage inspection system, as described in herein.

Next, step 1614 is performed by repositioning the vehicle relative to the vehicle undercarriage inspection system based on the indication of the alignment of the vehicle relative to the vehicle inspection system. In some embodiments, step 1614 may be performed by an inspector or another individual. In some embodiments step 1614 may be performed automatically by the vehicle undercarriage inspection system. In some embodiments step 1614 may be performed in part by an inspector or other individual and in part automatically the vehicle undercarriage inspection system. In some embodiments, the indication of alignment includes a direction for repositioning, and step 1614 may be performed based on the direction for repositioning.

In some embodiments, steps 1611-1614 may be iterated until the vehicle is determined to be properly aligned.

Next, step 1615 is performed by moving the vehicle and the vehicle undercarriage inspection system relative to one another. In some embodiments, the vehicle may be driven over the vehicle undercarriage inspection system, such as described with reference to FIGS. 3A-F. The vehicle may be driven by an inspector or by another individual. In some embodiments, the vehicle undercarriage inspection system may move relative to the vehicle. For example, the vehicle undercarriage inspection system may move beneath and/or around the vehicle.

Next, step 1616 is performed by capturing sensor data about the vehicle undercarriage using the sensor array of the vehicle undercarriage inspection system, the data about the vehicle including a plurality of images of the undercarriage of the vehicle.

Next, step 1617 is performed by generating, based on at least some of the plurality of images, a composite image of the vehicle undercarriage. In some embodiments, the composite image is generated in part by determining pixel shift distances between images of the plurality of images, aligning images of the plurality of images, cropping the aligned images, estimating the speed of the vehicle in the images, and combining the images based on the vehicle speed, as described with reference to FIGS. 10-11G. In some embodiments, the vehicle speed may be determined based on pixel shift distances. In some embodiments, the vehicle may be determined based on pixel shift distances and data obtained from a TOF sensor. In some embodiments, the composite image may be displayed and/or otherwise provided for a vehicle inspector for review.

Following the conclusion of process 1610, the inspector may proceed to conduct a further vehicle inspection. Accordingly, in some embodiments, the inspector may use the composite image and/or targeted professional inspection instructions to determine particular techniques to use during the further vehicle inspection (e.g., to check for the potential vehicle defects).

Additionally, or alternatively, the inspector may be a potential buyer who may use the composite image to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 16C:
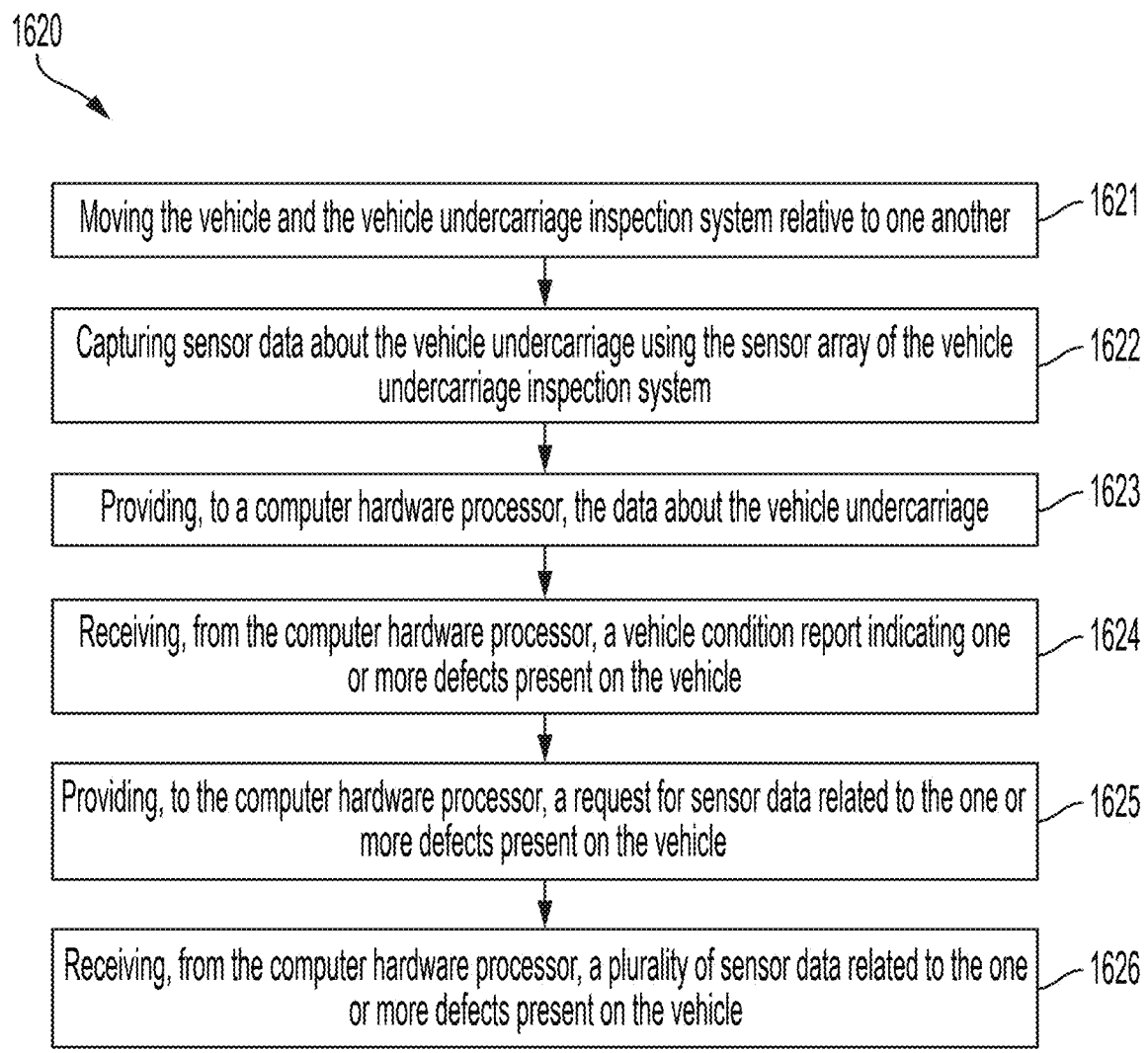
FIG. 16C is a flowchart of an illustrative process 1620 for using a vehicle undercarriage inspection system to analyze vehicle conditions, according to some embodiments of the technology described herein.

FIG. 16C is a flowchart of an illustrative process 1620 for using a vehicle undercarriage inspection system to analyze vehicle conditions, according to some embodiments. In some embodiments, the vehicle undercarriage inspection system used in performing process 1620 includes a sensor array with first, second and third cameras configured to capture images at different angles relative to the vehicle undercarriage, and a sensor configured to output data indicative of the position and/or motion of the vehicle relative to the vehicle undercarriage inspection system. In some embodiments, the vehicle undercarriage inspection system is configured as described with reference to FIGS. 7-9B. Some steps of process 1620 may be performed by an inspector and some steps may be performed by one or more components of the vehicle undercarriage inspection system.

Process 1620 begins at step 1621 by moving the vehicle and the vehicle undercarriage inspection system relative to one another. In some embodiments, the vehicle may be driven over the vehicle undercarriage inspection system, such as described with reference to FIGS. 3A-F. The vehicle may be driven by an inspector or by another individual. In some embodiments, the vehicle undercarriage inspection system may move relative to the vehicle. For example, the vehicle undercarriage inspection system may move beneath and/or around the vehicle.

Next, step 1622 is performed by capturing sensor data about the vehicle undercarriage using the sensor array of the vehicle undercarriage inspection system.

Next step 1623 is performed by providing, to a computer hardware processor, the data about the vehicle undercarriage. In some embodiments, the computer hardware processor is a component of the vehicle undercarriage inspection system. In some embodiments the computer hardware processor is a processor remote from the vehicle undercarriage inspection system. In some embodiments, the data may be formatted and/or processed before it is provided to the computer hardware processor. For example, the data may be processed as described with reference to the components of processor 930, as discussed with reference to FIG. 9B. In some embodiments, the data about the vehicle undercarriage includes a composite image of the vehicle undercarriage, as described herein with reference to FIGS. 10-11G.

Next, step 1623 is performed by receiving, from the computer hardware processor, a vehicle condition report indicating one or more defects present on the vehicle. In some embodiments, the condition report includes data related to the vehicle, for example as described with reference to FIG. 2. In some embodiments, data of a vehicle condition report may be determined using one or more machine learning models, such as those described herein with reference to FIGS. 13A-C. In some embodiments, the vehicle condition report may be displayed and/or otherwise provided for a vehicle inspector for review.

Next step 1625 is performed by providing, to the computer hardware processor, a request for sensor data related to the one or more defects present on the vehicle. In some embodiments, step 1625 may be performed by an inspector, such as by providing one or more inputs to the vehicle undercarriage inspection system, such as through a user interface of the vehicle undercarriage inspection system, as described herein. In some embodiments, the vehicle condition report may include one or more selectable inputs related to the defects. In some embodiments, the request may be provided by selecting a region of a vehicle undercarriage composite image, such as described with reference to FIG. 12.

Next, step 1626 is performed by receiving, from the computer hardware processor, a plurality of sensor data related to the one or more defects present on the vehicle. In some embodiments, the plurality of sensor data includes the sensor data used in determining the one or more defects are present. In some embodiments, the plurality of sensor data is provided in one or more visual displays, such as charts, plots, images and/or other visual displays. In some embodiments the plurality of sensor data includes a plurality of images of the defect, such as described with reference to FIG. 12. In some embodiments, the plurality of sensor data may be displayed and/or otherwise provided for a vehicle inspector for review.

Following the conclusion of process 1620, the inspector may proceed to conduct a further vehicle inspection. Accordingly, in some embodiments, the inspector may use the sensor data related to the one or more defects and/or targeted professional inspection instructions to determine particular techniques to use during the further vehicle inspection (e.g., to check for the potential vehicle defects).

Additionally, or alternatively, the inspector may be a potential buyer who may use sensor data related to the one or more defects to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

FIGS. 17A-H illustrate example vehicle exterior inspection systems, according to some embodiments.

Figure 17A:
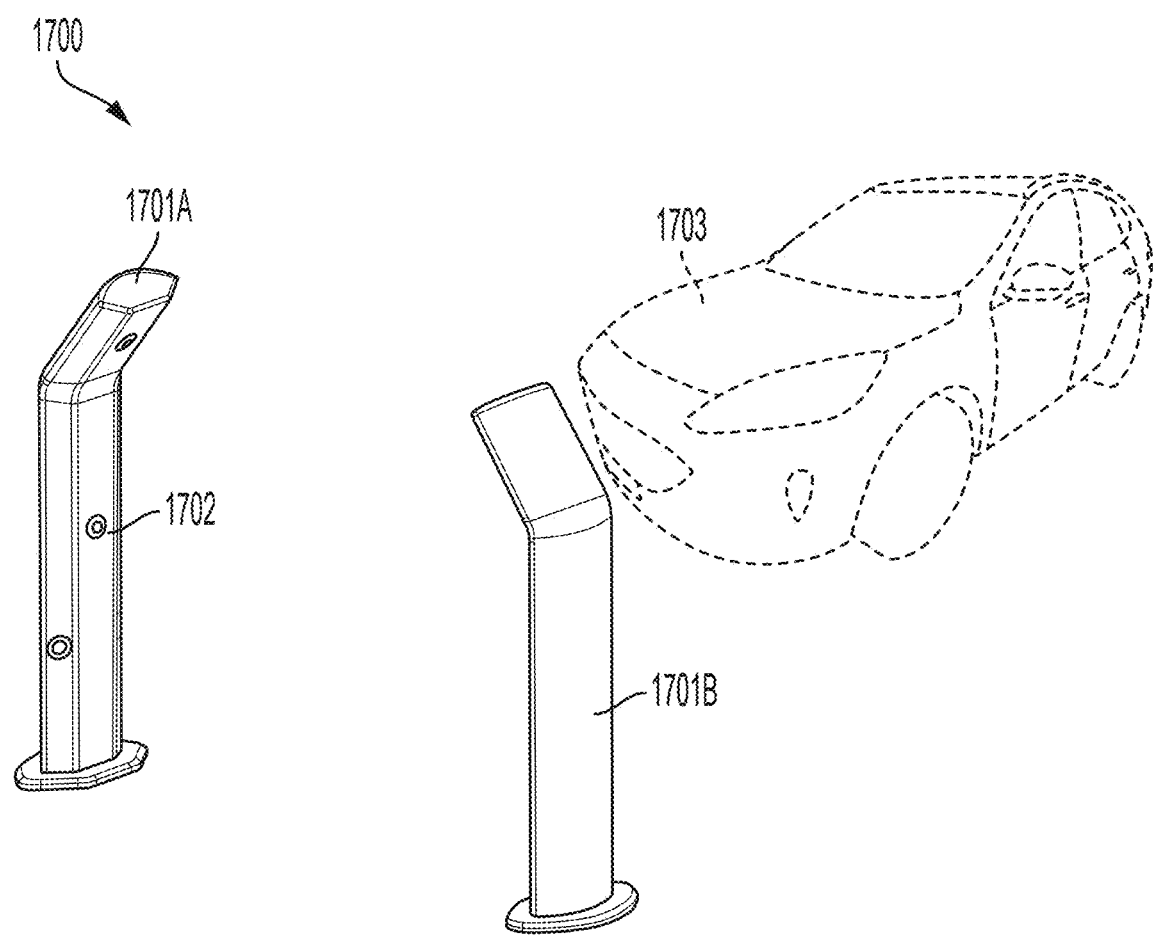
FIG. 17A illustrates an example vehicle exterior inspection system with two support members, according to some embodiments of the technology described herein.

FIG. 17A illustrates an example vehicle exterior inspection system with two support members, according to some embodiments. Vehicle inspection system 1700 includes support members 1701A and 1701B. The support members include sensor arrays 1702, which may be oriented at different angles, as described herein. The sensor arrays may include multiple sensors for recording data about vehicle 1703. Data may be recorded about vehicle 1703 as the vehicle drives past support members 1701A and 1701B.

Figure 17B:
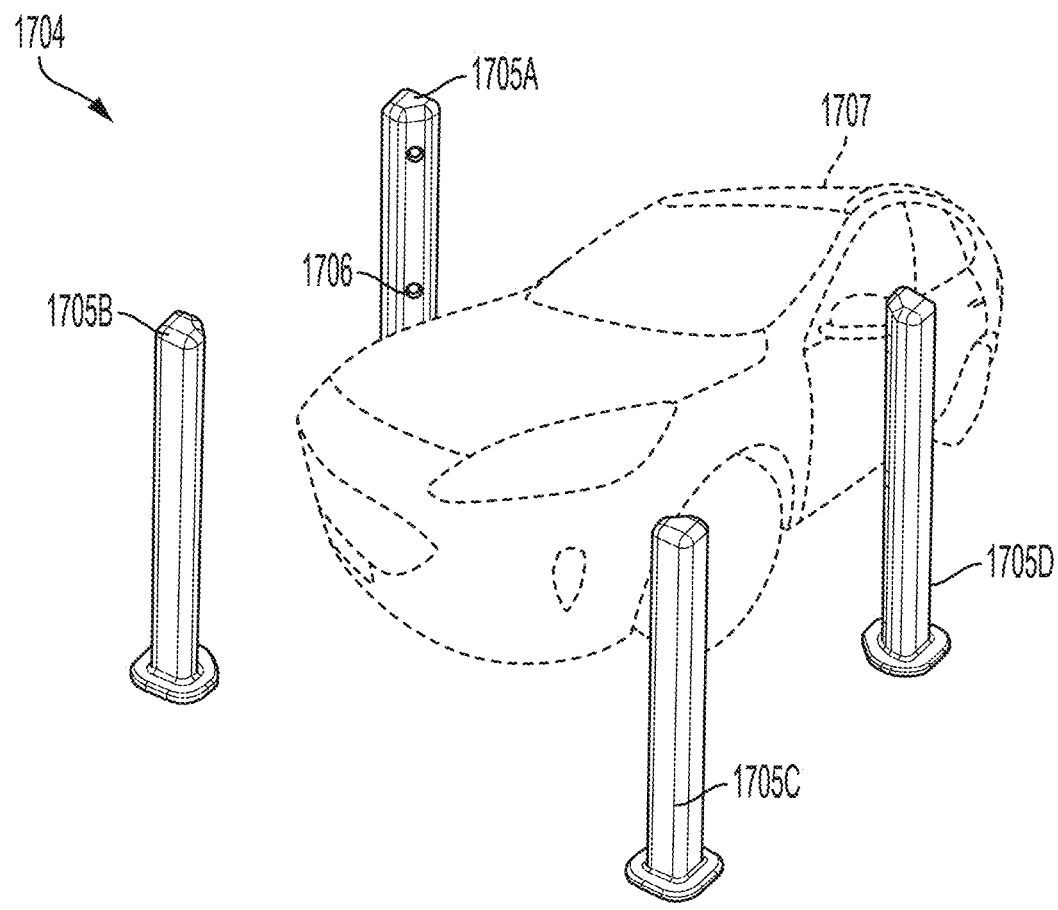
FIG. 17B illustrates an example vehicle exterior inspection system with four support members, according to some embodiments of the technology described herein.

FIG. 17B illustrates an example vehicle exterior inspection system with four support members, according to some embodiments. Vehicle inspection system 1704 includes support members 1705A-D. The support members include sensor arrays 1706, which may be oriented at different angles, as described herein. As shown, the support members 1705A-D are positioned at different angles relative to each other. The sensor arrays 1706 may include multiple sensors for recording data about vehicle 1707. Data may be recorded about vehicle 1707 as the vehicle drives past support members 1705A-D.

Figure 17C:
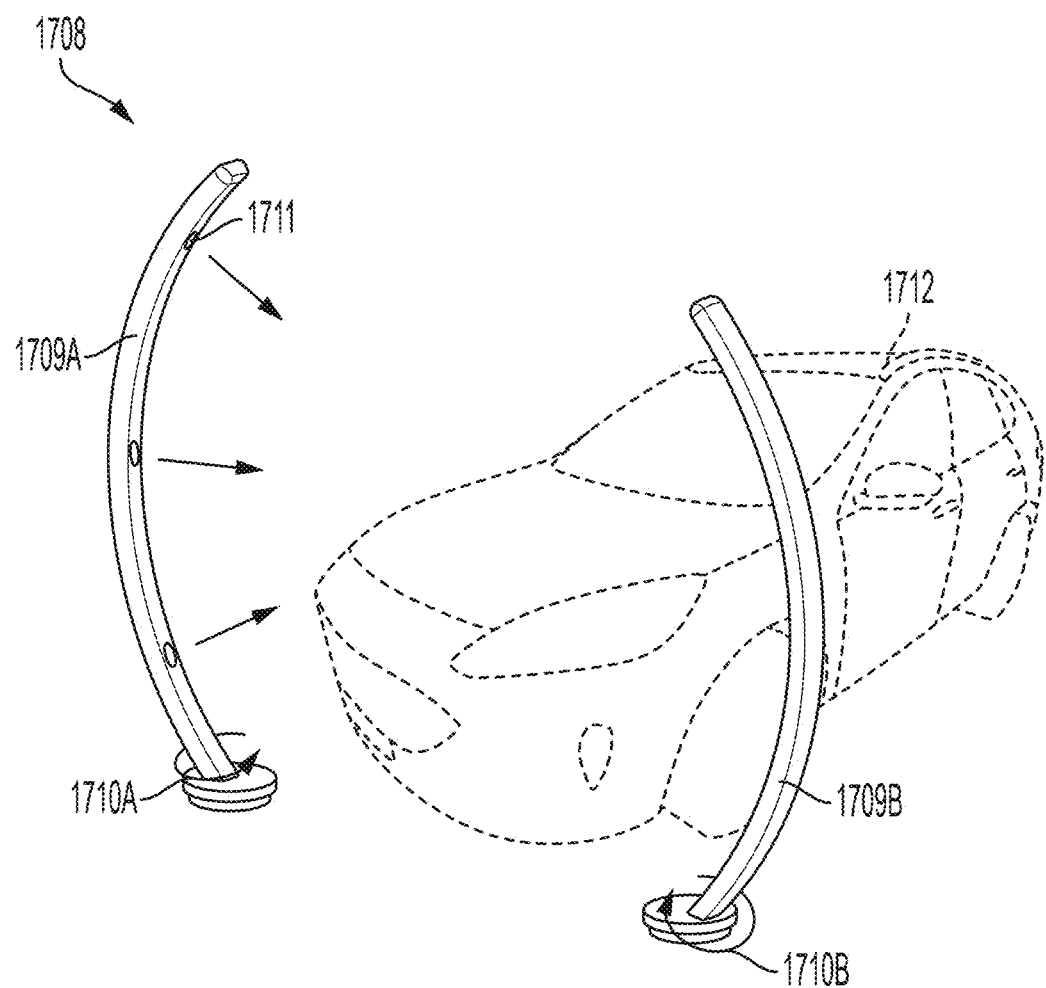
FIG. 17C illustrates an example vehicle inspection system with rotating support members, according to some embodiments.

FIG. 17C illustrates an example vehicle inspection system with rotating support members, according to some embodiments. Vehicle inspection system 1708 includes 2 support members, 1709 A and 1709 B. The two support members 1709 A and 1709 B contain multiple sensor arrays 1711. The sensor arrays 1711 may include multiple sensors, as described herein. The support members 1709 A and 1709 B may be configured to rotate as vehicle 1712 drives between these support members, in order to capture data from multiple angles relative to the vehicle. The support members 1709 A and 1709 B may rotate as shown by respective arrows 1710 A and 1710 B. Data may be recorded about vehicle 1712 as the vehicle drives past support members 1709 A and 1709 B.

Figure 17D:
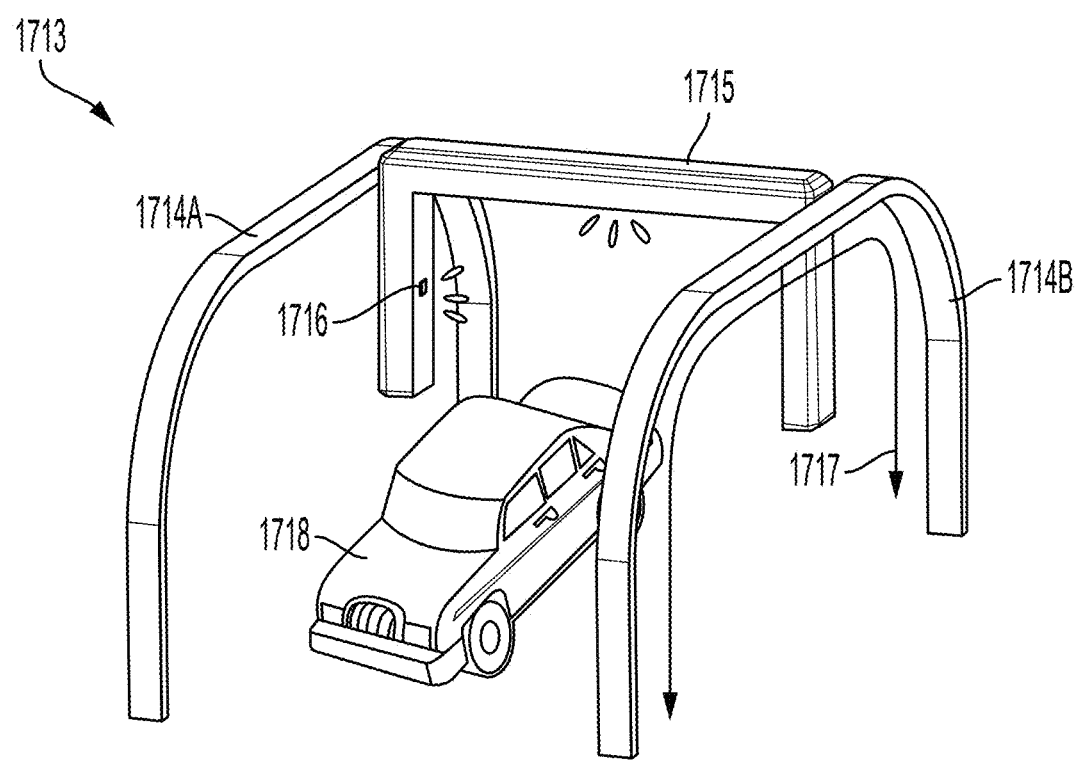
FIG. 17D illustrates an example vehicle inspection system with a moving sensor array, according to some embodiments of the technology described herein.

FIG. 17D illustrates an example vehicle inspection system with a moving sensor array, according to some embodiments. As shown, vehicle inspection system 1713 includes frame members 1714 A and 1714 B. The frame members support sensor array component 1715. Sensor array component 1715 includes multiple sensor arrays 1716. Sensor arrays 1716 may include multiple sensors, as described herein. As shown vehicle 1718 is parked between frame members 1714 A and 1714 B. The sensor array component 1715 may move along frame members 1714 A and 1714 B to capture data from multiple portions of the exterior of the vehicle 1718. The sensor array component may move along arrow 1717 to capture the data about the vehicle 1718.

Figure 17E:
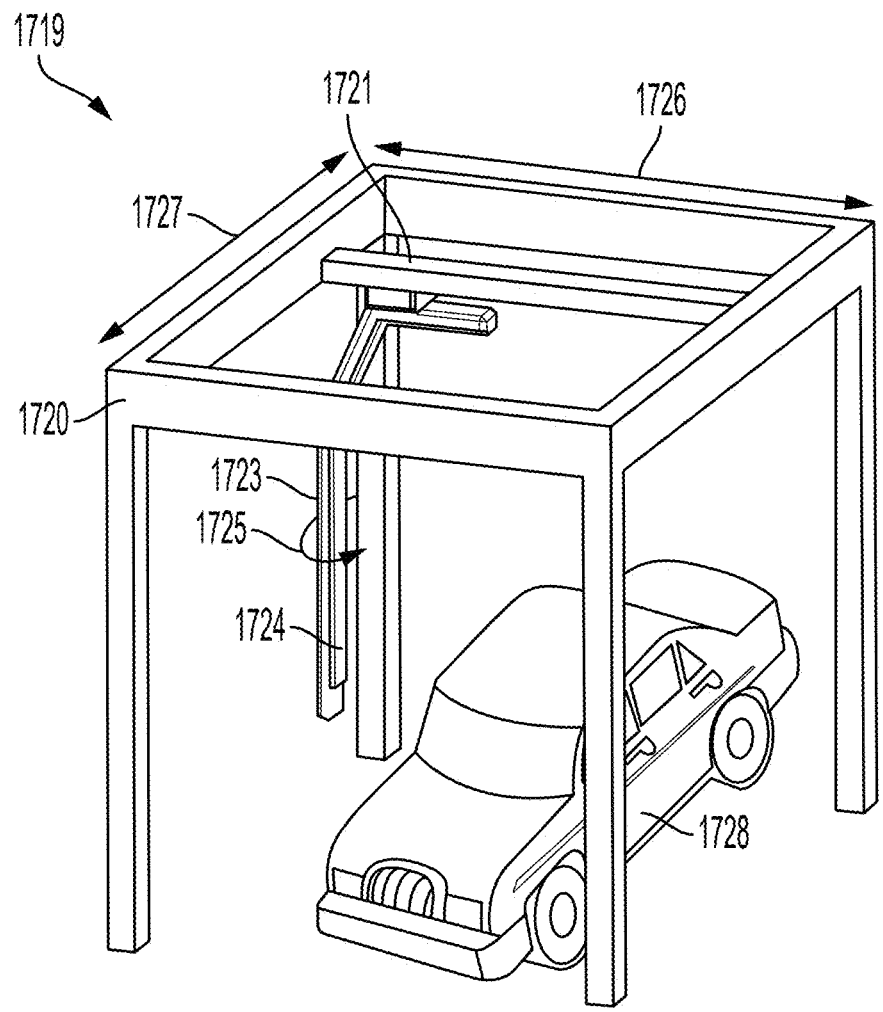
FIG. 17E illustrates an example vehicle exterior inspection system with a frame and a moving and rotating sensor array, according to some embodiments of the technology described herein.

FIG. 17E illustrates an example vehicle exterior inspection system with a frame and a moving and rotating sensor array, according to some embodiments. Vehicle inspection system 1719 includes frame 1720. Vehicle 1728 is parked within frame 1720. Sensor array 1724 is attached to a rotating component 1723, and rotating component 1723 is attached to sliding component 1721. The sensor array may be moved around the vehicle 1728 to capture data from multiple portions of the vehicle, as described herein. Sliding component 1721 may move the rotating component 1723 along directions 1726 and 1727. Rotating component 1723 may rotate as shown by arrow 1725 as it is moved by the sliding component 1721 to capture data from different portions of the vehicle 1728.

Figure 17F:
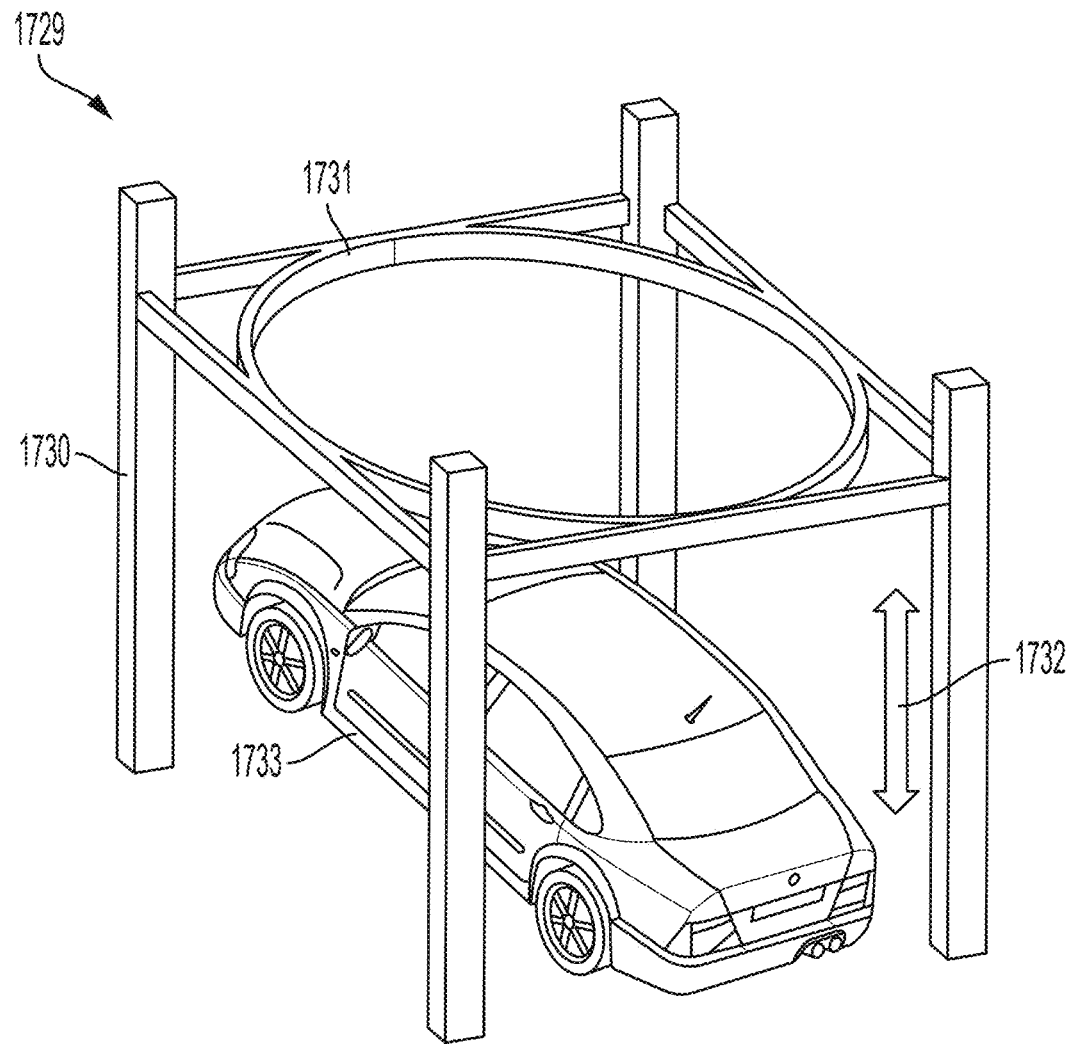
FIG. 17F illustrates an example vehicle exterior inspection system with a frame and a moving sensor array, according to some embodiments of the technology described herein.

FIG. 17F illustrates an example vehicle exterior inspection system with a frame and a moving sensor array, according to some embodiments. Vehicle exterior inspection system 1729 includes frame 1730. Frames 1730 includes 4 pillars which support sensor array 1731. Sensor array 1731 may include multiple sensors to capture data about vehicle 1733, as described herein. Sensor array 1731 may move along direction 1732 to capture data about vehicle 1733. As shown, sensor array 1731 is shaped as a ring which may encompass vehicle 1733 as it is moved along direction 1732. Accordingly, sensor array 1731 may capture data from multiple angles of vehicle 1733.

Figure 17G:
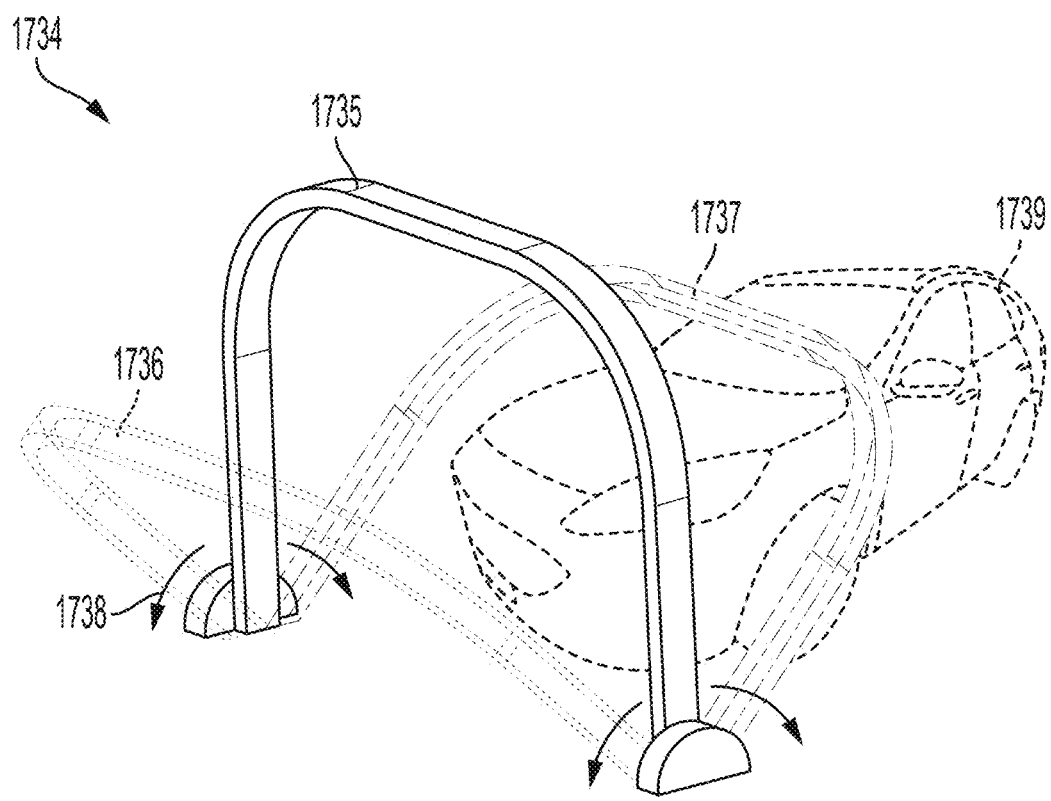
FIG. 17G Illustrates an example vehicle exterior inspection system with a pivoting frame, according to some embodiments of the technology described herein.

FIG. 17G Illustrates an example vehicle exterior inspection system with a pivoting frame, according to some embodiments. Vehicle exterior inspection system 1734 includes frame 1735. Frame 1735 may pivot between position 1736 and 1737 to capture data about vehicle 1739, from multiple angles. Frame 1735 may move as shown by arrows 1738. Frame 1735 may support one or more sensor arrays to capture data about vehicle 1739, as described herein. In some embodiments frame 1735 may move as vehicle 1739 is driven beneath frame 1735. In some embodiments, frame 1735 may move well vehicles 1739 is parked beneath frame 1735.

Figure 17H:
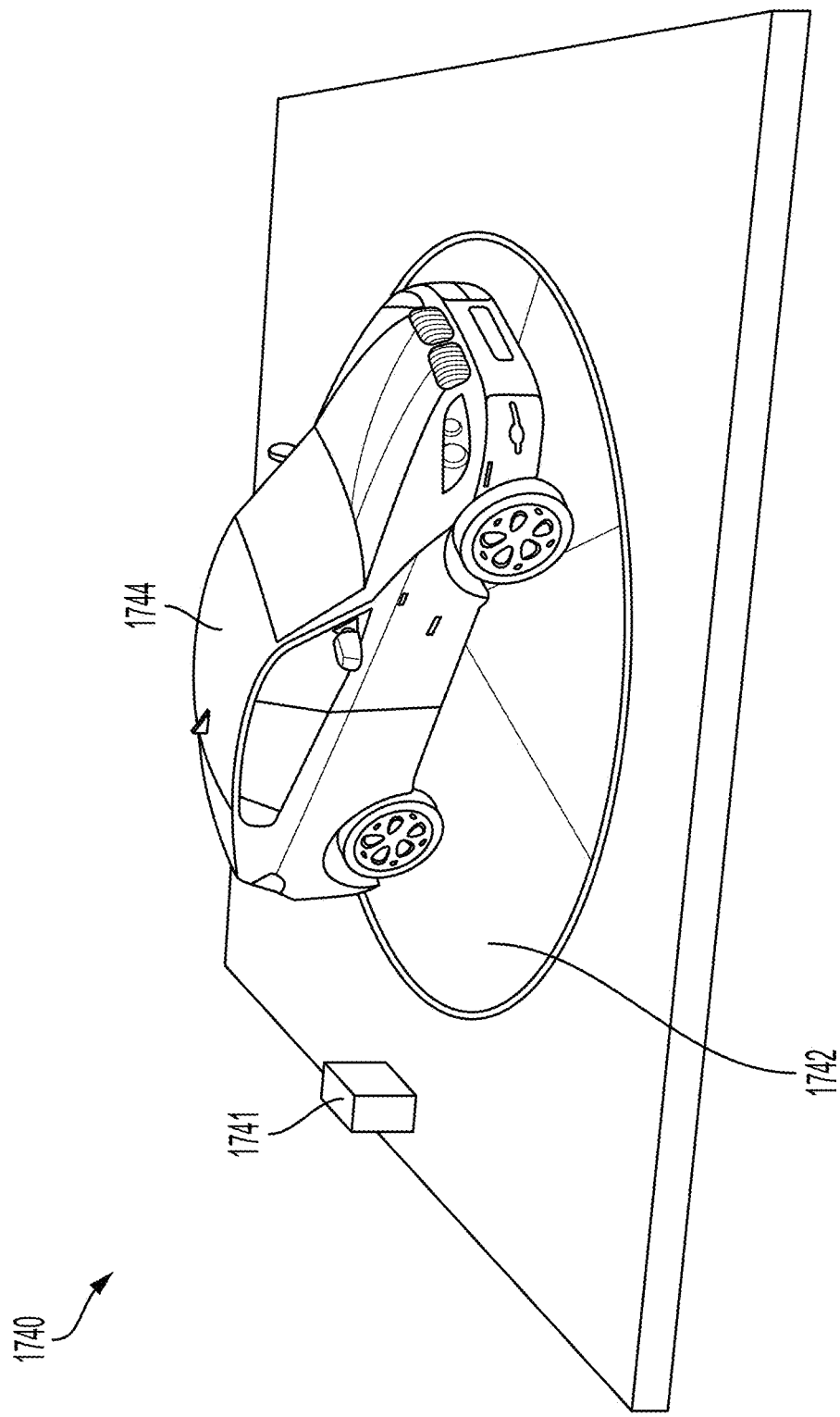
FIG. 17H Illustrates an example vehicle exterior inspection system with a turntable, according to some embodiments of the technology described herein.

FIG. 17H Illustrates an example vehicle exterior inspection system with a turntable, according to some embodiments. Vehicle exterior inspection system 1740 includes sensor array 1741 which may include multiple sensors to capture data about vehicle 1744, as described herein. Vehicle 1744 is positioned on turntable 1742 which may rotate such that the sensor array 1741 may capture data from multiple angles of vehicle 1744.

Figure 18C:
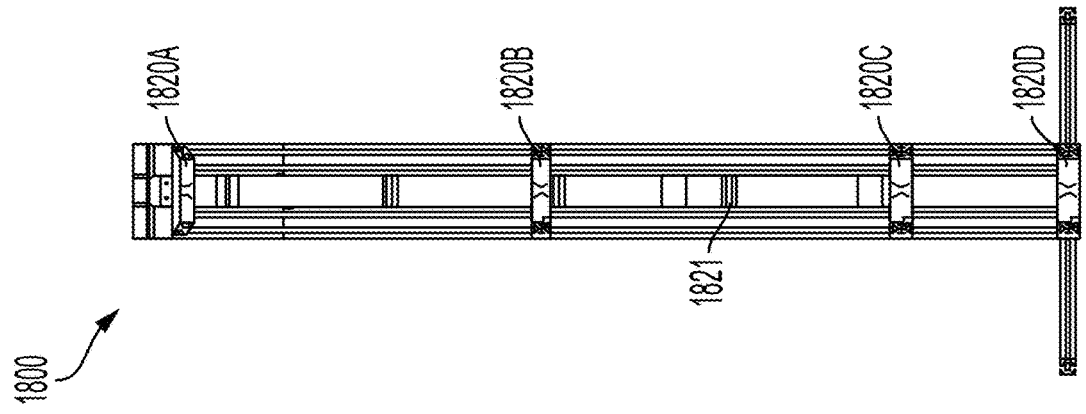
FIGS. 18A-C illustrate an example support member of a vehicle exterior inspection system, according to some embodiments of the technology described herein.
Figure 18B:
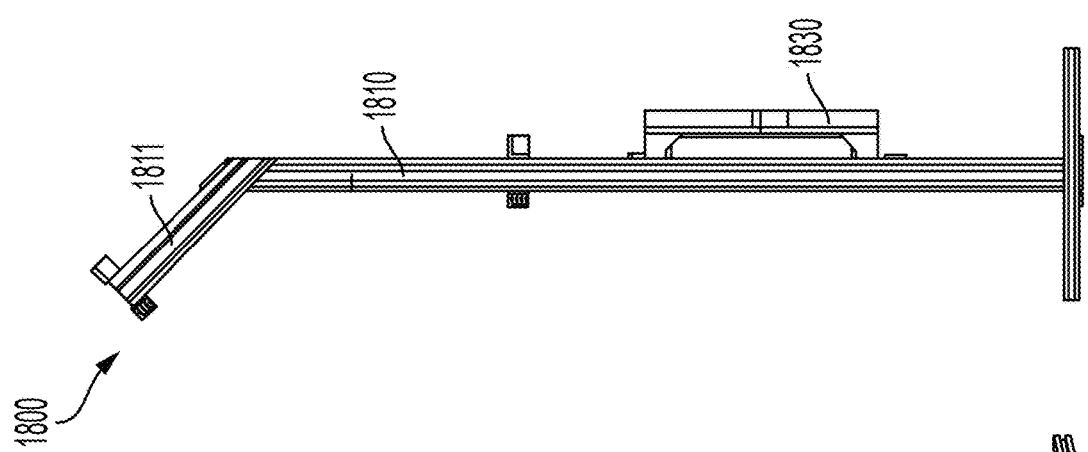
Figure 18A:
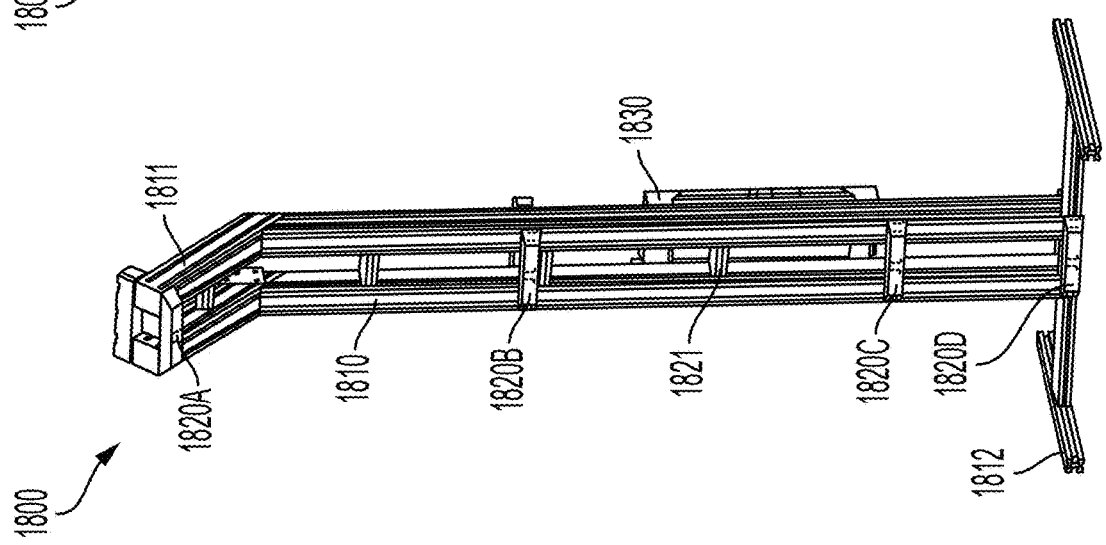

FIGS. 18A-C illustrate an example support member of a vehicle exterior inspection system, according to some embodiments. Support member 1800 includes sensor arrays 1820A-D, and 1821. Sensor arrays 1820A-D include three cameras, each camera oriented in a different direction, and may include additional sensors as described herein. In some embodiments, the sensor arrays are shaped as a trapezoid, with a camera oriented three sides of the trapezoid. In some embodiments, sensor arrays 1820A-D include light sources. Sensor array 1821 may include sensors such as microphones, air quality sensors, and/or TOF sensors, among other sensors as described herein. In some embodiments, sensor array 1821 includes a light source. Support member 1800 includes multiple portions, including angled portion 1811 and vertical portion 1810. In some embodiments, the support member 1800 may be used in conjunction with a second support member to capture data from a vehicle. In some embodiments, the support member 1800 may capture data from a vehicle as the vehicle is driven past support member 1800.

Sensor array 1820A is positioned on angled portion 1811. Angled portion 1811 may be angled relative to vertical portion 1810 such that the sensors of sensor array 1820A may capture data from the roof of a vehicle. Vertical portion 1810 may be oriented substantially vertically, as shown in FIGS. 18A-C. Sensor array 1820B is positioned on vertical portion 1810 and may be configured to capture data about the sides of a vehicle. Sensor array 1820C is positioned on vertical portion 1810 and may be configured to capture data from lower portions of a vehicle, such as wheels, tires and/or rocker panels. Sensor array 1820D is positioned at the bottom of vertical portion 1810 and may be configured to capture images of lower portions of a vehicle including wheels, tires and/or rocker panels. In some embodiments, sensor array 1820D is angled to capture data from a vehicle. Sensor array 1821 is positioned on the vertical portion 1810 and may be configured to capture signals from a side of a vehicle.

Support member 1800 additionally includes base 1812, which allows the support member 1800 to stand.

Support member 1800 additionally includes housing 1830 which may include one or more components of the vehicle exterior imaging system. For example, housing 1830 may include components such as circuitry, processors, heat management components, inputs, a power supply, routers, and/or networking components, among other components as described herein. As shown, housing 1830 is attached to vertical portion 1810.

In some embodiments, support member 1800 is collapsible between a stowed and a deployed configuration. For example, one or more components such as vertical portion 1810 base, 1812, and angled portion 1811 may be telescoping and/or may have hinges or other features for folding or collapsing. As shown, in FIGS. 18A-C support member 1800 is in the deployed configuration.

Figure 18D:
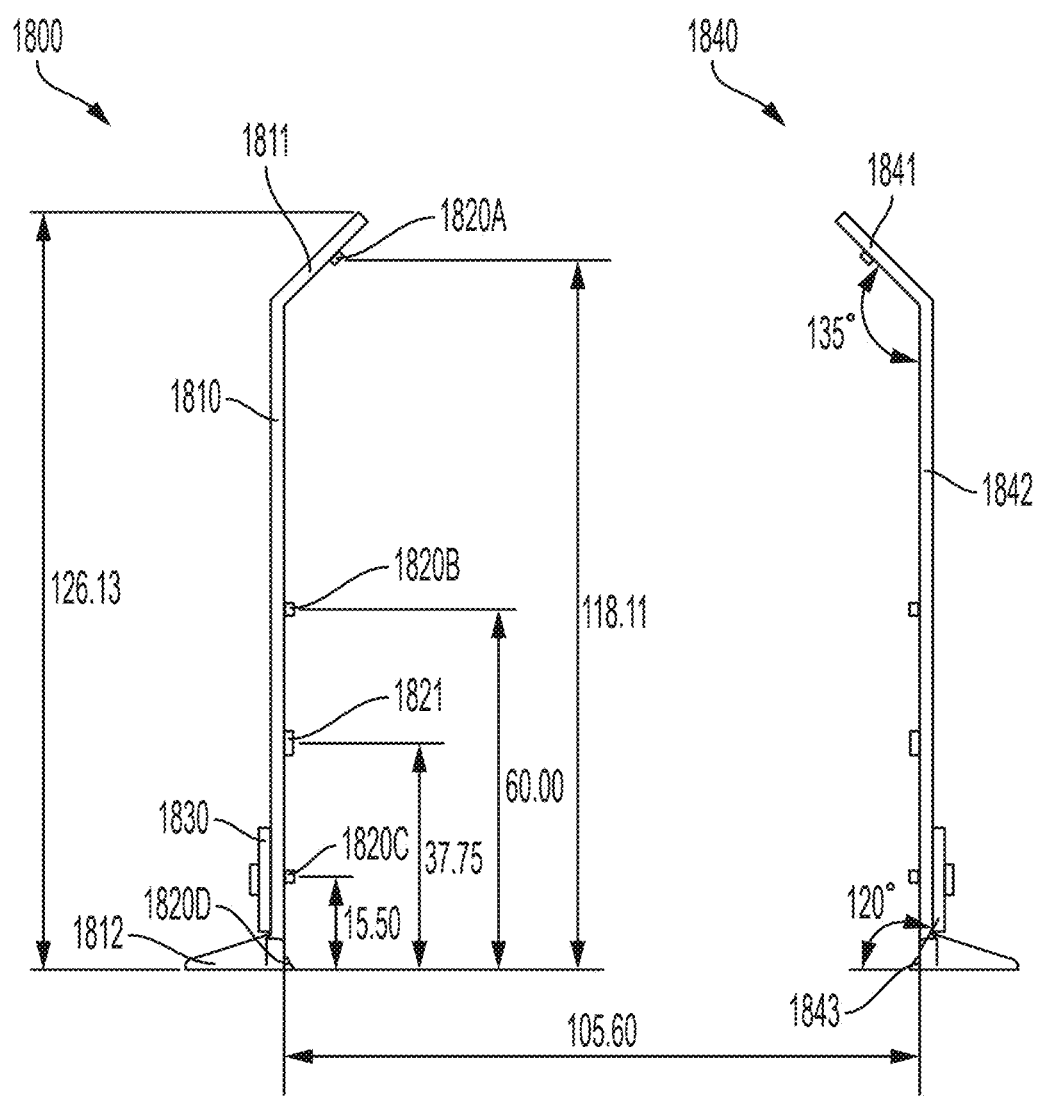
FIG. 18D illustrates an example vehicle exterior imaging system, according to some embodiments of the technology described herein.

FIG. 18D illustrates an example vehicle exterior imaging system, according to some embodiments. The vehicle exterior imaging system includes two support members, 1800 and 1840. FIG. 18D includes example dimensions in inches for the positioning of various components. For example, support member 1800 has a height of 126.13 in, and is positioned 105.6 in from support member 1840.

Sensor array 1820C is positioned at a height of 15.5 in, but may be adjusted to any suitable height, for example between 0 and 50 in. Sensor array 1821 is positioned at a height of 37.75 in but may be adjusted to any suitable height for example between 0 and 80 in. Sensor array 1820B is positioned at a height of 60 in but may be adjusted to any suitable height, for example between 20 and 100 in. Sensor array 1820A is positioned at a height of 118.11 in but may be adjusted to any suitable height, for example between 100 and 125 in.

The dimensions are shown by way of example only and may vary to be greater or smaller due to desired positioning and adjustability.

In addition, example angles are shown in FIG. 18D. For example, angled portion 1841 is angled at 1350 from vertical portion 1842. In addition, sensor array 1843 is positioned at an angle of 120°. The angles are shown by way of example only and may vary to be greater or smaller by 5%, 10%, 20% or greater than 20%. In some embodiments, one or more angles of the vehicle exterior imaging system may be adjustable.

In some embodiments, a vehicle exterior imaging system, such as those described with reference to FIGS. 17A-18D may be configured to image many sizes of vehicles.

In some embodiments, a vehicle exterior imaging system may be capable of imaging vehicles having lengths between a minimum and maximum length. In some embodiments, the minimum length may be 60 inches, 80 inches, 100 inches, 120 inches, 150 inches, or any length between 60 and 150 inches. In some embodiments, the maximum length may be 200 inches, 220 inches, 240 inches, 260 inches, 280 inches, 290 inches, 300 inches, 320 inches, 350 inches, or any length between 200 and 350 inches.

In some embodiments, a vehicle exterior imaging system may be capable of imaging vehicles having heights between a minimum and maximum height. In some embodiments, the minimum height may be 35 inches, 40 inches, 45 inches, 50 inches, 55 inches, or any height between 35 and 55 inches. In some embodiments, the maximum height may be 90 inches, 95 inches, 100 inches, 105 inches, 110 inches, 115 inches, 120 inches, 125 inches, 150 inches, or any height between 90 and 150 inches.

In some embodiments, a vehicle exterior imaging system may be capable of imaging vehicles having widths between a minimum and maximum width. In some embodiments, the minimum width may be 45 inches, 55 inches, 60 inches, 65 inches, 70 inches, or any width between 45 and 70 inches. In some embodiments, the maximum width may be 85 inches, 90 inches, 95 inches, 100 inches, 105 inches, 110 inches, 115 inches, 120 inches, 150 inches, or any width between 85 and 150 inches.

In some embodiments, a vehicle exterior imaging system may be capable of imaging vehicles having wheelbases between a minimum and maximum lengths. In some embodiments, the minimum wheelbase length may be 60 inches, 70 inches, 80 inches, 90 inches, 100 inches, or any length between 60 and 100 inches. In some embodiments, the maximum length may be 160 inches, 170 inches, 180 inches, 190 inches, 200 inches, 210 inches, 220 inches, 250 inches, or any length between 160 and 250 inches.

In some embodiments, the minimum a maximum lengths, widths, heights and wheelbase lengths are determined based on a pixel density of a FOV of the cameras at that dimension.

In some embodiments, vehicle exterior inspection systems, as described herein are configured to capture complete exterior images of vehicles which are smaller than "oversized vehicles" according to U.S. National Size Specifications for Vehicles on Road.

In some embodiments, imaging of different sized vehicles is accomplished in part by the FOVs of cameras of vehicle exterior inspection systems. In some embodiments, cameras of a vehicle exterior inspection system have FOVs of up to 175° in any direction, up to 170° in any direction, up to 160° in any direction, up to 155° in any direction, up to 150° in any direction, up to 145° in any direction, up to 140° in any direction, up to 130° in any direction or up to 100° in any direction. In some embodiments, cameras of vehicle exterior inspection systems have different FOVs depending on their positions. For example, a camera configured to capture images of the side of a vehicle may have a horizontal FOV of 170° and a vertical FOV of 160°.

Figure 19:
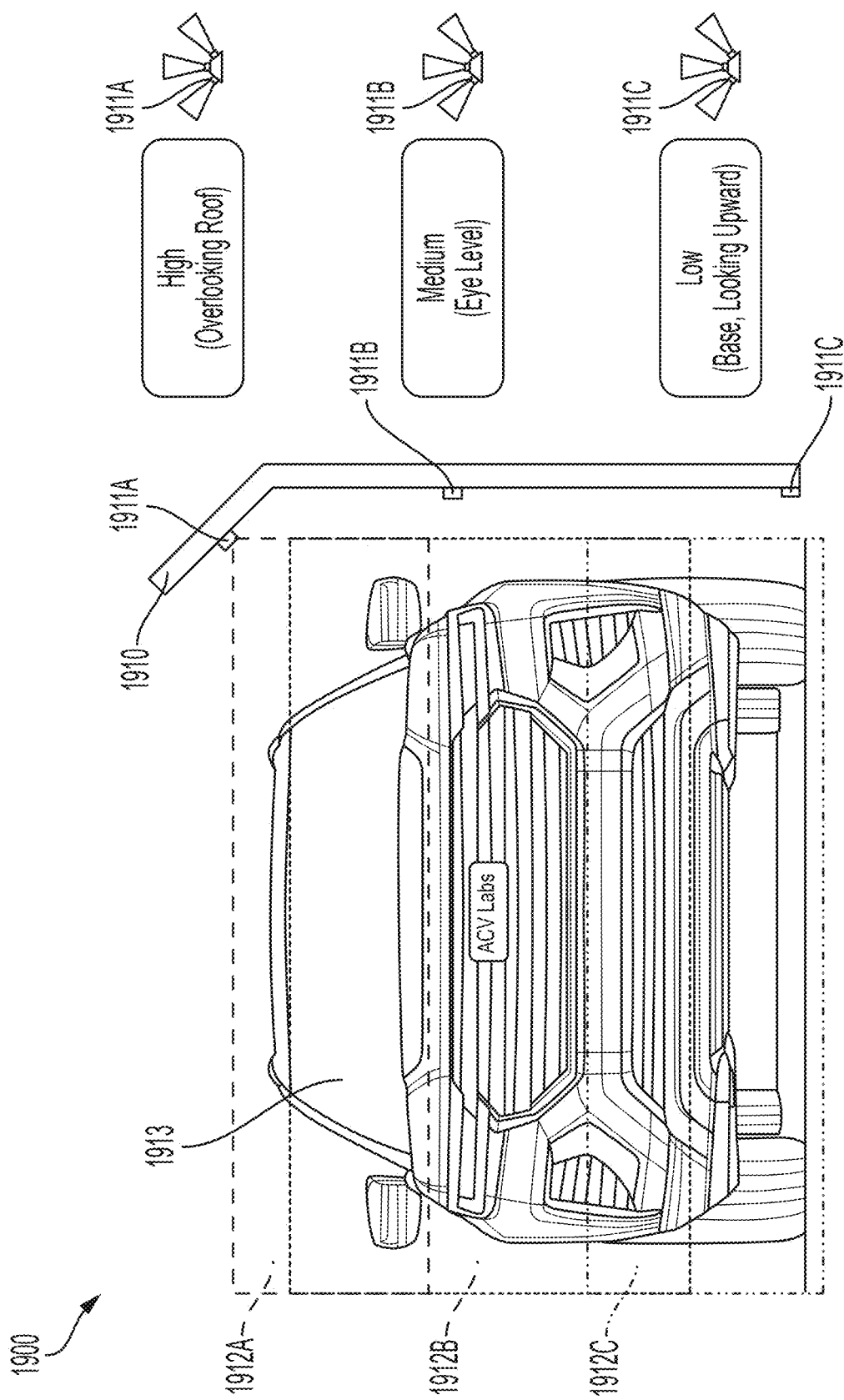
FIG. 19 shows an example of fields of view of camera sets of a vehicle exterior inspection system, according to some embodiments of the technology described herein.

FIG. 19 shows an example of fields of view of camera sets of a vehicle exterior inspection system, according to some embodiments. Shown is support member 1910 which is capturing data from vehicle 1913.

Support member 1910 includes three sensor arrays 1911A-C, however, may include greater or fewer sensor arrays, as described herein. As shown, sensor array 1911A is positioned on an angled portion of the support member and is overlooking the roof of the vehicle 1913. Sensor array 1911B is positioned at about eye level. Finally, sensor array 1911C is positioned low and is angled upwards towards the vehicle 1913.

Each sensor array 1911A-C includes a camera set with three cameras, oriented at different angles. The cameras of the camera set may have a camera angled in part into the page of FIG. 19, in part to the left of FIG. 19, and in part out of the page of FIG. 19. The orientation of the cameras of the camera sets of sensor arrays 1911A-C allow for images to be captured of different portions of the vehicle.

FIG. 19 includes the FOVs 1912A-C, respectively of cameras of camera sets of sensor arrays 1911A-C. FOV 1912A is of a camera of sensor array 1911A and is shown outlined in dashes. FOV 1912A includes the top portion of the vehicle and extends from above the roof of the vehicle to the hood of the vehicle. FOV 1912B is of a camera of sensor array 1911B and is shown outlined in dots. FOV 1912B is of the middle of the vehicle and extends from part of the wheels to the roof of the vehicle. FOV 1912C is of a camera of sensor array 1911C and is shown outlined in dots and dashes. FOV 1912C is of the lower part of the vehicle and extends from above the wheels of the vehicle to below the wheels of the vehicle.

As shown the FOVs overlap, therefore images of vehicle components may be captured by multiple cameras of the sensor arrays 1911A-C.

Figure 20:
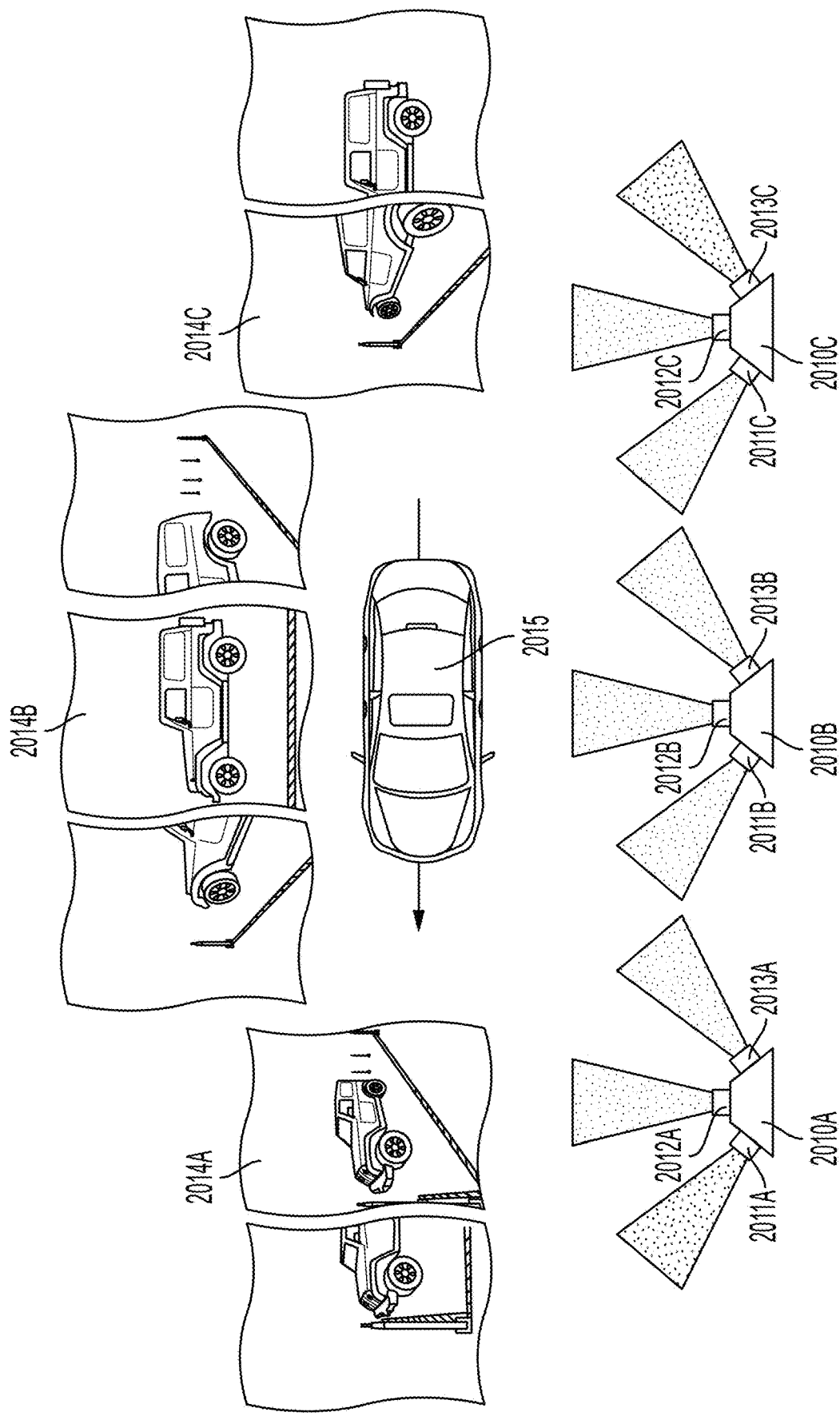
FIG. 20 illustrates an example of images captured by a vehicle exterior inspection system, according to some embodiments of the technology described herein.

FIG. 20 illustrates an example of images captured by a vehicle exterior inspection system, according to some embodiments. FIG. 20 shows sensor array, including a camera set, at three different points in time, as vehicle 2025 moves past the vehicle inspection system. The sensor array illustrated in FIG. 20 may be a sensor array as described herein, and/or may be included in a vehicle exterior inspection system, as described herein. The sensor array shown in FIG. 20 may be positioned on a vertical portion of a support member, such as sensor array 1911 of FIGS. 19 and/or 1820B of FIGS. 18A-D.

FIG. 20 includes sensor array 2010A, which represents a sensor array of a vehicle exterior inspection system, at a first point in time, as a vehicle approaches the vehicle exterior inspection system. As shown, sensor array 2010A includes a camera set with cameras 2011A, 2012A and 2013A. The camera set may capture image set 2014A, which includes two images. This is because the vehicle is within the FOV of two cameras, 2012A and 2013A. The leftmost image of image set 2014A shows the side of the vehicle, including the hood and front wheel, as the vehicle is alongside the vehicle exterior imaging system and is captured by camera 2012A. The rightmost image shows a view of the driver side of the vehicle from the front of the vehicle and was captured by camera 2013A. The vehicle 2015 is not within the FOV of camera 2011A, as the vehicle approaches the vehicle exterior imaging system at the first timepoint.

FIG. 20 includes sensor array 2010B, which represents a sensor array of a vehicle exterior inspection system, at a second point in time, as a vehicle 2015 is alongside the vehicle exterior inspection system. As shown, sensor array 2010B includes a camera set with cameras 2011B, 2012B and 2013B. The camera set may capture image set 2014B, which includes three images. This is because the vehicle is within the FOV of all three cameras, 2011B, 2012B and 2013B. The leftmost image of image set 2014B shows the front, driver's side of the vehicle, including the hood and front wheel, as the vehicle moves alongside the vehicle exterior imaging system and is captured by camera 2011B. The center image of image set 2014B shows the side of the vehicle 2015 as the vehicle is alongside the vehicle exterior inspection system and is captured by camera 2012B. The rightmost image shows a view of the rear driver side of the vehicle from captured from the center of the vehicle and is captured by camera 2013B.

FIG. 20 includes sensor array 2010C, which represents a sensor array of a vehicle exterior inspection system, at a third point in time, as a vehicle moves past the vehicle exterior inspection system. As shown, sensor array 2010C includes a camera set with cameras 2011C, 2012C and 2013C. The camera set may capture image set 2014C, which includes two images. This is because the vehicle is within the FOV of two cameras, 2011C and 2012C. The leftmost image of image set 2014C shows the driver's side of the vehicle, captured from the rear of the vehicle as the vehicle moves past the vehicle exterior imaging system and is captured by camera 2011C. The rightmost image shows a view of the rear driver side of the vehicle, including the rear wheel and trunk, and was captured by camera 2012C. The vehicle 2015 is not within the FOV of camera 2013C, as the vehicle moves past the vehicle exterior imaging system at the third timepoint.

Figure 21A:
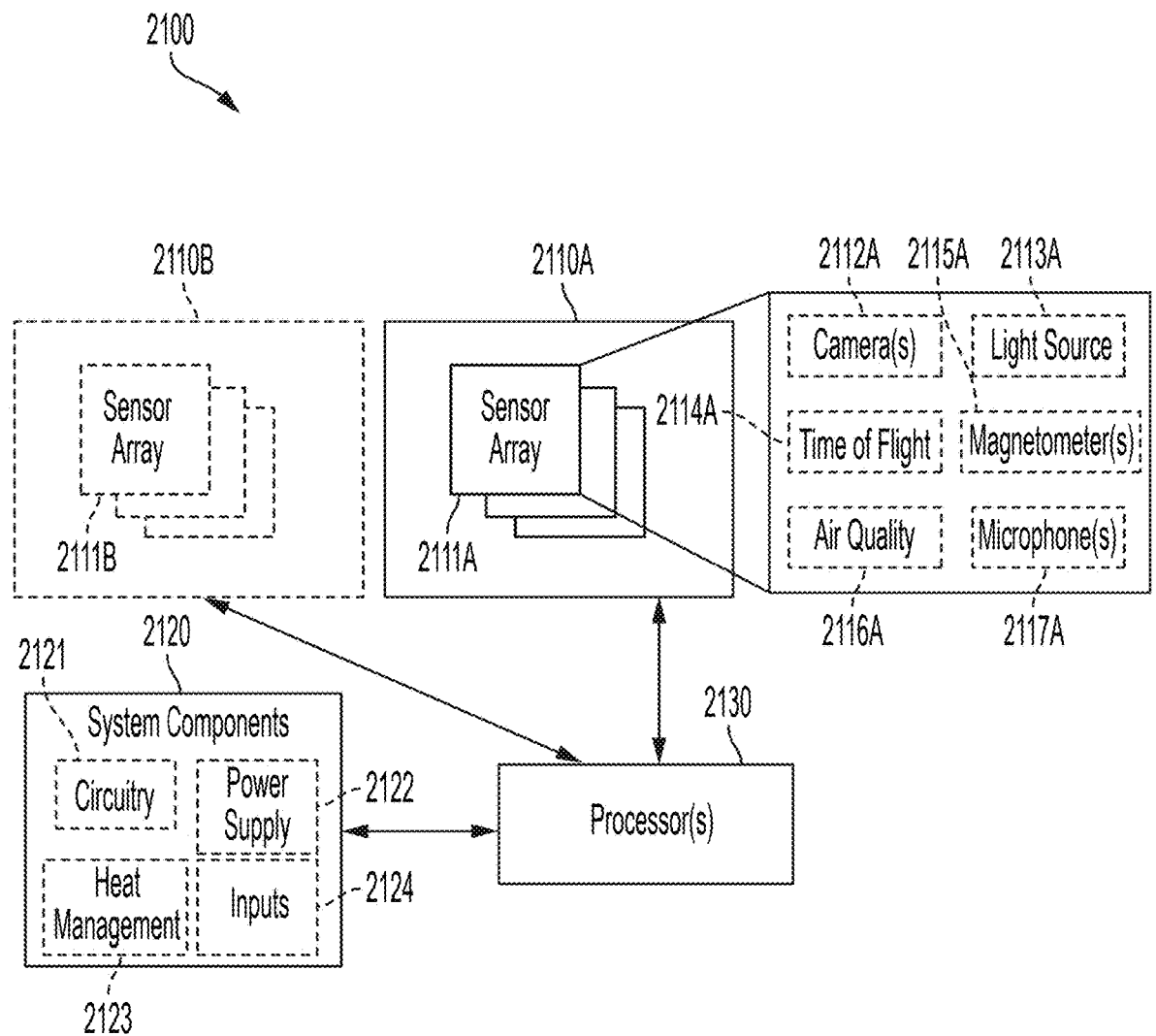
FIG. 21A is a diagram illustrating the components of a vehicle exterior inspection system, according to some embodiments of the technology described herein.

FIG. 21A is a diagram illustrating the components of a vehicle exterior inspection system, according to some embodiments. Vehicle exterior inspection system 2100 includes subsystems 2110A and 2110B, system components 2120, and processor(s) 2130. The vehicle exterior inspection system 2100 is an example vehicle exterior inspection system and may be configured as described herein, for example, as described with reference to FIGS. 17A-20. In some embodiments, subsystems 2110A and 2110B, system components 2120 and processors 2130 may be implemented in a single device and/or location. In some embodiments, the subsystems 2110A-B, system components 2120 and processors 2130 may be implemented in separate devices and/or locations. In some embodiments, the subsystems 2110A-B, system components 2120, and processors 2130 may be implemented in part in a single device and/or location and in part in separate and/or remote devices and/or locations.

Subsystems 2110A and 2110B may be portions of a vehicle exterior inspection system, such as support members or other portions which may support one or more sensor arrays, as described herein. In some embodiments, a vehicle exterior inspection system may include one or more subsystems for capturing data about a vehicle. As shown, the vehicle exterior inspection system 2100 includes two subsystems 2110A and 2110B, each of which includes respective sensor arrays 2111A and 2111B. In some embodiments, subsystems may include any suitable number of sensor arrays, for example, 1, 2, 3, 4, 5 or greater than 5 sensor arrays.

Components of a sensor array of sensor arrays 2111A are shown in FIG. 21A. These components include cameras 2112A, light source 2113A, magnetometers 2115A, air quality sensors 2116A, time of flight sensors 2114A, and microphones 2117A. In some embodiments, a sensor array may include greater or fewer sensor than those shown in FIG. 21A, as described herein.

Cameras 2112A may capture images of the exterior of a vehicle. The images may be captured as the vehicle and vehicle exterior inspection system move relative to one another. In some embodiments, the cameras 2112A may be configured as a camera set, as described herein. In some embodiments the cameras 2112A may include different types of cameras, for example, optical cameras, thermal cameras, and/or IR cameras. In some embodiments, the cameras 2112A may be oriented at different angles, as described herein. In some embodiments, the images captured by the cameras 2112A may be analyzed to determine one or vehicle characteristics and/or defects, as described herein.

Light source 2113A may be used to illuminate the vehicle exterior to facilitate capturing of images of the vehicle. In some embodiments, the light source 2113A may include one or more individual light sources which supply light to the vehicle exterior, as described herein. In some embodiments, the individual light sources of light source 2113A may be oriented at different angles, as described herein.

TOF sensors 2114A may capture data indicative of the position and/or motion of the vehicle relative to the vehicle exterior inspection system 2100. In some embodiments, the TOF sensors 2114A may capture data indicative of the position and/or motion of the vehicle relative to a vehicle inspection system, as described herein. In some examples, the TOF sensors 2114A may include multiple TOF sensors. In some embodiments, the TOF sensors 2114A may be oriented in different directions. In some embodiments, data collected by TOF sensors 2114A may be used in determining vehicle alignment with the vehicle exterior inspection system. In some embodiments, the data collected by TOF sensors 2114A may be used in controlling one or more components of the vehicle exterior inspection system 2100 and/or a vehicle inspection system.

Magnetometers 2115A may capture magnetic field signals from a vehicle. In some embodiments, the magnetic field signals are used to determine characteristics and/or defects of a vehicle, for example, a vehicle trim, drivetrain, make, model, presence of a catalytic converter, alternator performance, battery type, battery performance, and/or drivetrain performance, among other defects and/or characteristics as described herein. Techniques for analyzing vehicles using magnetometers are discussed in U.S. patent application Ser. No. 18/483,935, entitled: "Machine Learning and Magnetic Field Sensing Techniques for Vehicle Inspection and Condition Analysis," filed Oct. 10, 2023, which is incorporated by reference herein in its entirety.

Air quality sensors 2116A may record air quality data of the vehicle. In some embodiments, the air quality sensors are VOC sensors. In some examples, data recorded by the air quality sensors 2116A may be used to determine one or more defects such as fluid leaks, exhaust performance, and/or exhaust leaks.

Microphones 2117A may be used to record audio data from the undercarriage of a vehicle. The audio data may be used in determining one or more defects and/or characteristics of a vehicle, for example exhaust leaks, engine knocking, engine defects, and/or transmission whine, among other defects and/or characteristics, as described herein.

Vehicle exterior inspection system 2100 additionally includes system components 2120. In some embodiments, the vehicle exterior inspection system may include greater or fewer components than those included in system components 2120. In some embodiments, one or more components of system components 2120 may be included in one or more subsystems of a vehicle exterior inspection system, for example subsystem 2110A and/or subsystem 2110B.

As shown, system components 2120 include circuitry 2121, power supply 2122, heat management 2123 and inputs 2124. In some embodiments, the system components may include greater or fewer components than those shown.

Circuitry 2121 may include circuit boards, wiring, and/or other electrical components for interconnecting components of the vehicle exterior inspection system, including components of subsystems 2110A-B and/or system components 2120.

Power supply 2122 may provide power to components of the vehicle exterior inspection system 2100, including components of the subsystems 2110A-B and system components 2120. Power supply 2122 may be configured as a battery and/or any suitable power supply.

Heat management components 2123 may function to reduce the temperature of the vehicle exterior inspection system. In some embodiments, the heat management components 2123 may be active and/or passive components. In some embodiments, the heat management components may include fans and/or heat sinks.

Inputs 2124 may allow for signals and/or other inputs to be provided to the vehicle exterior inspection system 2100. In some embodiments, the inputs 2124 may include one or more electrical ports and/or connectors, buttons, switches, antennas, routers, and/or other components, as described herein.

Subsystems 2110A-B and system components 2120 may send data to and/or receive data from processors 2130. For example, data from sensor arrays of the subsystems and components of system components 2120 may be provided to processors 2130, and processors 2130 may provide control signals to the subsystems 2110A-B and/or system components 2120.

Figure 21B:
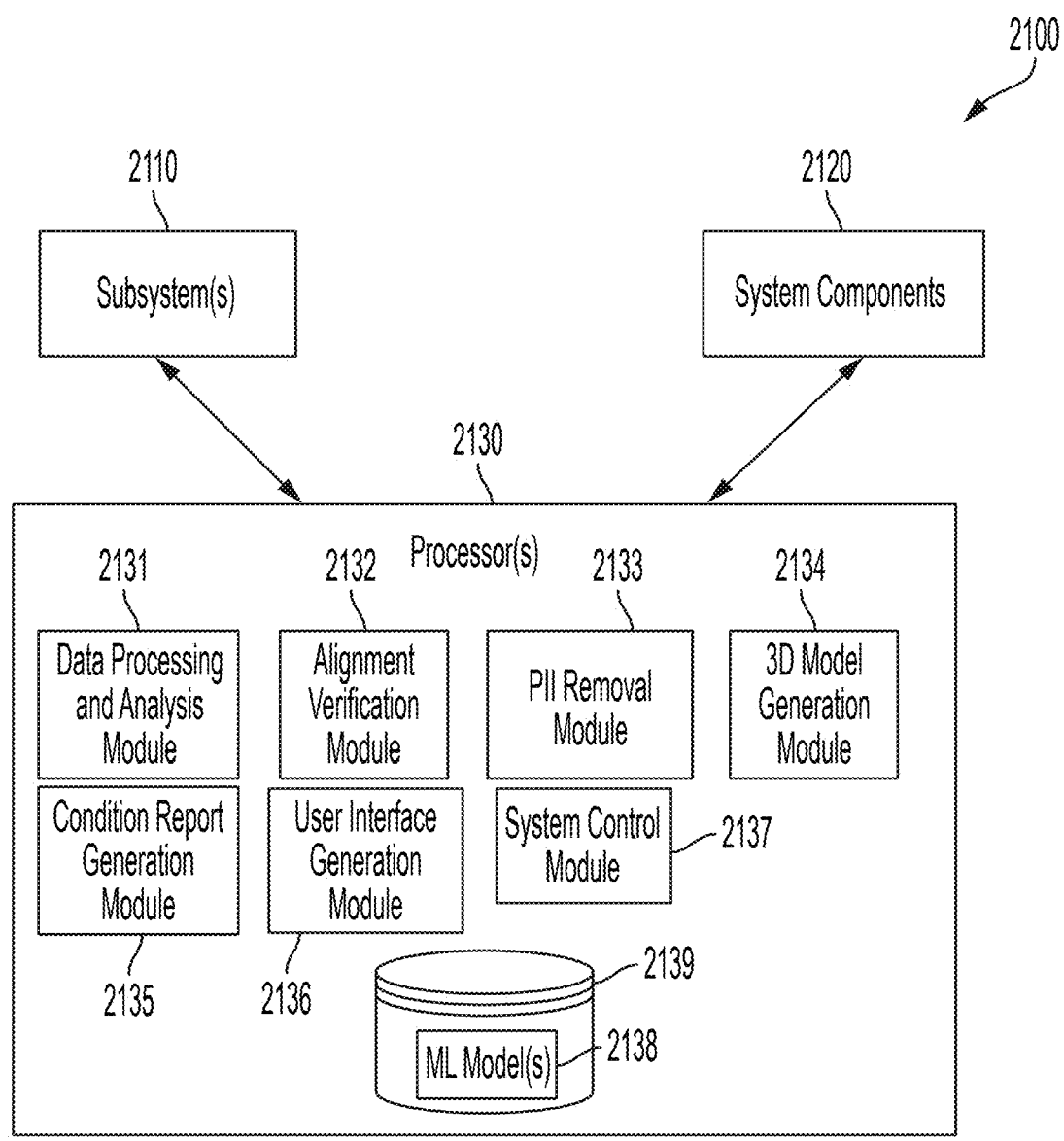
FIG. 21B is a diagram illustrating the components of processor(s) of a vehicle exterior inspection system, according to some embodiments of the technology described herein.

FIG. 21B is a diagram illustrating the components of processor(s) of a vehicle exterior inspection system, according to some embodiments. In FIG. 21B, vehicle exterior inspection system 2100 includes subsystem(s) 2110, system components 2120, and processor(s) 2130. As described herein, in some embodiments, the processors 2130 may be implemented as a part of the components of the vehicle exterior inspection system 2100. In some embodiments, the processor(s) 2130 may be implemented separate from the vehicle exterior inspection system 2100, for example as a device connected to the vehicle exterior inspection system 2100 at the location of the vehicle inspection system and/or in a remote location. In some embodiments, the processors 2130 may be implemented in part separately from and in part as a portion of the vehicle exterior inspection system 2100.

The processor(s) 2130 include data processing and analysis modules 2131, alignment verification modules 2132, PII removal module 2133, 3D model generation module 2134, condition report generation module 2135, user interface generation module 2136, system control module 2137, and database 2139 storing machine learning models 2138.

The data processing and analysis modules 2131 may perform one or more operations on data received from the subsystems 2110. In some embodiments, the processing and analysis modules 2131 may filter data, structure data and/or preprocess data for additional processing and analysis. In some embodiments, the data processing and analysis modules 2131 may determine one or more vehicle characteristics from the data received from the subsystems 2110. In some embodiments, the data processing and analysis modules 2131 may use one or more machine learning models, such as ML models 2138 to determine the one or more vehicle characteristics. In some embodiments, the data processing and analysis modules 2131 may determine one or more vehicle defects from the data received from subsystem(s) 2110. In some embodiments, the data processing and analysis modules may determine the one or more defects using one or more ML models, such as ML models 2138.

In some embodiments, the data processing and analysis modules 2131 may determine subsets of data for analysis from data received from subsystems 2110. For example, a subset of images may be determined from images received from the subsystems 2110. In some examples, a subset of images may be determined based on the location of the vehicle and/or parts of the vehicle within the images, as described herein.

The alignment verification module 2132 may determine whether the vehicle is properly aligned with the vehicle exterior inspection system for an inspection. In some embodiments, the alignment verification module may determine whether the vehicle is aligned with a vehicle inspection system. In some embodiments, the alignment verification module may analyze data received from one or more sensors of the vehicle undercarriage system, for example cameras and/or TOF sensors. In some embodiments, the alignment verification module determines the alignment of the vehicle using TOF sensors. In some embodiments, the alignment may be determined based on one or more TOF sensors facing a vehicle and comparing a detected position of the vehicle to a desired position. In some embodiments, the alignment verification module 2132 may determine an alignment of the vehicle and provide an indication of the alignment of the vehicle to one or more components of the vehicle exterior inspection system, such as a mobile device or other component with a display. In some embodiments, the alignment of the vehicle may be a binary value, for example, aligned or not aligned. In some embodiments, when the alignment verification module 2132 determines the vehicle is not aligned with the vehicle exterior inspection system, the alignment verification module may provide an indication of an adjustment to be made to the vehicle, for example move vehicle left.

The PII removal module 2133 may remove personally identifiable information from one or more images and/or data received from subsystems 2110. In some embodiments, PII may include names of individuals, images of individuals and/or other data about individuals which may be captured by sensors of subsystems 2110. In some embodiments, PII removal module may analyze data received from subsystems 2110 to determine the presence of PII. In some embodiments the PII may be obscured, replaced, eliminated or otherwise removed from the data.

In some embodiments, the 3D model generation module 2134 may generate a 3D model of a vehicle based on data received from the subsystems 2110. In some embodiments, the 3D model may be generated using one or more ML models, such as ML models 2138. In some embodiments, the 3D model is generated using photogrammetry. In some embodiments, the 3D model is generated using neural radiance fields. In some embodiments, the 3D model is generated using Gaussian splatting.

The vehicle condition report generation module 2135 may generate a vehicle condition report based on data received the subsystems 2110. In some embodiments, the vehicle condition report generation module 2135 may generate a vehicle condition report based on one or more characteristics and/or defects of the vehicle determined using the data processing and analysis modules 2131. In some embodiments, the condition report generation module 2135 may generate a vehicle condition report that includes data related to a vehicle, for example images of the vehicle, and/or audio recordings of the vehicle. In some embodiments, the condition report generation module may include a 3D model of the vehicle in a vehicle condition report. In some embodiments, the condition report generation module may generate a vehicle condition report using data obtained from a user interface of the vehicle exterior inspection system.

User interface generation module 2136 may provide a user interface of the vehicle exterior inspection system on one or more displays connected to the vehicle exterior inspection system. In some embodiments the user interface generation module 2136 may provide a user interface on a mobile device connected to the vehicle exterior inspection system, a computer connected to one or more components of the vehicle exterior inspection system, and/or a device remote from the vehicle exterior inspection system. In some embodiments, the user interface generation module 2136 may generate a user interface which displays information related to a vehicle, for example, alignment data, a 3D model of a vehicle, and/or a vehicle condition report. In some embodiments, the user interface generation module 2136 may provide vehicle data to a user responsive to a request for additional data, for example, the module 2136 may provide additional images of a region of the vehicle responsive to a request for images of the region.

The system control module 2127 may generate and provide control signals to the components of vehicle exterior inspection system 2100, including subsystems 2110 and system components 2120. In some embodiments, the control signals may include signals to trigger the starting and/or stopping of recording data by sensors of the subsystems 2110. In some embodiment, the control signals may be generated based on data obtained from the sensors of the subsystems, for example data indicative of the position and/or motion of the vehicle. In some embodiments, the system control module 2137 may generate control signals based on inputs received from a user of the vehicle exterior inspection system 2100.

Databases 2139 store ML models 2138. In some embodiments, the databases 2139 are implemented as a part of one or more components of the vehicle exterior inspection system 2100, for example as physical storage. In some embodiments, the databases 2139 are accessible by components of the vehicle inspection system, for example as cloud storage.

ML models 2138 may be used by modules of the vehicle exterior inspection system to analyze data and/or process obtained from the subsystems 2110. In some embodiments, the ML models 2138 may be used in determining one or more vehicle defects and/or characteristics. Machine learning models for determining vehicle characteristics and/or defects are describe in U.S. Pat. No. 11,631,289, entitled "Vehicle Audio Capture and Diagnostics," filed Jan. 22, 2020, U.S. Pat. No. 10,893,213, entitled "Vehicle Undercarriage Imaging System," filed Apr. 2, 2019, U.S. patent application Ser. No. 18/778,247, entitled "Methods and Systems for Identifying Potential Vehicle Defects," filed Jul. 19, 2024, and U.S. patent application Ser. No. 18/483,935, entitled: "Machine Learning and Magnetic Field Sensing Techniques for Vehicle Inspection and Condition Analysis," filed Oct. 10, 2023, each of which is incorporated by reference herein in its entirety. In some embodiments, the ML models may be used by the alignment verification modules 2132, 3D model generation modules 2134, and/or condition report generation modules 2135.

FIGS. 22A-E show example techniques for determining a subset of images captured by a vehicle exterior inspection system for analysis, according to some embodiments.

Figure 22A:
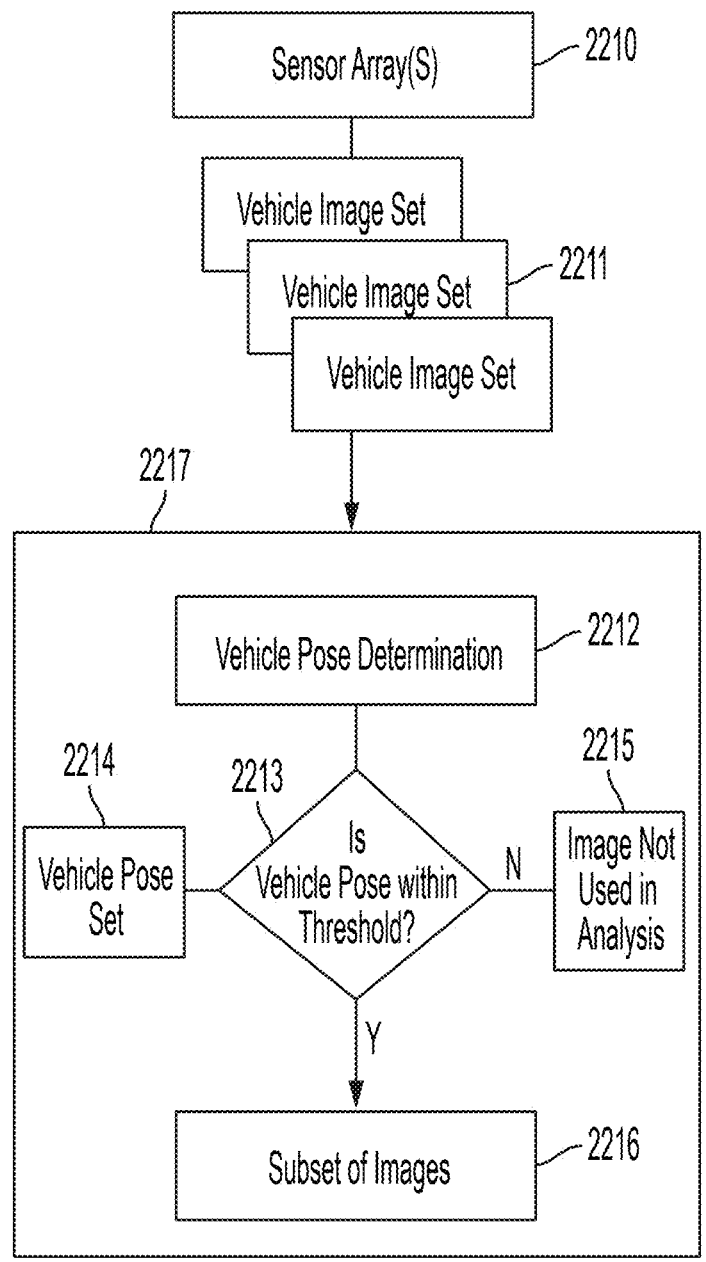
FIGS. 22A-E show example techniques for determining a subset of images captured by a vehicle exterior inspection system for analysis, according to some embodiments.

FIG. 22A illustrates an example process flow for determining a subset of images for analysis, according to some embodiments. The process flow of FIG. 22A may determine a subset of images 2216 from vehicle image sets 2211 received from sensor arrays 2210. Sensor arrays 2210 may be one or more sensor arrays of a vehicle exterior inspection system, as described herein. In some embodiments, sensor arrays 2210 may include camera sets with cameras oriented at different angles, as described herein. In some embodiments, vehicle image sets 2211 may include images captured from different cameras and/or at different angles relative to the vehicle.

The image sets 2211 may be provided to data processing and analysis module 2217. Data processing and analysis module 2217 may be included in one or more processors of a vehicle exterior inspection system, as described herein. Within data processing and analysis module is vehicle pose determination module 2212, which may determine a pose of the vehicle within the images of image sets 2211.

The vehicle pose determination module 2212 may determine the pose of the vehicle using one or more techniques. In some embodiments may determine the pose of the vehicle by segmenting the vehicle out from the images of image sets 2211. In some examples, the vehicle may be segmented out by determining a bounding box for the vehicle within images and applying a segmentation algorithm to segment out the vehicle from the bounding box. In some embodiments, the bounding box may be determined by a machine learning model which is configured to detect a vehicle within images. For example, in some embodiments, the machine learning model may be a text-prompted object detector, a transformer-based object detector, a neural network configured to identify vehicles within images, among other suitable machine learning models. In some embodiments, the vehicle may be segmented from bounding boxes by creating a mask for the vehicle and segmenting the vehicle out of the image based on the mask. In some embodiments, the mask may be generated using one or more machine learning models for example a neural network trained to generate object masks and/or a transformer-based model which generates object masks, among other suitable machine learning models. The vehicle pose for an image is the position within the image that the segmented-out vehicle is/was positioned and the orientation of the segmented out vehicle.

In some embodiments, the vehicle pose may be determined based on a position of a bounding box of the vehicle within an image. For example, the center of a bounding box. In some embodiments, a bounding box may be determined by a machine learning model which is configured to detect a vehicle within images. For example, in some embodiments, the machine learning model may be a text-prompted object detector, a transformer-based object detector, a neural network configured to identify vehicles within images, among other suitable machine learning models. In some embodiments, multiple vehicles are present within an image and the largest bounding box is selected as the pose of the vehicle. In some embodiments, multiple vehicles are present within an image and a bounding box is selected based on an optical flow algorithm using data from previously analyzed images.

In some embodiments, the pose of the vehicle may be determined by determining a pose of a particular part of the vehicle within an image, for example a wheel or window of the vehicle. In some embodiments, the pose of a part of a vehicle may be determined using the same techniques used to determine the pose of the vehicle.

Once the pose of the vehicle is determined using pose determination module 2212, the pose may be determined to one or more poses of a set of vehicle poses 2214. The vehicle pose set 2214 may include desired poses of the vehicle and/or poses of the vehicle to be used for analysis. In some embodiments, the poses of the pose set 2214 may include poses of the vehicle where specific vehicle parts are visible for analysis. In some embodiments, the poses of the pose set may include one or more poses for particular cameras of a vehicle exterior inspection system. For example, each camera of a vehicle exterior image system may have one or more associated poses in pose set 2214. Poses associated with particular cameras may reflect the pose of the vehicle when the vehicle is at a particular position with respect to that camera.

In some embodiments, poses of pose set 2214 may be determined based on images of a vehicle. For example, by generating masks representing the location of the vehicle within the images of the vehicle, determining an average orientation of the vehicle from the masks and using the average orientation as the vehicle pose.

Figure 22B:
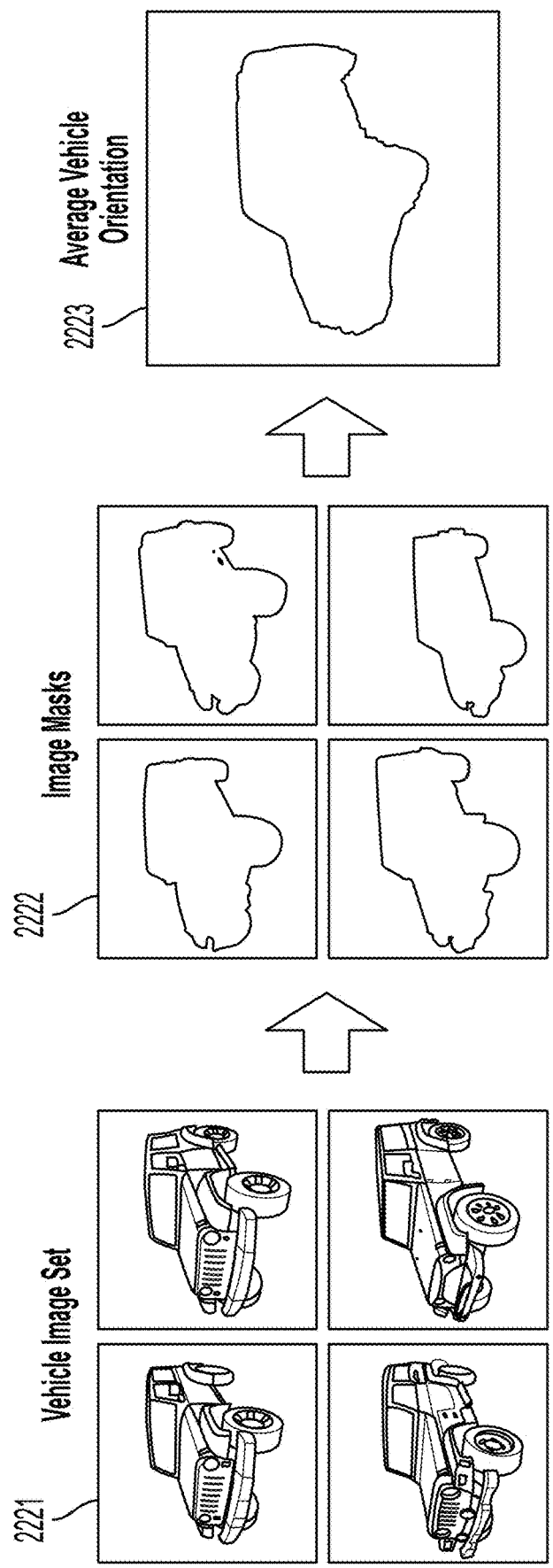

FIG. 22B illustrates an example process for determining a desired vehicle pose, according to some embodiments. In FIG. 22B, a vehicle image set 2221 is obtained including multiple images of a vehicle type. As shown, the same model of vehicle is included in all images of the image set 2221. In addition, the images of set 2221 are taken from about the same angle, such that the images include a view of the vehicle from the front driver's side of the vehicle. Image masks 2222 may be determined using the images of image set 2221. Image masks 2222 may be determined, as described herein, and the images may be modified such that the image mask is shown as white, and the remainder of the image is shown as black. After image masks 2222 are determined, an average vehicle orientation 2223 may be determined by averaging the image masks. The average vehicle orientation 2223 may be used as a desired vehicle pose of a set of vehicle poses, such as 2214. The process of FIG. 22B may be used to determine one or more poses of a set of vehicle poses.

Returning to FIG. 22A, in some embodiments, poses of the set of poses 2214 may correspond to locations of the vehicle and/or a vehicle part within an image.

The poses determined by vehicle pose determination module 2212 may then be compared to the vehicle poses of vehicle pose set 2214 at 2213. In some embodiments the pose of an image may be determined by determining a matching level such as an Intersection over Union (IoU) matching level, or a distance between the poses. If the vehicle pose of an image of the image sets 2211 is within a threshold level of matching to a vehicle pose of the vehicle pose set 2214, the associated image may be included in subset of images 2216. If the vehicle pose of an image of the image sets 2211 is not within a threshold level of matching to a vehicle pose of the vehicle pose set 2214, the associate image may not be used for analysis, shown by block 2215. In some embodiments, only the image having a vehicle having the highest level of matching to a particular pose of pose set 2214 is included in the subset of images 2216. In some embodiments, multiple images having a level of matching greater than a threshold are included in the subset of images 2216.

Figure 22C:
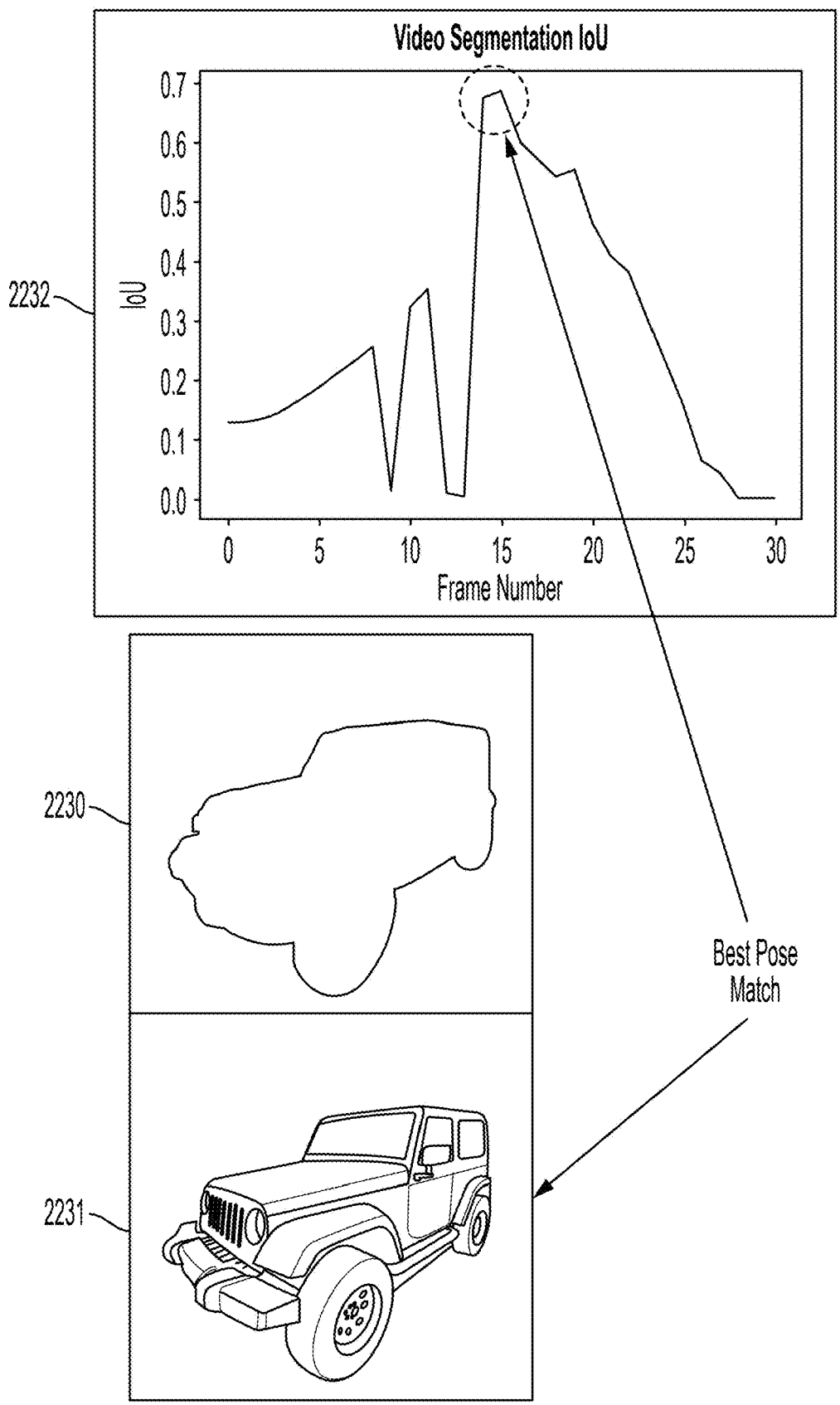

FIG. 22C shows an example of determining a level of matching between a pose of a vehicle and a desired pose, according to some embodiments. As shown, the pose of the vehicle in image 2231 is compared to desired pose 2230. In some embodiments, pose 2230 may be generated as described herein and included in a set of poses. As shown in plot 2232, IoU matching has been determined for multiple frames of a video, which correspond to images of a set of images. In some embodiments, the frames may all be captured by the same camera of a vehicle exterior inspection system. As shown frame 16 has the highest IoU matching and corresponds to image 2231. Image 2231 may therefore be included in a subset of images for analysis, as described herein.

Returning to FIG. 22A, in some embodiments, the pose of the set of poses 2214 may be compared to the poses determined for the images of the sets of images by determining a distance between the poses. In some embodiments the Euclidean distance between poses may be determined and/or any other suitable distance.

Figure 22D:
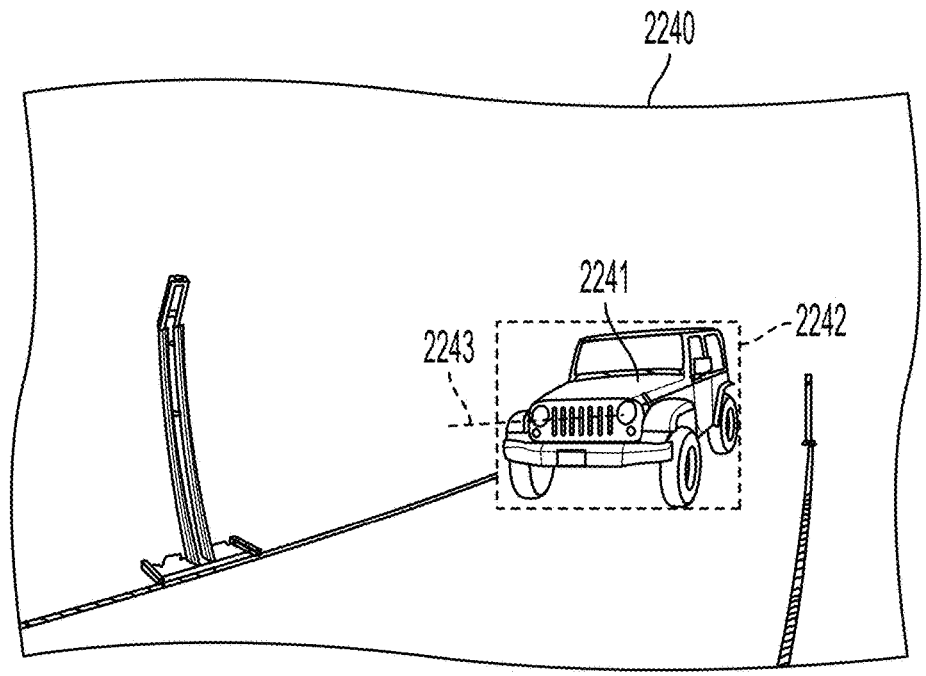

FIG. 22D illustrates an example of determining the distance between poses, according to some embodiments. In FIG. 22D, the desired pose is the center of the image 2240, which may correspond to the center of the FOV of the camera used to obtain the image. The pose of the vehicle within the image is the center of the bounding box 2242 surrounding vehicle 2241. The bounding box 2242 may be determined as described herein. Line 2243 represents the Euclidean distance between the desired pose and the center of bounding box 2242. In some embodiments, an image may be selected for inclusion in a subset for analysis when the distance 2243 is below a threshold. In some embodiments, the image with the smallest distance 2243 is selected for inclusion in an image subset.

In some embodiments, positions other than the center of the image may be used as a desired pose. For example, for lateral images of a vehicle (images taken of a vehicle between a corner of the vehicle and parallel to a side of the vehicle), a distance may be determined between the bounding box of a vehicle and the edge of a FOV of the camera associated with the image. In some embodiments, an image may be selected for inclusion in a subset for analysis when the distance between the bounding box and the edge of the FOV is below a threshold. In some embodiments, the image with the smallest distance between the bounding box and the edge of the FOV is selected for inclusion in an image subset. Different vehicle poses may be selected for lateral frames to give the appearance that the camera is rotating around the car due to the distortion caused by the lens.

Figure 22E:
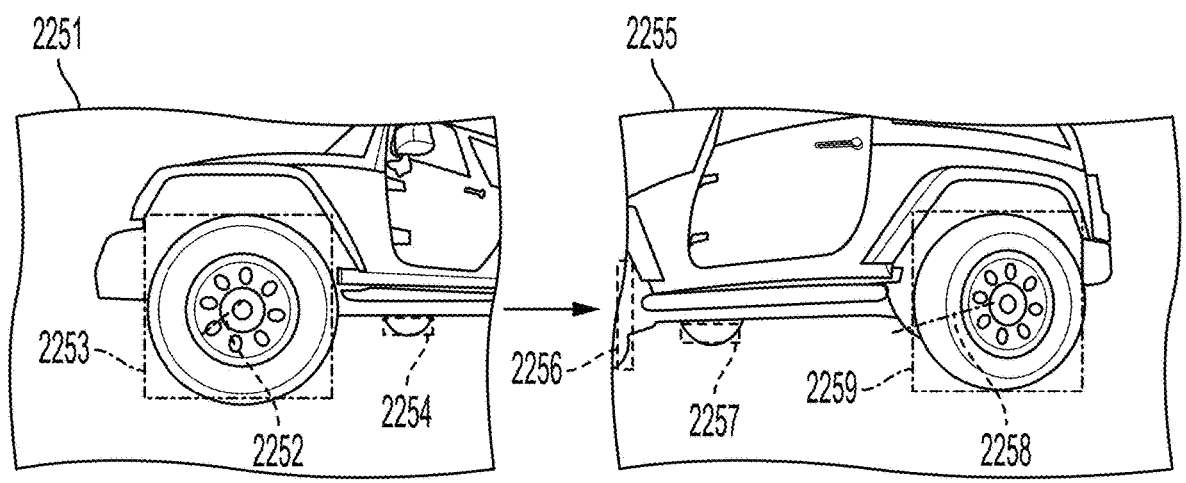

In some embodiments, the position of a part of a vehicle may be used as the pose of the vehicle and compared to a desired pose in a set of posed. As shown in FIG. 22E a bounding box of a wheel of the vehicle is used as the pose of the vehicle and this is compared to a desired pose at the center of the frame of the image. In the left frame 2251, bounding box 2253 surrounds the front driver's side wheel of the vehicle. Distance 2252 is determined between the desired pose at the center of the image. In some embodiments, an image may be selected for inclusion in a subset for analysis when the distance 2252 is below a threshold. In some embodiments, the image with the smallest distance 2252 is selected for inclusion in an image subset.

Determining vehicle poses based on vehicle parts may be difficult to perform due to the presence of multiple of the same vehicle part within images. For example, in image 2251, two wheel bounding boxes are shown, 2253 and 2254. Therefore, in some embodiments, bounding boxes may need to be determined for use as the vehicle pose. In some embodiments, the bounding boxes may be determined based on the size of the boxes, proximity of the boxes to the desired pose, and/or whether a complete vehicle part is contained within the box, for use as the vehicle pose.

Image 2255 is a second image of the vehicle taken after image 2251 as the vehicle moves past a vehicle exterior inspection system. Image 2255 includes bounding boxes 2256 and 2257 of the front wheels of the vehicle, and bounding box 2259 of the rear driver's side wheel of the vehicle. As shown bounding box 2259 is used as the pose of the vehicle and may be determined as described herein, distance 2258 represents the distance between the bounding box 2259 and the desired pose of the vehicle at the center of the image. In some embodiments, an image may be selected for inclusion in a subset for analysis when the distance 2258 is below a threshold. In some embodiments, the image with the smallest distance 2258 is selected for inclusion in an image subset.

In some embodiments, images of the front and rear driver's side wheels may be desired. Therefore, multiple images must be selected for inclusion in a subset of images, at least some of which include a view of the front wheel and at least some of which include a view of the rear wheel. In some embodiments, this may be accomplished by using "peak" detection algorithm to find the two predominant peaks in the Euclidean distance measure of images of the driver's side of the vehicle. These peaks correspond to the two detected front and rear wheels of the car, and the associated images may be included in a subset, as described herein.

In some embodiments, the process of FIG. 22A may be performed in real time or near real time, as images of vehicles are captured. This produces a subset of images corresponding to the desired views of the vehicle as an inspection is occurring. In some embodiments, the process of FIG. 22A may be performed after a vehicle inspection has been performed. In some embodiments, images in a subset of images, such as 2216, may be analyzed and/or processed as described herein. In some embodiments, images in a subset of images, such as 2216, may be included in a vehicle condition report, as described herein.

Figure 23A:
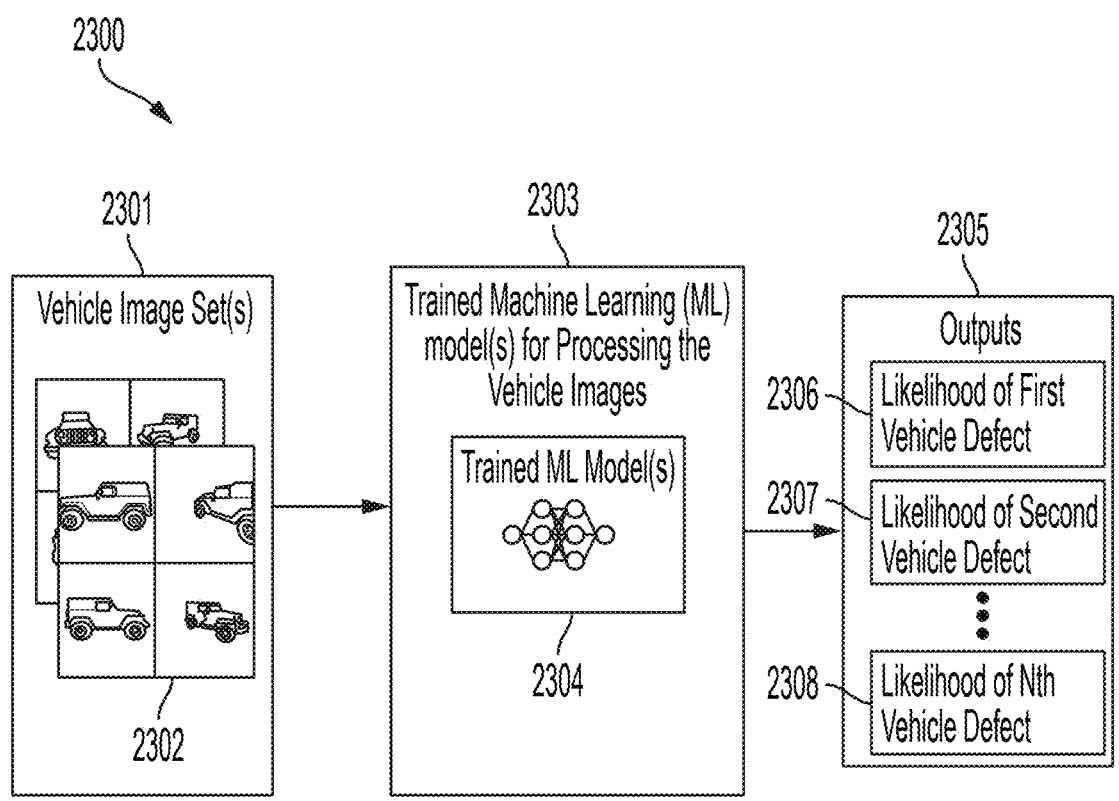
FIG. 23A illustrates one or more trained machine learning models 2300 for processing images of the exterior of a vehicle to evaluate the vehicle condition, according to some embodiments of the technology described herein.

FIG. 23A illustrates one or more trained machine learning models 2300 for processing images of the exterior of a vehicle to evaluate the vehicle condition, according to some embodiments. As shown in FIG. 23A, trained machine learning model 2300 includes trained machine learning model 2303 for processing the vehicle images sets 2301 to obtain outputs 2305.

In some embodiments, the image sets 2301 may be captured as a part of a vehicle inspection, performed using a vehicle exterior inspection system. For example, as described with reference to FIGS. 17A-20. In some embodiments, the images 2301 may include the views of the vehicle described with reference to FIG. 4A. In some embodiments, the image sets may be one or more subsets of images, as described herein, for example with reference to FIG. 22A-E.

In some embodiments, the images 2302 of the vehicle may be a series of images acquired of different views of the vehicle or may be a single image constructed from processing a series of images as described herein. In some embodiments, the images 2302 may be collected from a vehicle exterior inspection system, as described herein. In some embodiments, the images 2302 may be collected from a vehicle inspection system, as described herein. The images 2302 may include multiple color channels and may be formatted in any suitable image format. For example, the image may be a Joint Photographic Expert Group (JPEG) image or a Portable Network Graphics (PNG) image, where each pixel has a corresponding value indicating the red, blue, and green color components.

In some embodiments, trained machine learning model 2303 for processing the images of the vehicle may include preprocessing to generate input images for trained machine learning model 2304. Preprocessing to generate input images may modify at least one characteristic of the images of the vehicle, prior to the image being processed by the trained machine learning model 2304.

Trained machine learning model 2304 may be any suitable machine learning model for image analysis. In some embodiments, trained machine learning model 2304 is a 2D convolutional neural network. In some embodiments, ML model 2304 is structured as a deep convolutional neural network (DCNN). In some embodiments, ML model 2304 is structured as a YOLO architecture neural network. In some embodiments, ML model 2304 is a transformer-based model. In some embodiments, ML model 2304 is a diffusion model. In some embodiments the machine learning model 2304 is configured as an EfficientNet convolutional neural network.

Outputs 2305 may include a list of vehicle defects and the respective likelihood of the defect being present in the vehicle. As shown in FIG. 23A outputs 2305 include the likelihood of a first vehicle defect 2306, the likelihood of a vehicle image defect 2307, and a likelihood of an nth vehicle defect 2308. For example, when n=8 there may be 8 output classes (e.g., types of vehicle defects) including 7 defect classes and one affirmative quality class. In some embodiments, the outputs 2305 include likelihood of particular vehicle characteristics being present. Examples of vehicle characteristics and defects are described herein. In some embodiments, the outputs include likelihoods of image defects, for example incorrect cropping, insufficient detail, dirty lens, haze or glare, incorrect trim, and/or poor lighting, among other image defects.

Figure 23B:
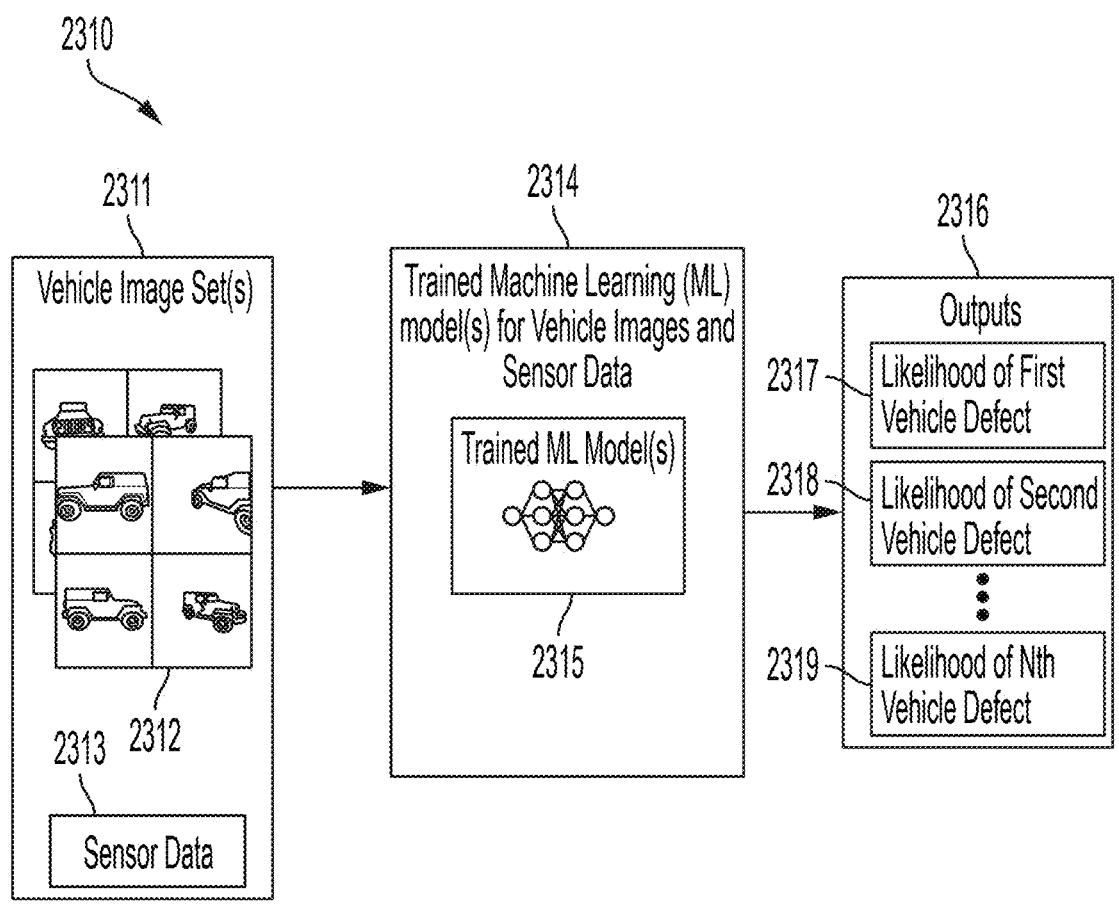
FIG. 23B illustrates one or more trained machine learning models 2310 for processing images and data from the exterior of a vehicle to evaluate the vehicle condition, according to some embodiments of the technology described herein.

FIG. 23B illustrates one or more trained machine learning models 2310 for processing images and data from the exterior of a vehicle to evaluate the vehicle condition, according to some embodiments. As shown in FIG. 23B, trained machine learning model 2310 includes trained machine learning model 2314 for processing the vehicle data 2311 to obtain outputs 2316.

In some embodiments, the data 2311 may be captured as a part of a vehicle inspection, performed using a vehicle exterior inspection system. For example, as described with reference to FIGS. 17A-20. In some embodiments, the images 2312 of the data 2311 may include the views of the vehicle described with reference to FIG. 4A.

In some embodiments, the vehicle data may include images 2312 of and sensor data 2313 about a vehicle. In some embodiments, the images 2312 of the vehicle may be a series of images acquired of different views of the exterior of the vehicle. In some embodiments, the images 2312 may be formatted as described with reference to images 2302 of FIG. 23A. In some embodiments, the images 2312 may be a subset of images determined as described with reference to FIGS. 22A-E.

In some embodiments, the sensor data 2313 may include data collected by one or more sensors of a vehicle exterior inspection system, as described herein. For example, the sensor data 2313 may include data collected by a microphone, an infrared camera, a thermal camera, a magnetometer, a time of flight sensor, and/or an air quality sensor.

In some embodiments, trained machine learning model 2314 for processing the vehicle data may include preprocessing to generate input data for trained machine learning model 2315. Preprocessing to generate input data may modify at least one characteristic of the vehicle data, prior to the data being processed by the trained machine learning model 2315.

In some embodiments, the trained machine learning models 2314 may process vehicle images 2312 and sensor data 2313 separately. In some embodiments, the trained machine learning models 2314 may process vehicle images 2312 and sensor data 2313 together. In some embodiments, the trained machine learning models 2314 may process vehicle images 2312 and sensor data 2313 together in part and separately in part.

Trained machine learning model 2315 may be any suitable machine learning model for image and/or sensor data analysis. In some embodiments, trained machine learning model 2315 is a 2D convolutional neural network. In some embodiments, ML model 2315 is structured as a deep convolutional neural network (DCNN). In some embodiments, ML model 2315 is structured as a YOLO architecture neural network. In some embodiments, ML model 2315 is a transformer-based model. In some embodiments, ML model 2315 is a diffusion model. In some embodiments the machine learning model 2315 is configured as an EfficientNet convolutional neural network.

Outputs 2316 may include a list of vehicle defects and the respective likelihood of the defect being present in the vehicle. As shown in FIG. 23B outputs 2316 include the likelihood of a first vehicle defect 2317, the likelihood of a vehicle image defect 2318, and a likelihood of an nth vehicle defect 2319. For example, when n=8 there may be 8 output classes (e.g., types of vehicle defects) including 7 defect classes and one affirmative quality class. In some embodiments, the outputs 2316 include likelihood of particular vehicle characteristics being present. Examples of vehicle characteristics and defects are described herein. In some embodiments, the outputs include likelihoods of image and/or data defects, for example incorrect cropping, insufficient detail, dirty lens, haze or glare, incorrect trim, insufficient magnitude, too noisy, and/or poor lighting, among other defects.

Figure 23C:
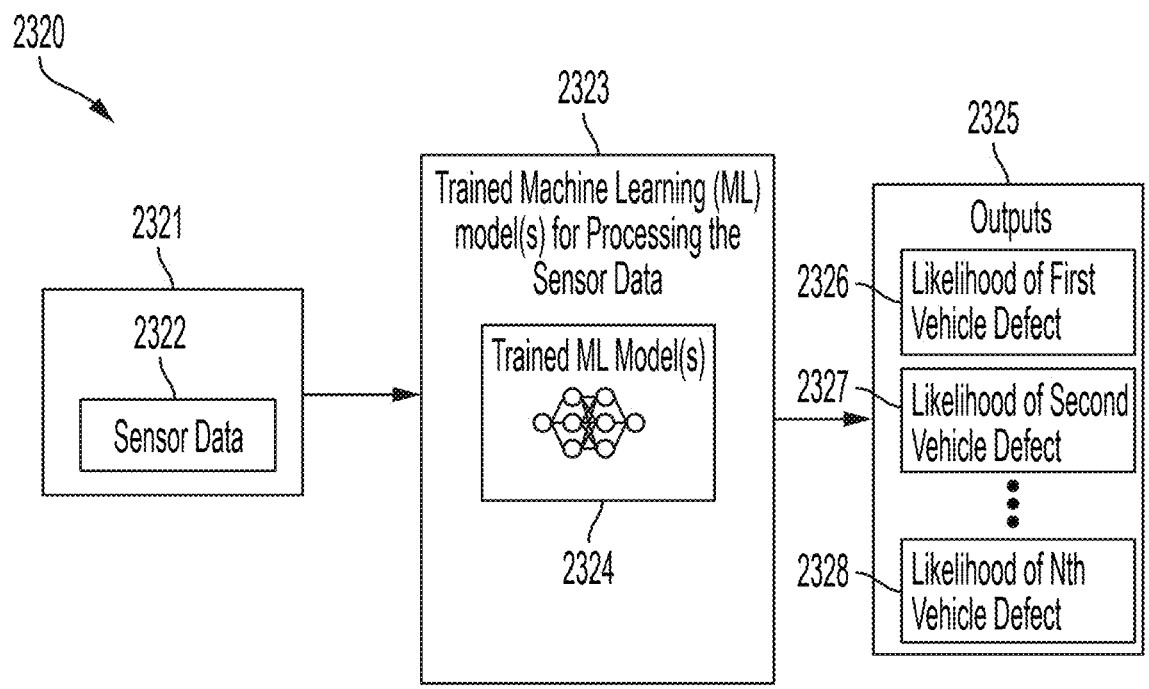
FIG. 23C illustrates one or more trained machine learning models 2320 for processing sensor data about an exterior of a vehicle to evaluate the vehicle condition, according to some embodiments of the technology described herein.

FIG. 23C illustrates one or more trained machine learning models 2320 for processing sensor data about an exterior of a vehicle to evaluate the vehicle condition, according to some embodiments. As shown in FIG. 23C, trained machine learning model 2320 includes trained machine learning model 2323 for processing the vehicle data 2321 to obtain outputs 2325.

In some embodiments, the data 2321 may be captured as a part of a vehicle inspection, performed using a vehicle exterior inspection system. For example, as described with reference to FIGS. 17A-20.

In some embodiments, the vehicle data may sensor data 2322 about a vehicle. In some embodiments, the sensor data 2322 may include data collected by one or more sensors of a vehicle exterior inspection system, as described herein. For example, the sensor data 2322 may include data collected by a microphone, an infrared camera, a thermal camera, a magnetometer, a time of flight sensor, and/or an air quality sensor.

In some embodiments, trained machine learning model 2323 for processing the vehicle data may include preprocessing to generate input data for trained machine learning model 2324. Preprocessing to generate input data may modify at least one characteristic of the vehicle data, prior to the data being processed by the trained machine learning model 2324.

In some embodiments, the trained machine learning models 2323 may process vehicle sensor data from different vehicle sensors separately. In some embodiments, the trained machine learning models 2323 may process the sensor data from different vehicle sensors together. In some embodiments, the trained machine learning models 2323 may process sensor data from different sensors together in part and separately in part.

Trained machine learning model 2324 may be any suitable machine learning model for sensor data analysis. In some embodiments, trained machine learning model 2324 is a 2D convolutional neural network. In some embodiments, ML model 2324 is structured as a deep convolutional neural network (DCNN). In some embodiments, ML model 2324 is a transformer-based model.

Figure 23D:
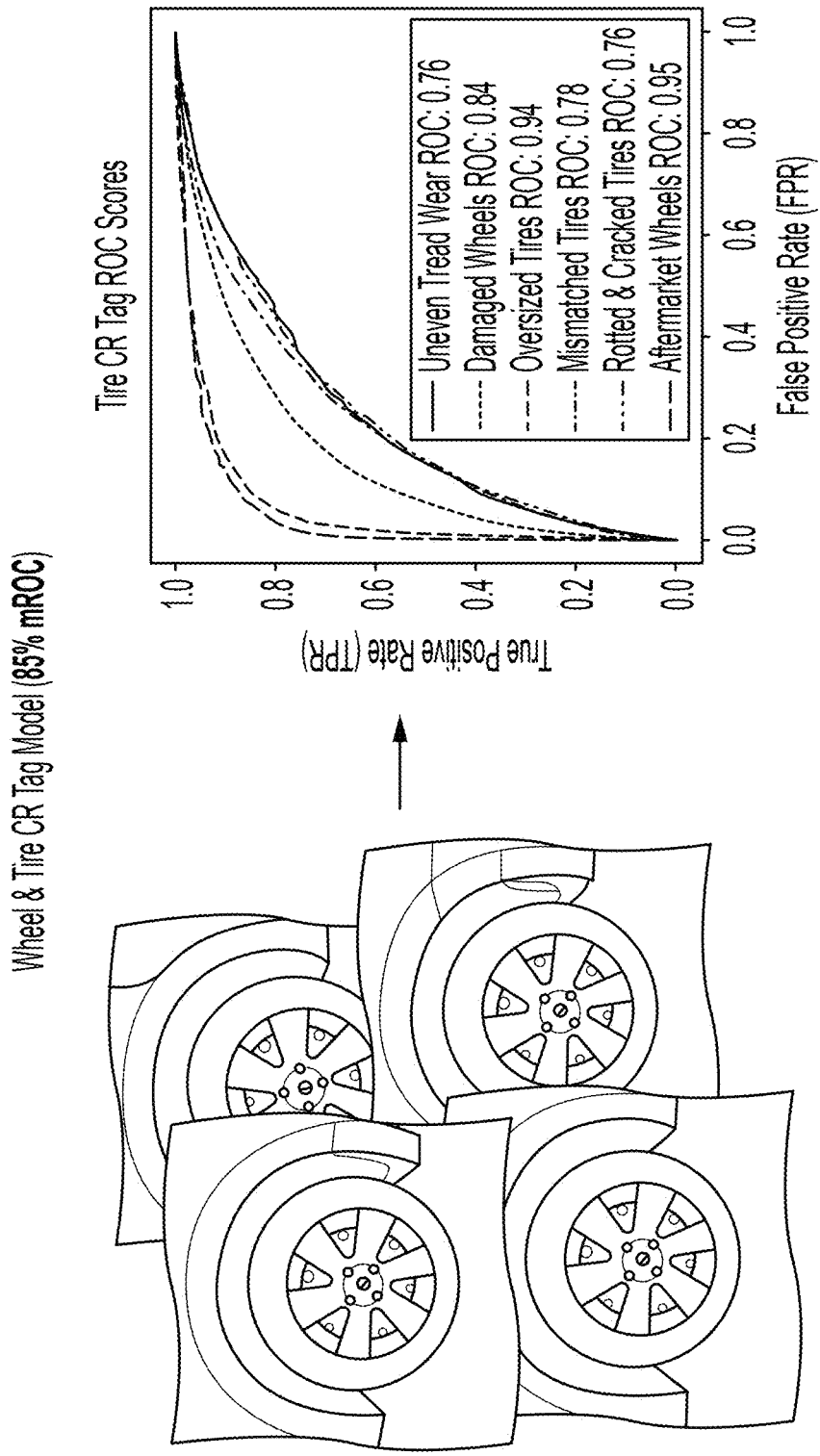
FIG. 23D shows example inputs and performance of a wheel and tire machine learning model, according to some embodiments of the technology described herein.

Outputs 2325 may include a list of vehicle defects and the respective likelihood of the defect being present in the vehicle. As shown in FIG. 23D outputs 2325 include the likelihood of a first vehicle defect 2326, the likelihood of a vehicle image defect 2327, and a likelihood of an nth vehicle defect 2328. For example, when n=8 there may be 8 output classes (e.g., types of vehicle defects) including 7 defect classes and one affirmative quality class. In some embodiments, the outputs 2325 include likelihood of particular vehicle characteristics being present. Examples of vehicle characteristics and defects are described herein. In some embodiments, the outputs 2325 include likelihoods data defects, for example incorrect cropping, insufficient detail, incorrect trim, insufficient magnitude, and/or too noisy, among other defects.

FIG. 23D shows example inputs and performance of a wheel and tire machine learning model, according to some embodiments. In some embodiments, the wheel and tire machine learning model may be a machine learning model configured to analyze images of wheels and tires of a vehicle, captured by a vehicle exterior inspection system. In some embodiments, the wheel and tire machine learning model may be configured as described with reference to FIG. 23A. In some embodiments, the wheel and tire machine learning model may be configured as one or more machine learning models.

As shown the wheel and tire machine learning model is configured to determine multiple defects associated with the wheels and/or tires of a vehicle. The defects include uneven tread wear, damaged wheels, oversized tires, mismatched tires, rotted and cracked tires, and aftermarket wheels. The ROC curves for these defects are shown in FIG. 23D. As shown the ROC scores for the defects are 0.76 for uneven tread wear, 0.84 for damaged wheels, 0.94 for oversized tires, 0.78 for mismatched tires, 0.76 for rotted and cracked tires, and 0.95 for aftermarket wheels, indicating the model performs well at discriminating defective vehicles from non-defective vehicles.

Figure 23E:
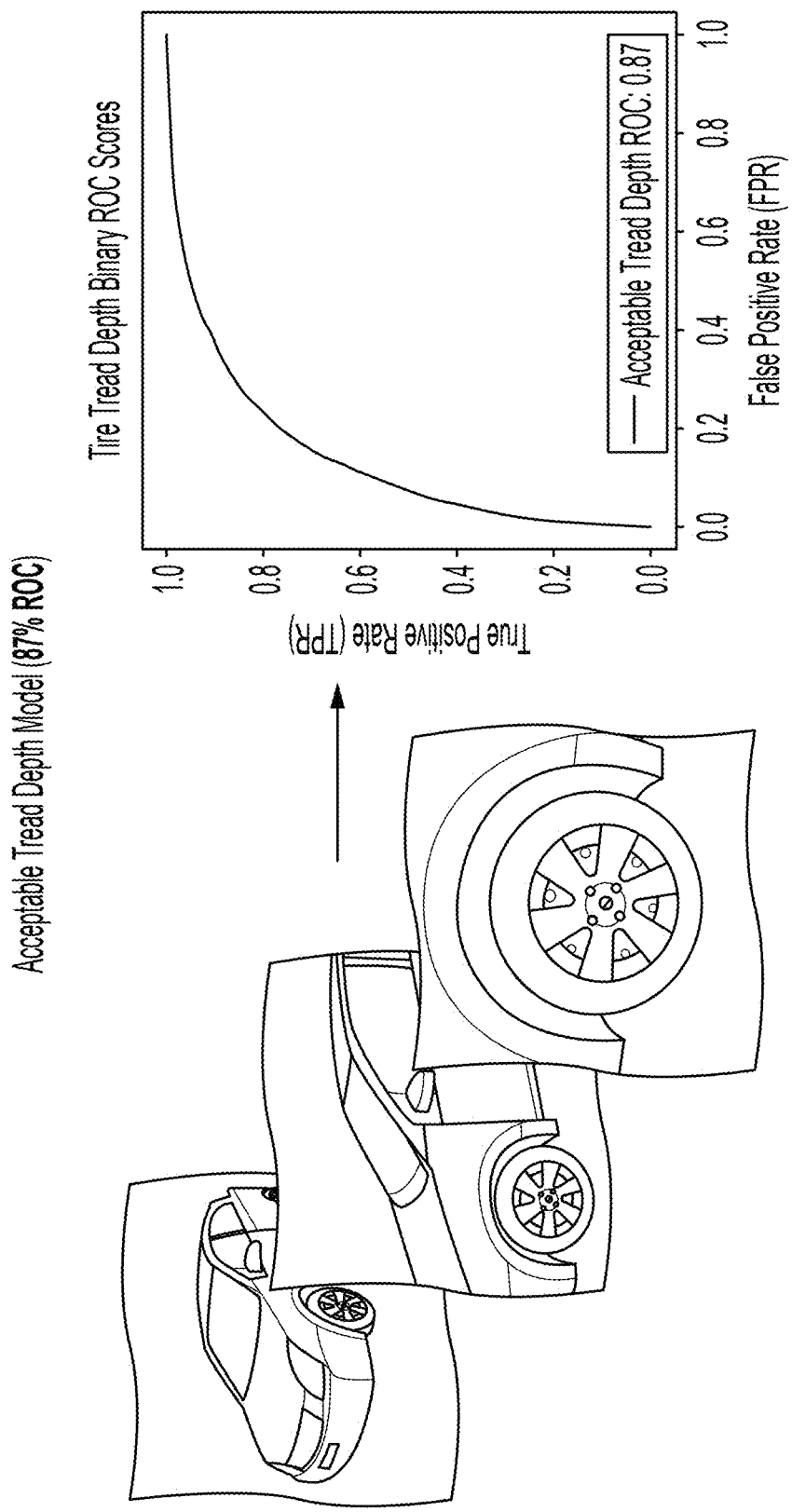
FIG. 23E shows example inputs and performance of a tire depth machine learning model, according to some embodiments of the technology described herein.

FIG. 23E shows example inputs and performance of a tire depth machine learning model, according to some embodiments. In some embodiments, the tire depth machine learning model may be a machine learning model configured to analyze images of wheels and tires of a vehicle, captured by a vehicle exterior inspection system. In some embodiments, the tire depth machine learning model may be configured as described with reference to FIG. 23A. In some embodiments, the tire depth machine learning model may be configured as one or more machine learning models.

As shown the tire depth machine learning model is configured to determine whether the tread depth of the tires of a vehicle is an acceptable depth. In some embodiments, an acceptable depth may be greater than $\frac{1}{10}$", greater than $\frac{1}{8}$", greater than $\frac{1}{6}$", greater than $\frac{1}{4}$" and/or greater than $\frac{1}{3}$". The ROC curve for the tread depth machine learning model is shown in FIG. 23E. As shown the ROC score for the tread depth machine learning model is 0.87, indicating the model performs well at discriminating vehicles having unacceptable tread depths.

In some embodiments, additional ML models may be provided for analysis of wheel and tires of vehicles. For example, a ML model may be configured to predict whether the vehicle has proper wheel alignment based on images of the sides of wheels, for example by predicting a camber angle for the wheel and comparing the camber angle to an acceptable range of camber angles.

Figure 24A:
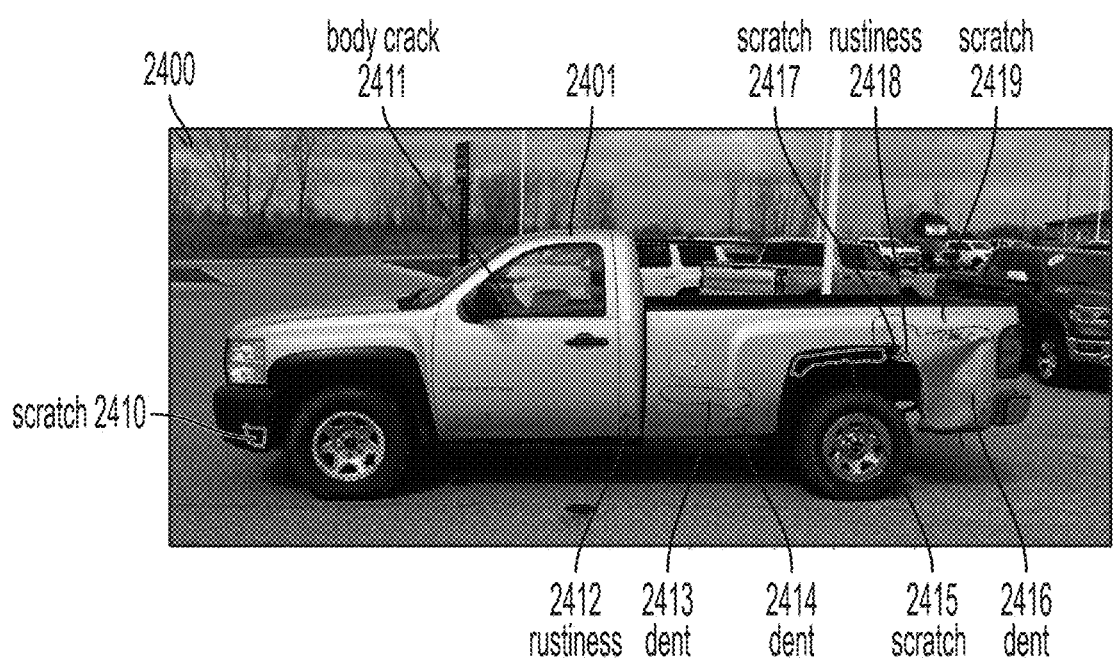
FIG. 24A illustrates an image of a vehicle with defect tags, according to some embodiments of the technology described herein.

FIG. 24A illustrates an image of a vehicle with defect tags, according to some embodiments. FIG. 24A includes image 2400 showing the driver's side of a vehicle. Image 2400 may be captured by a vehicle exterior imaging system, as described herein. The tags on image 2400 may be applied by one or more machine learning models, such as those described herein with reference to FIGS. 23A-E. In some embodiments, image 2400 may be included in a vehicle condition report, as described herein. In some embodiments, image 2400 may be provided on a user interface, as described herein.

Image 2400 includes tags indicating the location of different defects on the vehicle 2401. Tag 2410 indicates the presence of a scratch on the bumper and includes an outline and label. Tag 2411 indicates a body crack near the driver's side window and includes a label. Tag 2412 indicates the presence of rust at the bottom corner of the cabin and includes an outline and a label. Tag 2413 indicates a dent on the rear portion of the vehicle and includes an outline and a label. Tag 2414 indicates a dent on the rear portion of the vehicle and includes an outline and a label. Tag 2415 indicates a scratch rear wheel well of the vehicle and includes an outline and a label. Tag 2416 indicates a dent on the rear portion of the vehicle and includes an outline and a label. Tag 2417 indicates a scratch on the rear portion of the vehicle and includes an outline and a label. Tag 2418 indicates rust on the rear portion of the vehicle and includes an outline and a label. Tag 2419 indicates rust on the rear portion of the vehicle and includes an outline and a label.

The tags on image 2400 may be selectable by a user to obtain additional information related to the defects of the vehicle, for example on a user interface. In some embodiments, the user may select a defect to review the defect and may update the tag to provide additional information, add a comment, change the tag, delete the tag, or perform another action related to the tag.

Figure 24B:
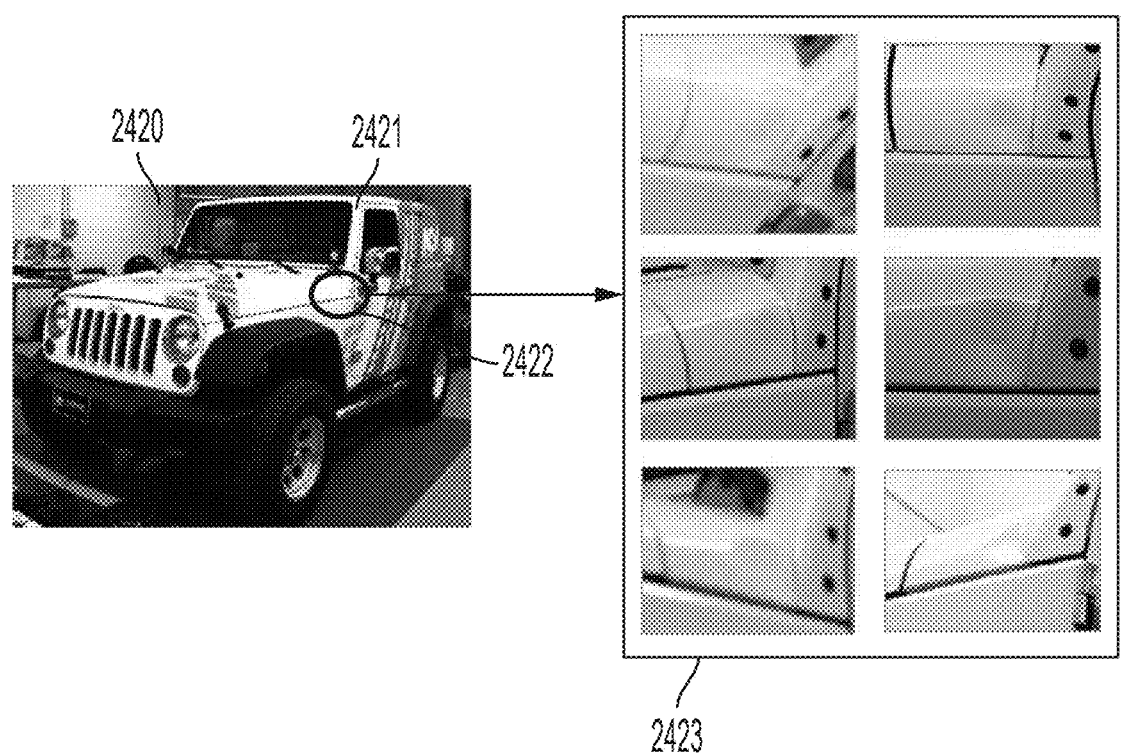
FIG. 24B is an example of is an example of additional information which may be provided in response to a user selecting a tag, according to some embodiments of the technology described herein.

FIG. 24B is an example of is an example of additional information which may be provided in response to a user selecting a tag, according to some embodiments. As shown, image 2420 of vehicle 2421, has tag 2422 indicating a dent. The tag may be generated and/or applied as described herein.

A user may select tag 2422 to obtain additional information related to the dent. As shown, the additional information provide is images 2423 of the dent from different angles. The images may be captured from different cameras of a vehicle exterior inspection system such as cameras oriented at different angles, as described herein.

In some embodiments, a user may select any portion of image 2420 to obtain additional information about that portion of the image, such as additional images of a portion of the vehicle.

Figure 25:
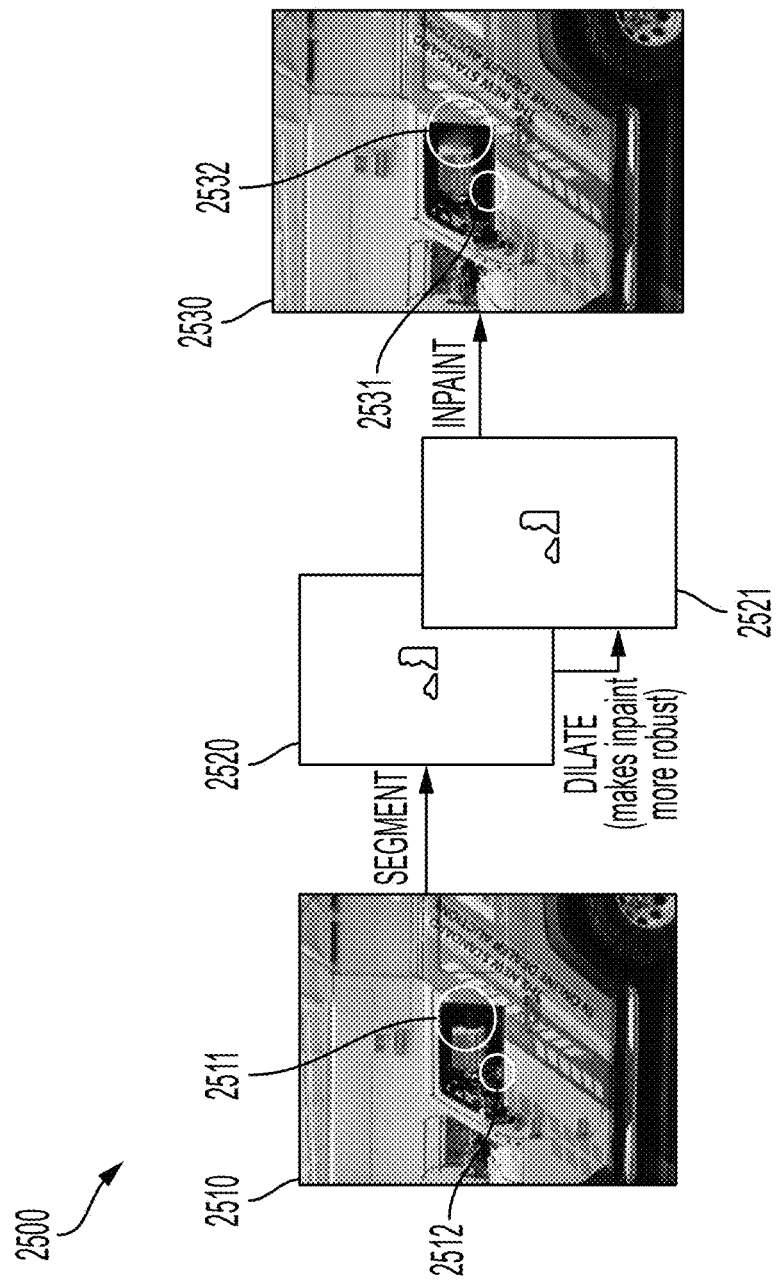
FIG. 25 is an example process for removing personally identifiable information (PII) from an image, according to some embodiments of the technology described herein.

FIG. 25 is an example process for removing personally identifiable information (PII) from an image, according to some embodiments. Process 2500 is for removing the PII from image 2510. Image 2510 may be captured from a camera of a vehicle exterior inspection system, as described herein. The process of FIG. 25 may be performed by a PII removal module of a vehicle exterior inspection system, as described herein.

The process 2500 begins by identifying the PII present in image 2510. In image PII is present within circles 2511, which includes the head of a driver, and 2512, which includes the hands of the driver. The PII may be identified by generating a mask 2520 indicative of the location(s) of the PII within the image. The mask 2520 may be generated using one or more machine learning models for example a neural network trained to generate object masks and/or a transformer-based model which generates object masks, among other suitable machine learning models. The mask may then be dilated to increase its size, shown as dilated mask 2521. The dilation ensures that all identified PII and any surrounding PII not included in mask 2520 is within the dilated mask 2521.

The PII may then be removed from image 2510 through an inpainting process, to generate inpainted image 2530. In the inpainted image the PII is removed, as shown in circles 2531 and 2532, where there is no longer a driver or evidence of the driver. In some embodiments, a machine learning-based inpainting model may be used to generate inpainted image 2530, for example a transformer-based ML model, a large mask inpainting model, and/or a diffusion model (e.g., Stable Diffusion Inpainting, Stable Diffusion (SDXL) Inpainting, Kandinsky Inpainting, etc.), among other suitable ML models. In some embodiments, the PII may be removed through other processes, such as blurring areas identified as having PII, or covering areas identified as having PII.

In some embodiments, inpainted image 2530 may be presented on a user interface of a vehicle exterior inspection system, as described herein. In some embodiments, inpainted image 2530 may be included in a vehicle condition report, as described herein.

Figure 26:
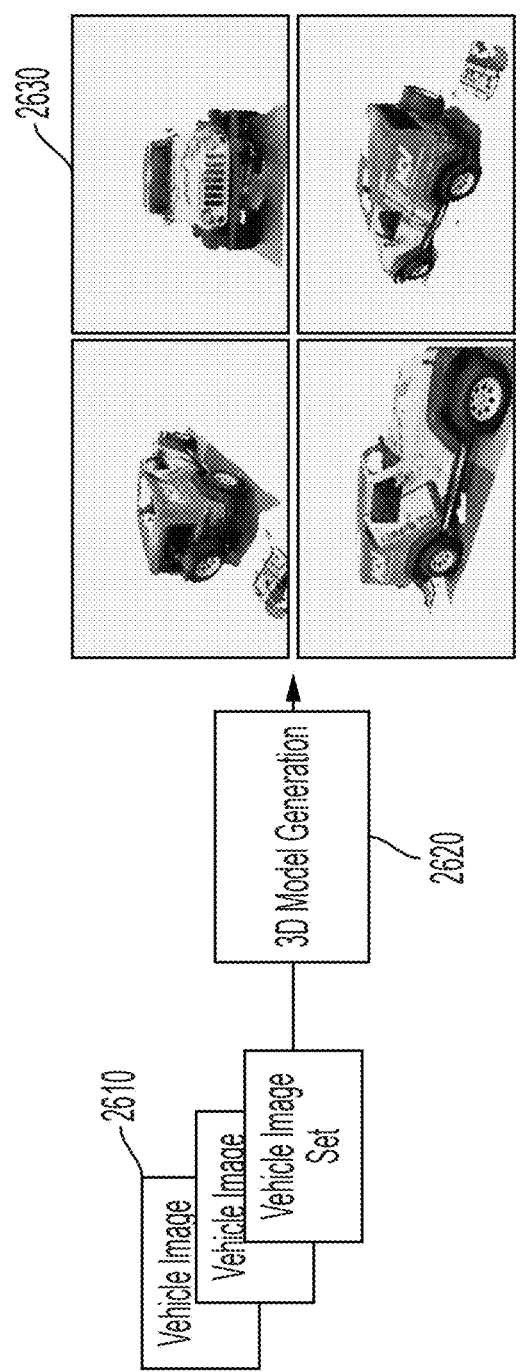
FIG. 26 is an example process for generating a 3D model of a vehicle, according to some embodiments of the technology described herein.

FIG. 26 is an example process for generating a 3D model of a vehicle, according to some embodiments. In FIG. 26, vehicle image sets 2610 are processed to generate 3D model 2630. Image sets 2610 may be captured by cameras of a vehicle exterior inspection system as described herein. In some embodiments, the image sets 2610 may be subsets of images determined from larger image sets, as described herein.

3D model 2630 may be generated by 3D model generation module 2620. The 3D model 2630 may be generated by determining a surface of the vehicle and applying images of the image sets 2610 to the surface. In some embodiments, the 3D model 2630 is generated using photogrammetry. In some embodiments, the 3D model 2630 is generated using neural radiance fields. In some embodiments, the 3D model 2630 is generated using Gaussian splatting.

In some embodiments, 3D model 2630 may be presented on a user interface of a vehicle exterior inspection system, as described herein. In some embodiments, 3D model 2630 may be included in a vehicle condition report, as described herein.

Figure 27:
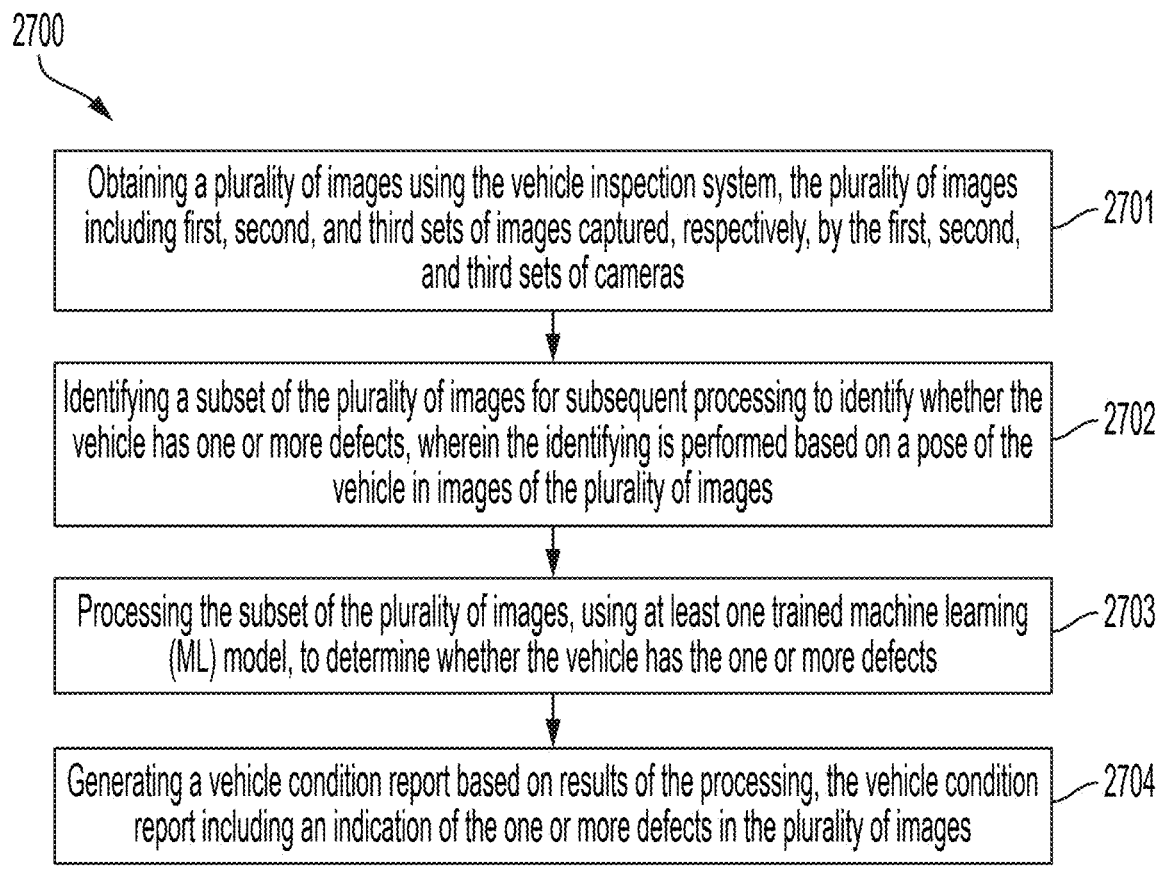
FIG. 27 is a flowchart of an illustrative process 2700 for analyzing vehicle condition using a vehicle exterior inspection system, according to some embodiments of the technology described herein.

FIG. 27 is a flowchart of an illustrative process 2700 for analyzing vehicle condition using a vehicle exterior inspection system, according to some embodiments. In some embodiments, the vehicle exterior inspection system used in performing process 2700 includes a plurality of sensor arrays including first, second and third sensor arrays having respective first, second, and third sets of cameras. In some embodiments, the vehicle exterior inspection system used in performing process 2700 may be configured as described herein, for example as described with reference to FIGS. 17A-12B. In some embodiments, process 2700 may be performed by one or more processors of a vehicle undercarriage inspection system, for example processors 2130 as described with reference to FIGS. 21A-B.

Process 2700 begins at step 2701 by obtaining a plurality of images using the vehicle inspection system, the plurality of images including first, second, and third sets of images captured, respectively, by the first, second, and third sets of cameras. In some embodiments, step 2701 may be performed as the vehicle and vehicle exterior inspection system move relative to each other. In some embodiments the vehicle may drive through and/or past the vehicle exterior inspection system, as described herein. In some embodiments the vehicle exterior inspection system may move around the vehicle, as described herein. In some embodiments, the vehicle may move through and/or past the vehicle exterior inspection system as the vehicle exterior inspection system moves around the vehicle.

Next, step 2702 is performed by identifying a subset of the plurality of images for subsequent processing to identify whether the vehicle has one or more defects, wherein the identifying is performed based on a pose of the vehicle in images of the plurality of images. In some embodiments, the pose of the vehicle is determined based on the position of the vehicle within an image. In some embodiments, the pose of the vehicle is determined based on the position of one or more parts of the vehicle within an image. In some embodiments the pose of the vehicle is determined based on the position of a bounding box of the vehicle and/or a part of the vehicle within an image. In some embodiments, the subset of images is determined by comparing a pose of the vehicle within an image to a set of desired vehicle poses, such as described with reference to FIGS. 22A-E. In some embodiments, the subset of images may be determined based on one or more other attributes of the images including a level of noise and/or blur in the image, a lighting of the image, a contrast of the image, a focus of the image, and/or other attributes of the image.

Next, step 2703 is performed by processing the subset of the plurality of images, using at least one trained machine learning (ML) model, to determine whether the vehicle has the one or more defects. In some embodiments the one or more defects may include defects as described herein. In some embodiments, step 2703 may be performed by one or more components of a vehicle exterior inspection system, for example data processing and analysis module 2131, as described in reference to FIG. 21B. In some embodiments, the at least one trained machine learning may include ML models such as those described herein with reference to 23A-E.

Next, step 2704 is performed by generating a vehicle condition report based on results of the processing, the vehicle condition report including an indication of the one or more defects in the plurality of images. In some embodiments, step 2704 is performed by a condition report generation module such as 2135, as described with reference to FIG. 21B. In some embodiments, the condition report includes data related to the vehicle, for example as described with reference to FIG. 2. In some embodiments, data of a vehicle condition report may be determined using one or more machine learning models, such as those described herein with reference to 23A-E. In some embodiments, the vehicle condition report may be displayed and/or otherwise provided for a vehicle inspector for review.

Following the conclusion of process 2700, the inspector may proceed to conduct a further vehicle inspection. Accordingly, in some embodiments, the inspector may use the vehicle condition report and/or targeted professional inspection instructions to determine particular techniques to use during the further vehicle inspection (e.g., to check for the potential vehicle defects).

Additionally, or alternatively, the inspector may be a potential buyer who may use the vehicle condition report to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 28A:
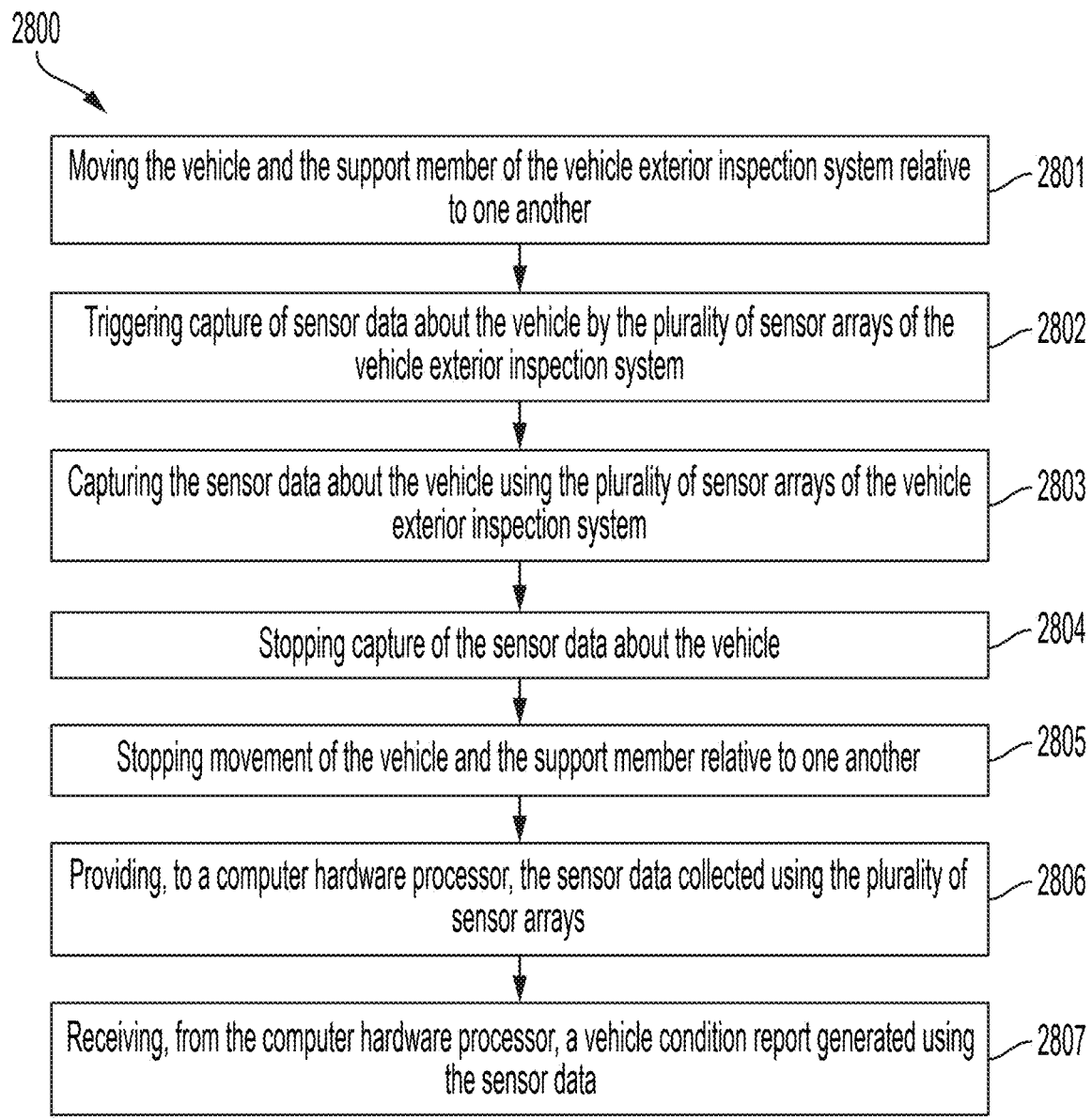
FIG. 28A is a flowchart of an illustrative process 2800 for inspecting a vehicle using a vehicle exterior inspection system, according to some embodiments of the technology described herein.

FIG. 28A is a flowchart of an illustrative process 2800 for inspecting a vehicle using a vehicle exterior inspection system, according to some embodiments. In some embodiments, the vehicle exterior inspection system used in performing process 2800 includes a support member and a plurality of sensor arrays coupled to the support member, the plurality of sensor arrays having respective sets of sensors oriented in different directions. In some embodiments, the vehicle exterior inspection system may be configured as described herein, for example as described with reference to FIGS. 17A-21B. Some steps of process 2800 may be performed by an inspector and some steps may be performed by one or more components of the vehicle exterior inspection system.

Process 2800 begins with step 2801 by moving the vehicle and the support member of the vehicle inspection system relative to one another. In some embodiments the vehicle may drive through and/or past the vehicle exterior inspection system, as described herein. In some embodiments the vehicle may be driven by an inspector or by another individual. In some embodiments the vehicle exterior inspection system may move around the vehicle, such as described herein with reference to FIGS. 17C-H. In some embodiments, the vehicle may move through and/or past the vehicle exterior inspection system as the vehicle exterior inspection system moves around the vehicle.

Next, step 2802 is performed by triggering capture of sensor data about the vehicle by the plurality of sensor arrays of the vehicle exterior inspection system. In some embodiments, the triggering is performed automatically by the vehicle exterior inspection system. In some embodiments the triggering is performed automatically based on signals obtained from one or more sensors of and/or connected to the vehicle exterior inspection system, such as TOF sensors, and/or cameras. In some embodiments, the triggering is performed when the vehicle is determined to be at one or more positions relative to the vehicle exterior inspection undercarriage system based on sensor data. In some embodiments different sensors of the vehicle exterior inspection system may be triggered at different times, for example sensors having different orientations may be triggered based on the position of the vehicle. In some embodiments, the triggering is performed in response to one or more inputs received from an inspector, such as through a user interface of the vehicle exterior inspection system or other inputs as described herein.

Next, step 2803 is performed by capturing the sensor data about the vehicle using the plurality of sensor arrays of the vehicle inspection system.

Next, step 2804 is performed by stopping capture of the sensor data about the vehicle. In some embodiments, the stopping is performed automatically by the vehicle exterior inspection system. In some embodiments the stopping is performed automatically based on signals obtained from one or more sensors of the vehicle exterior inspection system, such as TOF sensors, and/or cameras. In some embodiments, the stopping is performed when the vehicle is determined to be at one or more positions relative to the vehicle exterior inspection system based on sensor data. In some embodiments individual sensors may be stopped at different times, for example sensors having different orientations may be stopped based on the position of the vehicle. In some embodiments, the stopping is performed in response to inputs received from an inspector, such as through a user interface of the vehicle exterior inspection system or other inputs as described herein.

Next, step 2805 is performed by stopping movement of the vehicle and the support member relative to one another. In some embodiments, step 2805 is performed by an inspector or other individual by stopping the vehicle. In some embodiments, step 2805 is performed by an inspector by providing an input to the vehicle inspection system to stop moving. In some embodiments, step 2805 is performed automatically by the vehicle exterior inspection system.

Next, step 2806 is performed by providing, to a computer hardware processor, the sensor data collected using the plurality of sensor arrays. In some embodiments, the computer hardware processor is a component of the vehicle exterior inspection system. In some embodiments the computer hardware processor is a processor remote from the vehicle exterior inspection system. In some embodiments, the data may be formatted and/or processed before it is provided to the computer hardware processor. For example, the data may be processed as described with reference to the components of processor 2130, as discussed with reference to FIG. 21B. In some embodiments, the data about the vehicle includes a subset of images which may be determined as described with reference to FIGS. 22A-E.

Next, step 2807 is performed by receiving, from the computer hardware processor, a vehicle condition report generated using the sensor data. In some embodiments, the condition report includes data related to the vehicle, for example as described with reference to FIG. 2. In some embodiments the vehicle condition report includes data related to one or more defects of the vehicle and/or one or more characteristics of the vehicle, as described herein. In some embodiments, data of a vehicle condition report may be determined using one or more machine learning models, such as those described herein with reference to 23A-E. In some embodiments, the vehicle condition report may be displayed and/or otherwise provided for a vehicle inspector for review.

Following the conclusion of process 2800, the inspector may proceed to conduct a further vehicle inspection. Accordingly, in some embodiments, the inspector may use the vehicle condition report and/or targeted professional inspection instructions to determine particular techniques to use during the further vehicle inspection (e.g., to check for the potential vehicle defects).

Additionally, or alternatively, the inspector may be a potential buyer who may use the vehicle condition report to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 28B:
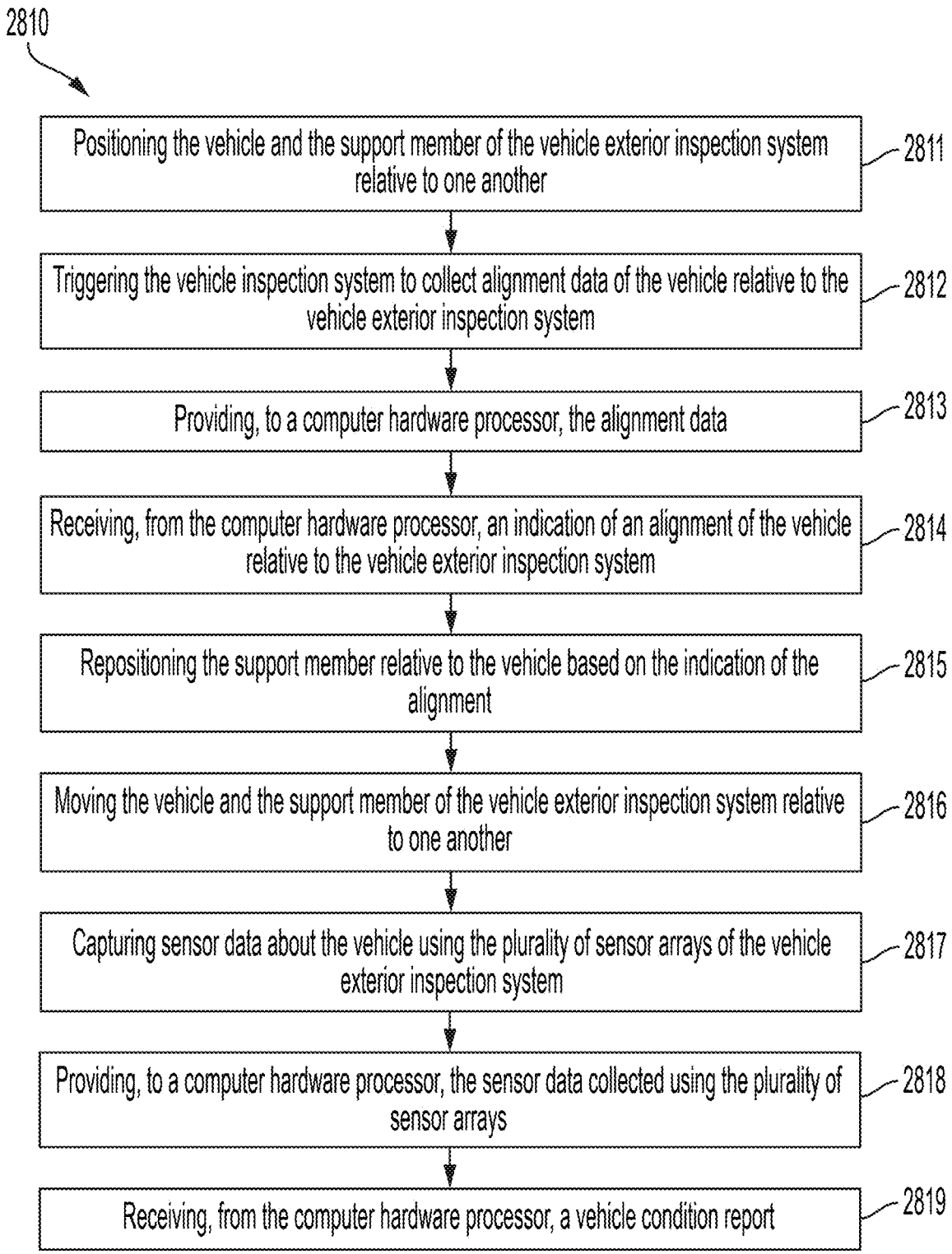
FIG. 28B is a flowchart of an illustrative process 2810 for preparing and using a vehicle exterior inspection system to perform a vehicle inspection, according to some embodiments of the technology described herein.

FIG. 28B is a flowchart of an illustrative process 2810 for preparing and using a vehicle exterior inspection system to perform a vehicle inspection, according to some embodiments. In some embodiments, the vehicle exterior inspection system used in performing process 2810 includes a support member and a plurality of sensor arrays coupled to the support member, the plurality of sensor arrays having respective sets of sensors oriented in different directions. In some embodiments, the vehicle exterior inspection system may be configured as described herein, for example as described with reference to FIGS. 17A-21B. Some steps of process 2810 may be performed by an inspector and some steps may be performed by one or more components of the vehicle exterior inspection system.

Process 2810 begins with step 2811 by positioning the vehicle and the support member of the vehicle inspection system relative to one another. In some embodiments, vehicle exterior inspection system may be positioned as described with reference to FIGS. 3A-F, with the support member positioned in front of and facing the side of a vehicle. In some embodiments, the vehicle exterior inspections system may be positioned as described with reference to FIGS. 17A-H. In some embodiments, an inspector may perform step 2811. In some embodiments step 2811 may be performed automatically by the vehicle exterior inspection system. In some embodiments step 2811 may be performed in part by an inspector and in part by the vehicle exterior inspection system.

Next, step 2812 is performed by triggering the vehicle exterior inspection system to collect alignment data of the vehicle relative to the vehicle inspection system. In some embodiments, the triggering is performed automatically by the vehicle exterior inspection system. In some embodiments the triggering is performed automatically based on signals obtained from one or more sensors of the vehicle exterior inspection system, such as TOF sensors, and/or cameras. In some embodiments, the triggering is performed when the vehicle is determined to be at one or more positions relative to the vehicle exterior inspection system based on sensor data.

In some embodiments, the triggering is performed manually by an inspector by providing one or more inputs to a vehicle exterior inspection system, such as through a user interface or other inputs as described herein.

Next, step 2813 is performed by providing, to a computer hardware processor, the alignment data. In some embodiments, the computer hardware processor is a component of the vehicle exterior inspection system. In some embodiments the computer hardware processor is a processor remote from the vehicle exterior inspection system. In some embodiments, the data may be formatted and/or processed before it is provided to the computer hardware processor.

Next, step 2814 is performed by receiving, from the computer hardware processor, an indication of an alignment of the vehicle relative to the vehicle inspection system. In some embodiments, the indication of alignment may be provided on a display of a vehicle exterior inspection system, as described in herein.

Next, step 2815 is performed by repositioning the support member relative to the vehicle based on the indication of the alignment. In some embodiments, step 2815 may be performed by an inspector or another individual. In some embodiments step 2815 may be performed automatically by the vehicle exterior inspection system. In some embodiments step 2815 may be performed in part by an inspector or other individual and in part automatically the vehicle exterior inspection system. In some embodiments, the indication of alignment includes a direction for repositioning, and step 2815 may be performed based on the direction for repositioning.

Next, step 2816 is performed by moving the vehicle and the support member of the vehicle inspection system relative to one another. In some embodiments the vehicle may drive through and/or past the vehicle exterior inspection system, as described herein. In some embodiments the vehicle may be driven by an inspector or by another individual. In some embodiments the vehicle exterior inspection system may move around the vehicle, such as described herein with reference to FIGS. 17C-H. In some embodiments, the vehicle may move through and/or past the vehicle exterior inspection system as the vehicle exterior inspection system moves around the vehicle.

Next, step 2817 is performed by capturing sensor data about the vehicle using the plurality of sensor arrays of the vehicle inspection system.

Next, step 2818 is performed by providing, to the computer hardware processor, the sensor data collected using the plurality of sensor arrays. In some embodiments, the computer hardware processor is a component of the vehicle exterior inspection system. In some embodiments the computer hardware processor is a processor remote from the vehicle exterior inspection system. In some embodiments, the data may be formatted and/or processed before it is provided to the computer hardware processor. For example, the data may be processed as described with reference to the components of processor 2130, as discussed with reference to FIG. 21B. In some embodiments, the data about the vehicle includes a subset of data, such as images, which may be determined as described with reference to FIGS. 22A-E.

Next, step 2819 is performed by receiving, from the computer hardware processor, a vehicle condition report. In some embodiments, the condition report includes data related to the vehicle, for example as described with reference to FIG. 2. In some embodiments the vehicle condition report includes data related to one or more defects of the vehicle and/or one or more characteristics of the vehicle, as described herein. In some embodiments, data of a vehicle condition report may be determined using one or more machine learning models, such as those described herein with reference to 23A-E. In some embodiments, the vehicle condition report may be displayed and/or otherwise provided for a vehicle inspector for review.

Following the conclusion of process 2810, the inspector may proceed to conduct a further vehicle inspection. Accordingly, in some embodiments, the inspector may use the vehicle condition report and/or targeted professional inspection instructions to determine particular techniques to use during the further vehicle inspection (e.g., to check for the potential vehicle defects).

Additionally, or alternatively, the inspector may be a potential buyer who may use the vehicle condition report to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 28C:
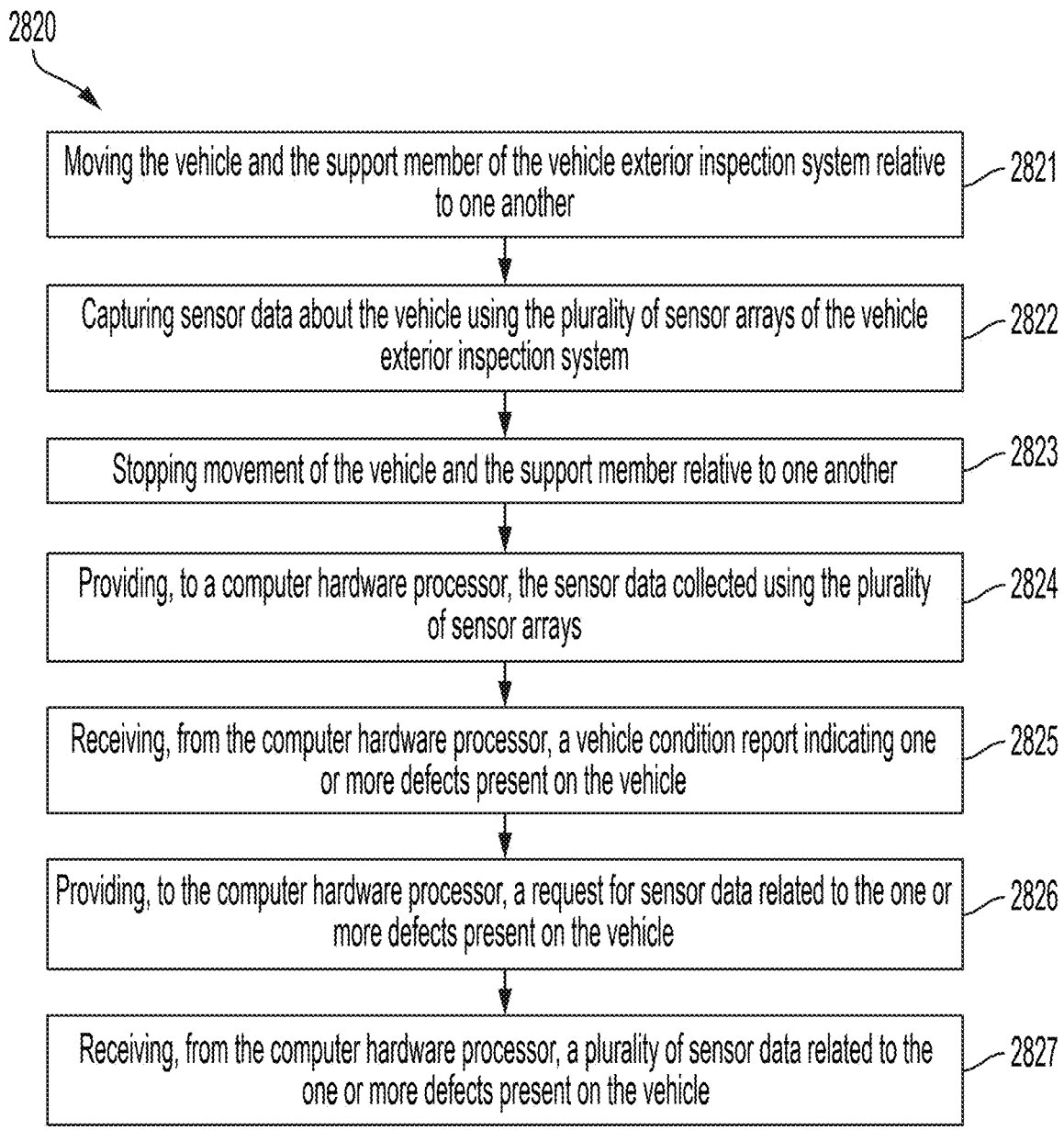
FIG. 28C is a flowchart of an illustrative process 2820 for using a vehicle exterior inspection system to analyze vehicle conditions, according to some embodiments of the technology described herein.

FIG. 28C is a flowchart of an illustrative process 2820 for using a vehicle exterior inspection system to analyze vehicle conditions, according to some embodiments. In some embodiments, the vehicle exterior inspection system used in performing process 2820 includes a support member and a plurality of sensor arrays coupled to the support member, the plurality of sensor arrays having respective sets of sensors oriented in different directions. In some embodiments, the vehicle exterior inspection system may be configured as described herein, for example as described with reference to FIGS. 17A-21B. Some steps of process 2820 may be performed by an inspector and some steps may be performed by one or more components of the vehicle exterior inspection system.

Process 2820 begins with step 2821 by moving the vehicle and the support member of the vehicle inspection system relative to one another. In some embodiments the vehicle may drive through and/or past the vehicle exterior inspection system, as described herein. In some embodiments the vehicle may be driven by an inspector or by another individual. In some embodiments the vehicle exterior inspection system may move around the vehicle, such as described herein with reference to FIGS. 17C-H. In some embodiments, the vehicle may move through and/or past the vehicle exterior inspection system as the vehicle exterior inspection system moves around the vehicle.

Next, step 2822 is performed by capturing sensor data about the vehicle using the plurality of sensor arrays of the vehicle exterior inspection system.

Next, step 2823 is performed by stopping movement of the vehicle and the support member relative to one another. In some embodiments, step 2823 is performed by an inspector or other individual by stopping the vehicle. In some embodiments, step 2823 is performed by an inspector by providing an input to the vehicle inspection system to stop moving. In some embodiments, step 2823 is performed automatically by the vehicle exterior inspection system.

Next, step 2824 is performed by providing, to a computer hardware processor, the sensor data collected using the plurality of sensor arrays. In some embodiments, the computer hardware processor is a component of the vehicle exterior inspection system. In some embodiments the computer hardware processor is a processor remote from the vehicle exterior inspection system. In some embodiments, the data may be formatted and/or processed before it is provided to the computer hardware processor. For example, the data may be processed as described with reference to the components of processor 2130, as discussed with reference to FIG. 21B. In some embodiments, the data about the vehicle includes a subset of data, such as images, which may be determined as described with reference to FIGS. 22A-E.

Next, step 2825 is performed by receiving, from the computer hardware processor, a vehicle condition report indicating one or more defects present on the vehicle. In some embodiments, the condition report includes data related to the vehicle, for example as described with reference to FIG. 2. In some embodiments the vehicle condition report includes data related to one or more defects of the vehicle and/or one or more characteristics of the vehicle, as described herein. In some embodiments, data of a vehicle condition report may be determined using one or more machine learning models, such as those described herein with reference to 23A-E. In some embodiments, the vehicle condition report may be displayed and/or otherwise provided for a vehicle inspector for review.

Next, step 2826 is performed by providing, to the computer hardware processor, a request for sensor data related to the one or more defects present on the vehicle. In some embodiments, step 2826 may be performed by an inspector, such as by providing one or more inputs to the vehicle exterior inspection system, such as through a user interface of the vehicle exterior inspection system, as described herein. In some embodiments, the vehicle condition report may include one or more selectable inputs related to the defects. In some embodiments, the request may be provided by selecting a region of an image, such as described with reference to FIGS. 24A-B.

Next, step 2827 is performed by receiving, from the computer hardware processor, a plurality of sensor data related to the one or more defects present on the vehicle. In some embodiments, the plurality of sensor data includes the sensor data used in determining the one or more defects are present. In some embodiments, the plurality of sensor data is provided in one or more visual displays, such as charts, plots, images and/or other visual displays. In some embodiments the plurality of sensor data includes a plurality of images of the defect, such as described with reference to FIG. 24B. In some embodiments, the plurality of sensor data may be displayed and/or otherwise provided for a vehicle inspector for review.

Following the conclusion of process 2820, the inspector may proceed to conduct a further vehicle inspection. Accordingly, in some embodiments, the inspector may use the sensor data related to the one or more defects and/or targeted professional inspection instructions to determine particular techniques to use during the further vehicle inspection (e.g., to check for the potential vehicle defects).

Additionally, or alternatively, the inspector may be a potential buyer who may use sensor data related to the one or more defects to make more informed pricing offers or to perform an inspection of the vehicle for themselves (e.g., to determine the presence of the potential vehicle defects). Additionally, or alternatively, the inspector may be a potential seller who may use the output to anticipate potential customer complaints. Additionally, or alternatively, the inspector may be the vehicle owner who may use the output to anticipate component failures and repairs.

Figure 29:
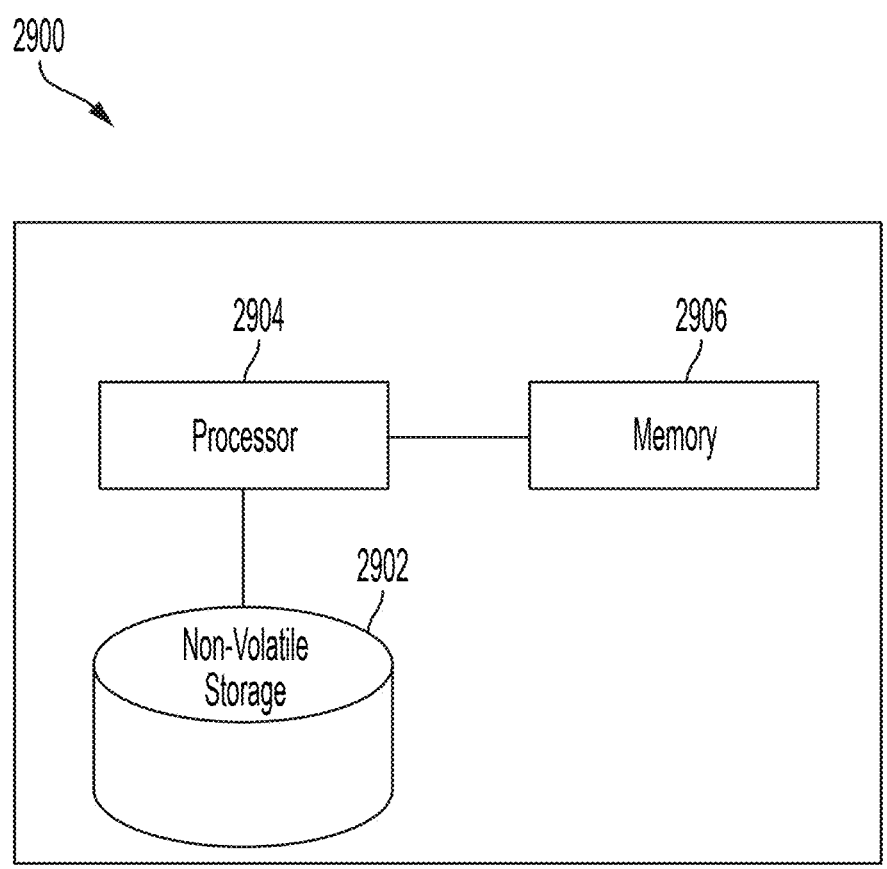
FIG. 29 illustrates a block diagram of an illustrative computing system that may be used in implementing some embodiments of the technology described herein.

FIG. 29 illustrates a block diagram of an illustrative computing system that may be used in implementing some embodiments of the technology described herein. An illustrative implementation of a computer system 2900 that may be used in connection with any of the embodiments of the disclosure provided herein is shown in FIG. 29. For example, any of the computing devices described herein (e.g., 116, 120, 145, 154, 164, 173, 182, 930, 2130) may be implemented as computer system 2900. The computer system 2900 may include one or more computer hardware processors 2904 and one or more articles of manufacture that comprise non-transitory computer-readable storage media, for example, one or more volatile storage device 2906 (e.g., random access memory or any other suitable type of memory) and/or one or more non-volatile storage devices 2902 (e.g., a hard disk, a flash memory, etc.). The hardware processor 2902(s) may control writing data to and reading data from the volatile storage device(s) 2906 and the non-volatile storage device(s) 2902 in any suitable manner. To perform any of the functionality described herein, including with respect to any process described herein, the hardware processor(s) 2904 may execute one or more processor-executable instructions stored in one or more non-transitory computer-readable storage media (e.g., the volatile storage device(s) 2906 and/or non-volatile storage device(s) 2902), which may serve as non-transitory computer-readable storage media storing processor-executable instructions for execution by the hardware processor(s) 2904.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein may be implemented in any of numerous ways. For example, the embodiments may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, tablet, or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, fiber optic networks, or any suitable combination thereof.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computers or other processors to implement various aspects of the technology as described above. As used herein, the term "computer-readable storage medium" encompasses only a non-transitory computer readable medium that may be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that may be employed to program a computer or other processor to implement various aspects of the technology as described above. Additionally, one or more computer programs that when executed perform methods of the technology described herein need not reside on a single computer or processor, but may be distributed in a modular fashion amongst a number of different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Unless otherwise specified, the terms "approximately," "substantially," and "about" may be used to mean within ±10% of a target value in some embodiments. The terms "approximately," "substantially" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

Various aspects are described in this disclosure, which include, but are not limited to, the following aspects:

1. A vehicle inspection system for inspecting a vehicle, the system comprising:
   a vehicle exterior inspection system comprising: a first support member; a first sensor array coupled to the first support member and comprising a first set of cameras positioned to capture images of wheels of the vehicle being imaged; a second sensor array coupled to the first support member and comprising a second set of cameras positioned to capture images of a side of the vehicle being imaged; and a third sensor array coupled to the first support member and comprising a third set of cameras positioned to capture images of a roof of the vehicle being imaged; a vehicle undercarriage inspection system comprising: a base having a width and a depth respectively extending along first and second directions orthogonal to one another, the width extending from a first end of the base to a second end of the base, the base supporting a fourth sensor array configured to capture images of an undercarriage of the vehicle, wherein the fourth sensor array comprises: a first camera positioned at a first side of the base, and oriented towards the first side of the base; a second camera positioned at a second side of the base, and oriented towards the second side of the base; and a third camera positioned between the first and second cameras, wherein the vehicle inspection system is configured to: capture a first plurality of images of the vehicle using the first, second and third sets of cameras of the vehicle exterior inspection system; and capture a second plurality of images of the undercarriage of the vehicle using the fourth sensor array of the vehicle undercarriage inspection system.

2. The vehicle inspection system of aspect 1, further comprising:
a computer hardware processor configured to: when the vehicle is moved relative to the vehicle exterior inspection system and the vehicle undercarriage inspection system: triggering the capture of the first plurality of images of the vehicle using the first, second and third sets of cameras of the vehicle exterior inspection system, receiving the first plurality of images, and/or processing the first plurality of images; and triggering the capture of a second plurality of images of the undercarriage of the vehicle using the fourth sensor array of the vehicle undercarriage inspection system, receiving the second plurality of images, and/or processing the second plurality of images.

3. The vehicle inspection system of any of aspects 1-2, wherein: the vehicle inspection system is configured to trigger the capture the first and second plurality of images based on a position of the vehicle.

4. The vehicle inspection system of any of aspects 1-3, wherein the vehicle undercarriage inspection system further comprises: a sensor configured to output data indicative of the position and/or motion of the vehicle relative to the vehicle inspection system, wherein the capturing of the first plurality of images is performed in response to determining the vehicle is at a first position and/or first distance relative to the vehicle inspection system, based on the data indicative of the position and/or motion of the vehicle.

5. The vehicle inspection system of any of aspects 1-4, wherein: the capturing of the second plurality of images is performed in response to determining the vehicle is at a second position and/or distance relative to the vehicle inspection system, different from the first position, based on the data indicative of the position and/or motion of the vehicle.

6. The vehicle inspection system of any of aspects 1-5, wherein: the second position is closer to the vehicle inspection system than the first position, and/or the first distance is smaller than the second distance.

7. The vehicle inspection system of any of aspects 1-5, wherein: the computer hardware processor is further configured to perform: stopping the capturing of the first plurality of images in response to determining the vehicle is at a third position and/or distance relative to the vehicle inspection system, different from the first and second positions and/or distances, based on the data indicative of the position and/or motion of the vehicle; and stopping the capturing of the second plurality of images in response to determining the vehicle is at a fourth position and/or distance relative to the vehicle inspection system, different from the first, second and third positions and/or distances, based on the data indicative of the position and/or motion of the vehicle.

8. The vehicle inspection system of any of aspects 1-7, wherein the vehicle exterior inspection system further comprises: a second support member; a fourth sensor array coupled to the second support member and comprising a fourth set of cameras positioned to capture images of wheels of the vehicle being imaged; a fifth sensor array coupled to the second support member and comprising a fifth set of cameras positioned to capture images of a side of the vehicle being imaged; and a sixth sensor array coupled to the second support member and comprising a sixth set of cameras positioned to capture images of a roof of the vehicle being imaged.

9. The vehicle inspection system of any of aspects 1-8, wherein: the vehicle exterior inspection system is portable and is collapsible between a deployed and a stowed configuration, and is configured to image the vehicle when in the deployed configuration; and wherein the vehicle undercarriage inspection system weighs less than 10 pounds, and further comprises a handle attached to the base for lifting the vehicle undercarriage inspection system.

10. The vehicle inspection system of any of aspects 1-9, wherein one or more of the first, second, third and fourth sensor arrays comprise one or more of: a microphone, an infrared camera, a thermal camera, a magnetometer, a time of flight sensor, a light source, and/or an air quality sensor.

11. The vehicle inspection system of any of aspects 1-10, wherein first, second, and third sensor arrays are configured such that the combined FOV of the first, second and third sets of cameras spans at least 150 inches in height, 300 inches in length and 120 inches in width.

12. A vehicle inspection system for analyzing the condition of a vehicle, the system comprising: a vehicle exterior inspection system comprising: a first support member; a first sensor array coupled to the first support member and comprising a first set of cameras positioned to capture images of wheels of the vehicle being imaged; a second sensor array coupled to the first support member and comprising a second set of cameras positioned to capture images of a side of the vehicle being imaged; and a third sensor array coupled to the first support member and comprising a third set of cameras positioned to capture images of a roof of the vehicle being imaged; a vehicle undercarriage inspection system comprising: a base having a width and a depth respectively extending along first and second directions orthogonal to one another, the width extending from a first end of the base to a second end of the base, the base supporting a fourth sensor array configured to capture images of an undercarriage of the vehicle, wherein the fourth sensor array comprises: a first camera positioned at a first side of the base, and oriented towards the first side of the base; a second camera positioned at a second side of the base, and oriented towards the second side of the base; and a third camera positioned between the first and second cameras; and a computer hardware processor configured to perform: obtaining a first plurality of images of the vehicle captured using the first, second and third sets of cameras of the vehicle exterior inspection system; and obtaining a second plurality of images of the undercarriage of the vehicle captured using the fourth sensor array of the vehicle undercarriage inspection system; processing images of the first and second pluralities of images, using at least one trained machine learning (ML) model, to determine whether the vehicle has one or more defects; and generating a vehicle condition report based on results of the processing of the images of the first plurality of images and the composite image.

13. The vehicle inspection system of aspect 12, wherein the computer hardware processor is further configured to perform: generating a composite image of the undercarriage of the vehicle by combining images of the second plurality of images, wherein the composite image is processed using the at least one machine learning model to determine whether the vehicle has the one or more defects.

14. The vehicle inspection system of any of aspects 12-13, wherein the one or more defects include: scratches to an exterior of the vehicle; cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, a missing catalytic converter and/or suspension modifications.

15. The vehicle inspection system of any of aspects 12-14, wherein the computer hardware processer is further configured to perform: generating a 3D model of the of the vehicle based on the first and second pluralities of images; generating a visualization of the 3D model; and providing access to the visualization to one or more users.

16. The vehicle inspection system of any of aspects 12-15, wherein the computer hardware processor is further configured to perform: before processing the images of the first plurality of images, identifying a subset of the first plurality of images based on a pose of the vehicle in images of the plurality of images, wherein processing the images of the first plurality of images comprises processing the subset of images.

17. The vehicle inspection system of any of aspects 12-16, wherein: the vehicle undercarriage imaging system further comprises a sensor configured to output data indicative of the position and/or motion of the vehicle relative to the vehicle undercarriage inspection system; and the computer hardware processor is further configured to perform: determining, based on the data indicative of the position and/or motion of the vehicle, a speed of the vehicle relative to the vehicle undercarriage inspection system, wherein the composite image is generated based on the vehicle speed.

18. The vehicle inspection system of any of aspects 12-17, wherein one or more of the first, second, third and fourth sensor arrays comprise one or more of: a microphone, an infrared camera, a thermal camera, a magnetometer, a time of flight sensor, a light source, and/or an air quality sensor.

19. The vehicle inspection system of any of aspects 12-18, wherein: obtaining the first plurality of images comprises capturing the first plurality of images of the vehicle using the first, second and third sets of cameras of the vehicle exterior inspection system; and obtaining the second plurality of images comprises capturing the second plurality of images of the undercarriage of the vehicle using the fourth sensor array of the vehicle undercarriage inspection system.

20. A vehicle inspection system, for inspecting a vehicle, the vehicle inspection system comprising: a vehicle exterior inspection system comprising: a first support member comprising a first portion and a second portion angled relative to the first portion; a first plurality of sensor arrays coupled to the first support member, the first plurality of sensor arrays comprising: a first sensor array comprising a first set of cameras oriented in multiple first directions, the first sensor array being coupled to the first support member at a position at which the first set of cameras has one or more wheels of a vehicle in its field of view (FOV) when the first sensor array is being used to image the vehicle; a second sensor array comprising a second set of cameras oriented in multiple second directions, the second sensor array being coupled to the first support member at a position at which the second set of cameras has a first side of the vehicle in its FOV when the second sensor array is being used to image the vehicle; and a third sensor array comprising a third set of cameras oriented in multiple third directions, the third sensor array being coupled to the first support member at a position at which the third set of cameras has a roof of the vehicle in its FOV when the third sensor array is being used to image the vehicle; and a vehicle undercarriage inspection system, comprising: a base having a width and a depth respectively extending along first and second directions orthogonal to one another, the width extending from a first end of the base to a second end of the base; a fourth sensor array coupled to the base, the fourth sensor array comprising a set of cameras oriented in multiple directions, the set of cameras including: a first camera oriented in part towards the first end of the base; a second camera oriented in part towards the second end of the base; and a third camera positioned between the first and second cameras.

21. A method for inspecting a vehicle using a vehicle inspection system, the vehicle inspection system comprising a vehicle exterior inspection system comprising a support member and a plurality of exterior sensor arrays coupled to the support member, the plurality of exterior sensor arrays comprising respective sets of sensors oriented in different directions, and a vehicle undercarriage inspection system comprising an undercarriage sensor array comprising first, second and third cameras configured to capture images at different angles relative to the vehicle undercarriage, and a sensor configured to output data indicative of the position and/or motion of the vehicle relative to the vehicle inspection system, the method comprising: moving the vehicle and the vehicle inspection system relative to one another; triggering capture, by the plurality of exterior sensor arrays and undercarriage sensor array, of sensor data about the vehicle; capturing the sensor data about the vehicle using the plurality of exterior sensor arrays and undercarriage sensor array of the vehicle inspection system; stopping capture of the sensor data about the vehicle; stopping movement of the vehicle and the vehicle inspection system relative to one another; generating a vehicle condition report based on the sensor data collected using the plurality of exterior sensor arrays and the undercarriage sensor array.

22. The method of aspect 21, wherein the generating comprises generating the vehicle condition report using the vehicle inspection system.

23. The method of any of aspects 21-22, wherein the generating comprises:
providing to a computer hardware processor, separate from the vehicle inspection system, at least some of the sensor data collected using the plurality of exterior sensor arrays and the undercarriage sensor array.

24. The method of any of aspects 21-23, wherein the triggering is performed by the vehicle inspection system based on the data indicative of the position and/or motion of the vehicle.

25. The method of any of aspects 21-24, wherein the triggering comprises:
triggering capture of the sensor data by the plurality of exterior sensor arrays when the vehicle is determined to be at a first position and/or distance relative to the vehicle inspection system based on the data indicative of the position and/or motion of the vehicle.

26. The method of aspect 25, wherein the triggering comprises: triggering capture of the sensor data by the undercarriage sensor array when the vehicle is determined to be at a second position and/or distance relative to the vehicle inspection system, different from the first position, based on the data indicative of the position and/or motion of the vehicle.

27. The method of any of aspects 25-26, wherein the second position is closer to the vehicle inspection system than the first position, and/or the second distance is smaller than the first distance.

28. The method of any of aspects 25-27, wherein the stopping is performed by the vehicle inspection system based on the data indicative of the position and/or motion of the vehicle.

29. The method of any of aspects 21-28, further comprising: before the moving: placing a mobile vehicle diagnostic device (MVDD) of the vehicle inspection system at an engine of the vehicle, wherein the triggering comprises triggering a sensor array of the MVDD of the vehicle inspection system to capture the sensor data about the engine of the vehicle and the capturing comprises using the MVDD to capture the sensor data about the engine of the vehicle.

30. A method for inspecting a vehicle using a vehicle inspection system, the vehicle inspection system comprising a vehicle exterior inspection system comprising a support member and a plurality of exterior sensor arrays coupled to the support member, the plurality of exterior sensor arrays comprising respective sets of sensors oriented in different directions, and a vehicle undercarriage inspection system comprising an undercarriage sensor array comprising first, second and third cameras configured to capture images at different angles relative to the vehicle undercarriage, and a sensor configured to output data indicative of the position and/or motion of the vehicle relative to the vehicle undercarriage inspection system, the method comprising: moving the vehicle and the vehicle inspection system relative to one another; triggering capture, by the plurality of exterior sensor arrays and undercarriage sensor array, of sensor data about the vehicle; capturing the sensor data about the vehicle using the plurality of exterior sensor arrays and undercarriage sensor array of the vehicle inspection system; stopping capture of the sensor data about the vehicle; stopping movement of the vehicle and the vehicle inspection system relative to one another; processing the sensor data, using a computer hardware processor, to identify one or more vehicle defects.

31. The method of aspect 30, wherein the triggering comprises: triggering capture of the sensor data by the plurality of exterior sensor arrays is performed when the vehicle is determined to be at a first position and/or distance relative to the vehicle inspection system based on the data indicative of the position and/or motion of the vehicle.

32. The method of aspect 31, wherein the triggering comprises: triggering capture of the sensor data by the undercarriage sensor array is performed when the vehicle is determined to be at a second position and/or distance relative to the vehicle inspection system, different from the first position, based on the data indicative of the position and/or motion of the vehicle.

33. The method of any of aspects 30-32, wherein the stopping is performed by the vehicle inspection system based the data indicative of the position and/or motion of the vehicle.

34. The method of any of aspects 30-33, further comprising: before the moving: placing a mobile vehicle diagnostic device (MVDD) of the vehicle inspection system at an engine of the vehicle, wherein the triggering comprises triggering a sensor array of the MVDD of the vehicle inspection system to capture the sensor data about the engine of the vehicle and the capturing comprises using the MVDD to capture the sensor data about the engine of the vehicle.

35. A method for inspecting a vehicle using a vehicle inspection system, the vehicle inspection system comprising a vehicle exterior inspection system comprising a support member and a plurality of exterior sensor arrays coupled to the support member, the plurality of exterior sensor arrays comprising respective sets of sensors oriented in different directions, and a vehicle undercarriage inspection system comprising an undercarriage sensor array comprising first, second and third cameras configured to capture images at different angles relative to the vehicle undercarriage, and a sensor configured to output data indicative of the position and/or motion of the vehicle relative to the vehicle inspection system, the method comprising: positioning the vehicle, the vehicle exterior inspections system and the vehicle undercarriage inspection system relative to one another; triggering the vehicle inspection system to collect alignment data of the vehicle relative to the vehicle inspection system; obtaining an indication of an alignment of the vehicle relative to the vehicle inspection system based on the alignment data; based on the indication of the alignment of the vehicle, adjusting one or more of the exterior sensor arrays or the undercarriage sensor array; moving the vehicle and the vehicle inspection system relative to one another; capturing sensor data about the vehicle using the plurality of exterior sensor arrays and undercarriage sensor array of the vehicle inspection system; and processing the sensor data, using a computer hardware processor, to identify one or more vehicle defects.

36. The method of aspect 35, wherein the alignment data is captured by the sensor of the vehicle undercarriage inspection system configured to output the data indicative of the position and/or motion of the vehicle.

37. The method of any of aspects 35-36, wherein the moving comprises driving the vehicle past the vehicle undercarriage inspection system and vehicle exterior inspection system.

38. The method of any of aspects 35-37, wherein the moving comprises moving the vehicle exterior and vehicle undercarriage inspection systems about the vehicle.

39. The method of any of aspects 35-38, further comprising: before the moving: placing a mobile vehicle diagnostic device (MVDD) of the vehicle inspection system at an engine of the vehicle, wherein the triggering comprises triggering a sensor array of the MVDD of the vehicle inspection system to capture the sensor data about the engine of the vehicle and the capturing comprises using the MVDD to capture the sensor data about the engine of the vehicle.

40. The method of any of aspects 35-39, further comprising: before the processing: receiving an indication the capturing was unsuccessful; and recapturing second sensor data about the vehicle using the plurality of exterior sensor arrays and undercarriage sensor array of the vehicle inspection system.

41. A system for vehicle inspection, the system comprising: a first support member comprising a first portion and a second portion angled relative to the first portion; a first plurality of sensor arrays coupled to the first support member, the first plurality of sensor arrays comprising: a first sensor array comprising a first set of cameras oriented in multiple first directions, the first sensor array being coupled to the first support member at a position at which the first set of cameras has one or more wheels of a vehicle in its field of view (FOV) when the first sensor array is being used to image the vehicle; a second sensor array comprising a second set of cameras oriented in multiple second directions, the second sensor array being coupled to the first support member at a position at which the second set of cameras has a first side of the vehicle in its FOV when the second sensor array is being used to image the vehicle; and a third sensor array comprising a third set of cameras oriented in multiple third directions, the third sensor array being coupled to the first support member at a position at which the third set of cameras has a roof of the vehicle in its FOV when the third sensor array is being used to image the vehicle; and a processor configured to control the first plurality of sensor arrays to capture images of the vehicle.

42. The system of aspect 41, wherein the first sensor array is positioned below the second and third sensor arrays on the first support member.

43. The system of aspect 42, wherein the second sensor array is positioned below the third sensor array on the first support member.

44. The system of any of aspects 41-43, wherein the first and second sensor arrays are positioned on the first portion of the first support member, and the third sensor array is positioned on the second portion of the first support member.

45. The system of any of aspects 41-44, wherein the first sensor array further comprises: a microphone, an infrared camera, a thermal camera, a magnetometer, a light source and/or an air quality sensor.

46. The system of any of aspects 41-45, further comprising: a second support member comprising a third portion, and a fourth portion angled relative to the third portion; a second plurality of sensor arrays coupled to the second support member, the second plurality of sensor arrays comprising: a fourth sensor array comprising a fourth set of cameras oriented in multiple fourth directions, the fourth sensor array being coupled to the second support member at a position at which the fourth set of cameras has one or more wheels of a vehicle in its FOV when the fourth sensor array is being used to image the vehicle; a fifth sensor array comprising a fifth set of cameras oriented in multiple fifth directions, the fifth sensor array being coupled to the second support member at a position at which the fifth set of cameras has a second side of the vehicle in its field of view when the fifth sensor array is being used to image the vehicle; and a sixth sensor array comprising a sixth set of cameras oriented in multiple sixth directions, the sixth sensor array being coupled to the second support member at a position at which the sixth set of cameras has the roof of the vehicle in its field of view when the sixth sensor array is being used to image the vehicle, wherein the processor is further configured to control the second plurality of sensor arrays capture images of the vehicle.

47. The system of any of aspects 41-46, wherein the first plurality of sensor arrays is configured such that the combined FOV of the first, second and third sets of cameras spans at least 150 inches in height, 300 inches in length and 120 inches in width.

48. The system of any of aspects 41-47, wherein: during imaging the vehicle and support structure move relative to one another along a first direction; the first set of cameras comprises: a first camera oriented in part towards the first direction; a second camera oriented in part opposite the first direction; and a third camera oriented substantially perpendicular to the first direction; the first camera has a rocker panel and wheels of the vehicle in its field of view when being used to image the vehicle; the second camera has the rocker panel and rear of the vehicle in its field of view when being used to image the vehicle; and the third camera has one or more wheels of the vehicle in its field of view when being used to image the vehicle.

49. The system of any of aspects 41-48, wherein: during imaging the vehicle and support structure move relative to one another along a first direction; the second set of cameras comprises: a first camera oriented in part towards the first direction; a second camera oriented in part opposite the first direction; and a third camera oriented substantially perpendicular to the first direction; the first camera has the side and front of the vehicle in its field of view when being used to image the vehicle; the second camera has the side and rear of the vehicle in its field of view when being used to image the vehicle; and the third camera has the side of the vehicle in its field of view when being used to image the vehicle.

50. The system of any of aspects 41-49, wherein: during imaging the vehicle and support structure move relative to one another along a first direction; the third set of cameras comprises: a first camera oriented in part towards the first direction; a second camera oriented in part opposite the first direction; and a third camera oriented substantially perpendicular to the first direction; the first camera has the roof, front, and hood of the vehicle in its field of view when being used to image the vehicle; the second camera has the roof and rear of the vehicle in its field of view when being used to image the vehicle; and the third camera has the hood and the roof of the vehicle in its field of view when being used to image the vehicle.

51. The system of any of aspects 41-50, wherein: the first support member is portable and is collapsible between a deployed and a stowed configuration; and wherein the vehicle inspection system is configured to image the vehicle when the first support member is in the deployed configuration.

52. The system of any of aspects 41-51, wherein: the processor is configured to control the first plurality of sensor arrays to image the vehicle as the vehicle is driven past the first support member.

53. The system of any of aspects 41-52, wherein: the processor is configured to control the first support member to move about the vehicle, and wherein the processor is configured to control the first plurality of sensor arrays to image the vehicle as the first support member moves about the vehicle.

54. The system of any of aspects 41-53, wherein: the processor is further configured to process the images of the vehicle using at least one trained machine learning (ML) model, to determine whether the vehicle has the one or more defects, wherein the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

55. The system of any of aspects 41-54, further comprising a vehicle undercarriage inspection system comprising a fourth sensor array configured to capture signals related to the undercarriage of the vehicle.

56. A system for vehicle inspection, the system comprising: a support member; a first plurality of sensor arrays coupled to the first support member, the first plurality of sensor arrays comprising: a first sensor array comprising a first set of cameras oriented in multiple first directions and a first microphone; a second sensor array comprising a second set of cameras oriented in multiple second directions and a second microphone; and a third sensor array comprising a third set of cameras oriented in multiple third directions, and a third microphone; and a processor configured to control the first plurality of sensor arrays to capture images and audio recordings of the vehicle.

57. The system of aspect 56, wherein: during imaging the vehicle and support member move relative to one another along a first direction; and the first, second and third sets of cameras respectively comprise: a first camera oriented in part towards the first direction; a second camera oriented in part opposite the first direction; and a third camera oriented substantially perpendicular to the first direction.

58. The system of any of aspects 56-57, wherein: the processor is further configured to process the images and/or audio of the vehicle using at least one trained machine learning (ML) model, to determine whether the vehicle has the one or more defects; wherein the one or more defects include: scratches to an exterior of the vehicle; cracked windows, mirrors, or windshields; chipped paint; dents to the exterior of the vehicle; misaligned body panels; missing vehicle parts, non-standard replacement parts, non-standard paint; aftermarket vehicle accessories; rust/corrosion on the vehicle; damaged wheels; damaged tires; bald tires; tire sidewall bubbles; broken tire valves; wheel misalignment; mismatched tires; brake rotor discoloration; brake rotor damage; brake rotor wear; suspension modifications; engine damage; an exhaust leak; and/or transmission whine.

59. A system for vehicle inspection, the system comprising: a support member; a first plurality of sensor arrays coupled to the first support member, the first plurality of sensor arrays configured to capture signals about a vehicle as the vehicle and support member move relative to one another along a first direction, and comprising: a first sensor array comprising a first set of cameras, the first sensor array coupled to the first support member at a position at which the first set of cameras has a first side of the vehicle in its FOV when the first sensor array is being used to image the vehicle, the first set of cameras comprising: a first camera oriented in part towards the first direction; a second camera oriented in part opposite the first direction; and a third camera oriented substantially perpendicular to the first direction; and a second sensor array comprising a second set of cameras, the first sensor array coupled to the first support member at a position at which the second set of cameras has a roof of the vehicle in its FOV when the second sensor array is being used to image the vehicle, the second set of cameras comprising: a fourth camera oriented in part towards the first direction; a fifth camera oriented in part opposite the first direction; and a sixth camera oriented substantially perpendicular to the first direction; and a processor configured to control the first plurality of sensor arrays to capture images of the vehicle.

60. The system of aspect 59, wherein: the first camera has the side and front of the vehicle in its FOV when being used to image the vehicle; the second camera has the side and rear of the vehicle in its FOV when being used to image the vehicle; the third camera has the side of the vehicle in its FOV when being used to image the vehicle; the fourth camera has the roof, front, and hood of the vehicle in its FOV when being used to image the vehicle; the fifth camera has the roof and rear of the vehicle in its FOV when being used to image the vehicle; and the sixth camera has the hood and the roof of the vehicle in its FOV when being used to image the vehicle.

61. A method for analyzing condition of a vehicle from images of the vehicle collected by a vehicle inspection system, the vehicle inspection system comprising a plurality of sensor arrays comprising first, second and third sensor arrays comprising respective first, second, and third sets of cameras, the method comprising: using at least one computer hardware processor to perform: obtaining a plurality of images using the vehicle inspection system, the plurality of images including first, second, and third sets of images captured, respectively, by the first, second, and third sets of cameras; identifying a subset of the plurality of images for subsequent processing to identify whether the vehicle has one or more defects, wherein the identifying is performed based on a pose of the vehicle in images of the plurality of images; processing the subset of the plurality of images, using at least one trained machine learning (ML) model, to determine whether the vehicle has the one or more defects; and generating a vehicle condition report based on results of the processing, the vehicle condition report including an indication of the one or more defects in the plurality of images.

62. The method of aspect 61, wherein the obtaining comprises controlling the plurality of sensor arrays of the vehicle inspection system to capture the plurality of images of the vehicle.

63. The method of aspect 62, wherein the controlling comprises: controlling the first set of cameras to capture images of one or more wheels of the vehicle; controlling the second set of cameras to capture images of a first side of the vehicle; and controlling the third set of cameras to capture images of a roof of the vehicle.

64. The method of any of aspects 61-63, further comprising: generating a 3D model of the vehicle using at least some of the plurality of images; generating a visualization of the 3D model; and providing access to the visualization to one or more users.

65. The method of aspect 64, wherein the 3D model is generated using photogrammetry, neural radiance fields, or Gaussian splatting.

66. The method of any of aspects 61-65, further comprising: identifying, from among the plurality of images, an image containing personally identifiable information (PII); identifying a region of the image containing the PII; and distorting the region of the image containing the PII, wherein the vehicle condition report includes the image.

67. The method of any of aspects 61-66, wherein the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

68. The method of any of aspects 61-67, wherein: the vehicle inspection system further comprises a vehicle undercarriage inspection system; and the plurality of images includes a fourth set of images of an undercarriage of the vehicle captured by the vehicle undercarriage inspection system.

69. The method of any of aspects 61-68, wherein identifying the subset of the plurality of images for subsequent processing comprises: determining a degree of matching between the pose of the vehicle in images of the plurality of images and vehicle poses of a reference set of vehicle poses; and for each vehicle pose of the reference set of vehicle poses, identifying an image in the plurality of images having at least a threshold degree of matching and including the identified image in the subset of the plurality of images.

70. The method of aspect 69, wherein determining the degree of matching between the pose of the vehicle in the images of the plurality of images and vehicle poses of the reference set of vehicle poses comprises: determining a distance between a center of a bounding box of the vehicle in an image and the center of the image.

71. The method of any of aspects 69-70, wherein the set of vehicle poses includes poses associated with the cameras of the first, second and third sets of cameras.

72. A vehicle inspection system comprising: a plurality of sensor arrays comprising first, second and third sensor arrays comprising respective first, second, and third sets of cameras; and a computer hardware processor configured to perform: obtaining a plurality of images, the plurality of images including first, second, and third sets of images captured, respectively, by the first, second, and third sets of cameras; identifying a subset of the plurality of images for subsequent processing to identify whether the vehicle has one or more defects, wherein the identifying is performed based on a pose of the vehicle in images of the plurality of images; processing the subset of the plurality of images, using at least one trained machine learning (ML) model, to determine whether the vehicle has the one or more defects; and generating a vehicle condition report based on results of the processing, the vehicle condition report including an indication of the one or more defects in the plurality of images.

73. The vehicle inspection system of aspect 72, wherein the obtaining comprises controlling the plurality of sensor arrays of the vehicle inspection system to capture the plurality of images of the vehicle.

74. The vehicle inspection system of aspect 73, wherein the controlling comprises: controlling the first set of cameras to capture images of one or more wheels of the vehicle; controlling the second set of cameras to capture images of a first side of the vehicle; and controlling the third set of cameras to capture images of a roof of the vehicle.

75. The vehicle inspection system of any of aspects 72-74, further comprising: generating, using photogrammetry, neural radiance fields or Gaussian splatting, a 3D model of the vehicle using at least some of the plurality of images; generating a visualization of the 3D model; and providing access to the visualization to one or more users.

76. The vehicle inspection system of any of aspects 72-75, wherein the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint; aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

77. At least one non-transitory computer-readable storage medium storing processor-executable instructions that, when executed by at least one computer hardware processor, causes the at least one computer hardware processor to perform a method for analyzing conditions of a vehicle from images of the vehicle collected by a vehicle inspection system, the vehicle inspection system comprising a plurality of sensor arrays comprising first, second and third sensor arrays comprising respective first, second, and third sets of cameras, the method comprising: obtaining a plurality of images, the plurality of images including first, second, and third sets of images captured, respectively, by the first, second, and third sets of cameras; identifying a subset of the plurality of images for subsequent processing to identify whether the vehicle has one or more defects, wherein the identifying is performed based on a pose of the vehicle in images of the plurality of images; processing the subset of the plurality of images, using at least one trained machine learning (ML) model, to determine whether the vehicle has the one or more defects; and generating a vehicle condition report based on results of the processing, the vehicle condition report including an indication of the one or more defects in the plurality of images.

78. The at least one non-transitory computer-readable storage medium of aspect 77, wherein the obtaining comprises controlling the plurality of sensor arrays of the vehicle inspection system to capture the plurality of images of the vehicle.

79. The at least one non-transitory computer-readable storage medium of aspect 78, wherein the controlling comprises: controlling the first set of cameras to capture images of one or more wheels of the vehicle; controlling the second set of cameras to capture images of a first side of the vehicle; and controlling the third set of cameras to capture images of a roof of the vehicle.

80. The at least one non-transitory computer-readable storage medium of any of aspects 77-79, wherein the one or more defects include: scratches to an exterior of the vehicle, cracked windows, mirrors, or windshields, chipped paint, dents to the exterior of the vehicle, misaligned body panels, missing vehicle parts, non-standard replacement parts, non-standard paint, aftermarket vehicle accessories, rust/corrosion on the vehicle, damaged wheels, damaged tires, bald tires, tire sidewall bubbles, broken tire valves, wheel misalignment, mismatched tires, brake rotor discoloration, brake rotor damage, brake rotor wear, and/or suspension modifications.

81. A method for inspecting a vehicle using a vehicle inspection system, the vehicle inspection system comprising a support member and a plurality of sensor arrays coupled to the support member, the plurality of sensor arrays comprising respective sets of sensors oriented in different directions, the method comprising: moving the vehicle and the support member of the vehicle inspection system relative to one another; triggering capture of sensor data about the vehicle by the plurality of sensor arrays of the vehicle inspection system; capturing the sensor data about the vehicle using the plurality of sensor arrays of the vehicle inspection system; stopping capture of the sensor data about the vehicle; stopping movement of the vehicle and the support member relative to one another; providing, to a computer hardware processor, the sensor data collected using the plurality of sensor arrays; and receiving, from the computer hardware processor, a vehicle condition report generated using the sensor data.

82. The method of aspect 81, wherein the plurality of sensor arrays comprise first, second and third sensor arrays, the first sensor array comprising a first set of cameras oriented in multiple first directions, the second sensor array comprising a second set of cameras oriented in multiple second directions, the third sensor array comprising a third set of cameras oriented in multiple third directions, and wherein capturing the data related to the vehicle using the plurality of sensor arrays comprises, capturing images of the vehicle using the first, second and third sets of cameras.

83. The method of any of aspects 81-82, further comprising: obtaining an image of a front of the vehicle using a camera of the vehicle inspection system.

84. The method of any of aspects 81-83, further comprising:
obtaining a plurality of images of an interior of the vehicle using a camera of the vehicle inspection system; and providing the plurality of images to the computer hardware processor.

85. The method of any of aspects 81-84, further comprising: before the moving: placing a mobile vehicle diagnostic device (MVDD) of the vehicle inspection system at an engine of the vehicle, wherein the triggering comprises triggering a sensor array of the MVDD of the vehicle inspection system to capture sensor data about the engine of the vehicle.

86. The method of any of aspects 81-85, further comprising: before the moving: positioning a vehicle undercarriage imaging system of the vehicle inspection system relative to the vehicle and the support member of the vehicle inspection system, wherein the triggering comprises triggering a sensor array of the vehicle undercarriage imaging system to capture sensor data about an undercarriage of the vehicle.

87. The method of any of aspects 81-86, further comprising: obtaining a plurality of images of an interior of the vehicle using a camera of the vehicle inspection system, wherein the providing further comprises providing the plurality of images of the interior of the vehicle to the computer hardware processor.

88. The method of any of aspects 81-87, wherein the triggering is performed by the vehicle inspection system when the vehicle is detected at a first position by one or more sensors of the plurality of sensor arrays.

89. The method of aspect 88, wherein the stopping capture is performed by the vehicle inspection system when the vehicle is detected at a second position, different from the first position, by the one or more sensors of the plurality of sensor arrays.

90. The method of any of aspects 81-89, further comprising: before receiving the vehicle condition report, receiving from the computer hardware processor an indication the capturing was unsuccessful; recapturing second sensor data about the vehicle using the plurality of sensor arrays of the vehicle inspection system; and providing, to the computer hardware processor, the second sensor data collected using the plurality of sensor arrays.

91. The method of any of aspects 81-90, further comprising: before the moving, positioning the support member relative to the vehicle.

92. The method of any of aspects 81-91, wherein the moving comprises driving the vehicle past the support member.

93. The method of any of aspects 81-92, wherein the moving comprises moving the support member about the vehicle.

94. A method for inspecting a vehicle using a vehicle inspection system, the vehicle inspection system comprising a support member, and a plurality of sensor arrays coupled to the support member, the plurality of sensor arrays comprising respective sets of sensors oriented in different directions, the method comprising: positioning the vehicle and the support member of the vehicle inspection system relative to one another; triggering the vehicle inspection system to collect alignment data of the vehicle relative to the vehicle inspection system; providing, to a computer hardware processor, the alignment data; receiving, from the computer hardware processor, an indication of an alignment of the vehicle relative to the vehicle inspection system; repositioning the support member relative to the vehicle based on the indication of the alignment; moving the vehicle and the support member of the vehicle inspection system relative to one another; capturing sensor data about the vehicle using the plurality of sensor arrays of the vehicle inspection system; providing, to a computer hardware processor, the sensor data collected using the plurality of sensor arrays; and receiving, from the computer hardware processor, a vehicle condition report.

95. The method of aspect 94, further comprising: before the moving: positioning a vehicle undercarriage imaging system of the vehicle inspection system relative to the vehicle and the support member of the vehicle inspection system; and performing a registration process between the support member and the vehicle undercarriage imaging system, wherein the triggering comprises triggering the vehicle inspection system to collect alignment data of the support member and the vehicle undercarriage inspection system relative to the vehicle.

96. The method of any of aspects 94-95, further comprising: before the moving: placing a mobile vehicle diagnostic device (MVDD) of the vehicle inspection system at an engine of the vehicle, the MVDD comprising a sensor array.

97. The method of any of aspects 94-96, wherein the moving comprises driving the vehicle past the support member.

98. A method for inspecting a vehicle using a vehicle inspection system, the vehicle inspection system comprising a support member, and a plurality of sensor arrays coupled to the support member, the plurality of sensor arrays comprising respective sets of sensors oriented in different directions, the method comprising: moving the vehicle and the support member of the vehicle inspection system relative to one another; capturing sensor data about the vehicle using the plurality of sensor arrays of the vehicle inspection system; stopping movement of the vehicle and the support member relative to one another; providing, to a computer hardware processor, the sensor data collected using the plurality of sensor arrays; receiving, from the computer hardware processor, a vehicle condition report indicating one or more defects present on the vehicle; providing, to the computer hardware processor, a request for sensor data related to the one or more defects present on the vehicle; and receiving, from the computer hardware processor, a plurality of sensor data related to the one or more defects present on the vehicle.

99. The method of aspect 98, wherein: the sets of sensors oriented in different directions of the plurality of sensor arrays are respective sets of cameras; and the plurality of sensor data related to the one or more defects comprises a plurality of images of the one or more defects taken from different angles by cameras of the respective sets of cameras of the plurality of sensor arrays.

100. The method of aspect 99, further comprising: analyzing the vehicle to confirm a presence of the one or more defects; providing, to the computer hardware processor, an indication of the presence of the one or more defects; and receiving, from the computer hardware processor, an updated vehicle condition report.

101. A vehicle undercarriage inspection system, comprising: a base having a width and a depth respectively extending along first and second directions orthogonal to one another, the width extending from a first end of the base to a second end of the base; a sensor array coupled to the base, the sensor array comprising a set of cameras oriented in multiple directions, the set of cameras including: a first camera oriented in part towards the first end of the base; a second camera oriented in part towards the second end of the base; and a third camera positioned between the first and second cameras; and a processor configured to control the sensor array to capture a plurality of images of an undercarriage of a vehicle with the set of cameras.

102. The vehicle undercarriage inspection system of aspect 101, wherein the sensor array further comprises: a microphone, an infrared camera, a thermal camera, a magnetometer, a time of flight sensor, a light source, and/or an air quality sensor.

103. The vehicle undercarriage inspection system of any of aspects 101-102, wherein the processor is further configured to: generate a composite image of the vehicle undercarriage from images of the plurality of images of the vehicle undercarriage captured using the set of cameras.

104. The vehicle undercarriage inspection system of aspect 103, wherein the processor is further configured to: process the composite image, using at least one trained machine learning (ML) model, to determine whether the vehicle has one or more defects, or provide the composite image to another computing device for processing with the at least one trained ML model to determine whether the vehicle has one or more defects.

105. The vehicle undercarriage inspection system of aspect 104, wherein the one or more defects include: damage to one or more vehicle parts, presence of rust, presence of one or more aftermarket vehicle modifications, altered vehicle suspension, and/or a missing catalytic converter.

106. The vehicle undercarriage inspection system of any of aspects 101-105, wherein: the sensor array further comprises: a first time of flight (TOF) sensor oriented in part toward the first end of the base; and a second TOF sensor oriented in part the second end of the base, wherein the processor is configured to: determine a position and/or motion of the vehicle relative to the vehicle undercarriage inspection system based on signals collected by the first and second TOF sensors; and generate a composite image of the vehicle undercarriage from images of the plurality of images of the vehicle undercarriage captured using the set of cameras and based on the position and/or motion of the vehicle relative to the vehicle undercarriage inspection system.

107. The vehicle undercarriage inspection system of any of aspects 101-106, further comprising: a cover coupled to the base, wherein the cover is configured to withstand 16,000 pounds of force.

108. The vehicle undercarriage inspection system of aspect 107, wherein: the cover comprises internal ribbing configured to reinforce the cover to withstand the 16,000 pounds of force.

109. The vehicle undercarriage inspection system of any of aspects 101-108, wherein first, second and third cameras are configured such that their combined field of view (FOV) is 200 cm in width with a minimum pixel density of 15 pixels/cm.

110. The vehicle undercarriage inspection system of any of aspects 101-109, wherein: the vehicle undercarriage inspection system weighs less than 10 pounds; and the vehicle undercarriage inspection system further comprises a handle attached to the base for lifting the vehicle undercarriage inspection system.

111. The vehicle undercarriage inspection system of any of aspects 101-110, wherein the processor is configured to: generate a 3D reconstruction of the vehicle undercarriage using the images of the vehicle undercarriage captured using the set of cameras.

112. The vehicle undercarriage inspection system of any of aspects 101-111, further comprising: a substrate supporting a plurality of electronic components, the plurality of electronic components comprising: the processor; respective camera controllers for the first, second and third cameras; and a power supply.

113. A vehicle undercarriage inspection system, comprising: a base having a width and a depth respectively extending along first and second directions orthogonal to one another, the width extending from a first end of the base to a second end of the base; a sensor array coupled to the base, the sensor array comprising: a set of cameras oriented in multiple directions; and a first time of flight (TOF) sensor configured to detect a position and/or motion of the vehicle; and a processor configured to: control the sensor array to capture a plurality of images of an undercarriage of a vehicle with the set of cameras; and control the TOF sensor to capture one or more signals indicative of the position and/or motion of the vehicle.

114. The vehicle undercarriage inspection system of aspect 113, further comprising: a second time of flight sensor configured to detect a position and/or motion of the vehicle, wherein: the first time of flight sensor is oriented in part towards the first end of the base; the second time of flight sensor is oriented in part towards the second end of the base; and the first and second time of flight sensors are configured to collect signals indicative of a distance to one or more wheels of the vehicle.

115. The vehicle undercarriage inspection system of any of aspects 113-114, wherein the first TOF sensor is oriented to collect signals indicative of a distance between the undercarriage of the vehicle and the vehicle undercarriage inspection system.

116. The vehicle undercarriage inspection system of any of aspects 113-115, wherein the processor is configured to generate a composite image of the undercarriage of the vehicle by combining images of the plurality of images based on the signals indicative of the position and/or motion of the vehicle.

117. A method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a time of flight (TOF) sensor configured to output signals indicative of the distance of one or more parts of the vehicle relative to the vehicle undercarriage inspection system, the method comprising: using a computer hardware processor to perform: obtaining, using the TOF sensor, at least one first signal indicative of a distance between the vehicle and the TOF sensor; in response to determining, using the at least one signal, that the vehicle is within a threshold distance of the TOF sensor, triggering the sensor array to capture one or more images of the vehicle undercarriage; capturing the one or more images of the vehicle undercarriage using the sensor array; and processing images of the plurality of images using a machine learning model to determine whether the vehicle has one or more defects.

118. The method of aspect 117, further comprising: obtaining, using the TOF sensor, at least one second signal indicative of the distance between the vehicle and the TOF sensor; in response to determining the vehicle is in a second position relative to the vehicle undercarriage inspection system based on the at least one second signal, triggering the sensor array to stop capture of the images of the vehicle undercarriage.

119. The method of any of aspects 117-118, further comprising: determining, using the at least one signal, that the vehicle is within the threshold distance of the TOF sensor.

120. The method of any of aspects 117-119, wherein the processing comprises: generating a composite image of the undercarriage of the vehicle by combining the images of the plurality of images based on the signals related to the position of the vehicle obtained from the TOF sensor.

121. A method for analyzing the condition of an undercarriage of a vehicle using a vehicle undercarriage inspection system, the vehicle undercarriage inspection system comprising a sensor array, the sensor array comprising first, second, and third cameras, the method comprising: using a computer hardware processor to perform: obtaining, using the sensor array of the vehicle undercarriage inspection system, sensor data about the undercarriage of the vehicle captured as the vehicle and vehicle undercarriage inspection system move relative to each other, the sensor data including: first, second and third sets of images captured by the first, second and third cameras, respectively; and data indicative of the speed of the vehicle relative to the vehicle undercarriage inspection system; generating a composite image of the undercarriage of the vehicle by combining images of the first, second and third sets of images based on the speed of the vehicle; determining whether the vehicle has one or more defects by processing the composite image, using a first trained machine learning (ML) model; and generating a vehicle condition report based on results of the processing.

122. The method of aspect 121, wherein the first, second and third sets of images respectively comprise consecutive images of the undercarriage of the vehicle taken by the first, second and third cameras.

123. The method of aspect 122, further comprising: determining pixel shift distances between adjacent images of the consecutive images of the first, second and third sets of images, wherein determining the speed of the vehicle comprises determining the speed of the vehicle based on the pixel shift distances.

124. The method of aspect 123, wherein the vehicle undercarriage imaging system further comprises a sensor configured to output data indicative of a position and/or motion of the vehicle relative to the vehicle undercarriage inspection system, and the determining the speed of the vehicle is performed based on the pixel shift distances and the data indicative of the position and/or motion of the vehicle relative to the vehicle undercarriage inspection system.

125. The method of any of aspects 122-124, further comprising: determining pixel shift distances between adjacent images of the consecutive images of the first, second and third sets of images; and aligning the first, second and third sets of images using the respective pixel shift distances for the first, second and third sets of images, wherein the generating comprises combining temporally aligned images of the first, second and third sets of images.

126. The method of aspect 125, wherein aligning the first, second and third sets of images comprises: determining a difference between the pixel shift distances of the second and third sets of images and the pixel shift distances of the first set of images; and determining an alignment of the first, second and third sets of images which minimizes the difference between the pixel shift distances of the second and third sets of images and the pixel shift distances of the first set of images.

127. The method of any of aspects 122-126, further comprising: determining pixel shift distances between adjacent images of the consecutive images of the first, second and third sets of images; and determining, based on the pixel shift distances, respective first, second and third subsets of images from the first, second and third sets of images, the first, second and third subsets of images comprising images in which the vehicle is moving relative to the vehicle undercarriage inspection system, wherein generating the composite image of the undercarriage of the vehicle by combining images of the first, second and third subsets of images.

128. The method of any of aspects 121-127, wherein the one or more defects include: damage to one or more vehicle parts, presence of rust, presence of one or more aftermarket vehicle modifications, altered vehicle suspension, and/or a missing catalytic converter.

129. The method of any of aspects 121-128, further comprising: generating a 3D model of the undercarriage of the vehicle based on the first, second and third sets of images and the data indicative of the speed of the vehicle relative to the vehicle undercarriage inspection system; generating a visualization of the 3D model; and providing access to the visualization to one or more users.

130. The method of any of aspects 121-129, further comprising: obtaining air quality data from an air quality sensor of the vehicle undercarriage inspection system; obtaining magnetic field data from a magnetometer of the vehicle undercarriage inspection system; and/or obtaining audio data from a microphone of the vehicle undercarriage inspection system, wherein determining whether the vehicle has the one or more defects comprises processing the air quality data, magnetic field data and/or the audio data using a second trained machine learning model.

131. A vehicle undercarriage inspection system for analyzing a condition of an undercarriage of a vehicle, the system comprising: a sensor array comprising: a first, second and third camera; a time-of-flight sensor configured to output data indicative of a position and/or motion of the vehicle relative to the vehicle undercarriage inspection system; and a computer hardware processor configured to perform: obtaining, from the sensor array, sensor data about the undercarriage of the vehicle captured as the vehicle and vehicle undercarriage inspection system move relative to each other, the sensor data including: first, second and third sets of images taken respectively by the first, second and third cameras; and data, captured by the time-of-flight sensor indicative of a position and/or motion of the vehicle relative to the vehicle undercarriage inspection system; generating a composite image of the undercarriage of the vehicle by combining images of the first, second and third sets of images based on the data indicative of position and/or motion of the vehicle relative to the vehicle undercarriage inspection system; determining whether the vehicle has one or more defects by processing the composite image, using a first trained machine learning (ML) model; and generating a vehicle condition report based on results of the processing.

132. The vehicle undercarriage inspection system of aspect 131, wherein the first, second and third sets of images respectively comprise consecutive images of the undercarriage of the vehicle taken by the first, second and third cameras.

133. The vehicle undercarriage inspection system of aspect 132, wherein the computer hardware processor is further configured to perform: determining pixel shift distances between adjacent images of the consecutive images of the first, second and third sets of images, wherein generating the composite image is performed based on the pixel shift distances and the data indicative of position and/or motion of the vehicle.

134. The vehicle undercarriage inspection system of any of aspects 132-133, wherein the computer hardware processor is further configured to perform: determining pixel shift distances between adjacent images of the consecutive images of the first, second and third sets of images; and aligning the first, second and third sets of images using the respective pixel shift distances for the first, second and third sets of images, wherein the generating the composite image comprises combining aligned images of the first, second and third sets of images.

135. The vehicle undercarriage inspection system of any of aspects 131-134, wherein the one or more defects include: damage to one or more vehicle parts, presence of rust, presence of one or more aftermarket vehicle modifications, altered vehicle suspension, and/or a missing catalytic converter.

136. At least one non-transitory computer-readable storage medium storing processor-executable instructions that, when executed by at least one computer hardware processor, cause the at least one computer hardware processor to perform a method for analyzing conditions of an undercarriage of a vehicle using a vehicle undercarriage inspection system, the vehicle undercarriage inspection system comprising a sensor array, the sensor array comprising first, second and third cameras, the method comprising: obtaining, using the sensor array of the vehicle undercarriage inspection system, sensor data about the undercarriage of the vehicle captured as the vehicle and vehicle undercarriage inspection system move relative to each other, the sensor data including: first, second and third sets of images captured by the first, second and third cameras, respectively; and data indicative of the speed of the vehicle relative to the vehicle undercarriage inspection system; generating a composite image of the undercarriage of the vehicle by combining images of the first, second and third sets of images based on the speed of the vehicle; determining whether the vehicle has one or more defects by processing the composite image, using a first trained machine learning (ML) model; and generating a vehicle condition report based on results of the processing.

137. The at least one non-transitory computer-readable storage medium of aspect 136, wherein the first, second and third sets of images respectively comprise consecutive images of the undercarriage of the vehicle taken by the first, second and third cameras.

138. The at least one non-transitory computer-readable storage medium of aspect 137, wherein the method further comprises: determining pixel shift distances between adjacent images of the consecutive images of the first, second and third sets of images, wherein the generating the composite image is performed based on the pixel shift distances.

139. The at least one non-transitory computer-readable storage medium of any of aspects 137-138, wherein the method further comprises: determining pixel shift distances between adjacent images of the consecutive images of the first, second and third sets of images; and aligning the first, second and third sets of images using the respective pixel shift distances for the first, second and third sets of images, wherein the generating the composite image comprises combining aligned images of the first, second and third sets of images.

140. The at least one non-transitory computer-readable storage medium of any of aspects 136-139, wherein the one or more defects include: damage to one or more vehicle parts, presence of rust, presence of one or more aftermarket vehicle modifications, altered vehicle suspension, and/or a missing catalytic converter.

141. A method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a sensor configured to output data indicative of the position and/or motion of the vehicle relative to the vehicle undercarriage inspection system, the method comprising: positioning the vehicle undercarriage inspection system relative to the vehicle; moving the vehicle and the vehicle undercarriage inspection system relative to one another; triggering capture of data about the vehicle undercarriage by the sensor array of the vehicle undercarriage inspection system; capturing the data about the vehicle undercarriage using the sensor array of the vehicle undercarriage inspection system, the data about the vehicle including a plurality of images of the undercarriage of the vehicle captured by the first, second, and third cameras at the different angles relative to the vehicle undercarriage; stopping capture of the data about the vehicle undercarriage; generating, based on at least some of the plurality of images, a composite image of the vehicle undercarriage.

142. The method of aspect 141, wherein the generating is performed using the vehicle inspection system.

143. The method of any of aspects 141-142, wherein the generating comprises: providing, from the vehicle undercarriage inspection system to a computer hardware processor, separate from the vehicle undercarriage inspection system the at least some of the plurality of images for use in generating the composite image of the vehicle undercarriage.

144. The method of any of aspects 141-143, wherein the capturing comprises capturing respective first, second and third set of images using the first, second and third cameras of the sensor array.

145. The method of any of aspects 141-144, wherein the triggering comprises triggering the capture based on the data indicative of the position and/or motion of the vehicle.

146. The method of aspect 145, wherein the stopping capture is performed based on the data indicative of the position and/or motion of the vehicle.

147. The method of any of aspects 141-146, wherein the moving comprises driving the vehicle over the vehicle undercarriage inspection system.

148. The method of any of aspects 141-146, further comprising: before the moving: positioning a vehicle exterior inspection system relative to the vehicle, the vehicle exterior inspection system comprising a support member and a plurality of sensor arrays coupled to the support member, the plurality of sensor arrays comprising respective sets of sensors oriented in different directions, wherein: the triggering comprises triggering the plurality of sensor arrays to capture sensor data about an exterior of the vehicle; the capturing further comprises capturing the sensor data about an exterior of the vehicle using the plurality of sensor arrays.

149. A method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a sensor configured to output data indicative of the position and/or motion of the vehicle relative to the vehicle undercarriage inspection system, the method comprising: positioning the vehicle undercarriage inspection system relative to the vehicle; triggering the vehicle undercarriage inspection system to collect alignment data of the vehicle relative to the vehicle undercarriage inspection system; generating, based on the alignment data, an indication of an alignment of the vehicle relative to the vehicle inspection system; repositioning the vehicle relative to the vehicle undercarriage inspection system based on the indication of the alignment of the vehicle relative to the vehicle inspection system; moving the vehicle and the vehicle undercarriage inspection system relative to one another; capturing sensor data about the vehicle undercarriage using the sensor array of the vehicle undercarriage inspection system, the data about the vehicle including a plurality of images of the undercarriage of the vehicle; generating, based on at least some of the plurality of images, a composite image of the vehicle undercarriage.

150. The method of aspect 149, wherein the alignment data is captured by the sensor configured to output data indicative of the position and/or motion of the vehicle.

151. The method of any of aspects 149-150, wherein the capturing is triggered based on the data indicative of the position and/or motion of the vehicle.

152. The method of aspect 151, wherein the capturing is stopped based on the data indicative of the position and/or motion of the vehicle.

153. The method of any of aspects 149-152, wherein the moving comprises driving the vehicle over the vehicle undercarriage inspection system.

154. The method of any of aspects 149-153, wherein the moving comprises moving the vehicle undercarriage inspection system beneath the vehicle.

155. The method of any of aspects 149-154, wherein the generating is performed by the vehicle undercarriage inspection system.

156. A method for inspecting an undercarriage of a vehicle using a vehicle undercarriage inspection system, the vehicle undercarriage inspection system comprising a sensor array comprising first, second and third cameras configured to capture images at different angles relative to the vehicle undercarriage, and a sensor configured to output data indicative of the position and/or motion of the vehicle relative to the vehicle undercarriage inspection system, the method comprising: moving the vehicle and the vehicle undercarriage inspection system relative to one another; capturing sensor data about the vehicle undercarriage using the sensor array of the vehicle undercarriage inspection system; providing, to a computer hardware processor, the data about the vehicle undercarriage; receiving, from the computer hardware processor, a vehicle condition report indicating one or more defects present on the vehicle; providing, to the computer hardware processor, a request for sensor data related to the one or more defects present on the vehicle; and receiving, from the computer hardware processor, a plurality of sensor data related to the one or more defects present on the vehicle.

157. The method of aspect 156, wherein: the plurality of sensor data related to the one or more defects comprises a plurality of images of the one or more defects taken from different angles by the first, second and third cameras of the sensor array.

158. The method of aspect 157, further comprising: analyzing the vehicle to confirm a presence of the one or more defects; providing, to the computer hardware processor, an indication of the presence of the one or more defects; and receiving, from the computer hardware processor, an updated vehicle condition report.

159. The method of any of aspects 156-158, wherein the triggering is performed by the vehicle undercarriage inspection based on the data indicative of the position and/or motion.

160. The method of aspect 159, wherein the stopping capture is performed by the vehicle inspection system based on the data indicative of the position and/or motion.

What is claimed is:

1. A vehicle undercarriage inspection system, comprising:
    a base having a width and a depth respectively extending along first and second directions orthogonal to one another, the width extending from a first end of the base to a second end of the base;
    a sensor array coupled to the base, the sensor array comprising:
        a set of cameras oriented in multiple directions, the set of cameras including:
            a first camera oriented in part towards the first end of the base;
            a second camera oriented in part towards the second end of the base; and
            a third camera positioned between the first and second cameras;
        a first time of flight (TOF) sensor oriented in part toward the first end of the base; and
        a second TOF sensor oriented in part toward the second end of the base;
    a processor configured to:
        control the sensor array to capture a plurality of images of an undercarriage of a vehicle with the set of cameras as a vehicle passes over the vehicle undercarriage inspection system, while the vehicle undercarriage inspection system remains stationary at a fixed location as the vehicle passes over the vehicle undercarriage inspection system;
        determine a position and/or motion of the vehicle relative to the vehicle undercarriage inspection system based on signals collected by the first and second TOF sensors; and
        generate a composite image of the vehicle undercarriage from images of the plurality of images of the vehicle undercarriage captured using the set of cameras and based on the position and/or motion of the vehicle relative to the vehicle undercarriage system; and
    a cover coupled to the base, wherein the cover is configured to withstand 16,000 pounds of force.

2. The vehicle undercarriage inspection system of claim 1, wherein the sensor array further comprises: a microphone, an infrared camera, a thermal camera, a magnetometer, a light source, and/or an air quality sensor.

3. The vehicle undercarriage inspection system of claim 1, wherein the processor is further configured to:
    process the composite image, using at least one trained machine learning (ML) model, to determine whether the vehicle has one or more defects, or
    provide the composite image to another computing device for processing with the at least one trained ML model to determine whether the vehicle has one or more defects.

4. The vehicle undercarriage inspection system of claim 3, wherein the one or more defects include: damage to one or more vehicle parts, presence of rust, presence of one or more aftermarket vehicle modifications, altered vehicle suspension, and/or a missing catalytic converter.

5. The vehicle undercarriage inspection system of claim 1, wherein:
the cover comprises internal ribbing configured to reinforce the cover to withstand the 16,000 pounds of force.

6. The vehicle undercarriage inspection system of claim 1, wherein the first, second and third cameras are configured such that their combined field of view (FOV) is 200 cm in width with a minimum pixel density of 15 pixels/cm.

7. The vehicle undercarriage inspection system of claim 1, wherein:
the vehicle undercarriage inspection system weighs less than 10 pounds; and
the vehicle undercarriage inspection system further comprises a handle attached to the base for lifting the vehicle undercarriage inspection system.

8. The vehicle undercarriage inspection system of claim 1, wherein the processor is further configured to:
generate a 3D reconstruction of the vehicle undercarriage using the images of the vehicle undercarriage captured using the set of cameras.

9. The vehicle undercarriage inspection system of claim 1, further comprising:
a substrate supporting a plurality of electronic components, the plurality of electronic components comprising:
the processor;
respective camera controllers for the first, second and third cameras; and
a power supply.

10. A vehicle undercarriage inspection system, comprising:
a base having a width and a depth respectively extending along first and second directions orthogonal to one another, the width extending from a first end of the base to a second end of the base;
a sensor array coupled to the base, the sensor array comprising:
a set of cameras oriented in multiple directions;
a first time of flight (TOF) sensor configured to detect a position and/or motion of a vehicle; and
a second TOF sensor configured to detect a position and/or motion of the vehicle,
wherein:
the first TOF sensor is oriented in part towards the first end of the base; and
the second TOF sensor is oriented in part towards the second end of the base; and
a processor configured to, as the vehicle passes over the vehicle undercarriage inspection system, while the vehicle undercarriage inspection system remains stationary at a fixed location as the vehicle passes over the vehicle undercarriage inspection system:
control the sensor array to capture a plurality of images of an undercarriage of the vehicle with the set of cameras; and
control the first and second TOF sensors to capture one or more signals indicative of the position and/or motion of the vehicle.

11. The vehicle undercarriage inspection system of claim 10,
wherein the first and second time of flight sensors are configured to collect signals indicative of a distance to one or more wheels of the vehicle.

12. The vehicle undercarriage inspection system of claim 10, further comprising:
a third TOF sensor oriented to collect signals indicative of a distance between the undercarriage of the vehicle and the vehicle undercarriage inspection system.

13. The vehicle undercarriage inspection system of claim 10, wherein the processor is further configured to generate a composite image of the undercarriage of the vehicle by combining images of the plurality of images based on the signals indicative of the position and/or motion of the vehicle.

14. The vehicle undercarriage inspection system of claim 13, wherein the processor is further configured to:
process the composite image, using at least one trained machine learning (ML) model, to determine whether the vehicle has one or more defects, or
provide the composite image to another computing device for processing with the at least one trained ML model to determine whether the vehicle has one or more defects.

15. The vehicle undercarriage inspection system of claim 10, further comprising a cover coupled to the base and configured to withstand 16,000 pounds of force.

16. The vehicle undercarriage inspection system of claim 15, wherein the cover comprises internal ribbing configured to reinforce the cover to withstand the 16,000 pounds of force.

17. The vehicle undercarriage inspection system of claim 10, wherein:
the vehicle undercarriage inspection system weighs less than 10 pounds; and
the vehicle undercarriage inspection system further comprises a handle attached to the base for lifting the vehicle undercarriage inspection system.

18. The vehicle undercarriage inspection system of claim 10, further comprising one or more light sources coupled to the base and configured to illuminate the undercarriage of the vehicle.

19. The vehicle undercarriage inspection system of claim 18, wherein the processor is configured to control the one or more light sources based on the position and/or motion of the vehicle.

* * * * *